(12) United States Patent
McCrossan et al.

(10) Patent No.: US 8,369,690 B2
(45) Date of Patent: Feb. 5, 2013

(54) RECORDING MEDIUM, REPRODUCTION APPARATUS, RECORDING METHOD, INTEGRATED CIRCUIT, PROGRAM, AND REPRODUCTION METHOD

(75) Inventors: Joseph McCrossan, Simi Valley, CA (US); Tomoyuki Okada, Nara (JP); Kazuhiro Mochinaga, Itami (JP)

(73) Assignee: Panasonic Corporation, Osaka (JP)

( * ) Notice: Subject to any disclaimer, the term of this patent is extended or adjusted under 35 U.S.C. 154(b) by 914 days.

(21) Appl. No.: 12/437,477

(22) Filed: May 7, 2009

(65) Prior Publication Data

US 2009/0220211 A1 Sep. 3, 2009

Related U.S. Application Data

(62) Division of application No. 10/561,418, filed on Dec. 19, 2005.

(51) Int. Cl.
| | |
|---|---|
| H04N 5/78 | (2006.01) |
| H04N 5/84 | (2006.01) |
| H04N 5/92 | (2006.01) |
| H04N 5/93 | (2006.01) |
| H04N 5/775 | (2006.01) |
| H04N 5/917 | (2006.01) |
| H04N 5/935 | (2006.01) |
| H04N 7/12 | (2006.01) |
| H04N 7/16 | (2011.01) |
| H04N 9/80 | (2006.01) |
| H04N 9/475 | (2006.01) |
| G06F 3/12 | (2006.01) |
| G09G 5/39 | (2006.01) |
| H04J 3/00 | (2006.01) |
| H04J 3/04 | (2006.01) |
| H04L 12/56 | (2006.01) |

(52) U.S. Cl. ........ 386/324; 366/219; 366/230; 366/241; 366/324; 366/328; 366/334; 366/337; 366/338; 366/356; 366/357; 345/531; 358/1.15; 370/389; 370/421; 370/498; 370/535; 375/240.26; 725/136

(58) Field of Classification Search ............... 386/324, 386/219, 230, 241, 328, 334, 337, 338, 356, 386/357; 370/389, 421, 498, 535; 345/531; 348/512; 358/1.15; 375/240.26, E7.271; 725/136

See application file for complete search history.

(56) References Cited

U.S. PATENT DOCUMENTS (Continued)

FOREIGN PATENT DOCUMENTS

| EP | 0 877 377 | 11/1998 |
|---|---|---|
| EP | 0 924 934 A1 | 6/1999 |

(Continued)

OTHER PUBLICATIONS

Avaro O. et al.; "The MPEG-4 Systems and Description Languages: A way Ahead in Audio Visual Information Representation"; Signal Processing: Image Communication; Elsevier Science Publishers, Amsterdam, Netherlands; vol. 9, No. 4, May 1, 1997; pp. 385-431.

(Continued)

*Primary Examiner* — Thai Tran
*Assistant Examiner* — Syed Hasan

(57) ABSTRACT

AVClip recorded in BD-ROM is obtained by multiplexing a graphics stream and a video stream. The graphics stream is a PES packet sequence that includes 1) PES packets storing graphics data (ODS) and 2) PES packets storing control information (PCS). In each ODS, values of DTS and PTS indicate a timing of decoding start for corresponding graphics data, and a timing of decoding end for corresponding graphics data, respectively. In each PCS, a value of PTS indicates a display timing of corresponding decoded graphics data combined with the video stream.

3 Claims, 80 Drawing Sheets

EPOCH 1: A PERIOD OF REPRODUCING IN WHICH SUBTITLES APPEAR IN A PREDETERMINED AREA (WINDOW 1)

EPOCH 2: A PERIOD OF REPRODUCING IN WHICH SUBTITLES APPEAR IN A PREDETERMINED AREA (WINDOW 2)

U.S. PATENT DOCUMENTS

| | | | |
|---|---|---|---|
| 4,918,624 A * | 4/1990 | Moore et al. | 358/1.15 |
| 5,519,339 A | 5/1996 | Martin | |
| 5,603,012 A | 2/1997 | Sotheran | |
| 5,625,571 A | 4/1997 | Claydon | |
| 5,689,313 A | 11/1997 | Sotheran | |
| 5,699,544 A | 12/1997 | Robbins et al. | |
| 5,703,793 A | 12/1997 | Wise et al. | |
| 5,724,537 A | 3/1998 | Jones | |
| 5,740,460 A | 4/1998 | Wise et al. | |
| 5,761,741 A | 6/1998 | Robbins et al. | |
| 5,768,561 A | 6/1998 | Wise | |
| 5,768,629 A | 6/1998 | Wise et al. | |
| 5,771,075 A * | 6/1998 | Rim et al. | 348/512 |
| 5,771,357 A | 6/1998 | Kato et al. | |
| 5,784,631 A | 7/1998 | Wise | |
| 5,798,719 A | 8/1998 | Wise et al. | |
| 5,801,973 A | 9/1998 | Wise et al. | |
| 5,805,914 A | 9/1998 | Wise et al. | |
| 5,809,270 A | 9/1998 | Robbins | |
| 5,821,885 A | 10/1998 | Wise et al. | |
| 5,828,907 A | 10/1998 | Wise et al. | |
| 5,829,007 A | 10/1998 | Wise et al. | |
| 5,835,740 A | 11/1998 | Wise et al. | |
| 5,835,792 A | 11/1998 | Wise et al. | |
| 5,842,033 A | 11/1998 | Wise et al. | |
| 5,861,894 A | 1/1999 | Sotheran et al. | |
| 5,878,273 A | 3/1999 | Wise et al. | |
| 5,881,301 A | 3/1999 | Robbins | |
| 5,907,658 A * | 5/1999 | Murase et al. | 386/248 |
| 5,907,692 A | 5/1999 | Wise et al. | |
| 5,929,857 A | 7/1999 | Dinallo et al. | |
| 5,930,450 A * | 7/1999 | Fujita | 386/241 |
| 5,956,519 A | 9/1999 | Wise et al. | |
| 5,956,741 A | 9/1999 | Jones | |
| 5,963,154 A | 10/1999 | Wise et al. | |
| 5,978,592 A | 11/1999 | Wise | |
| 5,984,512 A | 11/1999 | Jones et al. | |
| 5,995,727 A | 11/1999 | Wise et al. | |
| 5,999,160 A | 12/1999 | Kitamura et al. | |
| 6,018,354 A | 1/2000 | Jones et al. | |
| 6,018,776 A | 1/2000 | Wise et al. | |
| 6,034,674 A | 3/2000 | Sotheran et al. | |
| 6,035,126 A | 3/2000 | Wise et al. | |
| 6,038,380 A | 3/2000 | Wise et al. | |
| 6,047,112 A | 4/2000 | Wise et al. | |
| 6,067,417 A | 5/2000 | Wise et al. | |
| 6,079,009 A | 6/2000 | Wise et al. | |
| 6,112,017 A | 8/2000 | Wise | |
| 6,119,213 A | 9/2000 | Robbins | |
| 6,122,726 A | 9/2000 | Wise et al. | |
| 6,141,721 A | 10/2000 | Patterson et al. | |
| 6,181,872 B1 * | 1/2001 | Yamane et al. | 386/332 |
| 6,217,234 B1 | 4/2001 | Dewar et al. | |
| 6,263,422 B1 | 7/2001 | Wise et al. | |
| 6,282,209 B1 | 8/2001 | Kataoka et al. | |
| 6,285,825 B1 | 9/2001 | Miwa et al. | |
| 6,297,857 B1 | 10/2001 | Jones et al. | |
| 6,330,665 B1 | 12/2001 | Wise et al. | |
| 6,330,666 B1 | 12/2001 | Wise et al. | |
| 6,356,707 B1 | 3/2002 | Murase et al. | |
| 6,378,030 B1 | 4/2002 | Jones et al. | |
| 6,417,859 B1 | 7/2002 | Sotheran et al. | |
| 6,435,737 B1 | 8/2002 | Wise et al. | |
| 6,470,460 B1 | 10/2002 | Kashiwagi et al. | |
| 6,580,869 B1 * | 6/2003 | Ando et al. | 386/217 |
| 6,697,930 B2 | 2/2004 | Wise et al. | |
| 6,763,178 B1 * | 7/2004 | Suzuki et al. | 386/230 |
| 6,799,246 B1 | 9/2004 | Wise et al. | |
| 6,868,096 B1 | 3/2005 | Hayashi | |
| 6,892,296 B2 | 5/2005 | Wise et al. | |
| 6,910,125 B2 | 6/2005 | Wise et al. | |
| 6,950,930 B2 | 9/2005 | Wise et al. | |
| 7,095,783 B1 | 8/2006 | Sotheran et al. | |
| 7,149,811 B2 | 12/2006 | Wise et al. | |
| 7,230,986 B2 | 6/2007 | Wise et al. | |
| 7,315,690 B2 * | 1/2008 | Kikuchi et al. | 386/329 |
| 7,711,938 B2 | 5/2010 | Wise et al. | |
| 7,814,422 B2 | 10/2010 | Yahata et al. | |
| 8,024,767 B1 * | 9/2011 | Klebanov et al. | 725/136 |
| 2002/0152369 A1 | 10/2002 | Wise et al. | |
| 2003/0002858 A1 | 1/2003 | Kikuchi et al. | |
| 2003/0018884 A1 | 1/2003 | Wise et al. | |
| 2003/0086568 A1 | 5/2003 | Kato et al. | |
| 2003/0117529 A1 | 6/2003 | De Haan | |
| 2005/0025459 A1 | 2/2005 | Kato et al. | |
| 2005/0063669 A1 | 3/2005 | Kato et al. | |

FOREIGN PATENT DOCUMENTS

| | | |
|---|---|---|
| EP | 0 940 986 | 9/1999 |
| EP | 1 035 735 A2 | 9/2000 |
| JP | 06275054 A | 3/1993 |
| JP | 06-121263 | 4/1994 |
| JP | 06275054 A * | 9/1994 |
| JP | 7-288776 | 10/1995 |
| JP | 8-172624 | 7/1996 |
| JP | 2003-116100 | 4/2003 |
| JP | 2007-528625 | 10/2007 |
| KR | 2002007659 A | 7/2000 |
| RU | 2 073 913 | 9/1991 |
| RU | 2 179 377 | 11/1998 |
| RU | 2 129 758 | 4/1999 |
| RU | 97106830 | 4/1999 |
| TW | 436778 | 12/1987 |
| TW | 448631 | 12/1988 |
| TW | 200300928 | 11/1991 |
| WO | WO 92/05556 | 4/1992 |
| WO | 97/06531 | 2/1997 |
| WO | 00/38431 | 6/2000 |
| WO | WO 00/42773 | 7/2000 |
| WO | 01/15168 | 3/2001 |
| WO | 01/31497 | 5/2001 |
| WO | 01/76256 | 10/2001 |
| WO | 02/075739 | 9/2002 |
| WO | WO 2005/004146 | 1/2005 |

OTHER PUBLICATIONS

Dorat, D. et al., "Explanatory Dictionary of Modern Computer Terms", BKhV-Petersburg Publishing House, St. Petersburg, 2001, P335 with partial English translation.

Japanese Application No. 2008-279457 Office Action dated Feb. 1, 2011, 2 pages.

Taiwan Patent Application No. 931201030 Office Action dated Aug. 30, 2010, 6 pages with partial English translation.

Japanese Application No. 2009-118702 Office Action dated Jan. 24, 2012, 2 pages.

Russian Application No. 2008108075/07(008740) Decision on Grant Patent for Invention dated Oct. 2, 2012, 14 pages including English translation.

* cited by examiner

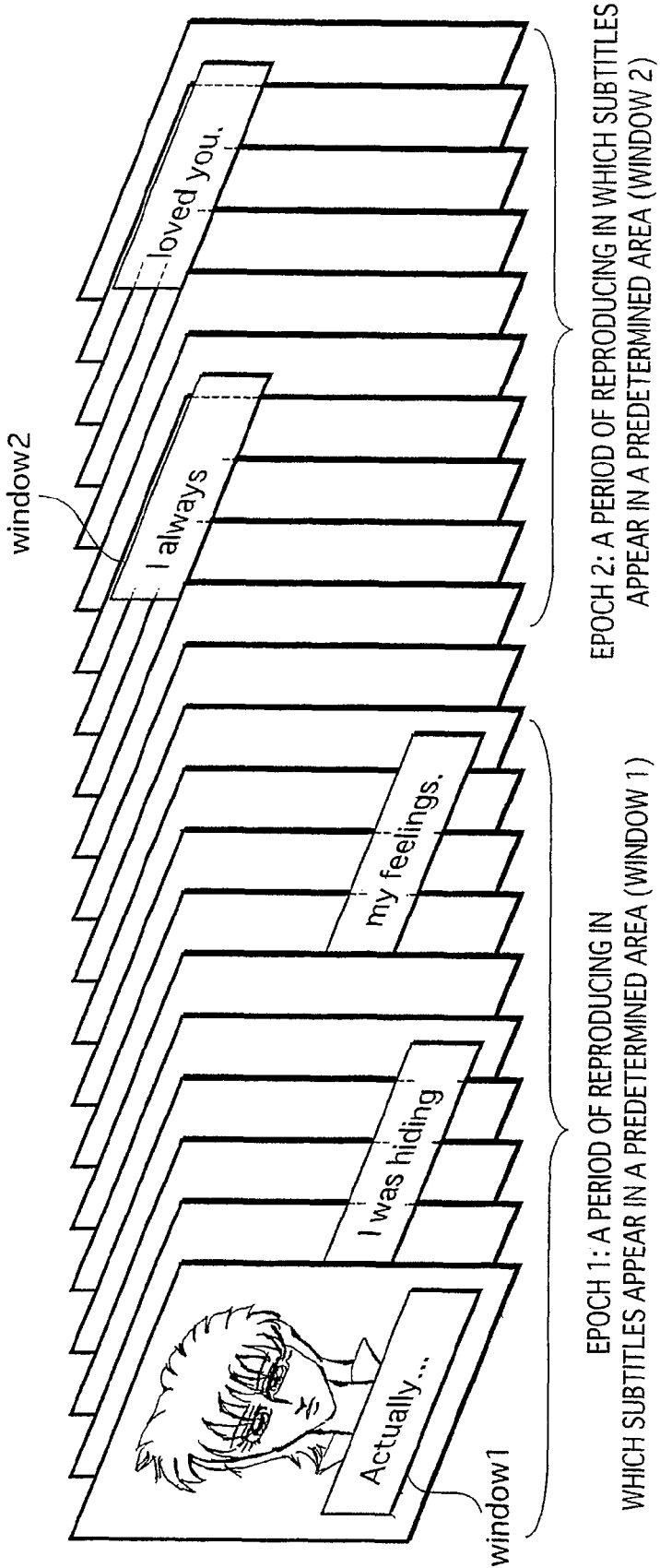

FIG. 17
OBJECT BUFFER
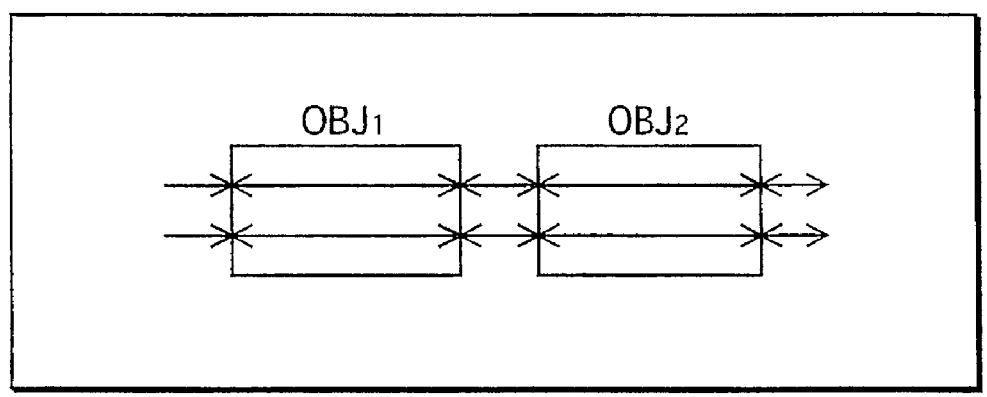
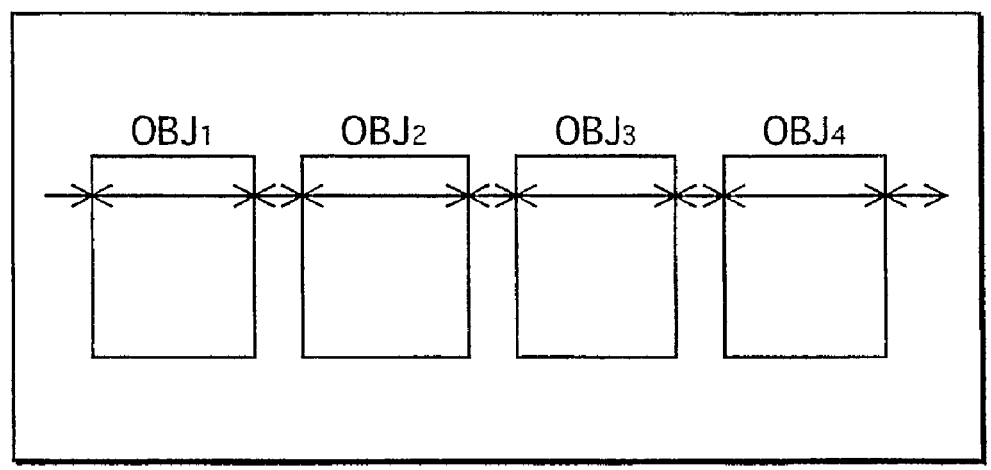
X: EDGE

FIG. 18

PTS( DSn[PCS)] )>=DTS( DSn[PCS] )+DECODEDURATION( DSn )

Where:
- DECODEDURATION( DSn ) is calculated as follows:

```
decode_duration = 0 ;
decode_duration += PLANEINITIALIZATIONTIME( DSn ) ;
if( DSn. PCS. num_of_objects == 2 )
{
    decode_duration += WAIT( DSn, DSn. PCS. OBJ[0], decode_duration ) ;
    if( DSn. PCS. OBJ[0]. window_id == DSn. PCS. OBJ[1]. window_id )
    {
            decode_duration += WAIT( DSn, DSn. PCS. OBJ[1], decode_duration ) ;
            decode_duration += 90000*( SIZE( DSn. PCS. OBJ[0]. window_id )//256*10^6 ) ;
    }
    else
    {
            decode_duration += 90000*( SIZE( DSn. PCS. OBJ[0]. window_id )//256*10^6 ) ;
            decode_duration += WAIT( DSn, DSn. PCS. OBJ[1], decode_duration );
            decode_duration += 90000*( SIZE( DSn. PCS. OBJ[1]. window_id )//256*10^6 ) ;
    }
}
else if( DSn. PCS. num_of_objects ==1 )
{
    decode_duration += WAIT( DSn, DSn. PCS. OBJ[0], decode_duration ) ;
    decode_duration += 90000*( SIZE( DSn. PCS. OBJ[0]. window_id )//256*10^6 ) ;
}
return decode_duration ;
```

- PLANEINITIALIZATIONTIME( DSn ) is calculated as follows:

```
initialize_duration=0 ;
if( DSn. PCS. composition_state= = EPOCH_START )
{
    initialize_duration = 90000*( 8*video_width*video_height//256*10^6) ;
}
else
{
    for( i=0 ; i < WDS. num_windows ; i++ )
    {
            if( EMPTY(DSn.WDS.WIN[i],DSn ) )
                initialize_duration += 90000*( SIZE( DSn. WDS. WIN[i] )//256*10^6) ;
    }
}
return initialize_duration ;
```

- WAIT( DSn, OBJ, current_duration ) is calculated as follows:

```
wait_duration = 0 ;
if( EXISTS( OBJ. object_id, DSn ) )
{
    object_definition_ready_time = PTS( GET( OBJ. object_id. DSn ) ) ;
    current_time = DTS( DSn. PCS )+current_duration ;
    if( current_time < object_definition_ready_time )
            wait_duration += object_definition_ready_time - current_time ) ;
}
return wait_duration ;
```

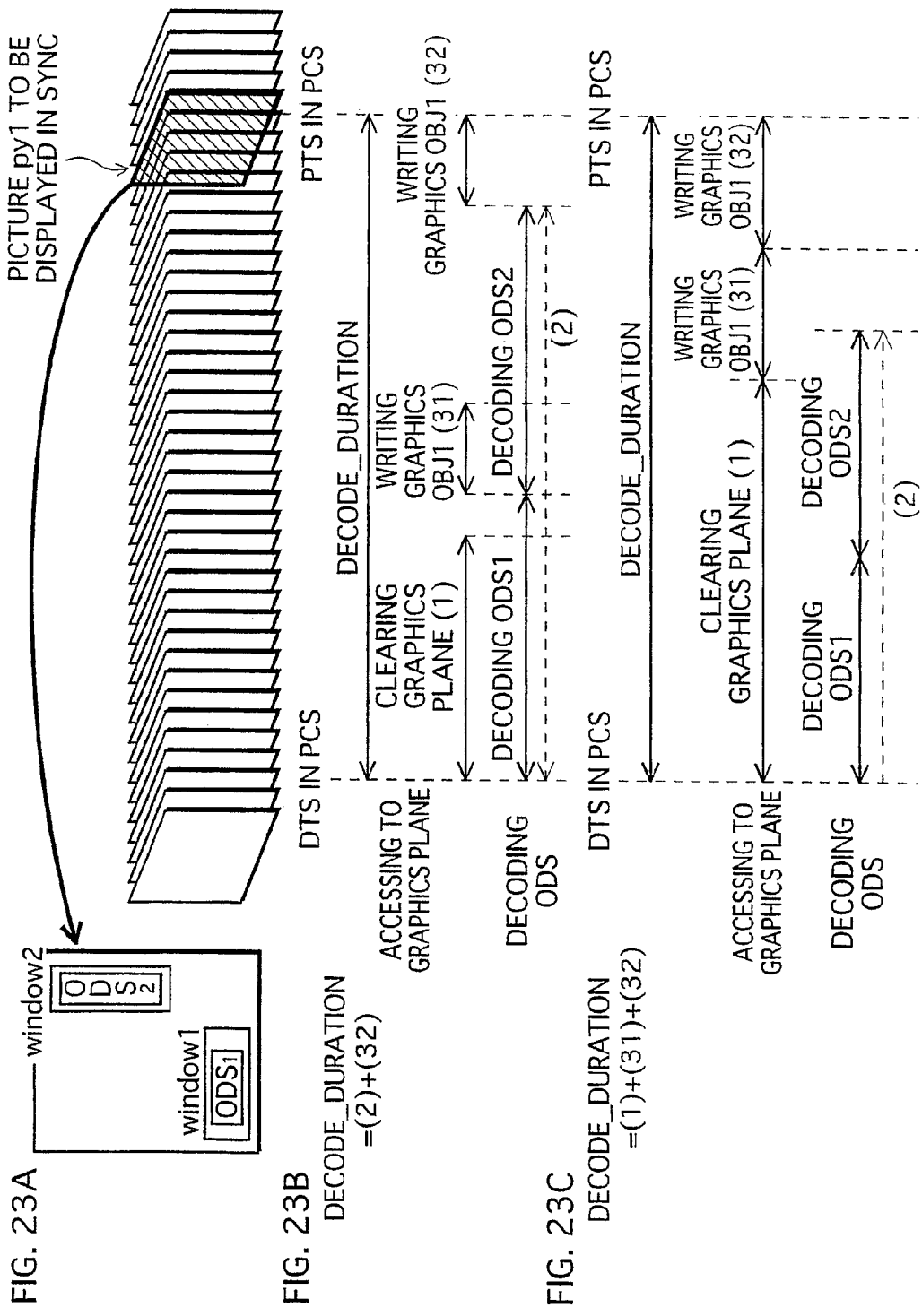

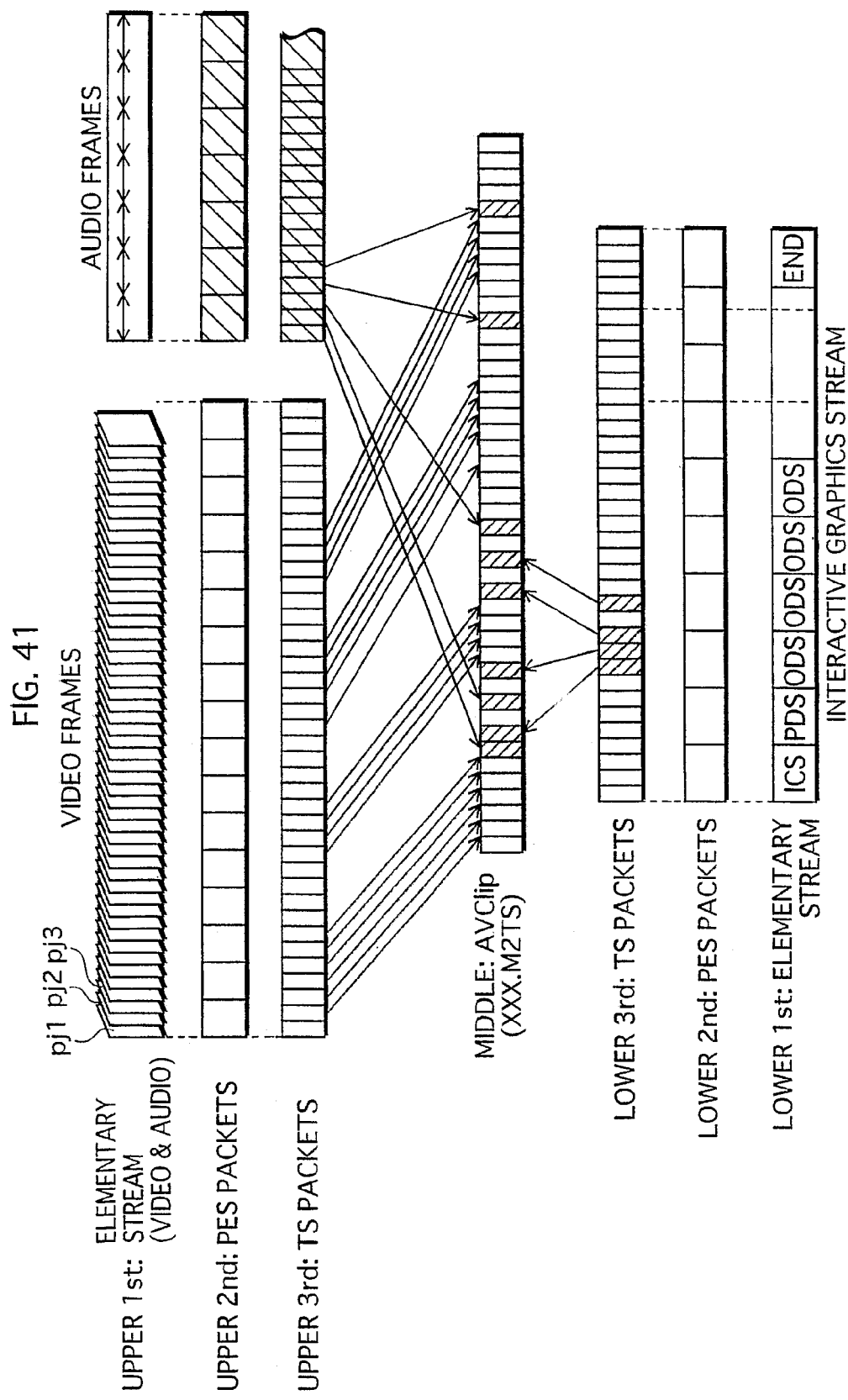

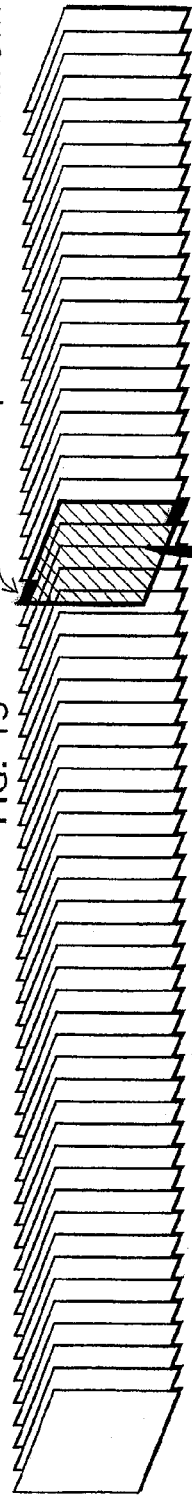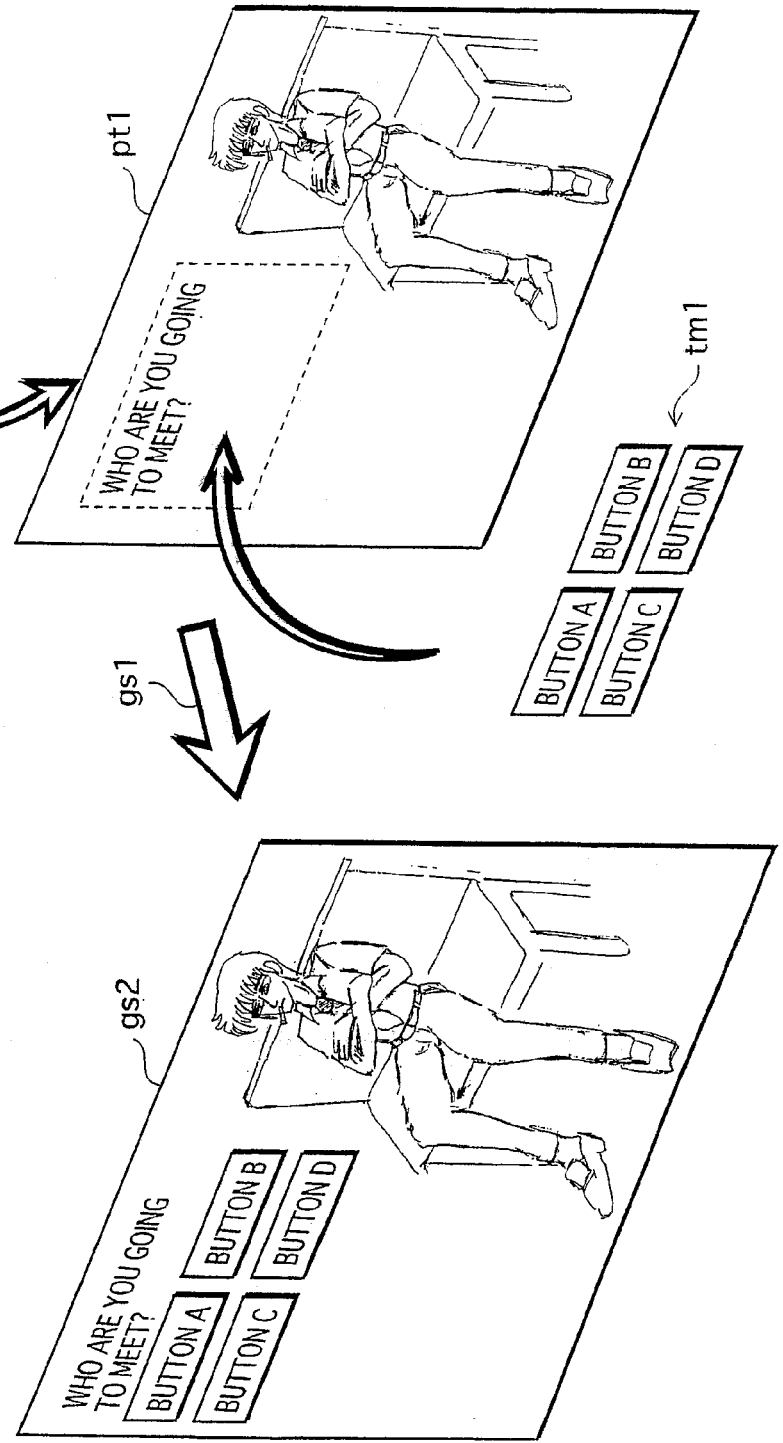
FIG. 45

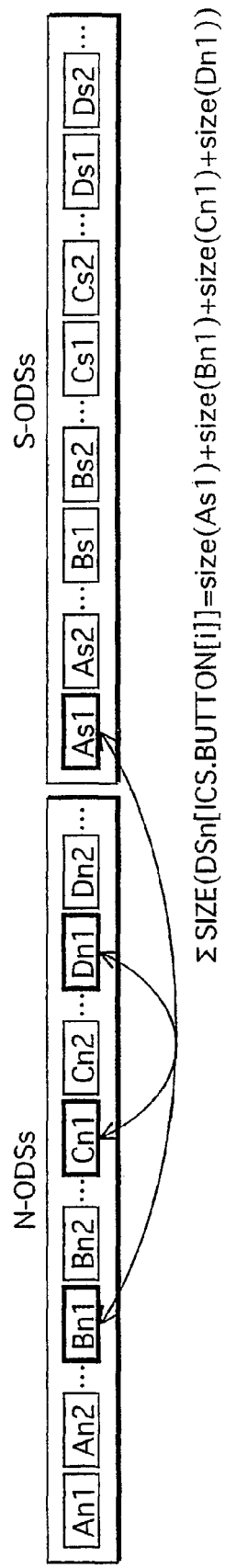
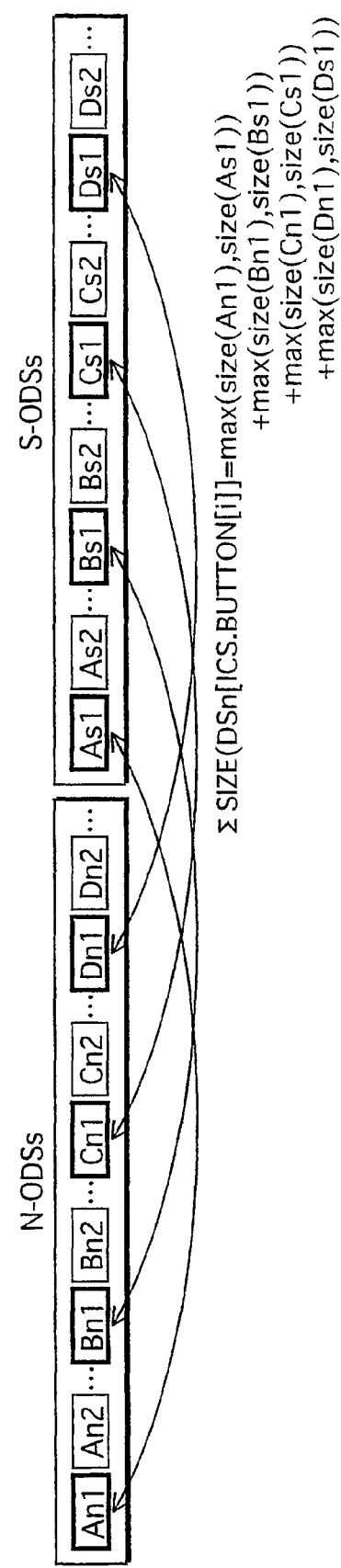
FIG. 54A
default_selected_button_number is indicated
FIG. 54B
default_selected_button_number=0

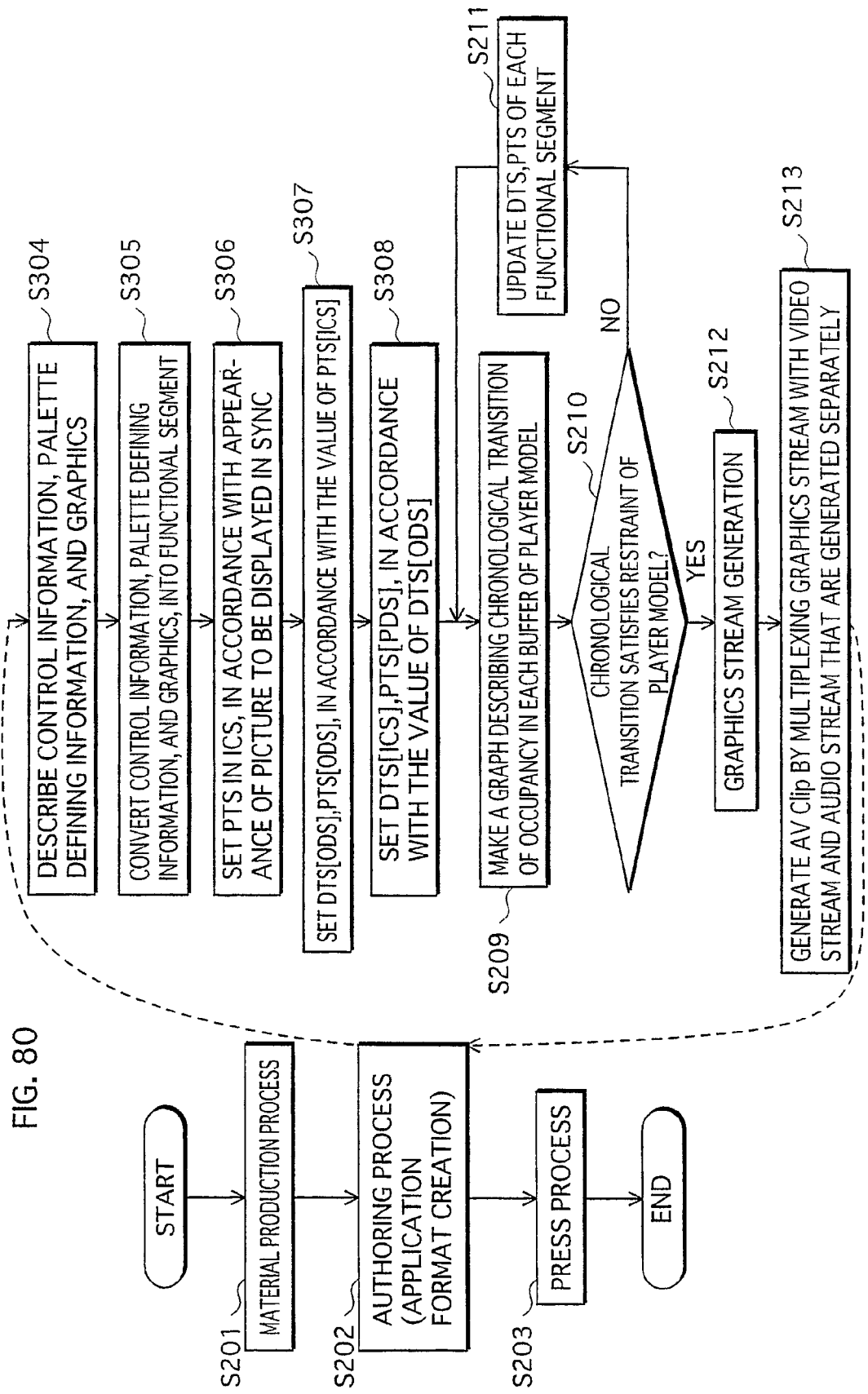

RECORDING MEDIUM, REPRODUCTION APPARATUS, RECORDING METHOD, INTEGRATED CIRCUIT, PROGRAM, AND REPRODUCTION METHOD

RELATED APPLICATIONS

This application is a divisional application of U.S. patent application Ser. No. 10/561,418 filed on Dec. 19, 2005.

TECHNICAL FIELD

The present invention relates to a recording medium such as BD-ROM, and to a reproduction apparatus. The present invention particularly relates to a technology for realizing subtitle display and interactive display, by means of graphics.

BACKGROUND ART

Subtitle display by means of graphics has an important mission of conveying words uttered by the characters in a work, to people in every area of the world. One conventional technology for realizing subtitle display is the subtitle application of ETSI EN 300 743 standard (ETSI: European Telecommunication Standards Institute). The subtitle application is a video stream to be reproduced together with subtitle display by means of graphics. Here, the graphics that correspond to subtitle are displayed as a data stream of MPEG2 standard. The data stream is a sequence of PES packets, where each PES packet has a PTS (presentation time stamp). ETSI EN 300 743 standard defines the timing of subtitle display in a subtitle application. This standard establishes synchronization between a moving picture and graphics, in which graphics is displayed when corresponding images in a video stream are displayed.

When subtitle application is to be provided for BD-ROM, there is a need for further enhancing the resolution level of the graphics. To be more specific, the resolution level is desired to be improved to the level of 1920*1080. However, realization of such a high definition incurs an enormous amount of decoding load at reproduction.

The ETSI EN 300 743 standard defines reproduction control for performing decoding at the time designated by the PTS, and for displaying it straight away. When this is applied, an enormous amount of decoding load will be concentrated in the reproduction apparatus at points immediately before display. Such concentration of load forces the hardware/software competence of the reproduction apparatus to be high, so as to realize graphics display. If such a condition becomes essential for reproduction apparatuses, production cost for reproduction apparatuses will rise remarkably, which will prevent such reproduction apparatuses from being commonly used.

DISCLOSURE OF THE INVENTION

The object of the present invention is to provide a recording medium that realizes high definition level of graphics display, as well as avoiding rise in production cost.

So as to achieve the above-described object, the present invention provides a recording medium storing therein a digital stream that is obtained by multiplexing a graphics stream and a video stream, the graphics stream being a packet sequence that includes a data packet storing graphics data and a control packet storing control information, wherein the data packet has a time stamp whose value indicates a decoding time of the graphics data, and the control packet has a time stamp whose value indicates a time at which the graphics data, after being decoded, is displayed combined with the video stream.

The period in which graphics is decoded is indicated by the time stamp of the packet storing the graphics, and display of the graphics is defined by the value of the time stamp assigned to corresponding control information. Therefore in the present invention, "state of already decoded but not yet displayed", in other words, a state in which decompressed graphics is buffered, is defined on the reproduction timeline.

By defining such a buffering period, it becomes possible to avoid concentration of an enormous amount of decoding load to one point. In addition, if the use of the hardware resource for decoding simultaneously contends other processing, buffering period can be provided so as to relocate the graphics decoding period, thereby avoiding such contention.

Here, if this buffering concept is introduced so as to achieve the aforementioned object, technicians pursuing the development of such a reproduction apparatus will be at a loss about the extent of the memory to be mounted, so as to guarantee normal operation. Meanwhile, technicians who produce subtitle application will also be anxious about whether the subtitle application of their own can be assuredly reproduced by the reproduction apparatus. All these are because the memory occupancy for this buffering will change chronologically, in the course of reproduction on the reproduction timeline. If the chronological change in memory occupancy stays unknown, the anxieties of these technicians will not be wiped away.

So as to solve this problem, it is desirable to have a construction in which the control information includes type information that indicates a memory management start, the time stamp of the control packet is a presentation time stamp, and the control packet further includes a decode time stamp whose value indicates a point of a reproduction timeline of the digital stream, which corresponds to the memory management start, and a time at which the control information is read to a memory.

According to this construction, a memory management start is indicated by a decode time stamp of a packet storing control information. Therefore, by referring to the decode time stamp, it becomes possible to know on which point of the reproduction timeline each buffer for the decoder model should be flashed. If the flash point is considered as a starting point of memory management, it is easy to grasp the chronological occupancy transition of the buffer that stores control information, the buffer that stores graphics before being decoded, and the buffer that stores graphics after being decoded. By changing the value of this decode time stamp, it is possible to adjust the chronological transition of the state of the buffers. According to such adjustment, it becomes possible to avoid buffer overflow at the reproduction apparatus. Therefore, it becomes easy to implement hardware/software at the development stage of reproduction apparatus.

In addition, since it becomes easy to grasp and adjust the chronological transition, verification becomes accordingly easy as to whether the graphics stream obtained by authoring satisfies the restraints of the decoder model that the BD-ROM standard assumes. Therefore a person in charge of authoring can proceed with his authoring operation, under a condition where the graphics of his creation is assured to be operated normally.

In assuming the decoder model of BD-ROM, a further constituting element will become necessary so as to carry out the present invention. In this decoder model of BD-ROM, the decoder main body (i.e. processor) of graphics is independent from the controller main body (i.e. controller) for updating the graphics. The reason why the decoder main body is provided independently from the updating controller main body is to perform advanced updating such as displaying and deleting of graphics gradually, which is useful for a case when the graphics is a subtitle, for example. When the updating controller main body is an independent body from the decoder main body, processor-controller connection will need to be closer. This is because, after the processor completes decoding of the graphics data, the controller has to perform update without delay.

The manner in which the decoding completion of the processor is notified to the controller depends on the manner in which the processor and the controller are implemented in the apparatus. If the processor and the controller are implemented as programs, notification will be performed by intra-process communication. If the processor and the controller are implemented as independent hardware components from each other, then notification will be performed by an interrupting signal. The amount of time lag of such notification also depends on the implementation manner in the apparatus. If the implementation necessitates a large time lag of notification, there will be a case where updating of graphics cannot be synchronized with the display rate of the moving picture.

So as to prevent such a case from occurring, it is desirable to have a construction in which the value of the presentation time stamp is obtained by adding a predetermined value to the value of the decode time stamp, where the predetermined value is based on: a longer one of a period required for clearing of a screen, and a period required for decoding of the graphics data; and a period required for writing of the graphics data to the screen.

The presentation time stamp of a packet storing graphics indicates a decoding ending time, and the presentation time stamp of a packet storing control information indicates a time obtained by adding a predetermined period to the decoding ending time. Therefore only by referring to the presentation time stamps, the controller can perform updating at an adequate timing without receiving from the processor any decoding-completion notification of graphics data. If such update is performed, it becomes possible to assure update synchronized with the display rate of the moving picture, regardless of the manner of implementation in the reproduction apparatus.

Since closer processor-controller connection is realized regardless of the manner of processor-controller implementation in the reproduction apparatus, it becomes possible to maintain a degree of flexibility in the apparatus designing, as well as facilitating manufacturing apparatuses at low cost.

BRIEF DESCRIPTION OF THE DRAWINGS

FIG. 6 illustrates a relation between a display position of a subtitle and an Epoch.

FIG. 17 is a diagram comparing two cases: a window has four Graphics Objects, and a window has two Graphics Objects.

FIG. 18 illustrates an example of an algorithm for calculating a decode duration.

FIG. 23A describes a case in which each of two Windows includes an ODS.

FIG. 23B illustrates a case in which a decode period (2) is longer than a total of a clearing period (1) and a write period (31).

FIG. 23C illustrates a case in which a total of the clearing period (1) and the write period (31) is longer than the decode period (2).

FIG. 41 is a diagram schematically illustrates a structure of AVClip according to the second embodiment.

FIG. 45 shows a screen composition at the display timing of arbitrary picture data "pt1".

FIGS. 54A and 54B shows a value of ΣSIXE(DSn[ICS.BUTTON[i]]), in a case when N-ODSs include plural ODS constituting the buttons A-D, and S-ODSs include plural ODS constituting the buttons A-D.

FIG. 80 illustrates a method of manufacturing a BD-ROM that records the PCS explained in the second embodiment.

BEST MODE FOR CARRYING OUT THE INVENTION (First Embodiment)

A First Embodiment of a non-transitory recording medium according to the present invention is explained below.

Figure 1:
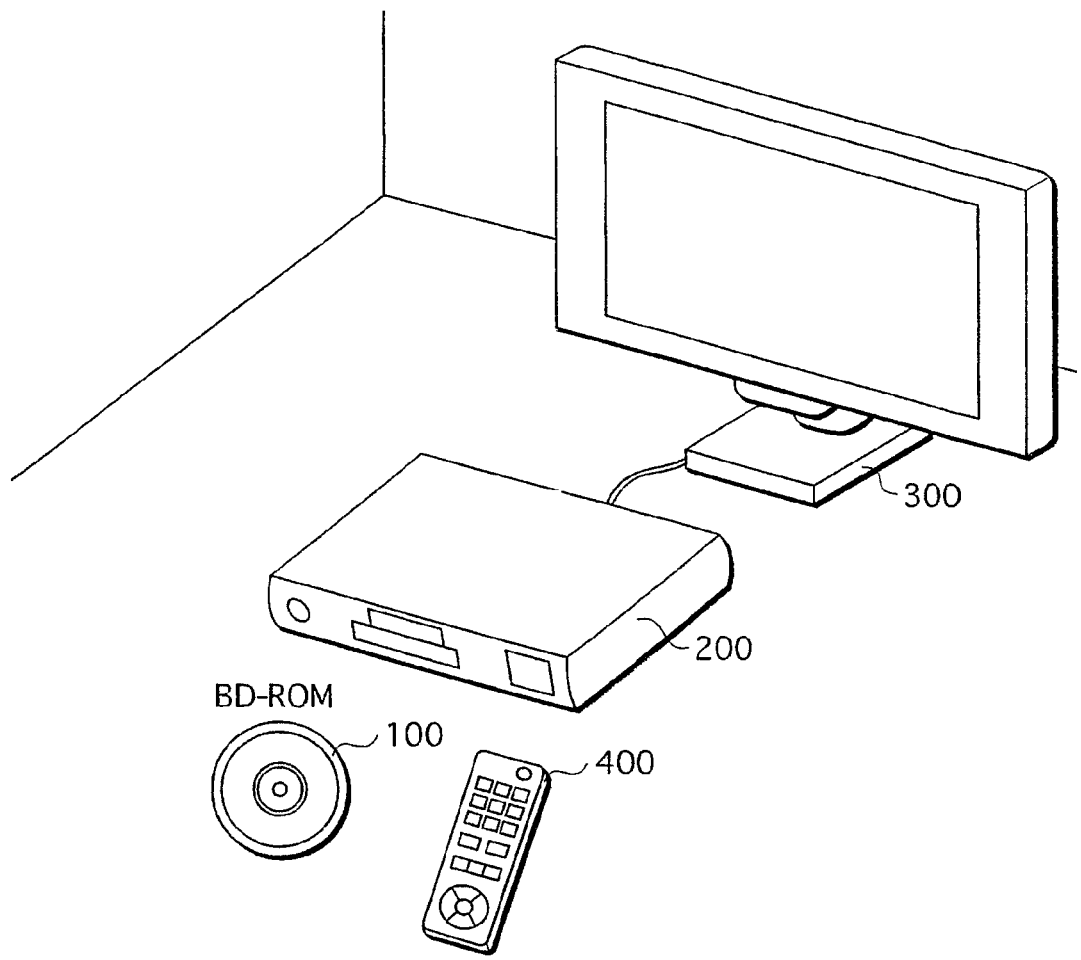
FIG. 1 illustrates an example of use of a recording medium according to the present invention.

FIG. 1 illustrates an example of use of the recording medium. In the drawing, BD-ROM 100 is the recording medium according to the present invention. The BD-ROM 100 is used for providing data of movie works to a Home Theatre System structured by a reproduction apparatus 200, a television 300, and a remote controller 400.

Figure 2:
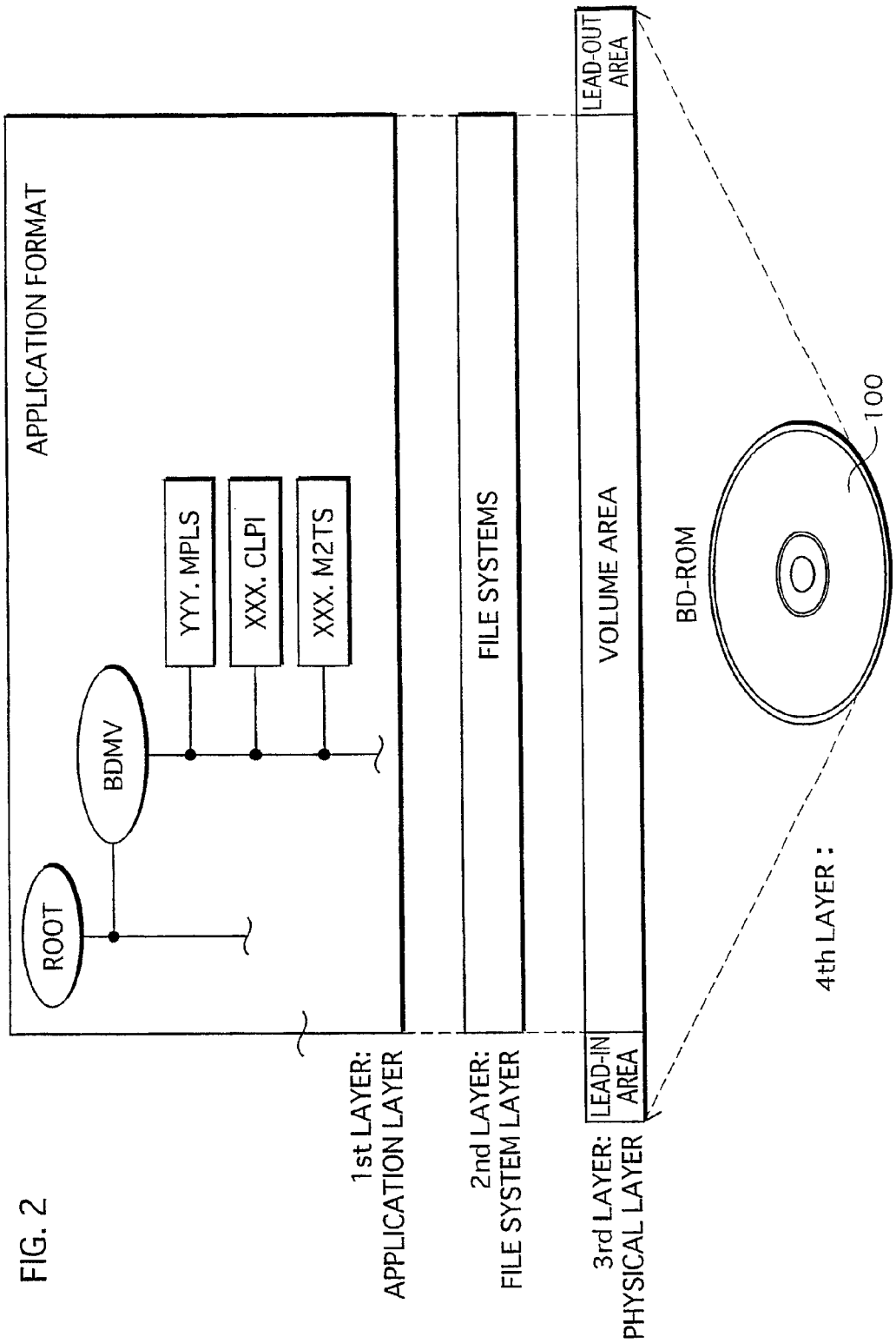
FIG. 2 illustrates a structure of a BD-ROM.

The recording medium according to the present invention is manufactured by an improvement in an application layer of a BD-ROM. FIG. 2 illustrates a structure of the BD-ROM.

In the drawing, the BD-ROM is shown at a bottom of the drawing, and a track on the BD-ROM is shown above the BD-ROM. The track is actually in a spiral shape on the disk, but shown in a line in the drawing. The track includes a lead-in area, a volume area, and a lead-out area. The volume area in this drawing has a physical layer, a file system layer, and an application layer. At a top of the drawing, an application format of the BD-ROM is illustrated using a directory structure. As illustrated in the drawing, the BD-ROM has a directory BDMV under the root directory, and the BDMV directory contains a file for storing an AVClip with an extension M2TS (XXX.M2TS), a file for storing administrative info for the AVClip with an extension CLPI (XXX.CLPI), and a file for defining a logical Play List (PL) for the AVClip with an extension MPLS (YYY.MPLS). By forming the above application format, it is possible to manufacture the recording medium according to the present invention. In a case in which there are more than one file for each kind, it is preferable to provide three directories named STREAM, CLIPINF, and PLAYLIST under the BDMV to store the files with the same extension in one directory. Specifically, it is desirable to store the files with the extension M2TS in the STREAM, the files with the extension CLPI in the CLIPINF, and the files with the extension MPLS in the PLAYLIST.

An explanation about the AVClip (XXX.M2TS) in the above application format is given below.

Figure 3:
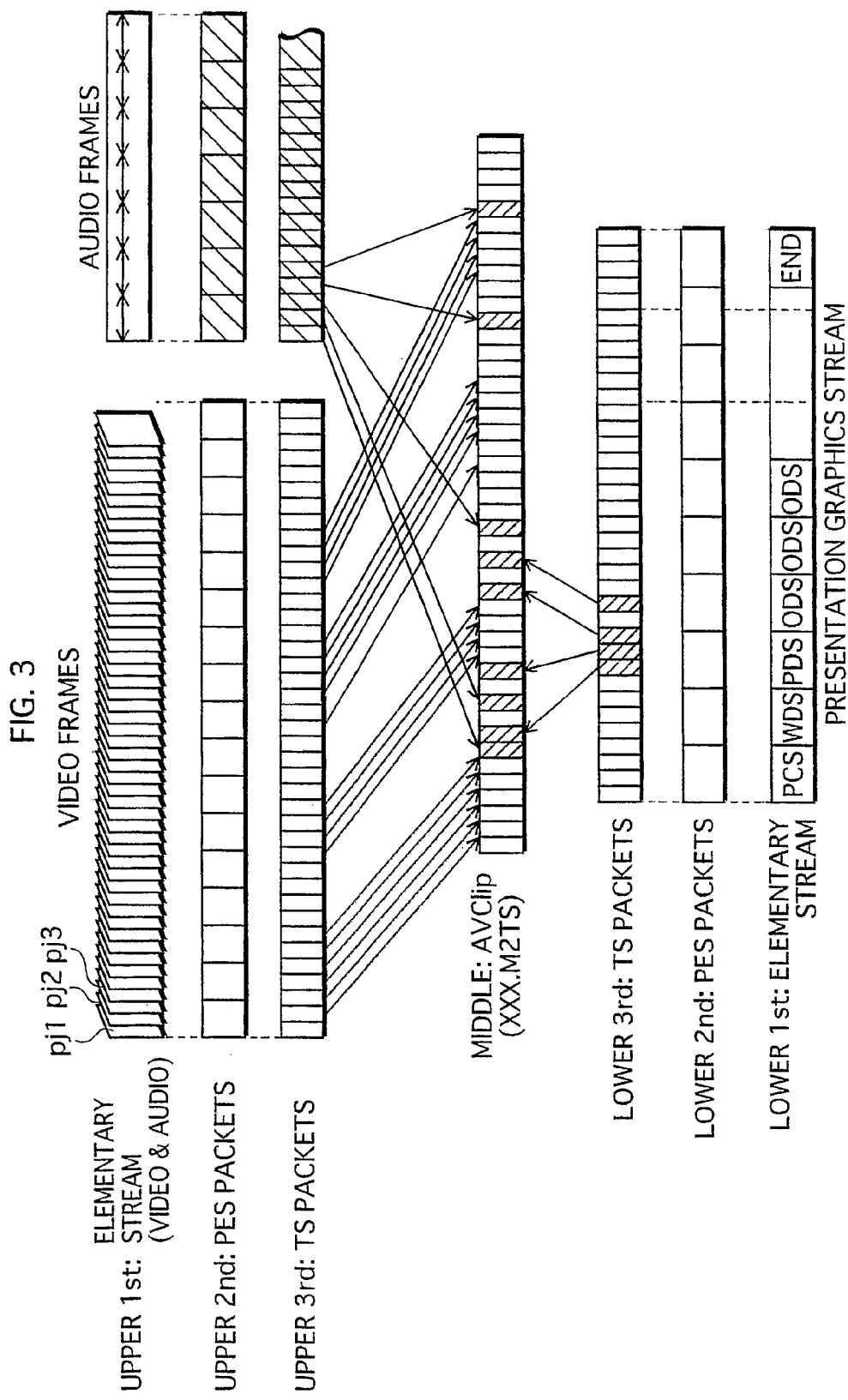
FIG. 3 is a diagram schematically illustrating a structure of an AVClip.

The AVClip (XXX.M2TS) is a digital stream in MPEG-TS format (TS is Transport Stream) obtained by multiplexing a video stream, at least one audio stream, and a presentation graphics stream. The video stream represents pictures of the film, the audio stream represents sound of the film, and the presentation graphics stream represents subtitles of the film. FIG. 3 is a diagram schematically illustrating a structure of the AVClip.

The AVClip (XXX.M2TS) is structured in a following manner. The video stream made of plural vide frames (picture pj1, pj2, and pj3), and the audio stream made of plural audio frames (top row of the drawing) are respectively converted into a line of PES packets (second row of the drawing), and then into a line of TS packets (third row of the drawing). The presentation graphics stream (bottom row of the drawing) is converted into a line of PES packets (second to bottom row of the drawing), and then into a line of TS packets (third to bottom row of the drawing). The three lines of TS packets are multiplexed, and thus the AVClip (XXX.M2TS) is constituted.

In the drawing, only one presentation graphics stream is multiplexed. However, in a case in which the BD-ROM is compatible to plural languages, a presentation graphics stream for each language is multiplexed to constitute the AVClip. The AVClip constituted in the above manner is divided into more than one extent, like ordinary computer files, and stored in areas in the BD-ROM.

Figure 4:
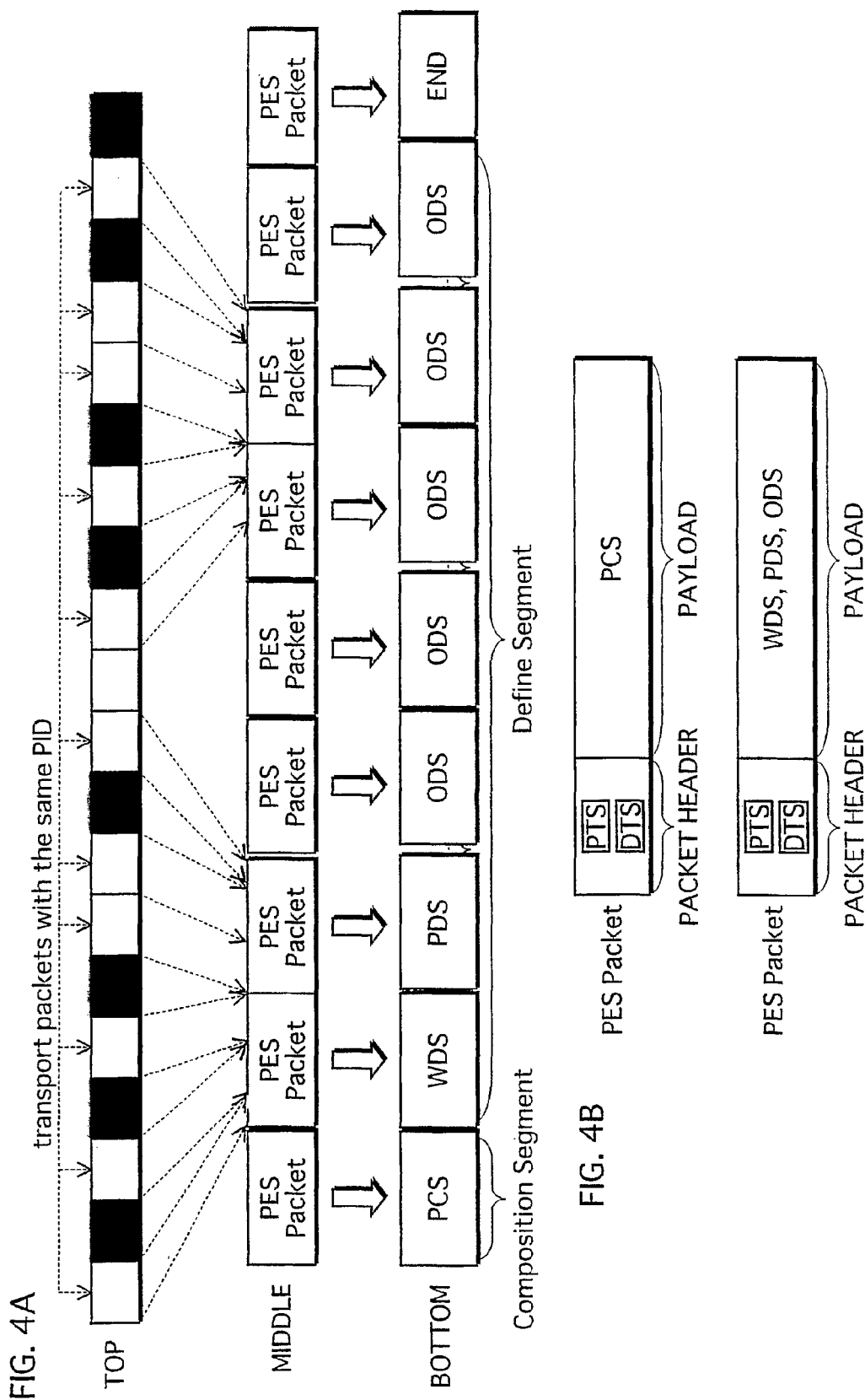
FIG. 4A illustrates a structure of a presentation graphics stream.
FIG. 4B illustrates a PES packet obtained after functional segments are converted.

Next, the presentation graphics stream is explained. FIG. 4A illustrates a structure of the presentation graphics stream. A top row indicates the TS packet line to be multiplexed to the AVClip. A second to the top row indicates the PES packet line that constitutes a graphics stream. The PES packet line is structured by retrieving payloads out of TS packets having a predetermined PID, and connecting the retrieved payloads.

A third to the top row indicates the structure of the graphics stream. The graphics stream is made of functional segments named a Presentation Composition Segment (PCS), a Window Definition Segment (WDS), a Palette Definition Segment (PDS), an Object Definition Segment (ODS), and an END of Display Set Segment (END). Among the above functional segments, the PCS is called a screen composition segment, and the WDS, PDS, ODS, and END are called definition segments. The PES packet and each of the functional segments correspond one to one, or one to plurality. In other words, one functional segment is either recorded in the BD-ROM after converted into one PES packet, or after divided into fragments and converted into more than one PES packet.

FIG. 4B illustrates the PES packet obtained by converting the functional segments. As shown in the drawing, the PES packet is made of a packet header and the payload, and the payload is a substantial body of a functional segment. The packet header includes a DTS and a PTS corresponding to the functional segment. The DTS and PTS included in the packet header are hereinafter referred to as the DTS and PTS of the functional segment.

Figure 5:
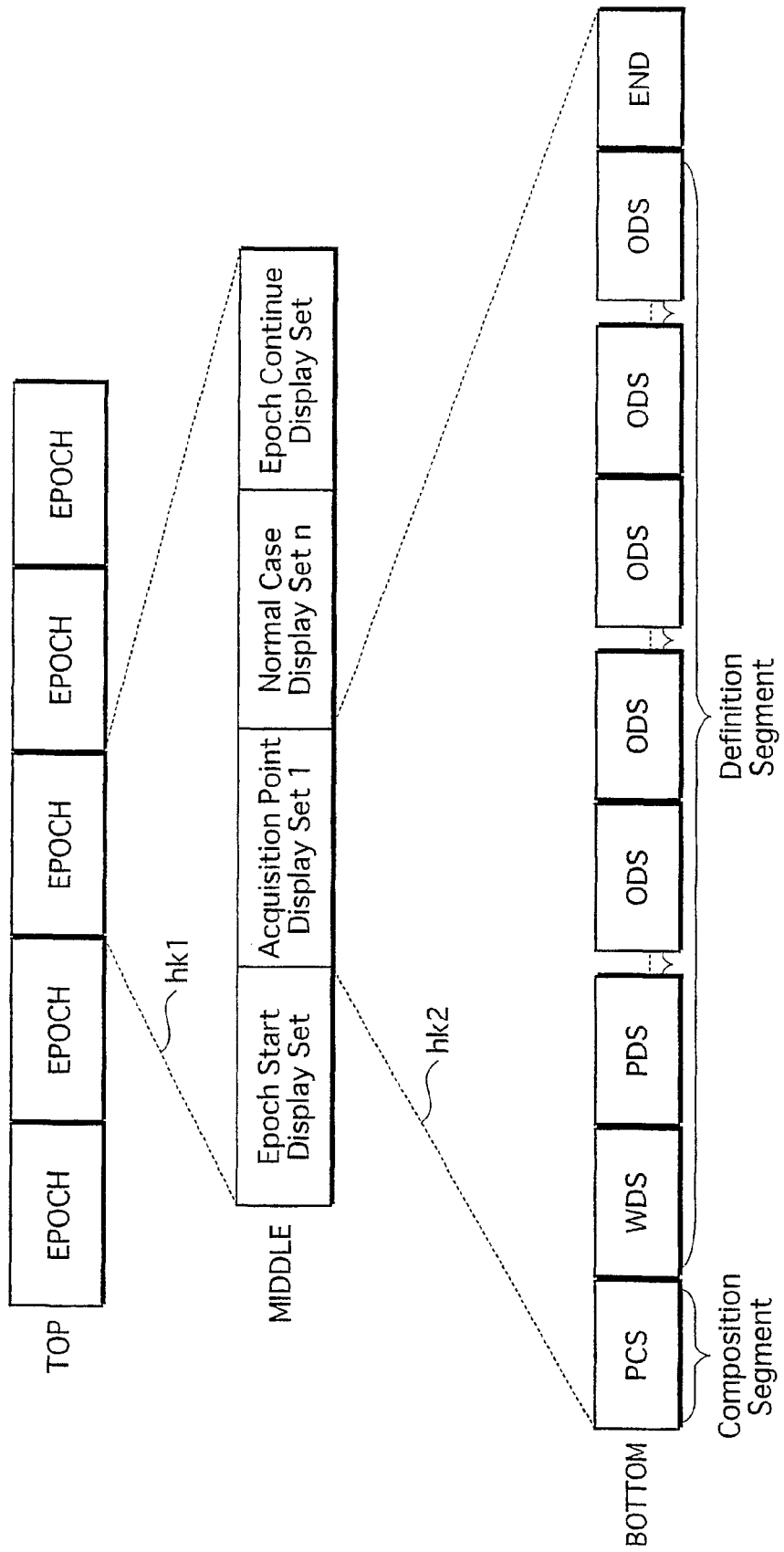
FIG. 5 illustrates a logical structure that is made of various kinds of functional segments.

The above described various kind of functional segments constitute a logical structure as illustrated in FIG. 5. FIG. 5 illustrates the logical structure that is made of the various kinds of functional segments. In the drawing, a top row illustrates Epochs, a middle row illustrates Display Sets (DS), and a bottom row illustrates the functional segments.

Each of the DS shown in the middle row is a group of functional segments that compose graphics for one screen, among all of the plural functional segments that constitute the graphics stream. Broken lines in the drawing indicate the DS to which the functional segments in the bottom row belong, and show that a series of the functional segments of the PCS, WDS, PDS, ODS, and END constitute one DS. The reproduction apparatus is able to generate graphics for one screen by reading the functional segments that constitute the DS.

The Epochs shown in the top row indicate time periods, and memory management is consecutive timewise along a timeline of the AVClip reproduction in one Epoch. One Epoch also represents a group of data that is assigned to the same period of time. The memory referred to here are the Graphics Plane that stores the graphics for one screen, and an Object Buffer that stores decompressed graphics data. The consecutiveness of the memory management means a flash of the Graphics Plane or of the Object Buffer does not occur in the Epoch, and erasing and rendering of the graphics are only performed in a predetermined rectangular area on the Graphics Plane (the flash here indicates clearing of all contents of the stored data in a plane or a buffer). A size and a position of the rectangular area are fixed during one Epoch. As long as the erasing and rendering of the graphics are only performed in the predetermined rectangular area on the Graphics Plane, a sync reproduction between the picture and the graphics is guaranteed. In other words, the Epoch is a unit in the reproducing timeline, and in this unit, the picture and the graphics are guaranteed to be reproduced synchronously. When moving the area, in which the graphics are erased and rendered, to a different position, it is necessary to define a point on the timeline to move the area, and a period after the point becomes a new Epoch. The sync reproduction is not guaranteed at a boarder between two Epochs.

In viewing an actual film, one Epoch is a time period in which subtitles are displayed in the same rectangular area on the screen. FIG. 6 illustrates a relation between the position of the subtitles and the Epochs. In an example illustrated by the drawing, the positions at which the five subtitles "Actually . . . ", "I was hiding", "my feelings.", "I always", and "loved you." are shown move according to the picture in the film. Specifically, the subtitles "Actually . . . ", "I was hiding", and "my feelings." appear at the bottom of the screen, while the subtitles "I always" and "loved you." are shown at the top of the screen. The position of the rectangular area moves in order that the subtitles are out of the way of pictures when viewing the screen, considering visibility of the film. A time period during which the subtitles appear at the bottom is an Epoch 1, and a subsequent time period during which the subtitles appear at the top is an Epoch 2. The Epochs 1 and 2 each have a different area in which the subtitles are rendered. The area in the Epoch 1 is a Window 1 positioned at the bottom of the screen, and the area in the Epoch 2 is a Window 2 positioned at the top of the screen. The memory management is consecutive in each of the Epochs 1 and 2, and accordingly, rendering of the subtitles in the Windows 1 and 2 is synchronous with the pictures.

Next, details about the Display Set (DS) are described.

Broken lines hkl1 and hkl2 in FIG. 5 indicate which functional segment at the middle row belongs to which Epoch. A series of DS "Epoch Start", "Acquisition Point", and "Normal Case" constitute the Epoch at the top raw. The "Epoch Start", "Acquisition Point", "Normal Case", and "Epoch Continue"

are types of the DS, and an order between the "Acquisition Point" and "Normal Case" does not matter and either of them may come first.

The Epoch Start is a DS that has a display effect of "new display", which indicates a start of a new Epoch. Because of this, the Epoch Start contains all functional segments needed to display a new composition of the screen. The Epoch Start is provided at a position which is a target of a skip operation of the AVClip, such as a chapter in a film.

The Acquisition Point is a DS that has a display effect of "display refresh", and is identical in content used for rendering graphics with the Epoch Start which is a preceding DS. The Acquisition Point is not provided at a starting point of the Epoch, but contains all functional segments needed to display the new composition of the screen. Therefore, it is possible to display the graphics without fail when a skip operation to the Acquisition Point is performed. Accordingly, with the Acquisition Point, it is possible to compose a screen in the middle of the Epoch.

The Acquisition Point is provided at a position that could be a target for the skip operation. An example of such a position is a position that could be specified when performing a time search. The time search is an operation in response to a user's input of a time to start reproducing from a reproducing point corresponding to the time specified by the user. The time is specified roughly, by 10 minutes or by 10 seconds for example, and accordingly, points at which the reproduction starts are provided at a 10 minute interval, or a 10 second interval, for example. By providing the Acquisition Point at the points at which the reproduction may start, it is possible to perform reproduction smoothly after the time search.

The Normal Case is a DS that has a display effect of "display update", and contains only elements that are different from the preceding composition of the screen. Specifically, when subtitles in a DSv is the same as subtitles in a DSu but the screen is displayed differently in the DSv and DSu, the DSv is provided so as to include only the PCS and makes the DSv the Normal Case. By this, it becomes unnecessary to provide an ODS with the same content as the content of the ODS in the preceding DS, and a data size in the BD-ROM may be reduced. On the other hand, because the DS as the Normal Case contains only the difference, it is not possible to compose the screen using the Normal Case alone.

The Epoch Continue indicates that Epoch continues across a boundary of AVClips. If Composition State of one DSn is set as Epoch Continue, if the DSn exists on an AVClip different from that of the DSn−1 positioned immediately before the DSn, the DSn and DSn−1 will belong to a same Epoch. Therefore even if AVClip branching occurs between these two DS, there will be no graphics plane/object buffer flash.

Details of the Definition Segments (ODS, WDS, and PDS) are explained below. The Object Definition Segment (ODS) is a functional segment that defines the Graphics Object. An explanation of the Graphics Object is given first. A selling point of the AVClip recorded in the BD-ROM is its resolution as high as hi-vision, and therefore the resolution for the Graphics Object is set at 1920×1080 pixels. Because of the high resolution of 1920×1080 pixels, it is possible to display a specific character style for the subtitles clearly on the screen. As for colors of the subtitles, a bit length of an index value for each pixel (Color Difference Red Cr, Color Difference Blue Cb, Luminance Y, and Transparency T) is 8 bits, and thus it is possible to chose any 256 colors out of full color (16,777,216 colors) for the subtitles. The subtitles realized by the Graphics Object are rendered by positioning texts on a transparent background.

Figure 7A:
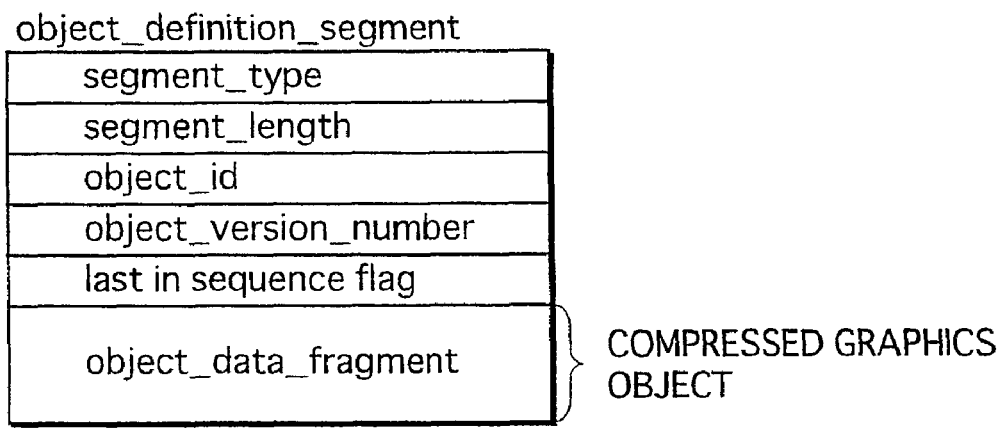
FIG. 7A illustrates syntax to define a Graphics Object in an Object Definition Segment (ODS).

Syntax of ODS to define the Graphics Object is shown in FIG. 7A. The ODS is made of segment_type indicating that the segment is the ODS, segment_length indicating a data length of the ODS, object_id uniquely identifying the Graphics Object corresponding to the ODS in the Epoch, object_version_number indicating a version of the ODS within the Epoch, last_in_sequence_flag, and object_data_fragment which is a consecutive sequence of bytes corresponding to a part or all of Graphics Object.

The object_id is for uniquely identifying the Graphics Object corresponding to the ODS in the Epoch. The Epoch of the graphics stream contains more than one ODS having the same ID. The ODS having the same ID also have the same width and height, and are assigned with a common area in the Object Buffer. After one of the ODS having the same ID is read in the common area, the read ODS is overwritten by a subsequent ODS having the same ID. By overwriting the ODS that is read to the Object Buffer by the subsequent ODS having the same ID as the reproduction of the vide stream proceeds, the graphics by the ODS is updated accordingly. A size constraint that the width and height of the Graphics Object having the same ID should be the same is applied only during one Epoch, and the Graphics Objects in different Epochs may have different sizes.

Explanations about last_in_sequence_flag and object_data_fragment are given next. In some cases, it is not possible to store the decompressed graphics that constitutes the subtitle in one ODS due to a payload constraint of the PES packet. In such cases, the graphics is split into a series of consecutive fragments, and one fragment is set to the object_data_fragment. When one Graphics Object is stored as more than one fragment, every fragment except a last fragment has the same size. The last fragment is less than or equal to the size of previous fragments. The ODS carrying the fragments appear in the same sequential order in the DS, with an end of the sequence indicated by the ODS having the last_in_sequence_flag. Although the above described syntax of the ODS is based on a premise that the fragments are stacked in from the preceding PES, the fragments may be stacked so that each PES contains a blank part.

Figure 7B:
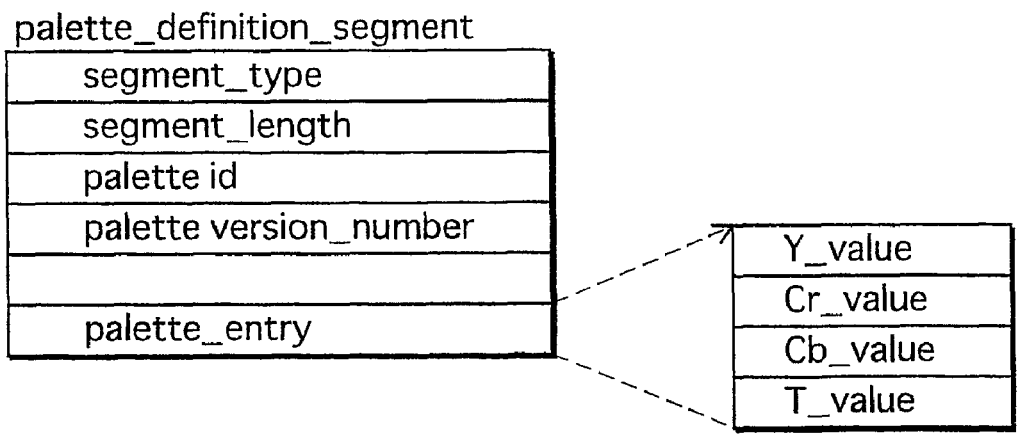
FIG. 7B illustrates syntax of a Palette Definition Segment (PDS).

Next, the Palette Definition Segment (PDS) is explained. The PDS is used to define a palette for a color conversion. FIG. 7B shows syntax of the PDS. The PDS is made of segment_type indicating that the segment is the PDS, segment_length indicating a data length of the PDS, palette_id uniquely identifying the palette contained in the PDS, palette_version_number indicating a version of the PDS within the Epoch, and palette_entry_id specifying an entry number of the palette. The palette_entry_id indicates the Color Difference Red (Cr_value), the Color Difference Blue (Cb_value), Luminance (Y_value), and Transparency (T_value).

Next, an explanation about the Window Definition Segment (WDS) is given below.

Figure 8A:
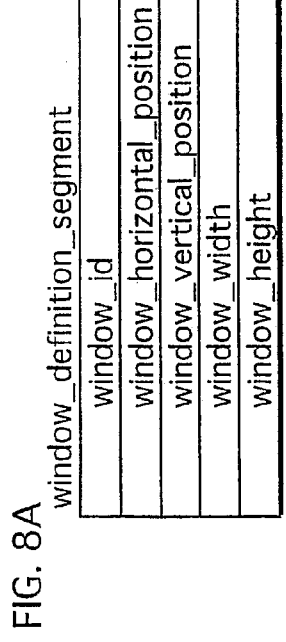
FIG. 8A illustrates syntax of a Window Definition Segment (WDS).

The WDS is used to define the rectangular area on the Graphics Plane. As described in the above, the memory management is sequential only when erasing and rendering is performed within a certain area on the Graphics Plane. The area on the Graphics Plane is defined by the WDS and called "Window". FIG. 8A illustrates syntax of the WDS. As shown by the drawing, the WDS is made of segment_type indicating that the segment is the WDS, segment_length indicating a data length of the WDS, window_id uniquely identifying the Window on the Graphics Plane, window_horizontal_position specifying a horizontal address of a top left pixel of the Window on the Graphics Plane, window_vertical_position specifying a vertical address of the top left pixel of the Window on the Graphics Plane, window_width specifying a width of the Window on the Graphics Plane, and window_height specifying a height of the Window on the Graphics Plane.

Ranges of values that the window_horizontal_position, window_vertical_position, window_width, and window_height may take are explained below. A coordinate system for those values is within an area on the Graphics Plane, and whose size is indicated two-dimensionally by the window_height for a height and the window_width for a width.

The window_horizontal_position specifies the horizontal address of the top left pixel of the Window on the Graphics Plane, and is within a range of 0 to (window_width)−1. Also, the window_vertical_position specifies the vertical address of the top left pixel of the Window on the Graphics Plane, and is within a range of 0 to (window_height)−1.

The window_width specifies the width of the Window on the Graphics Plane. The specified width falls within a range of 1 to (video_width)−(window_horizontal_position). Further, the window_height specifies the height of the Window on the Graphics Plane, and the specified height is within a range of 1 to (video_height)−(window_vertical_position).

The position and size of the Window on the Graphics Plane for each Epoch are defined by the window_horizontal_position, window_vertical_position, window_width, and window_height. Accordingly, it is possible to adjust the position and size of the Window at authoring, so that the Window in one Epoch appears at the position that does not come in the way of the picture when viewing the film. By this, the visibility of the subtitles becomes higher. Because the WDS is defined for each Epoch, it is possible to adjust the position of the Window according to the picture, even if the picture changes in the course of time. As a result, the quality of the film is maintained as high as in a case where the subtitles are incorporated in the main body of the film.

Next, the End of Display Set Segment (END) is explained. The END provides an indication that a transmission of the DS is completed. The End is inserted into a stream immediately after a last ODS in one DS. The End is made of segment_type indicating that the segment is the END and segment_length indicating a data length of the END. The END does not include any other element that requires a further explanation.

Next, an explanation about the Presentation Composition Segment (PCS) is given below.

Figure 8B:
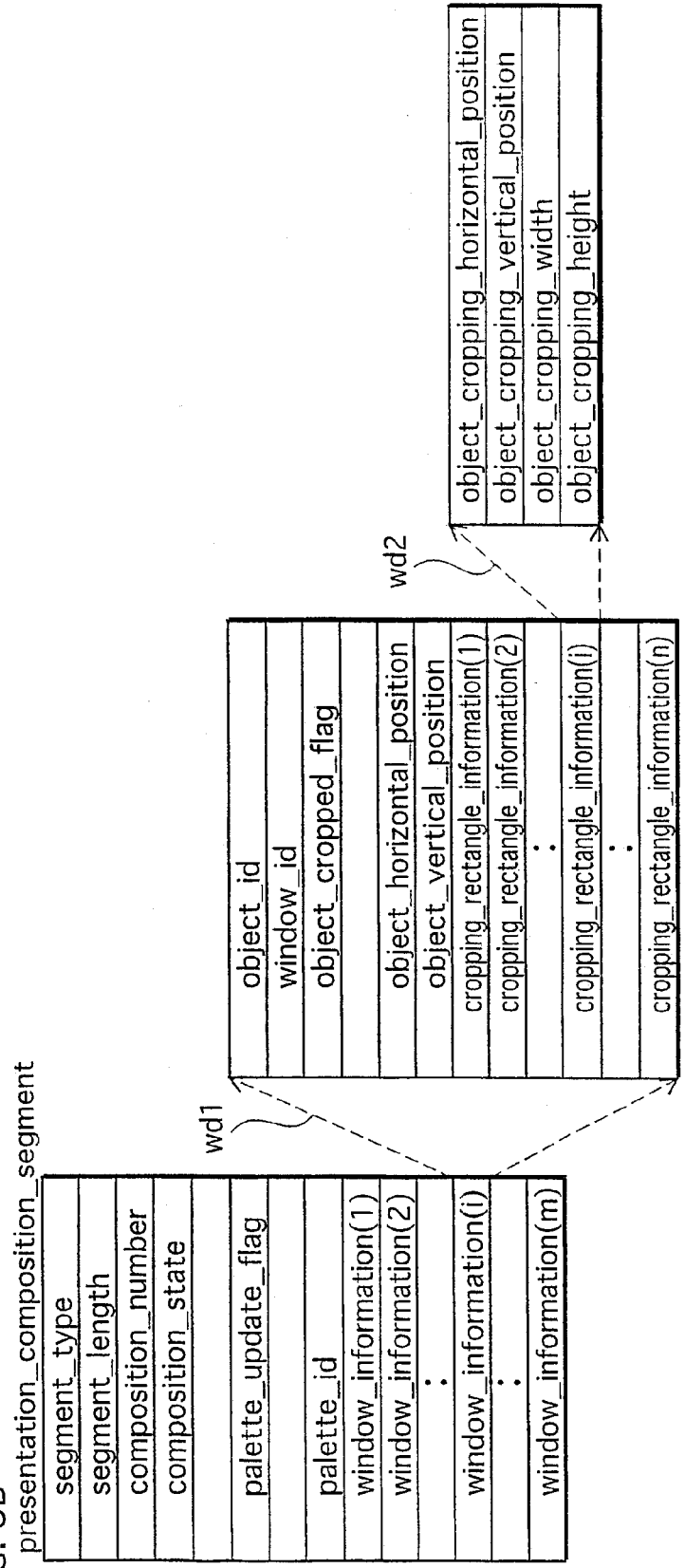
FIG. 8B illustrates syntax of a Presentation Composition Segment (PCS).

The PCS is a functional segment that is used for composing an interactive display. FIG. 8B illustrate syntax of the PCS. As shown in the drawing, the PCS is made of segment_type, segment_length, composition_number, composition_state, palette_update_flag, palette_id, and composition_object 1-m.

The composition_number identifies the Graphics Update in the DS by values in a range of 0 to 15. If the Graphics Update exists between the head of the Epoch and the PCS, the composition_number is incremented every time the Graphics Update occurs.

The composition_state indicates the type of the DS in which the PCS is contained, Normal Case, Acquisition Point, or Epoch Start.

The palette_update_flag indicates that the PCS describes a Palette only Display Update. The Palette only Display Update indicates that only the palette is updated from an immediately previous palette. The palette_update_flag field is set to "1", if the Palette only Display Update is performed.

The palette_id identifies the palette to be used in the Palette only Display Update.

The composition_object 1-m indicate how to control each Window in the DS to which the PCS belong. A broken line wd1 in FIG. 8B is to detail an internal syntax for composition_object i. The composition_object i is made of object_id, window_id, object_cropped_flag, object_horizontal_position, an object_vertical_position, and cropping_rectangle information 1-n.

The object_id identifies the ODS in a Window corresponding to the composition_object i.

The window_id identifies the Window to which the Graphics Object is allocated in the PCS. Up to two Graphics Objects may be assigned to one Window.

The object_cropped_flag is used to switch between display and no-display of a cropped Graphics Object in the Object Buffer. When the object_cropped_flag is set to "1", the cropped Graphics Object is displayed in the Object Buffer, and if set to "0", the Graphics Object is not displayed.

The object_horizontal_position specifies a horizontal address of a top left pixel of the Graphics Object in the Graphics Plane.

The object_vertical_position specifies a vertical address of the top left pixel of the Graphics Object in the Graphics Plane.

The cropping_rectangle information 1-n are elements used when the object_cropped_flag is set to "1". A broken line wd2 is to detail an internal syntax for cropping_rectangle information i. As shown by the broken line wd2, the cropping_rectangle information i is made of four fields, object_cropping_horizontal_position, object_cropping_vertical_position, object_cropping_width, and object_cropping_height.

The object_cropping_horizontal_position specifies a horizontal address of a top left corner of a cropping rectangle to be used during rendering of the Graphics Object in the Graphics Plane. The cropping rectangle is a cropping frame that is used to specify and crop a part of the Graphics Object, and corresponds to Region in the ETSI EN 300 743 standard.

The object_cropping_vertical_position specifies a vertical address of the top left corner of the cropping rectangle to be used during rendering of the Graphics Object in the Graphics Plane.

The object_cropping_width specifies a width of the cropping rectangle.

The object_cropping_height specifies a height of the cropping rectangle.

Figure 9:
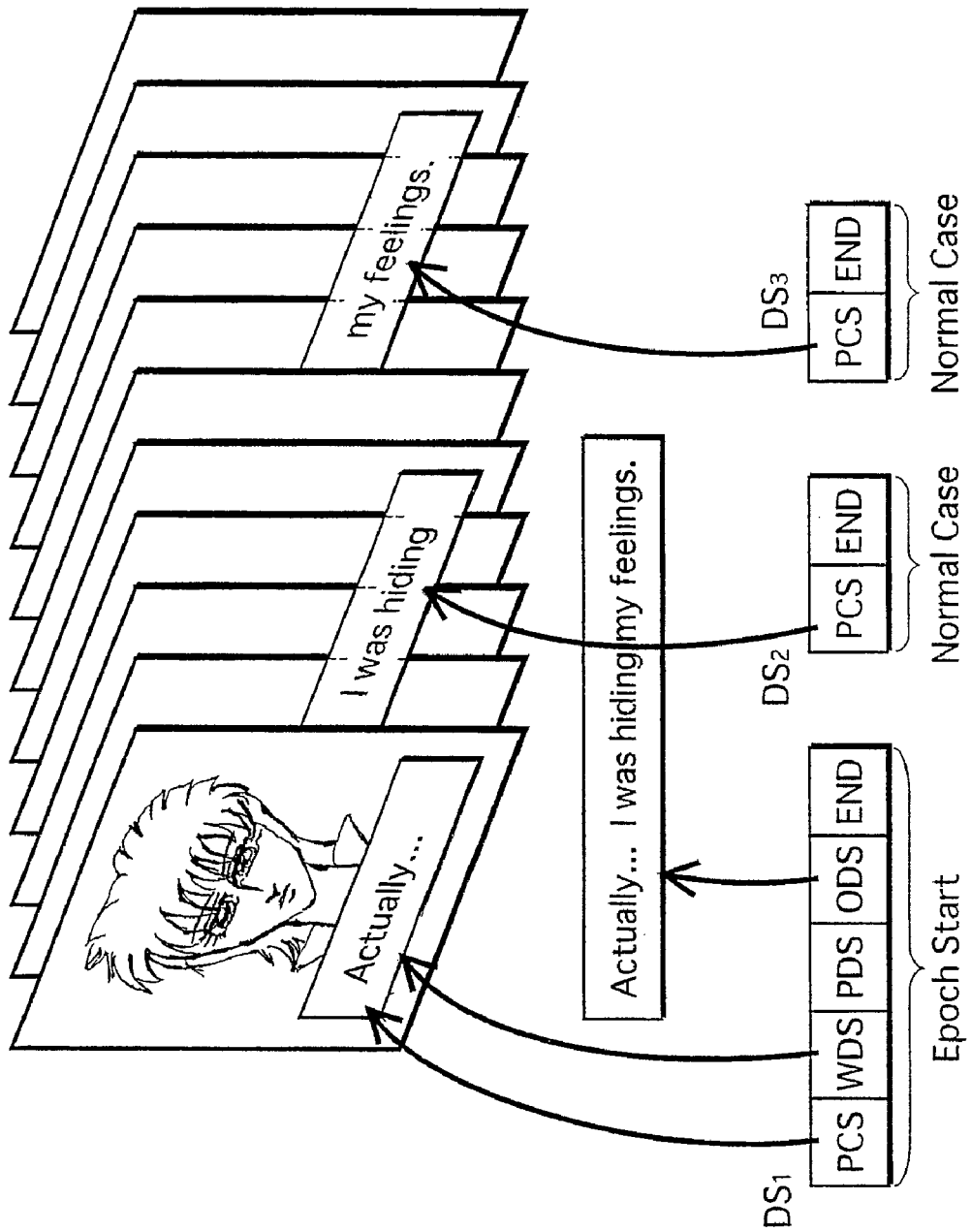
FIG. 9 illustrates an example of a description of a Display Set for subtitling.

A specific example of the PCS is detailed below. In the example, the subtitles "Actually . . . ", "I was hiding", and "my feelings." as shown in FIG. 6 appear gradually by writing to the Graphics Plane 3 times as the picture proceeds. FIG. 9 is an example of description for realizing such a subtitle display. An Epoch in the drawing includes a DS1 (Epoch Start), a DS2 (Normal Case), and a DS3 (Normal Case). The DS1 contains a WDS for specifying the Window in which the subtitles are displayed, an ODS for specifying the line "Actually . . . I was hiding my feelings.", and a first PCS. The DS2 contains a second PCS, and the DS3 contains a third PCS.

Figure 10:
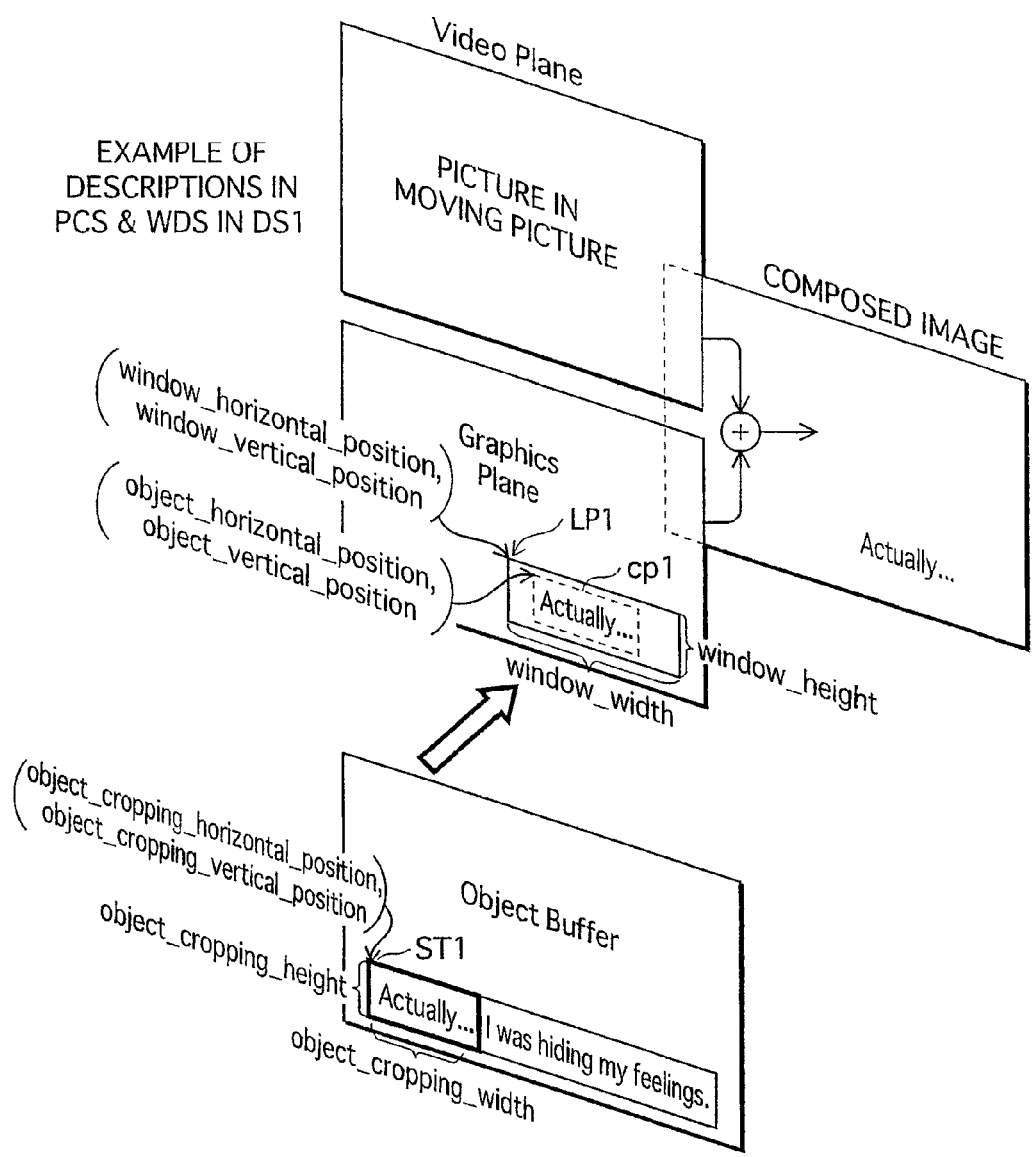
FIG. 10 illustrates an example of a description of the WDS and PCS in a DS1.
Figure 11:
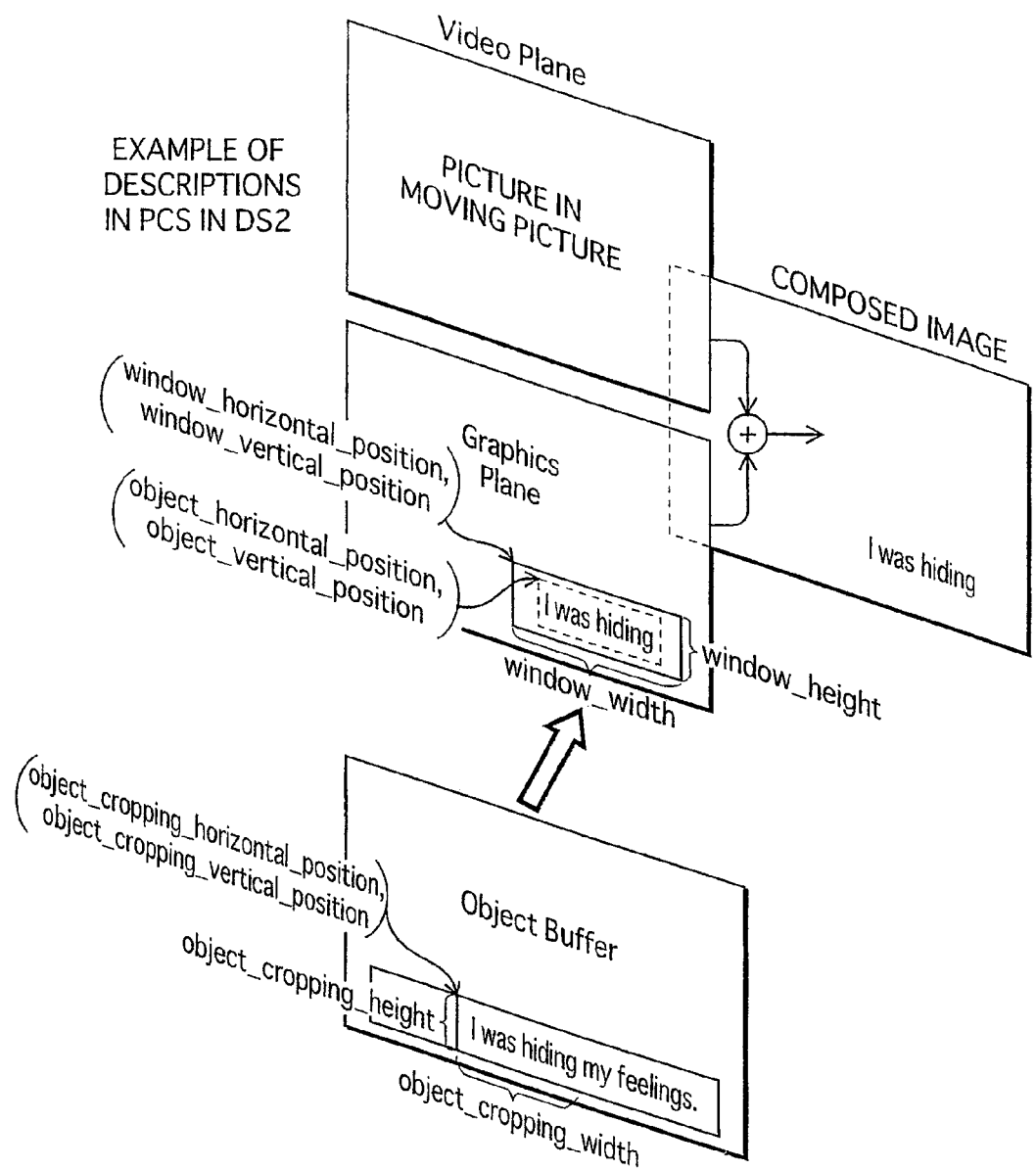
FIG. 11 illustrates an example of a description of the PCS in a DS2.
Figure 12:
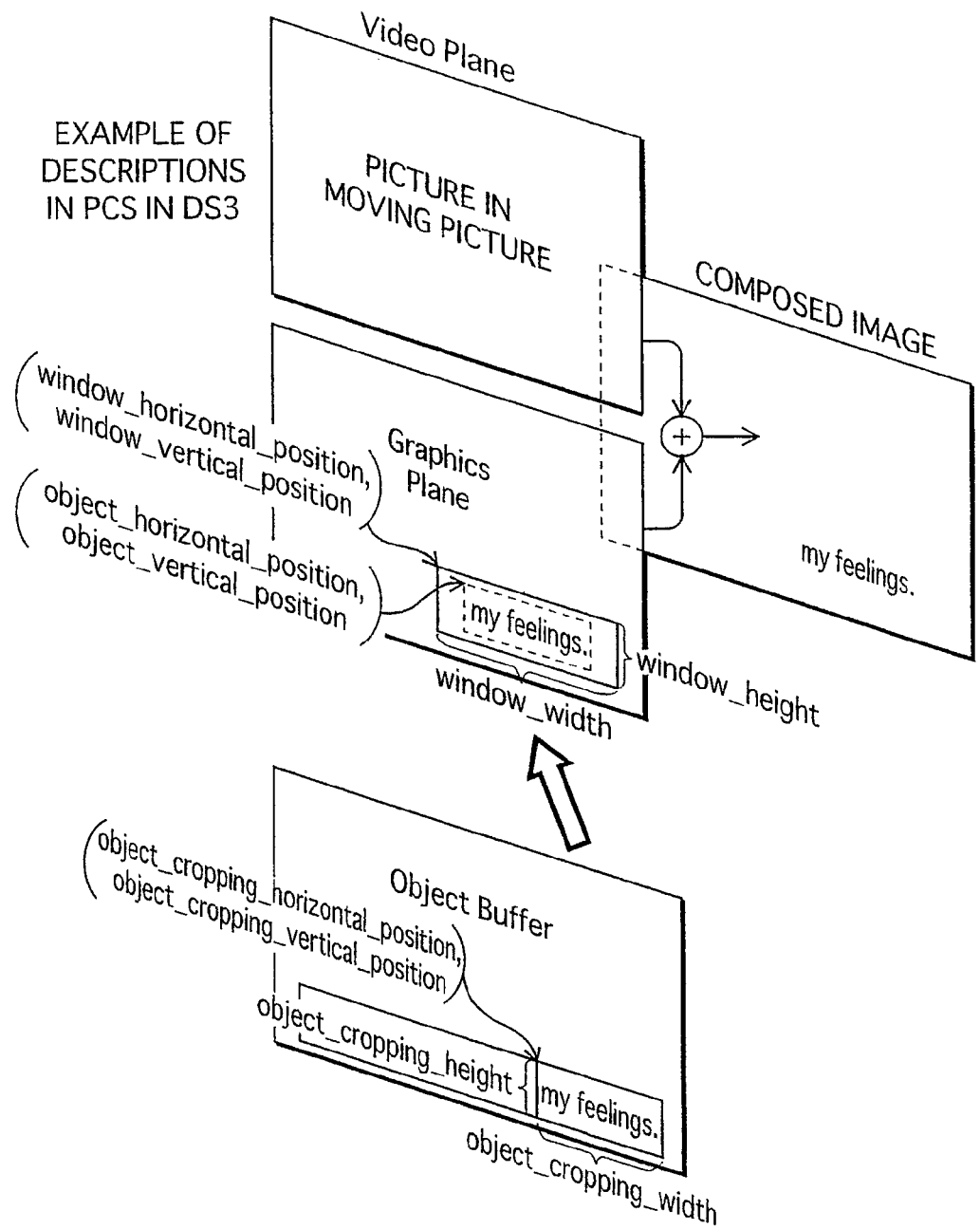
FIG. 12 illustrates an example of a description of the PCS in a DS3.

FIGS. 10-12 illustrate examples of the WDS and PCS contained in the DS. FIG. 10 shows an example of the PCS in the DS1.

In FIG. 10, the window_horizontal_position and the window_vertical_position of the WDS are indicated by a LP1, a position of the top left pixel of the Window on the Graphics Plane. The window_width and window_height indicate the width and height of the Window, respectively.

In FIG. 10, the object_cropping_horizontal_position and object_cropping_vertical_position indicate a reference point ST1 of the cropping rectangle in the coordinate system in which an origin is the top left pixel of the Graphics Object. The cropping rectangle is an area having the width from the ST to the object_cropping_width, and the height from the ST to the object_cropping_height (a rectangle shown by a heavyline frame). The cropped Graphics Object is positioned within a rectangle shown by a broken-line frame cp1, with a reference point in the coordinate system with an origin at the object_horizontal_position and object_vertical_position (the top left pixel of the Graphics Object) in the Graphics Plane. By this, the subtitle "Actually . . . " is written to the Window on the Graphics Plane, and then combined with the movie picture and displayed on the screen.

FIG. 11 shows an example of the PCS in the DS2. The WDS in the DS2 is not explained, because the WDS in the DS2 is the same as the WDS in the DS1. A description of the cropping information in the DS2 is different from the description of the cropping information shown in FIG. 10.

In FIG. 11, the object_cropping_horizontal_position and object_cropping_vertical_position in the cropping information indicate a top left pixel of the subtitle "I was hiding" out of "Actually . . . I was hiding my feelings." in the Object Buffer. The object_cropping_width and object_cropping_height indicates a width and a height of a rectangle containing the subtitle "I was hiding". By this, the subtitle "I was hiding" is written to the Window on the Graphics Plane, and then combined with the movie picture and displayed on the screen.

FIG. 12 shows an example of the PCS in the DS3. The WDS in the DS3 is not explained, because the WDS in the DS3 is the same as the WDS in the DS1. A description of the cropping information in the DS3 is different from the description of the cropping information shown in FIG. 10.

In FIG. 12, the object_cropping_horizontal_position and object_cropping_vertical_position in the cropping information indicate a top left pixel of the subtitle "my feelings." out of "Actually . . . I was hiding my feelings." in the Object Buffer. The object_cropping_width and object_cropping_height indicates a width and a height of a rectangle containing the subtitle "my feelings.". By this, the subtitle "my feelings." is written to the Window on the Graphics Plane, and then combined with the movie picture and displayed on the screen.

By describing the DS1, DS2, and DS3 as explained above, it is possible to achieve an effect of displaying the subtitles on the screen. It is also possible to achieve other kinds of effect, and description protocols for realizing other effects are explained below.

Figure 13:
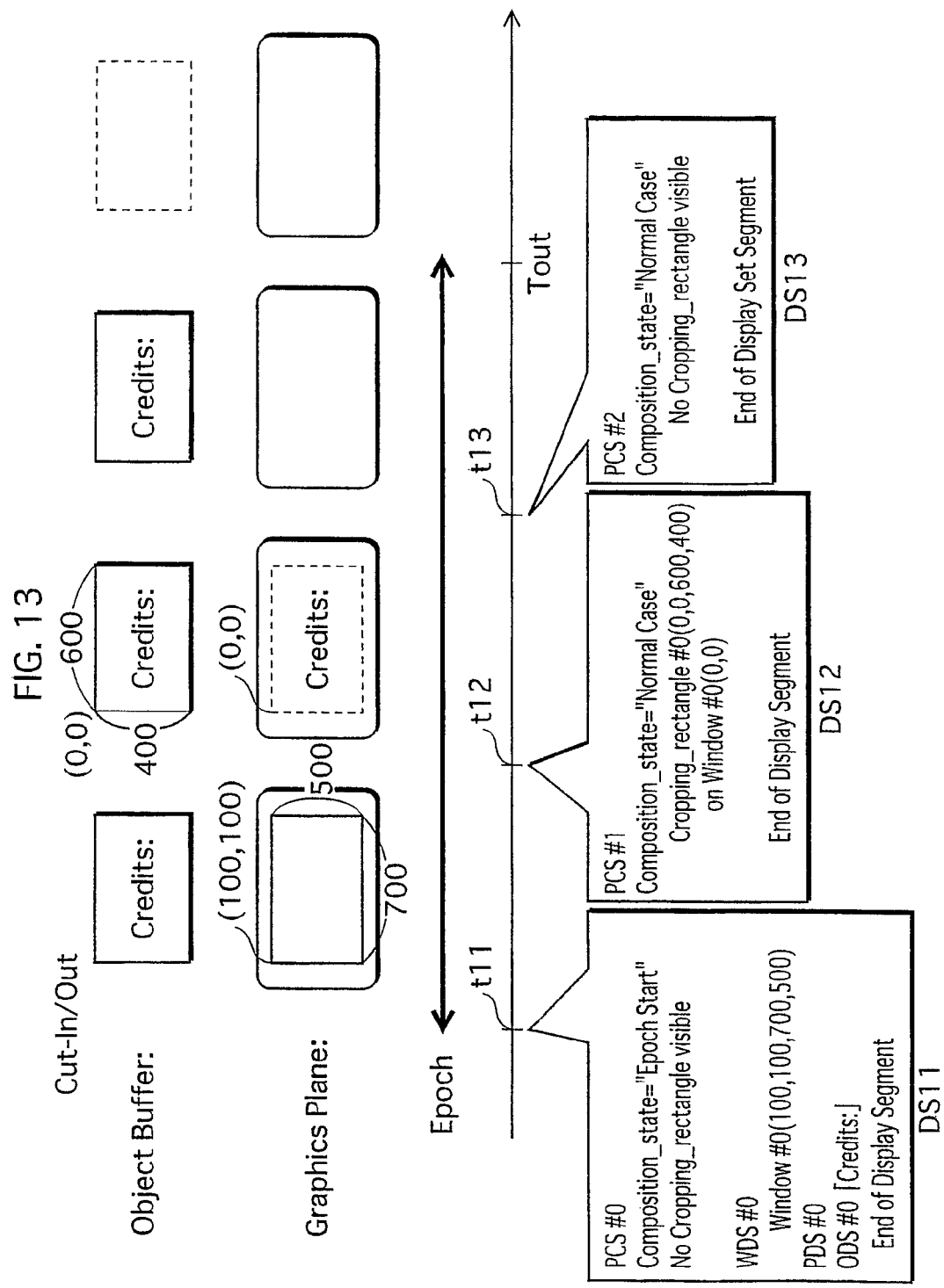
FIG. 13 is an example of a description of a Display Set when Cut-In/Out is performed, illustrating along a timeline.

First, a description protocol for a Cut-In/Out effect is explained. FIG. 13 shows an example of the description of the DS when Cut-In/Out is performed, illustrating along a timeline.

In the drawing, x and y in Window(x, y, u, v) respectively indicate values of the window_vertical_position and window_horizontal_position, and u and v respectively indicate values of the window_width and window_height. Also in the drawing, a and b in Cropping Rectangle(a,b,c,d) respectively indicate values of the object_cropping_vertical_position and object_cropping_horizontal_position, and c and d indicate values of the object_cropping_width and object_cropping_height, respectively. Display Sets DS11, DS12, and DS13 are at points t11, t12, and t13 on the reproduction timeline in the drawing.

The DS11 at the point t11 includes a PCS#0 in which the composition_state is "Epoch Start" and the object_cropped_flag is "0" (no_cropping_rectangle_visible), a WDS#0 having a statement for a Window in a width 700×height 500 at (100,100) in the Graphics Plane, a PDS#0, an ODS#0 indicating a subtitle "Credits:", and an END.

The DS12 at the point t12 includes a PCS#1 whose composition_state is "Normal Case" and indicating a crop operation of the Graphics Object to be in a 600×400 size from (0,0) in the Object Buffer (cropping_rectangle#0(0,0,600,400)), and positioning the cropped Graphics Object at the coordinates (0,0) in the Graphics Plane (on Window#0(0,0)).

The DS13 at the point t13 includes a PCS#2 whose composition_state is "Normal Case" and in which the object_cropped_flag is set to "0" so as to erase the cropped Graphics Object (no_cropping_rectangle_visible).

With the above explained Display Sets, the subtitle "Credits:" is no-display at the t11, appears at the t12, then becomes no-display at the t13 again, and the Cut-In/Cut-Out effect is realized.

Figure 14:
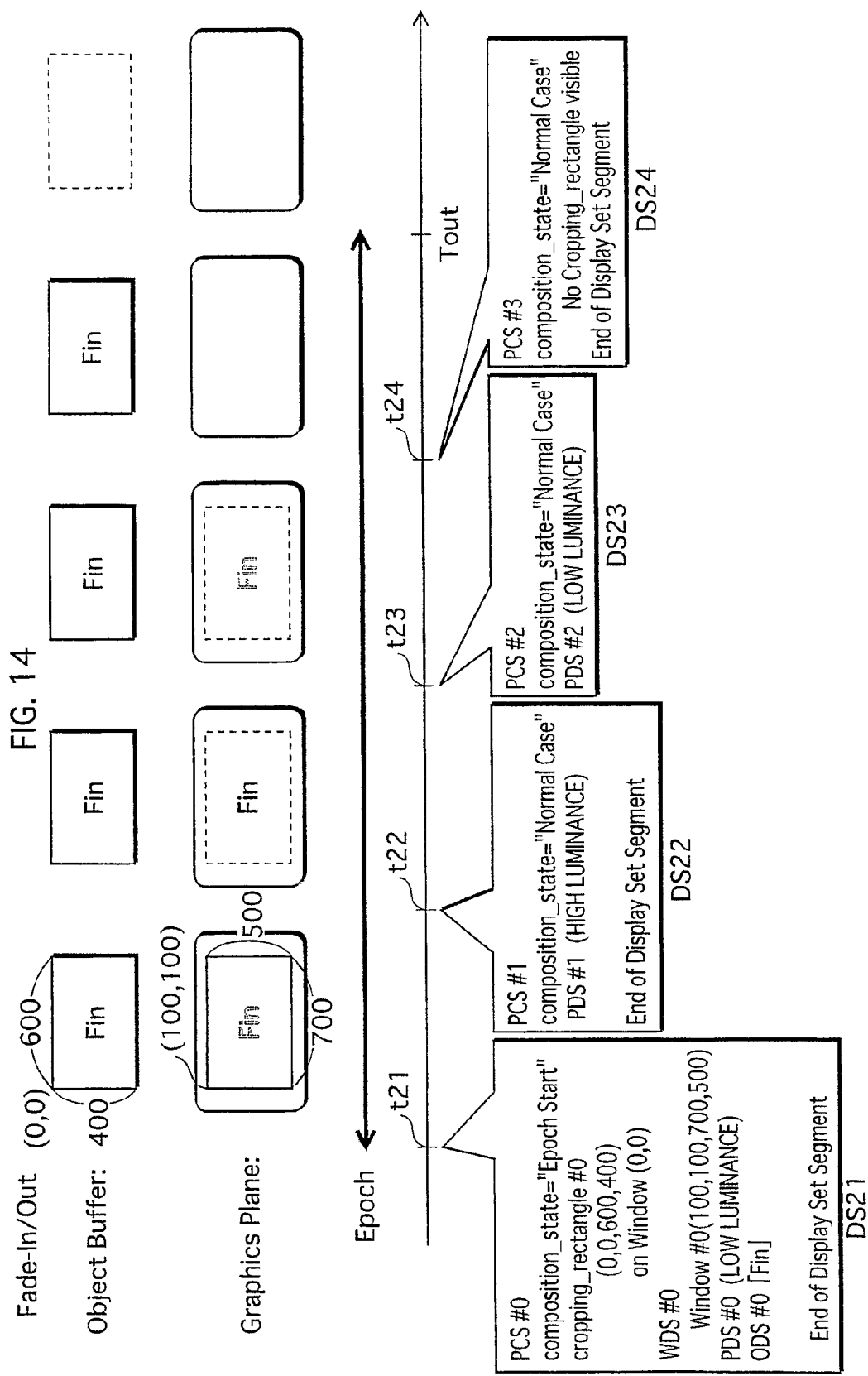
FIG. 14 is an example of a description of a Display Set when Fade-In/Out is performed, illustrating along a timeline.

Secondly, a description protocol for a Fade-In/Out effect is explained. FIG. 14 shows an example of the description of the DS when Fade-In/Out is performed, illustrating along a timeline. Display Sets DS21, DS22, DS23, and DS24 are at points t21, t22, t23, and t24 on the reproduction timeline in the drawing.

The DS21 at the point t21 includes a PCS#0 whose composition_state is "Epoch Start" and indicating the crop operation of the Graphics Object to be in a 600×400 size from (0,0) in the Object Buffer (cropping_rectangle#0(0,0,600,400)), and positioning the cropped Graphics Object at the coordinates (0,0) in the Graphics Plane (on Window#0(0,0)), a WDS#0 having a statement for a Window in a width 700×height 500 at (100,100) in the Graphics Plane, a PDS#0, an ODS#0 indicating a subtitle "Fin", and an END.

The DS22 at the point t22 includes a PCS#1 whose composition_state is "Normal Case", and a PDS#1. The PDS#1 indicates the same level of Cr and Cb as the PDS#0, but a luminance indicated by the PDS#1 is higher than the luminance in the PDS#0.

The DS23 at the point t23 includes a PCS#2 whose composition_state is "Normal Case", a PDS#2, and an END. The PDS#2 indicates the same level of Cr and Cb as the PDS#1, but the luminance indicated by the PDS#2 is lower than the luminance in the PDS#1.

The DS24 at the point t24 includes a PCS whose composition_state is "Normal Case" and the object_cropped_flag is "0" (no_cropping_rectangle_visible), and an END.

Figure 15:
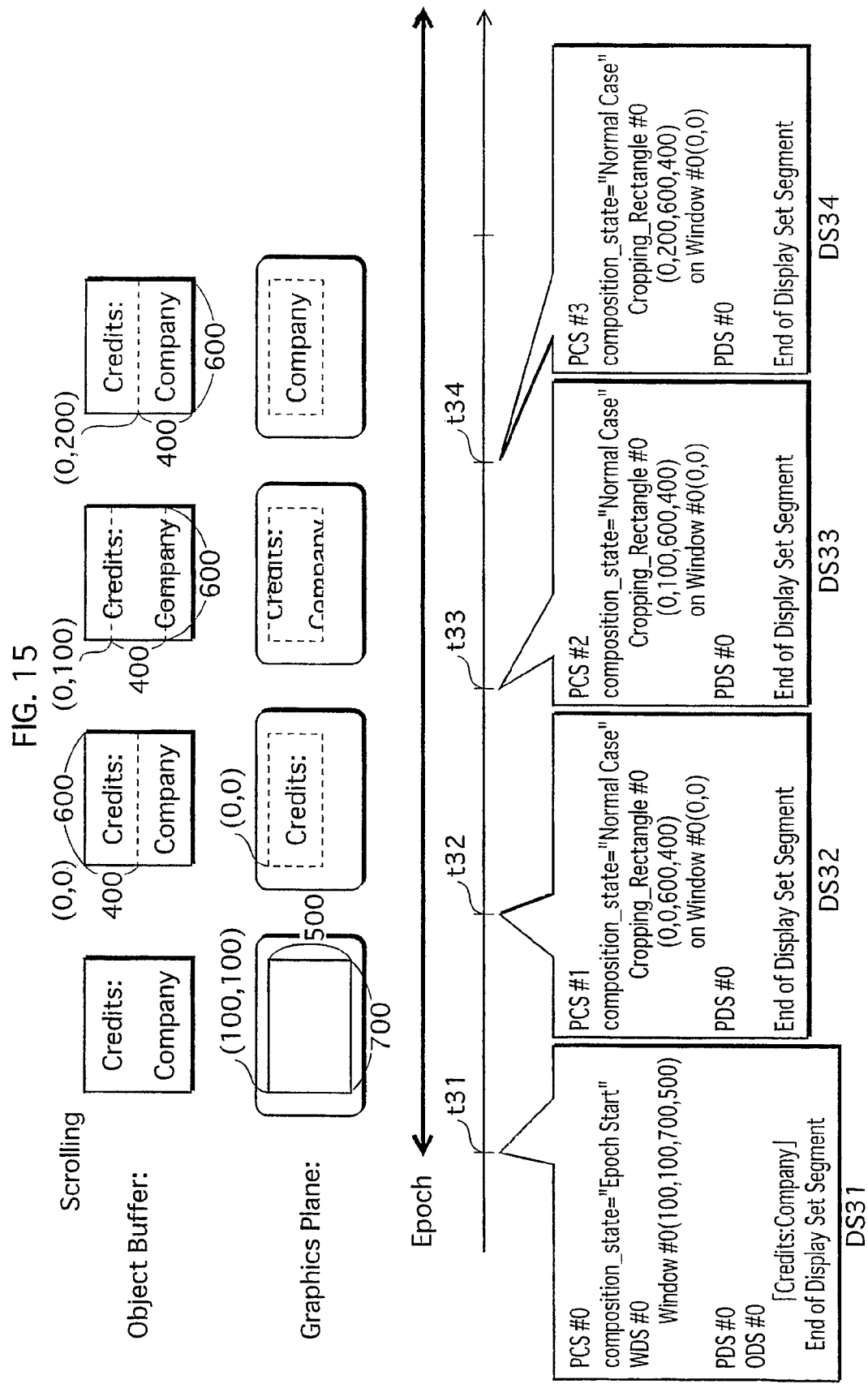
FIG. 15 is an example of a description of a Display Set when Scrolling is performed, illustrating along a timeline.

Each DS specifies a different PDS from a preceding DS, and accordingly, the luminance of the Graphics Object that is rendered with more than one PCS in one Epoch becomes gradually high, or low. By this, it is possible to realize the effect of Fade-In/Out. Next, a description protocol for a Scrolling is explained. FIG. 15 shows an example of the description of the DS when Scrolling is performed, illustrating along a timeline. Display Sets DS31, DS32, DS33, and DS34 are at points t31, t32, t33, and t34 on the reproduction timeline in the drawing.

The DS31 at the point t31 includes a PCS#0 whose composition_state is set to "Epoch Start" and object_cropped_flag is "0" (no_cropping_rectangle_visible), a WDS#0 having a statement for a Window in a width 700×height 500 at (100,100) in the Graphics Plane, a PDS#0, an ODS#0 indicating a subtitle "Credits: Company", and an END.

The DS32 at the point t32 includes a PCS#1 whose composition_state is "Normal Case" and indicating the crop operation of the Graphics Object to be in a 600×400 size from (0,0) in the Object Buffer (cropping_rectangle#0(0,0,600,400)), and positioning the cropped Graphics Object at the coordinates (0,0) in the Graphics Plane (on Window#0(0,0)). An area of the 600×400 size from (0,0) in the Object Buffer includes a part "Credits:" of the subtitle "Credits: Company" shown in two lines, and thus the part "Credits:" appears on the Graphics Plane.

The DS33 at the point t33 includes a PCS#2 whose composition_state is "Normal Case" and indicating the crop operation of the Graphics Object to be in a 600×400 size from (0,100) in the Object Buffer (cropping_rectangle#0 (0,100, 600,400)), and positioning the cropped Graphics Object at the coordinates (0,0) in the Graphics Plane (on Window#0(0,0)). The area of the 600×400 size from (0,100) in the Object Buffer includes the part "Credits:" and a part "Company" of the subtitle "Credits: Company" shown in two lines, and thus the parts "Credits:" and "Company" appear in two lines on the Graphics Plane.

The DS34 at the point t34 includes a PCS#3 whose composition_state is "Normal Case" and indicating the crop operation of the Graphics Object to be in a 600×400 size from (0,200) in the Object Buffer (cropping_rectangle#0 (0,200, 600,400)), and positioning the cropped Graphics Object at the coordinates (0,0) in the Graphics Plane (on Window#0(0,0)). The area of the 600×400 size from (0,200) in the Object Buffer includes the part "Company" of the subtitle "Credits: Company" shown in two lines, and thus the part "Company" appears on the Graphics Plane. By the above PCS description, it is possible to scroll down the subtitle in two lines.

Figure 16:
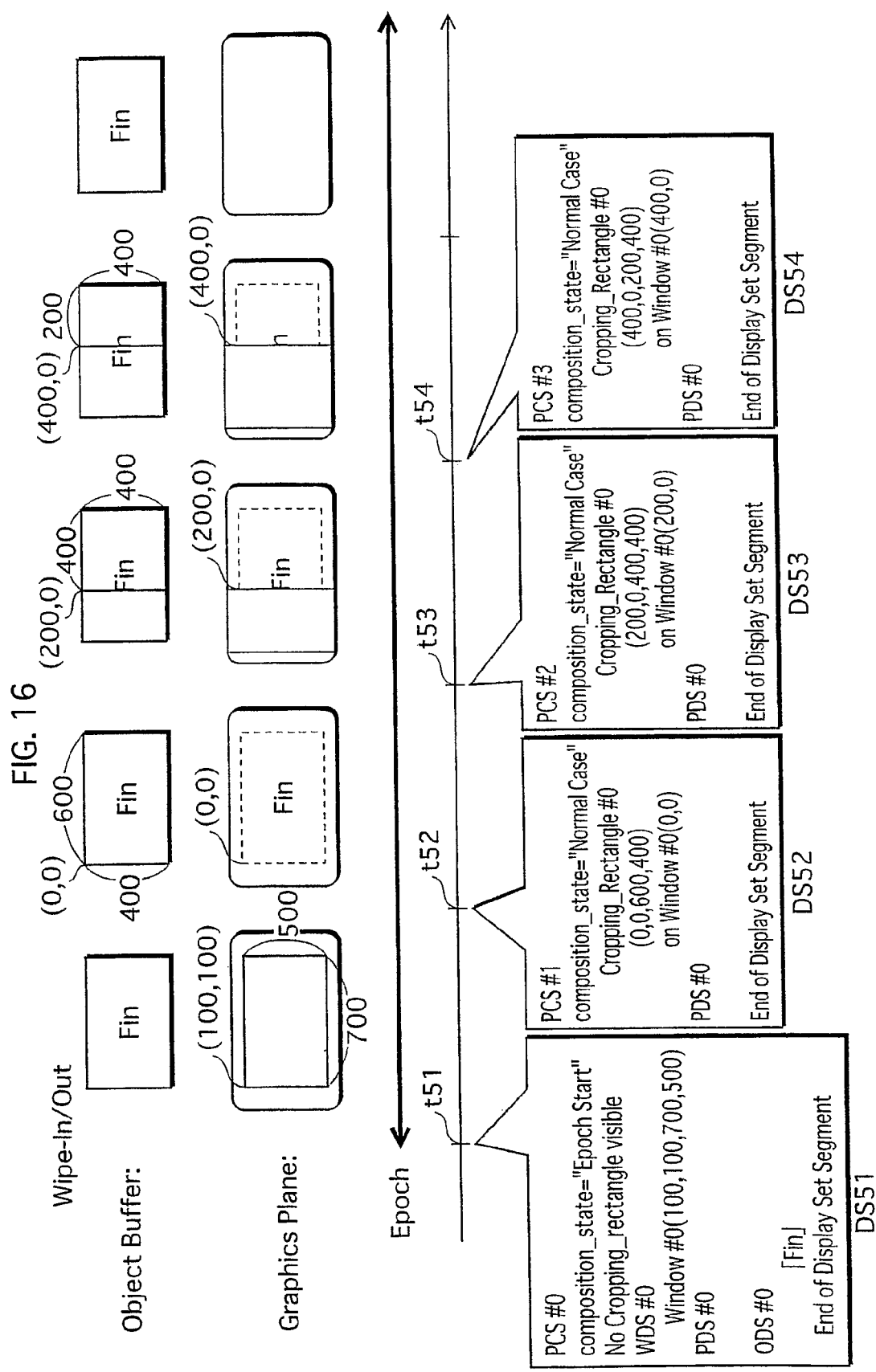
FIG. 16 is an example of a description of a Display Set when Wipe-In/Out is performed, illustrating along a timeline.

Finally, a description protocol for a Wipe-In/Out effect is explained. FIG. 16 shows an example of the description of the DS when Wipe-In/Out is performed, illustrating along a timeline. Display Sets DS21, DS22, DS23, and DS24 are at points t21, t22, t23, and t24 on the reproduction timeline in the drawing.

The DS51 at the point t51 includes a PCS#0 whose composition_state is set to "Epoch Start" and the object_cropped_flag is "0" (no_cropping_rectangle_visible), a WDS#0 having a statement for a Window in a width 700×height 500 at (100,100) in the Graphics Plane, a PDS#0, an ODS#0 indicating a subtitle "Fin", and an END.

The DS52 at the point t52 includes a PCS#1 whose composition_state is "Normal Case" and indicating the crop operation of the Graphics Object to be in a 600×400 size from (0,0) in the Object Buffer (cropping_rectangle#0(0,0,600, 400)), and positioning the cropped Graphics Object at the coordinates (0,0) in the Graphics Plane (on Window#0(0,0)). An area of the 600×400 size from (0,0) in the Object Buffer includes the subtitle "Fin", and thus the subtitle "Fin" appears on the Graphics Plane.

The DS53 at the point t53 includes a PCS#2 whose composition_state is "Normal Case" and indicating the crop operation of the Graphics Object to be in a 400×400 size from (200,0) in the Object Buffer (cropping_rectangle#0 (200,0, 400,400)), and positioning the cropped Graphics Object at the coordinates (200,0) in the Graphics Plane (on Window#0 (200,0)). By this, an area indicated by coordinates (200,0) and (400,400) in the Window becomes a display area, and an area indicated by coordinates (0,0) and (199,400) becomes a no-display area.

The DS54 at the point t54 includes a PCS#3 whose composition_state is "Normal Case" and indicating the crop operation of the Graphics Object to be in a 200×400 size from (400,0) in the Object Buffer (cropping_rectangle#0 (400,0, 200,400)), and positioning the cropped Graphics Object at the coordinates (400,0) in the Graphics Plane (on Window#0 (400,0)). By this, an area indicated by coordinates (0,0) and (399,400) becomes the no-display area.

By this, as the no-display area becomes larger, the display area becomes smaller, and thus the Wipe-In/Out effect is realized.

As described above, various effects such as Cut-In/Out, Fade-In/Out, Wipe-In/Out, and Scrolling may be realized using corresponding scripts, and therefore it is possible to make various arrangements in rendering the subtitles.

Constraints for realizing the above effects are as follows. In order to realize the Scrolling effect, operations for clearing and redrawing of the Window becomes necessary.

Taking the example of FIG. 15, it is necessary to perform "window clear" to erase the Graphics Object "Credits:" at the t32 from the Graphics Plane, and then to perform "window redraw" to write a lower part of "Credits:" and an upper part of "Company" to the Graphics Plane during an interval between the t32 and t33. Given that the interval is the same as an interval of video frames, a transfer rate between the Object Buffer and the Graphics Plane desirable for the Scrolling effect becomes an important point.

Here, a constraint about how large the Window may be is looked into. An Rc is the transfer rate between the Object Buffer and the Graphics Plane. A worst scenario here is to perform both of the Window clear and Window redraw at the rate Rc. In this case, each of the Window clear and Window redraw is required to be performed at a rate half of Rc (Rc/2).

In order to make the Window clear and Window redraw synchronized with a video frame, an equation below is need to be satisfied.

$$\text{Window size} \times \text{Frame Rate} \square Rc/2$$

If the Frame Rate is 29.97, Rc is expressed by an equation below.

$$Rc = \text{Window size} \times 2 \times 29.97$$

In rendering the subtitles, the Window size accounts for at least 25% to 33% of the Graphics Plane. A total number of pixels in the Graphics Plane is 1920×1080. Taking that an index bit length per pixel is 8 bits, a total capacity of the Graphics Plane is 2 Mbytes ($\square$1920×1080×8).

Taking that the Window size is ¼ of the total capacity of the Graphics Plane, the Window size becomes 500 Kbytes (=2 Mbytes/4). By substituting this value to the above equation, Rc is calculated to be 256 Mbps (=500 Kbytes×2×29.97). If the rate for the Window clear and Window redraw may be a half or a quarter of the frame rate, it is possible to double or quadruple the size of the Window even if the Rc is the same.

By keeping the Window size 25% to 33% of the Graphics Plane and displaying the subtitles at the transfer rate of 256 Mbps, it is possible to maintain the sync display between the graphics and the movie picture, no matter what kind of display effect is to be realized.

Next, the position, size, and area of the Window are explained. As explained above, the position and area of the Window does not change in one Epoch. The position and the size of the Window set to be the same during one Epoch because it is necessary to change a target write address of the Graphics Plane if the position and the size change, and changing the address causes an overhead that lowers the transfer rate from the Object Buffer to the Graphics Plane.

A number of Graphics Objects per Window has a limitation. The limitation of the number is provided in order to reduce the overhead in transferring decoded Graphics Object.

The overhead here is generated when setting the address of an edge of the Graphics Object, and the more a number of edges, the more the overhead is generated.

FIG. 17 shows examples in comparison, an example in which a Window has four Graphics Objects and another example in which a Window has two Graphics Objects. The number of the edges of the example with four Graphics Objects is twofold of the number of the edges of the example with two Graphics Objects.

Without the limitation in the number of the Graphics Object, it becomes unknown how many overheads could be generated in transferring the Graphics, and thus the load for the transfer increases and decreases drastically. On the other hand, when a maximum number of the Graphics Object in a Window is two, the transfer rate may be set taking up to 4 overhead into account. Accordingly, it is easier to set the number of a minimum transfer rate.

Next, an explanation about how the DS having the PCS and ODS is assigned to the timeline of the AVClip. The Epoch is a period of time in which a memory management is consecutive along the reproduction timeline. Since the Epoch is made of more than one DS, how to assign the DS to the reproduction timeline of the AVClip is important. The reproduction timeline of the AVClip is a timeline for specifying timings for decoding and reproducing of each piece of picture data that constitute the video stream multiplexed to the AVClip. The decoding and reproducing timings on the reproduction timeline are expressed at an accuracy of 90 KHz. A DTS and PTS that are attached to the PCS and ODS in the DS indicate timings for a synchronic control on the reproduction timeline. The assigning of the Display Set to the reproduction timeline means performing the synchronic control using the DTS and PTS attached to the PCS and ODS.

First, how the synchronic control is performed using the DTS and PTS attached to the ODS is explained below.

The DTS indicates, at the accuracy of 90 KHz, a time when the decoding of the ODS starts, and the PTS indicates a time when the decoding ends.

The decoding of the ODS does not finish at once, and has a certain length of time. In response to a request for clearly indicating a starting point and an ending point of a decode duration, the DTS and PTS of the ODS respectively indicate the times when the decoding starts and ends.

The value of the PTS indicates the deadline, and therefore it is necessary that the decoding of the ODS has to be completed by the time indicated by the PTS and the decompressed Graphics Object is written to the Object Buffer on the reproduction apparatus.

The decode starting time of any ODSj in a DSn is indicated by a DTS(DSn[ODS]) at the accuracy of 90 KHz. Adding a maximum length of the decode duration to the DTS(DSn [ODS]) is the time when the decoding of the ODSj ends.

When a size of the ODSj is "SIZE(DSn[ODSj])" and a decoding rate of the ODS is an "Rd", the maximum time required for decoding indicated by second is expressed in "SIZE(DSn[ODSj])//Rd". The symbol "//" indicates an operator for a division with rounding up after a decimal place.

By converting the maximum time period into a number expressed at the accuracy of 90 KHz and adding to the DTS of the ODSj, the time when the decoding ends (90 KHz) indicated by the PTS is calculated.

The PTS of the ODSj in the DSn is expressed in a following equation.

$$PTS(DSn[ODSj])=DTS(DSn[ODSj])+90,000\times(SIZE(DSn[ODSj])//Rd)$$

Further, it is necessary that a relation between two succeeding ODS, ODSj and ODSj+1, satisfies a following equation.

$$PTS(DSn[ODSj])\leq DTS(DSn[ODSj+1])$$

Next, settings of the DTS and PTS of the PCS are explained.

It is necessary that the PCS is loaded to the Object Buffer on the reproduction apparatus before the decode starting time (DTS(DSn[ODS1])) of a first ODS (ODS1) in the DSn, and before the time (PTS(DSn[PDS1])) when a first PDS (PDS1) in the DSn becomes valid. Accordingly, it is necessary that the DTS is set so as to satisfy following equations.

$$DTS(DSn[PCS])\leq DTS(DSn[ODS1])$$

$$DTS(DSn[PCS])\leq PTS(DSn[PDS1])$$

Further, the PTS of the PCS in the DSn is expressed in a following equation.

$$PTS(DSn[PCS])\geq DTS(DSn[PCS])+\text{decodeduration}(DSn)$$

The "decodeduration(DSn)" indicates a time duration for decoding all the Graphics Objects used for updating PCS. The decode duration is not a fixed value, but does not vary according to a status of the reproduction apparatus and a device or a software mounted to the reproduction apparatus. When the Object used for composing a screen of a DSn.PCSn is a DSn.PCSn.OBJ[j], the decodeduration(DSn) is affected by time (i) needed for clearing the Window, decode durations (ii) for decoding a DSn.PCSn.OBJ, and time (iii) needed for writing of the DSn.PCSn.OBJ. When the Rd and Rc are set, the decode_duration(DSn) is always the same. Therefore, the PTS is calculated by calculating lengths of these durations in authoring.

Figure 19:
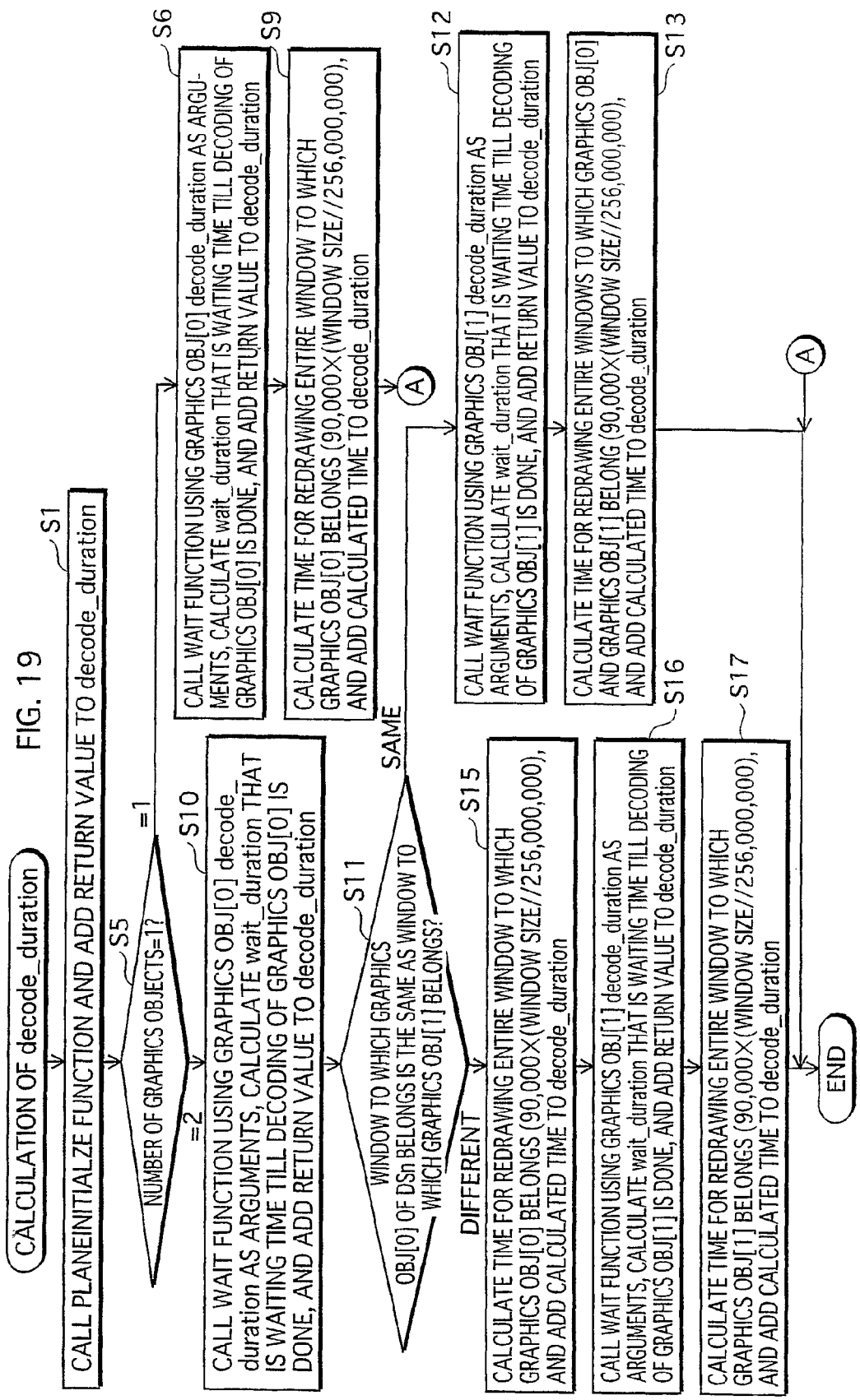
FIG. 19 is a flowchart of the algorithm of FIG. 18.
Figure 20A:
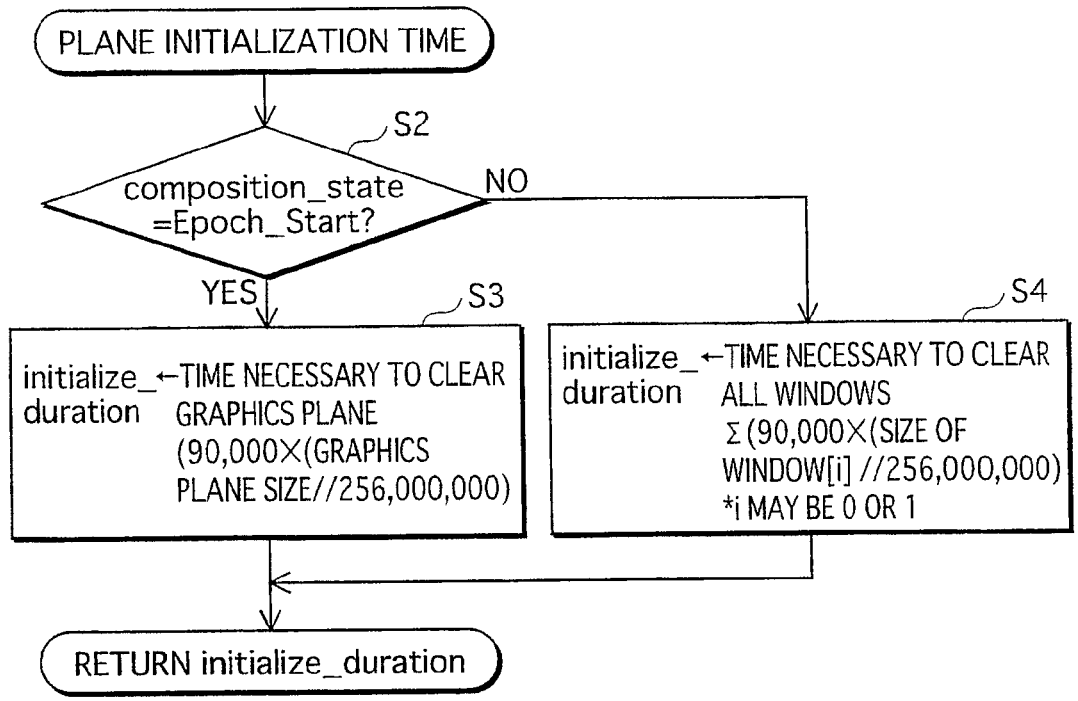
FIGS. 20A and B are flowcharts of the algorithm of FIG. 18.
Figure 20B:
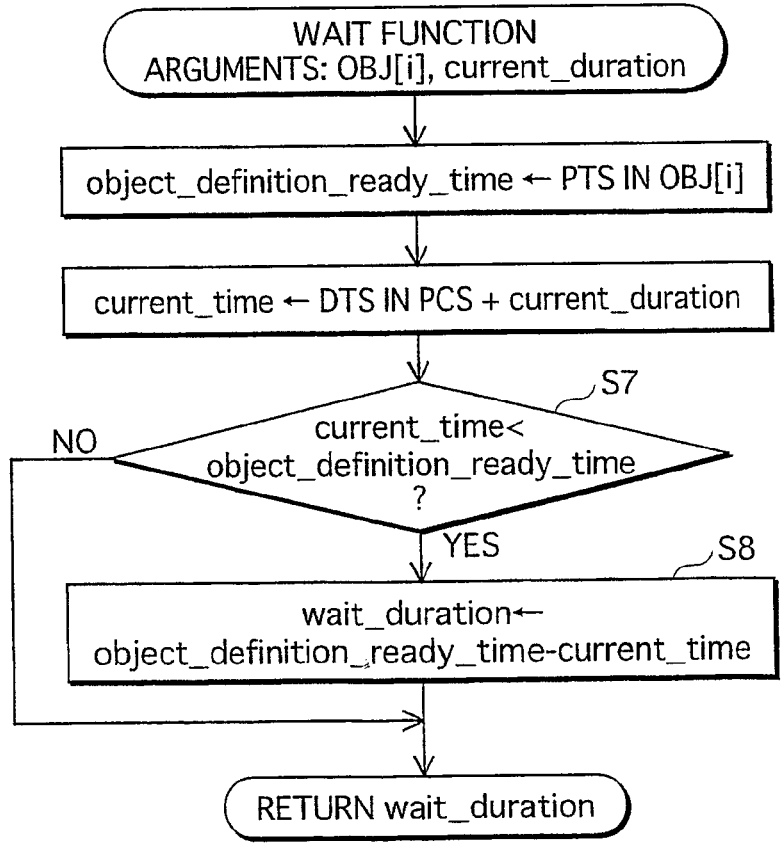

The calculation of the decode_duration is performed based on a program shown in FIG. 18. FIGS. 19, 20A and 20B are flowcharts schematically showing algorithms of the program. An explanation about the calculation of the decode_duration is given below referring to these drawings. In the flowchart shown in FIG. 19, first, a PLANEINITIALZE function is called (Step S1 in FIG. 19). The PLANEINITIALZE function is used for calling a function for calculating a time period necessary to initialize the Graphics Plane for rendering the DS. In the Step S1 in FIG. 19, the function is called with arguments DSn, DSn.PCS.OBJ[0], and decode_duration.

The following explains the PLANEINITIALZE function in reference to FIG. 20A. In the drawing, initialize_duration is a variable indicating a return value of the PLANEINITIALZE function.

Step S2 in FIG. 20 is an if statement for switching operations depending on whether or not the page_state in the PCS in the DSn indicates the Epoch Start. If the page_state indicates the Epoch Start (DSn.PCS.page_state==epoch_start, Step S2=Yes in FIG. 18), a time period necessary to clear the Graphics Plane is set to an initialize_duration (Step S3).

When the transfer rate Rc between the Object Buffer and the Graphics Plane is 256,000,000 as described in the above, and the total size of the Graphics Plane is set to video_width*video_height, the time period necessary to clear is "video_width*video_height//256,000,000". When multiplied by 90.000 Hz so as to express at the time accuracy of PTS, the time period necessary to clear the Graphics Plane is "90,000×video_width*video_height//256,000,000". This time period is added to the initialize_duration.

If the page_state does not indicate the Epoch Start (Step S2=No), a time period necessary to clear Window[i] defined by the WDS is added to the initialize_duration for all Windows (Step S4). When the transfer rate Rc between the Object Buffer and the Graphics Plane is 256,000,000 as described in the above and a total size of Window[i] that belongs to the WDS is ΣSIZE(WDS.WIN[i]), the time period necessary to clear is "ΣSIZE(WDS.WIN[i])//256,000,000". When multiplied by 90.000 Hz so as to express at the time accuracy of PTS, the time period necessary to clear the Windows that belong to the WDS is "90,000×ΣSIZE(WDS.WIN[i])//256,000,000". This time period is added to the initialize_duration, and the initialize_duration as a result is returned. The above is the PLANEINITIALZE function.

Step S5 in FIG. 19 for switching operations depending on whether the number of the Graphics Objects in the DSn is 2 or 1 (if (DSn.PCS.num_of_object==2, if (DSn.PCS.num_of_object==1 in FIG. 18), and if the number is 1 (Step S5), a waiting time for decoding the Graphics Object is added to the decode_duration (Step S6). Calculation of the waiting time is performed by calling a WAIT function (decode_duration += WAIT(DSn, DS.PCS.OBJ[0], decode_duration) in FIG. 18). The function is called using arguments set to DSn, DSn.PCS.OBJ[0], decode_duration, and a return value is wait_duration.

FIG. 20B is a flowchart showing an operation of the WAIT function.

In the flowchart, the decode_duration of an invoker is set as a current_duration. An object_definition_ready_time is a variable set to the PTS of the Graphics Object of the DS.

A current_time is a variable set to a total value of the current_duration and the DTS of the PCS in the DSn. When the object_definition_ready_time is larger than the current_time (Yes to Step S7, if (current_time<object_definition_ready_time)), the wait_duration as the return value is set to be a difference between the object_definition_ready_time and the current_time (Step S8, wait_duration+=object_definition_ready_time−current_time). The decode_duration is set to the time period that the return value of the WAIT function added to the time period necessary for re-drawing the Window, (90,000*(SIZE(DSn.WDS.WIN[0]))//256,000,000).

The above explanation is for the case in which the number of the Graphics Object is one. In Step S5 in FIG. 5, it is judged if the number of the Graphics Objects is two. If the number of the Graphics Objects in the DSn is more than two (if(DSn.PCS.num_of_object==2) in FIG. 18), the WAIT function is called using OBJ[0] in the PCS as an argument, and add a return value to the decode_duration (Step S10).

In a succeeding Step S11, it is judged if the Window to which the OBJ[0] of the DSn belongs is the same as the Window to which the Graphics Object [1] belongs (if (DSn.OBJ[0].window_id==DSn.PCS.OBJ[1].window_id). If the Window is the same, the WAIT function is called using OBJ[1] as an argument, and add a return value wait_duration to the decode_duration (Step S12), and add the time necessary to redraw the Window to which OBJ[0] belong (90,000* (SIZE (DSn.WDS.OBJ[0].window_id))//256,000,000) to the decode_duration (Step S13).

If it is judged that the Windows are different (Step S11, "different"), the time necessary to redraw the Window is added to which OBJ[0] belong (90,000*(SIZE(DSn.WDS.OBJ[0].window_id))//256,000,000) to the decode_duration (Step S15), the WAIT function is called using OBJ[1] as an argument, and add a return value wait_duration to the decode_duration (Step S16), and the time necessary to redraw the Window to which OBJ[1] belong (90,000*(SIZE(DSn.WDS.OBJ[0].window_id))//256,000,000) to the decode_duration (Step S17).

The decode_duration is calculated by the above algorithm. A specific manner in which the PTS of the OCS is set is explained below.

Figure 21A:
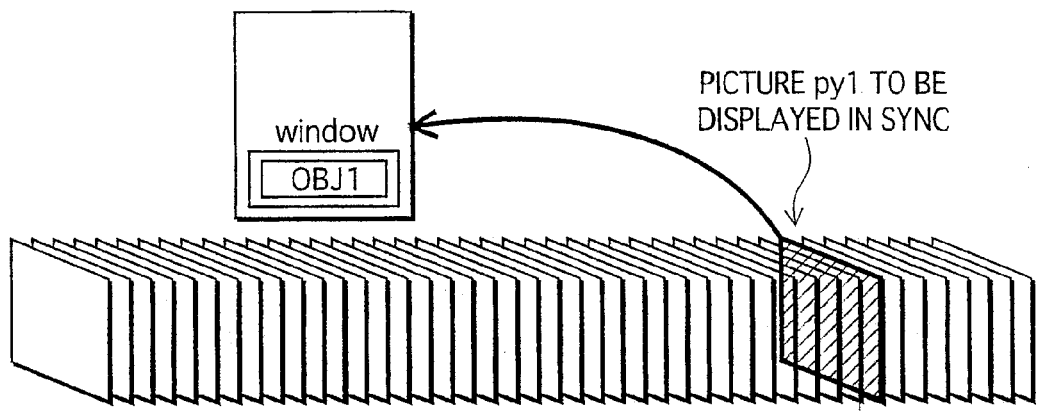
FIG. 21A illustrates a case in which each window has an Object Definition Segment.
Figure 21B:
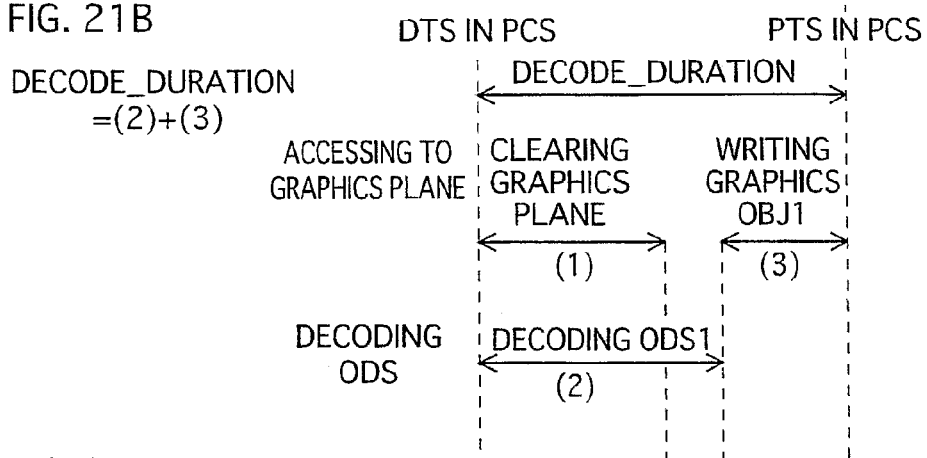
FIGS. 21B and C are timing charts showing orders among numerals referred to in FIG. 18.
Figure 21C:
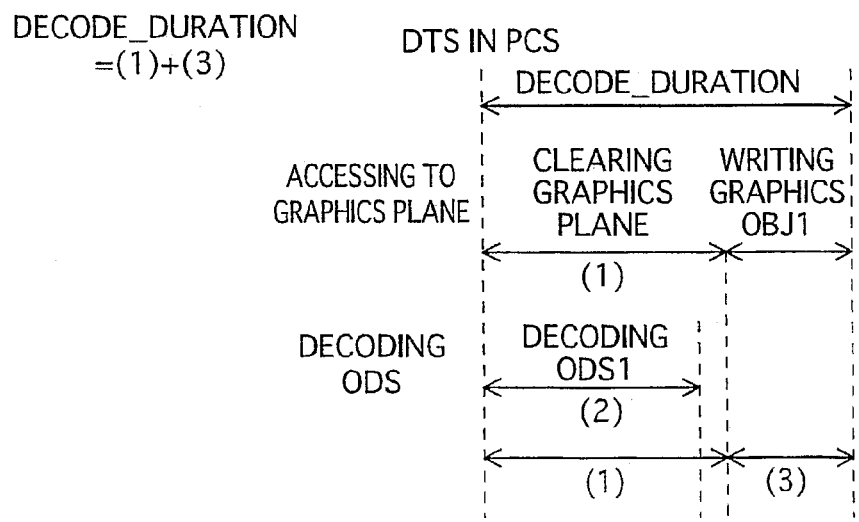

FIG. 21A illustrates a case in which one ODS is included in one Window. FIGS. 21B and 21C are timing charts showing values in an order of time that are referred to in FIG. 18. A bottom line "ODS Decode" and a middle line "Graphics Plane Access" in each chart indicate two operations that are performed simultaneously when reproducing. The above algorithm is described assuming that these two operations are performed in parallel.

The Graphics Plane Access includes a clearing period (1) and a write period (3). The clearing period (1) indicates either a time period necessary to clear an entire Graphics Plane (90,000×(size of Graphics Plane//256,000,000)), or a time period necessary to clear all Windows on the Graphics Plane (Σ(90,000×(size of Window [i]//256,000,000)).

The write period (3) indicates a time period necessary to render an entire Window (90,000×(size of Window [i]//256,000,000)).

Further, a decode period (2) indicates a time period between the DTS and the PTS of the ODS.

Lengths of the clearing period (1), the decode period (2), and the write period (3) may vary depending on a range to be cleared, a size of ODS to be decoded, and a size of the Graphics Object to be written to the Graphics Plane. For convenience, a starting point of the decode period (2) in the drawing is the same as a starting point of the clearing period (1).

FIG. 21B illustrates a case in which the decode period (2) is long, and the decode_duration equals to a total of the decode period (2) and the write period (3).

FIG. 21C illustrates a case in which the clearing period (1) is long, and the decode_duration equals to a total of the clearing period (1) and the write period (3).

Figure 22A:
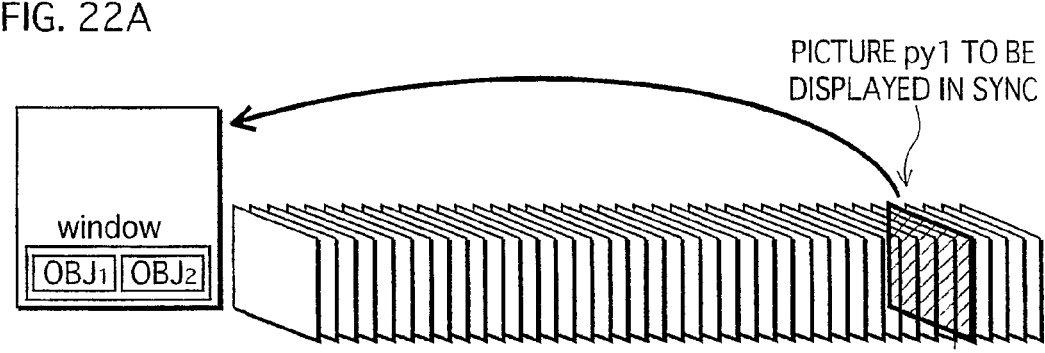
FIG. 22A illustrates a case in which each window has two Object Definition Segments.
Figure 22B:
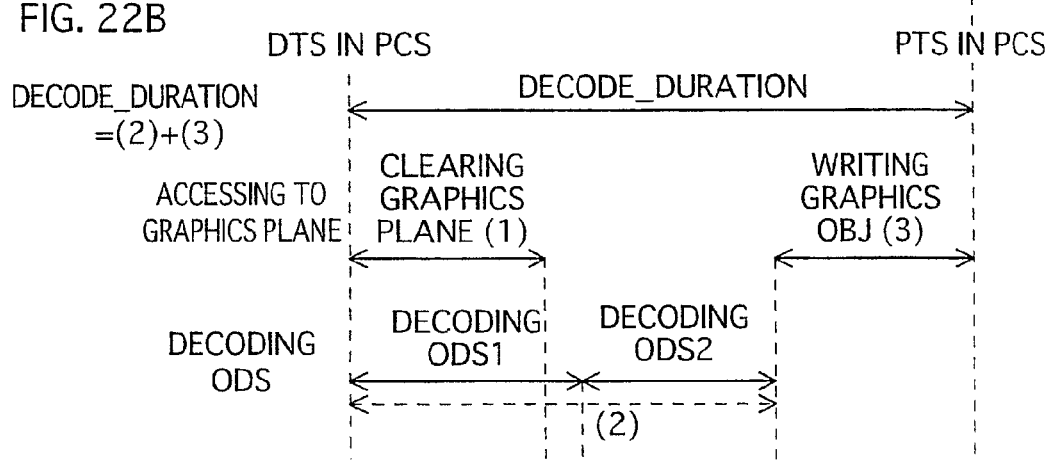
FIGS. 22B and C are timing charts showing orders among numerals referred to in FIG. 18.
Figure 22C:
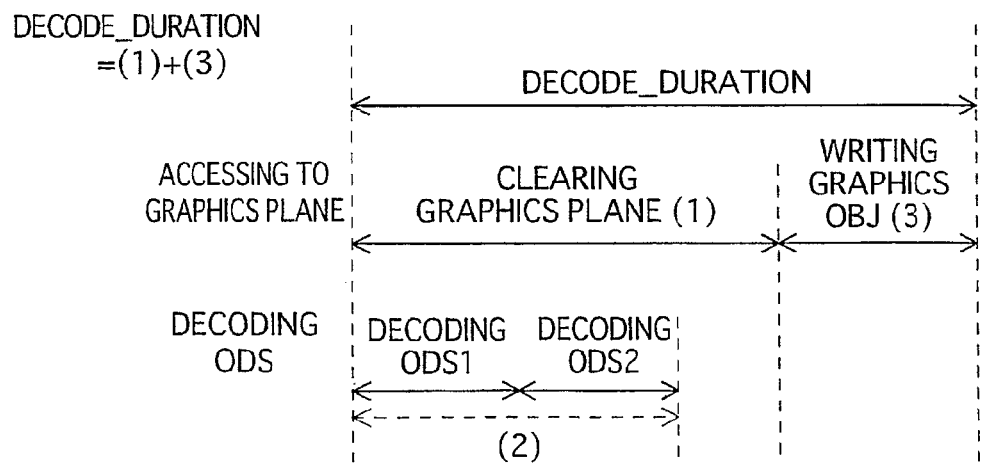

FIGS. 22A to 22C illustrate a case in which two ODS is included in one Window. The decode period (2) in both FIGS. 22B and 22C indicates a total time period necessary for decoding two Graphics. Likewise, the write period (3) indicates a total time period necessary for writing two Graphics to the Graphics Plane.

Even though the number of ODS is two, it is possible to calculate the decode_duration in the same manner as in the case of FIG. 21. When the decode period (3) for decoding the two ODS is long, the decode_duration equals to a total of the decode period (2) and the write period (3) as shown in FIG. 22B.

When the clearing period (1) is long, the decode_duration equals to a total of the clearing period (1) and the write period (3).

FIG. 23A describes a case in which each of two Windows includes an ODS. As in the previous cases, when the clearing period (1) is longer than the decode period (3) for decoding the two ODS, the decode_duration equals to a total of the clearing period (1) and the write period (3). However, when the clearing period (1) is shorter than the decode period (3), it is possible to write to a first Window before the decode period (2) ends. Accordingly, the decode_duration does not equal to either of a total of the clearing period (1) and the write period (3), or a total of the decode period (2) and the write period (3).

When a time period necessary for decoding a first ODS is a write period (31) and a time period necessary for decoding a second ODS is a write period (32), FIG. 23B illustrates a case in which the decode period (2) is longer than a total of the clearing period (1) and the write period (31). In this case, the decode_duration equals to a total of the decode period (2) and the write period (32).

FIG. 23C illustrates a case in which a total of the clearing period (1) and the write period (31) is longer than the decode period (2). In this case, the decode_duration equals to a total of the clearing period (1), the write period (31), and the write period (32).

The size of the Graphics Plane is known from a model of the reproduction apparatus in advance. Also, the size of the Window, and the size and number of the ODS are also known at the authoring. Accordingly, it is possible to find to which combination of time periods the decode_duration equals: the clearing period (1) and the write period (3), the decode period (2) and the write period (3), the decode period (2) and the write period (32), or the clearing period (1), the write period (3) and the write period (32).

By setting the PTS of the ODS based on the calculation of the decode_duration explained above, it is possible to synchronously display the graphics with the picture data at a high accuracy. Such a sync display at a high accuracy becomes possible by defining the Window and limiting an area to re-draw to the Window. Thus, introducing a concept of Window into an authoring environment has a great significance.

The following is an explanation about settings of the DTS and PTS of the WDS in the DSn. The DTS of the WDS may be set so as to satisfy an equation below.

$$DTS(DSn[WDS]) \geq DTS(DSn[PCS])$$

On the other hand, the OTS of the WDS in the DSn indicates a deadline to start writing to the Graphics Plane. Because it is sufficient to write to the Window on the Graphics Plane, the time to start writing to the Graphics Plane is determined by subtracting a time length indicated by the PTS of the PCS from a time period necessary for writing the WDS. When a total size of the WDS is ΣSIZE(WDS.WIN[i]), the time necessary for clearing and re-drawing is "ΣSIZE(WDS.WIN[i])//256,000,000". When expressing at a time accuracy of 90.000 KHz, the time is "90,000×ΣSIZE(WDS.WIN[i])//256,000,000".

Accordingly, it is possible to calculate the PTS of the WDS by the following equation.

$$PTS(DSn[WDS])=PTS(DSn[PCS])-90000 \times \Sigma SIZE(WDS.WIN[i])//256,000,000$$

The PTS indicated in the WDS is the deadline, and it is possible to start writing to the Graphics Plane earlier than the PTS. In other words, as shown in FIG. 23, once decoding the ODS to be rendered in one of the Windows, writing of the Graphics Object obtained by the decoding may start at this point.

As described above, it is possible to assign the Window to any point of time on the reproduction timeline of the AVClip using the DTS and PTS added to the WDS.

Figure 24:
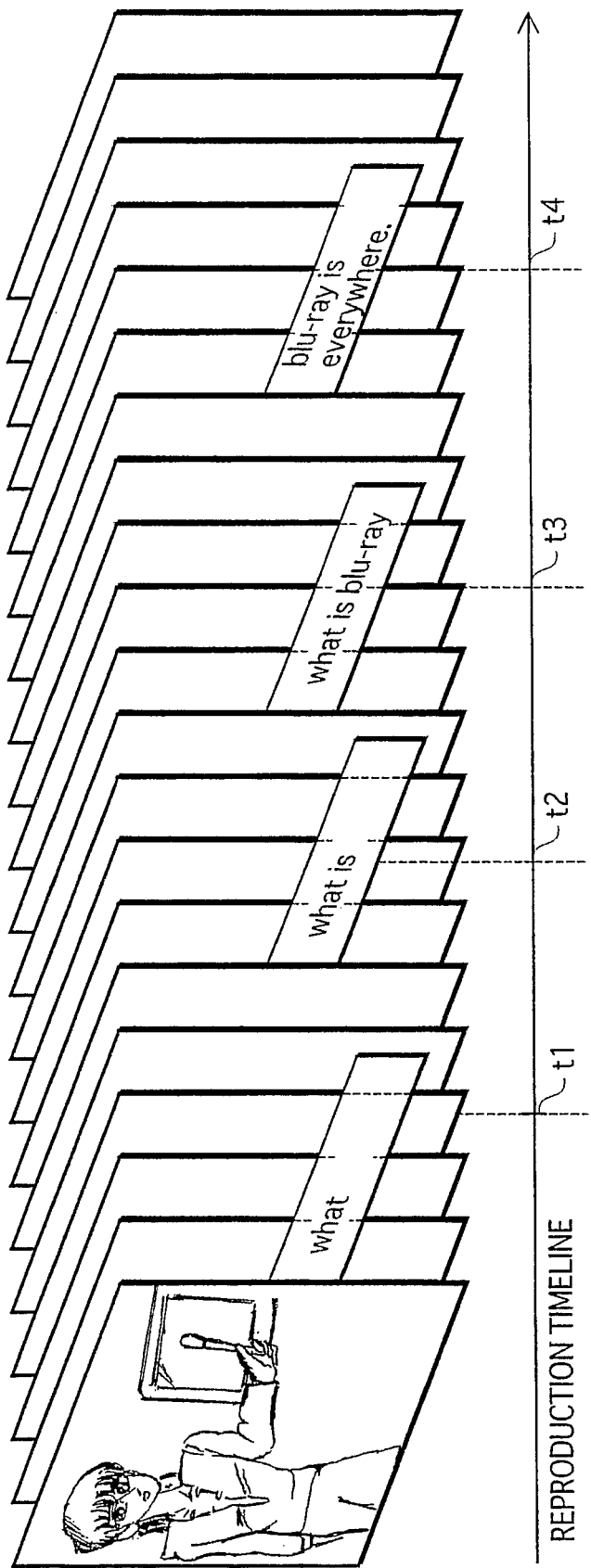
FIG. 24 illustrates chronological transition of update described in an example in the present specification.

Explanations about an example of settings of the DTS and PTS in a Display Set based on the settings are give below, referring to specific example illustrated in FIGS. 24-25. The example is about a case in which subtitles are displayed by writing to the Graphics Plane four times, and an update is performed for displaying each of two subtitles "what is blu-ray." and "blu-ray is everywhere." FIG. 24 illustrates chronological transition of the update in the example. Until a point t1, "what" is displayed, and "what is" is displayed after the t1 till a t2, and then "what is blu-ray." is displayed at a t3. After a whole sentence of a first subtitle has appeared, a second subtitle "blu-ray is everywhere." is displayed at a t4.

Figures 25A, 25B:
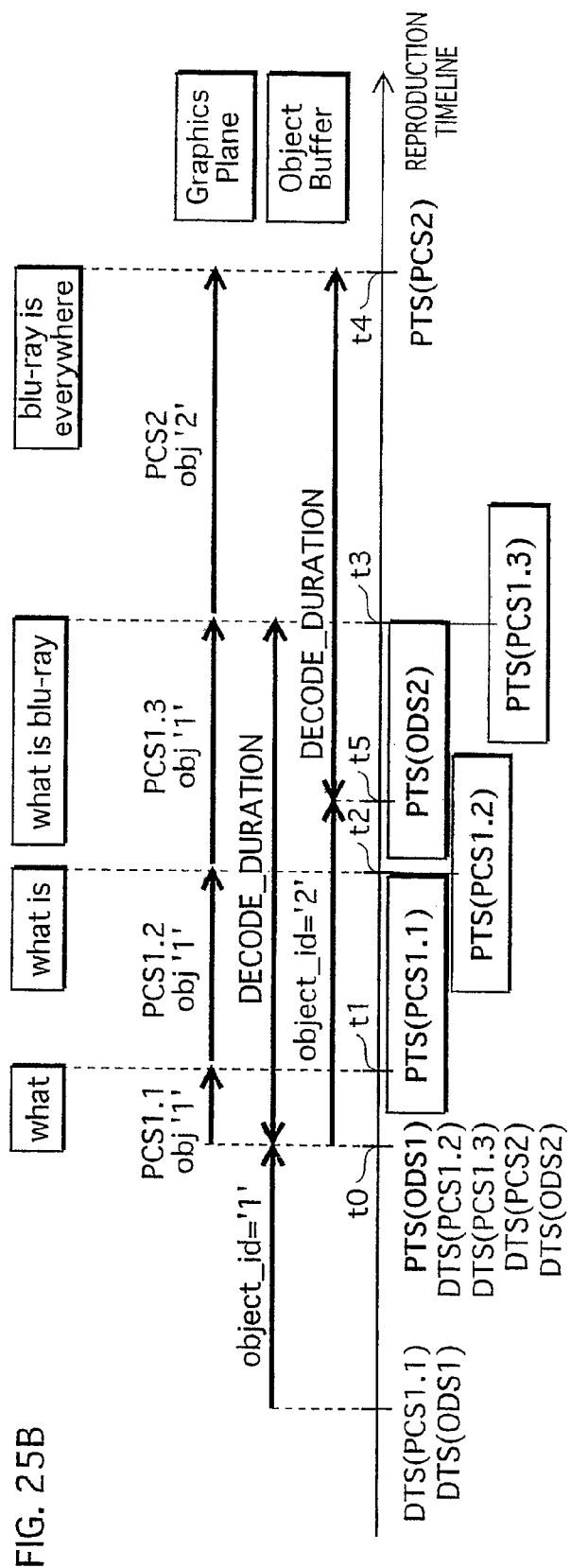
FIG. 25A illustrates four Display Sets that are described so as to perform the above explained update.
FIG. 25B is a timing chart showing settings of DTS and PTS of functional segments included in the four Display Sets.

FIG. 25A illustrates four Display Sets that are described so as to perform the above explained update. A DS1 includes a PCS1.2 for controlling an update at the t1, a PDS1 for coloring, an ODS1 corresponding to the subtitle "what is blu-ray.", and an END as an ending code of the DS1.

A DS2 includes a PCS1.2 for controlling an update at the t2, and an END. A DS3 includes a PCS1.3 for controlling an update at a t3 and an END. A DS4 includes a PCS2 for controlling an update at the t2, a PDS2 for color conversion, an ODS2 corresponding to the subtitle "blu-ray is everywhere.", and an END.

Referring to a timing chart in FIG. 25B, settings of DTS and PTS for each functional segment in the four Display Sets are explained.

The reproduction timeline in the timing chart is the same as the timeline in FIG. 24. In the timing chart of FIG. 25A, PTS(PCS1.1), PTS(PCS1.2), PTS(PCS1.3), and PTS(PCS2) are respectively set at a display point t1 for displaying "what", a display point t2 for displaying "what is", a display point t3 for displaying "what is blu-ray.", and a display point t4 for displaying "blue-ray is everywhere.". Each PTS are set as above, because it is necessary that the control such as cropping described in each PCS is performed at the display point of each subtitle.

PTS(ODS1) and PTS(ODS2) are set so as to indicate points that are calculated by subtracting decode_duration from the points indicated by PTS(PCS1.1) and PTS(PCS2), respectively, because PTS(PCS) is required to be set so as to satisfy a formula below.

$$PTS(DSn[PCS]) \geq DTS(DSn[PCS])+\text{decodeduration}(DSn)$$

In FIG. 25B, PTS(ODS2) is set so as to indicate a point t5 that comes before the point t4, and PTS(ODS1) is set so as to indicate a point t0 that comes before the point t1.

DTS(ODS1) and DTS(ODS2) are set so as to indicate points that are calculated by subtracting decode_duration from the points indicated by PTS(ODS1) and PTS(ODS2), respectively, because DTS(ODS) is required to be set so as to satisfy an equation below.

$$PTS(DS[ODSj])=DTS(DSn[ODSj])+90,000 \times (SIZE(DSn[ODSj])//Rd)$$

In FIG. 25B, PTS(ODS2) is set so as to indicate the point t5 that comes before the point to, and PTS(ODS1) is set so as to indicate a point that comes before the point t0. A relation indicated by DTS(ODS2)=PTS(ODS1) is satisfied here.

By setting a PTS of an ODS immediately after a PTS of a preceding ODS to be displayed earlier, the reproduction apparatus performs an operation in which the ODS is read out to the memory so as to overwrite the preceding ODS, and thus it is possible that the reproduction process is performed by a small size of memory. By realizing such a reproduction process, choices for a memory size for a reproduction apparatus become wider.

The DTS of PCS1.1 is set so as to be DTS(PCS1.1)=DTS(ODS1), because the value for the DTS of PCS1.1 may be any point before the point indicated by DTS(ODS1).

The PTS of ODS1, the DTS of ODS2, and the PTS of the PCS1.2, PCS1.3, and PCS2 are set at the point to, so as to satisfy a relation indicated by an equation below.

$$PTS(ODS1)=DTS(ODS2)=PTS(PCS1.2)=PTS(PCS1.3)=PTS(PCS2)$$

This is because the value for the DTS of PCS1.2 and PCS1.3 may be any points before the point indicated by PTS(PCS1.3), and the DTS of PCS2 may be any point before the point indicated by DTS(PCS2).

As explained above, it is possible to perform update of a succeeding PCS as soon as the updating of a previous PCS is completed, by reading out more than one PCS at the same time.

It is sufficient that the DTS and PTS of PCS and the DTS and PTS of ODS satisfy the relations indicated by the formulae above. Accordingly, it becomes possible that the values are set to be DTS(ODS2)=PTS(ODS1) or PTS(ODS1)=DTS(ODS2)=PTS(PCS1.2)=PTS(PCS1.3)=DTS(PCS2). By such settings for time stamps, it is possible to adjust time length of a period in which load in decoding increases or more buffers are needed. Such adjustment expands possibility of the controls during the reproduction, and advantageous for those who perform authoring or manufacture reproducing apparatuses.

Data structures of the Display Sets (PCS, WDS, PDS, ODS) explained above is an instance of the class structure described in a programming language. Producers that perform authoring may obtain the data structures on the BD-ROM by describing the class structure according to the syntax provided in the Blu-ray Disc Prerecording Format.

Figure 26:
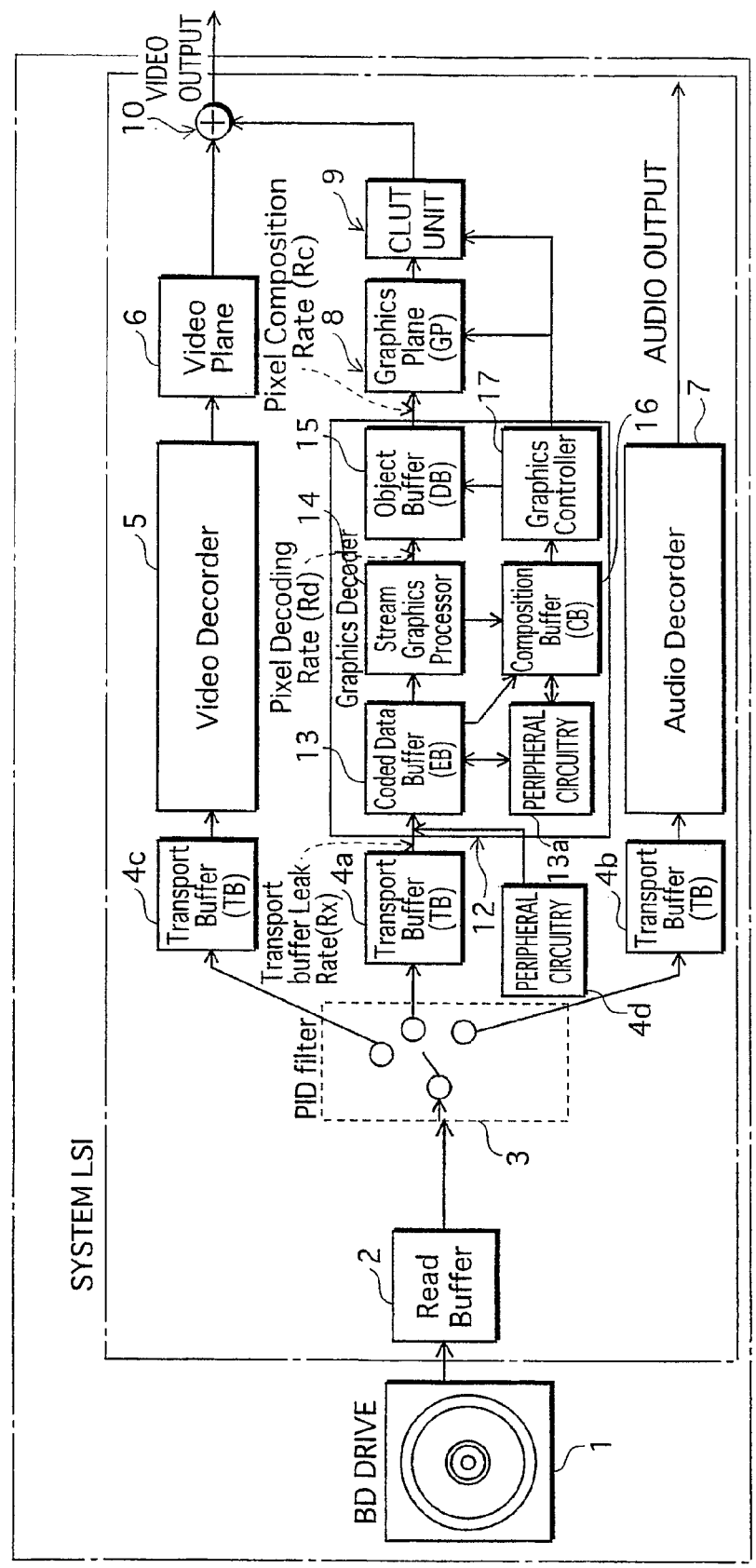
FIG. 26 illustrates an internal structure of a reproduction apparatus according to the present invention.

Next, a practical example of a reproduction apparatus according to the present invention is explained below. FIG. 26 illustrates an internal structure of the reproduction apparatus according to the present invention. The reproduction apparatus according to the present invention is industrially produced based on the internal structure shown in the drawing. The reproduction apparatus according to the present invention is mainly structured by three parts: a system LSI, a drive device, and a microcomputer system, and it is possible to industrially produce the reproduction apparatus by mounting the three parts to a cabinet and a substrate of the apparatus. The system LSI is an integrated circuit in which various processing units for carrying out a function of the reproduction apparatus are integrated. The reproduction apparatus manufactured in the above manner comprises a BD drive 1, a Read Buffer 2, a PID filter 3, Transport Buffers 4a-4c, a peripheral circuit 4d, a Video Decoder 5, a Video Plane 6, an Audio Decoder 7, a Graphics Plane 8, a CLUT unit 9, an adder 10, a Graphics Decoder 12, a Coded Data Buffer 13, a peripheral circuit 13a, a Stream Graphics Processor 14, an Object Buffer 15, a Composition Buffer 16, and a Graphics controller 17.

The BD drive 1 performs load/read/eject of the BD-ROM, and accesses to the BD-ROM.

The Read Buffer 2 is a FIFO memory for storing the TS packets read from the BD-ROM in a first-in first-out order.

The PID filter 3 filters more than one TS packet outputted from the Read Buffer 2. The filtering by the PID filter 3 is to write the only TS packets having a desired PID to the Transport Buffers 4a-4c. Buffering is not necessary for the filtering by the PID filter 3, and accordingly, the TS packets inputted to the PID filter 3 are written to the Transport Buffers 4a-4c without delay.

The Transport Buffers 4a-4c are for storing the TS packets outputted from the PID filter 3 in a first-in first-out order. A speed at which the TS packets from the Transport Buffers 4a-4c are outputted is a speed Rx.

The peripheral circuit 4d is a wired logic for converting the TS packets read from the Transport Buffers 4a-4c into functional segments. The functional segments obtained by the conversion are stored in the Coded Data Buffer 13.

The Video Decoder 5 decodes the more than one TS packets outputted from the PID filter 3 into a decompressed picture and writes to the Video Plane 6.

The Video Plane 6 is a plane memory for a moving picture.

The Audio Decoder 7 decodes the TS packets outputted from the PID filter 3 and outputs decompressed audio data.

The Graphics Plane 8 is a plane memory having an area for one screen, and is able to store decompressed graphics for one screen.

The CLUT unit 9 converts an index color of the decompressed Graphics stored in the Graphics Plane 8 based on the values for Y, Cr, and Cb indicated by the PDS.

The adder 10 multiplies the decompressed Graphics to which the color conversion has been performed by the CLUT unit 9 by the T value (Transparency) indicated by the PDS, adds the decomposed picture data stored in the Video Plane per pixel, then obtains and outputs the composed image.

The Graphics Decoder 12 decodes the Graphics Stream to obtain the decomposed graphics, and writes the decomposed graphics as the Graphics Object to the Graphics Plane 8.

By decoding the Graphics Stream, the subtitles and menus appear on the screen. The Graphics Decoder 12 includes the Coded Data Buffer 13, the peripheral circuit 13a, the Stream Graphics Processor 14, the Object Buffer 15, the Composition Buffer 16, and the Graphics controller 17.

The Coded Data Buffer 13 is a buffer in which the functional segment is stored along with the DTS and PTS. The functional segment is obtained by removing a TS packet header and a PES packet header from each TS packet in the Transport Stream stored in the Transport Buffer 4a-4c and by arranging the payloads sequentially. The PTS and DTS out of the removed TS packet header and PES packet header are stored after making correspondence between the PES packets.

The peripheral circuit 13a is a wired logic that realizes a transfer between the Coded Data Buffer 13 and the Stream Graphics Processor 14, and a transfer between the Coded Data Buffer 13 and the Composition Buffer 16. In the transfer operation, when a current time is a time indicated by the DTS of the ODS, the ODS is transferred from the Coded Data Buffer 13 to the Stream Graphics Processor 14. When the current time is a time indicated by the DTS of the PCS and PDS, the PCS and PDS are transferred to the Composition Buffer 16.

The Stream Graphics Processor 14 decodes the ODS, and writes the decompressed graphics of the index color obtained by decoding as the Graphics Object to the Object Buffer 15.

The decoding by the Stream Graphics Processor 14 starts at the time of the DTS corresponding to the ODS, and ends by the decode end time indicated by the PTS corresponding to the ODS.

The decoding rate Rd of the Graphics Object is an output rate of the Stream Graphics Processor 14.

The Object Buffer 15 is a buffer corresponding to a pixel buffer in the ETSI EN 300 743 standard, and the Graphics Object obtained by the decode that the Stream Graphics Processor 14 performs is disposed. The Object Buffer 15 needs to be set to twice or four times as large as the Graphics Plane 8, because in case the Scrolling effect is performed, the Object Buffer 15 needs to store the Graphics Object that is twice or four times as large as the Graphics Plane.

The Composition Buffer 16 is a memory in which the PCS and PDS are disposed. The Graphics controller 17 decodes the PCS disposed in the Composition Buffer 16, and performs a control based on the PCS. A timing for performing the control is based on the PTS attached to the PCS.

Figure 27:
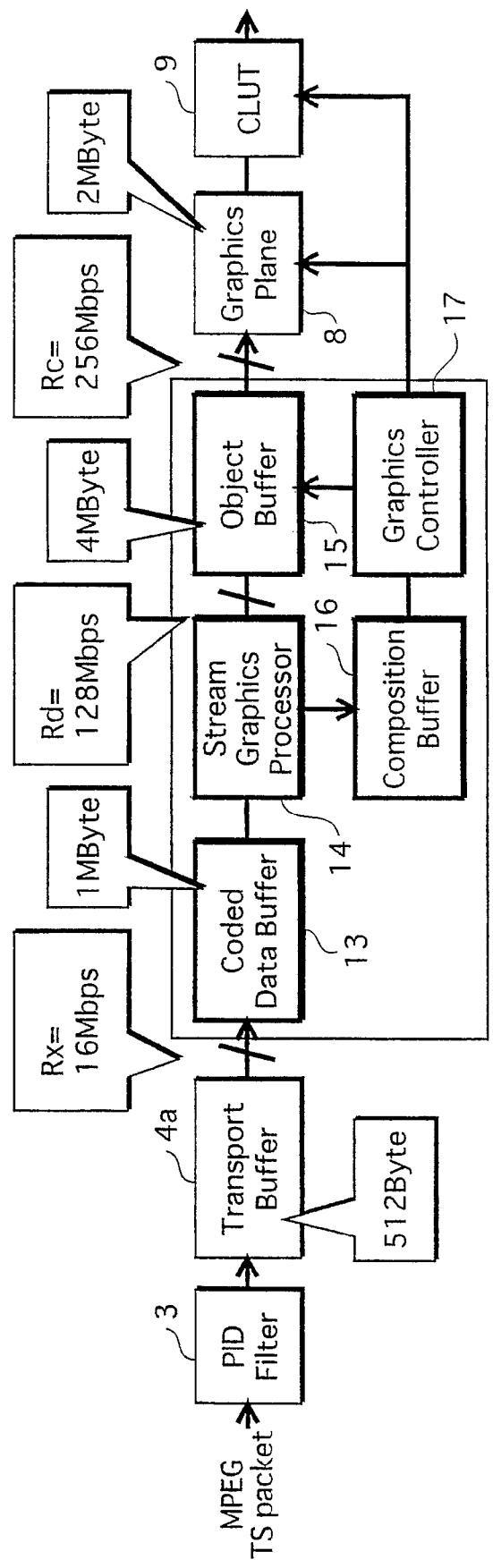
FIG. 27 illustrates sizes of write rates Rx, Rc, and Rd, Graphics Plane 8, Coded Data Buffer 13, Object Buffer 15, and Composition Buffer 16.

Next, recommended values for the transfer rate and buffer size for structuring the PID filter 3, Transport Buffer 4a-4c, Graphics Plane 8, CULT unit 9, Coded Data Buffer 13, and Graphics controller 17 are explained. FIG. 27 illustrates sizes of the write rates Rx, Rc, and Rd, Graphics Plane 8, Coded Data Buffer 13, Object Buffer 15, and Composition Buffer 16.

The transfer rate Rc between the Object Buffer 15 and the Graphics Plane 8 is the highest transfer rate in the reproduction apparatus of the present embodiment, and calculated as 256 Mbps (=500 Kbytes×29.97×2) from the window size and the frame rate.

Unlike the Rc, the transfer rate Rd (Pixel Decoding Rate) between the Stream Graphics Processor 14 and Object Buffer 15 does not need to be updated every video frame cycle, and ½ or ¼ of the Rc is sufficient for the Rd. Accordingly, the Rd is either 128 Mbps or 64 Mbps.

The Transport Buffer Leak Rate Rx between the Transport Buffer 4a-4c and Coded Data Buffer 13 is a transfer rate of the ODS in a compressed state. Accordingly, the transfer rate Rd multiplied by the compression rate is sufficient for the Transport Buffer leak rate Rx. Given the compression rate of the ODS is 25%, 16 Mbps (=64 Mbps×25%) is sufficient.

The transfer rates and buffer sizes shown in the drawing are the minimum standard, and it is also possible to set at higher rates and larger sizes.

In the above structured reproduction apparatus, each elements perform a decoding operation in a pipeline structure.

Figure 28:
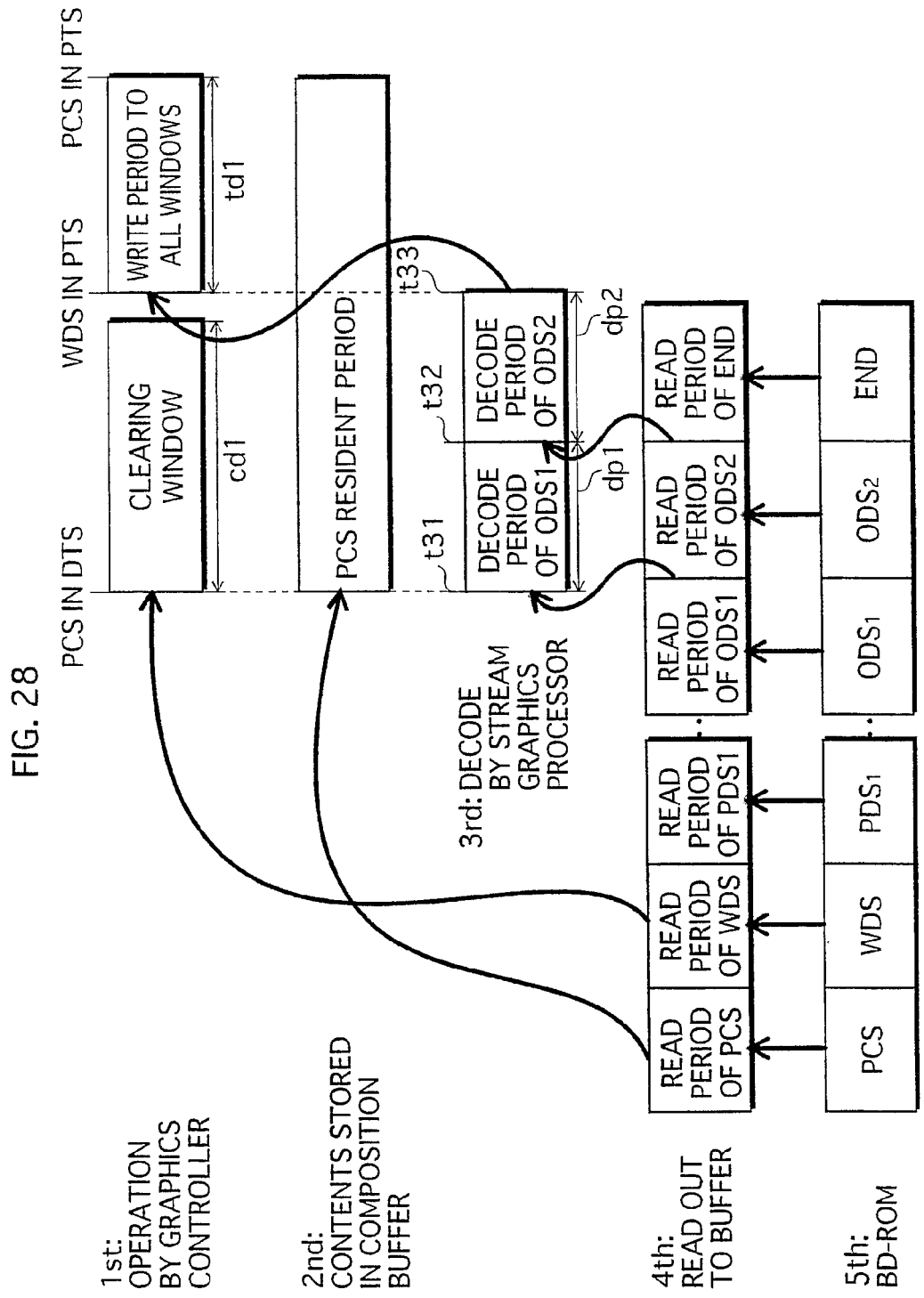
FIG. 28 is a timing chart illustrating a pipeline processing by the reproduction apparatus.

FIG. 28 is a timing chart illustrating a pipeline processing by the reproduction apparatus. A 5th row in the drawing is a Display Set in the BD-ROM, a 4th row shows read periods from the PCS, WDS, PDS, and ODS to the Coded Data Buffer 13. A 3rd row shows decode periods of each ODS by the Stream Graphics Processor 14. A 1st row shows operations that the Graphics controller 17 performs.

The DTS (decode starting time) attached to the ODS1 and ODS2 indicate t31 and t32 in the drawing, respectively. Because the decode starting time is set by DTS, each ODS is required to be read out to the Coded Data Buffer 13. Accordingly, the reading of the ODS1 is completed before a decode period dp1 in which the ODS1 is decoded to the Coded Data Buffer 13. Also, the reading of the ODS2 is completed before a decode period dp2 in which the ODS2 is decoded to the Coded Data Buffer 13.

On the other hand, the PTS (decode ending time) attached to the ODS1 and ODS2 indicate t32 and t33 in the drawing, respectively. Decoding of the ODS1 by the Stream Graphics Processor 14 is completed by the t32, and decoding of the ODS2 is completed by a time indicated by the t33. As explained above, the Stream Graphics Processor 14 reads the ODS to the Coded Data Buffer 13 by the time the DTS of the ODS indicates, and decodes the ODS read to the Coded Data Buffer 13 by the time the PTS of the ODS indicates, and write the decoded ODS to the Object Buffer 15.

A period cd1 at the 1st row in the drawing indicates a period necessary for the Graphics controller 17 to clear the Graphics Plane. Also, a period td1 indicates a period necessary to write the Graphics Object obtained on the Object Buffer to the Graphics Plane 8. The PTS of the WDS indicates the deadline to start writing, and the PTS of the PCS indicates ending of the write and a timing for display. At the time indicated by the PTS of the PCS, the decompressed graphics to compose an interactive screen is obtained on the Graphics Plane 8.

After the CLUT unit 9 performs the color conversion of the decompressed graphics and the adder 10 performs composition of the decomposed graphics and a decomposed picture stored in the Video Plane 6, a composite image is obtained.

Figure 29:
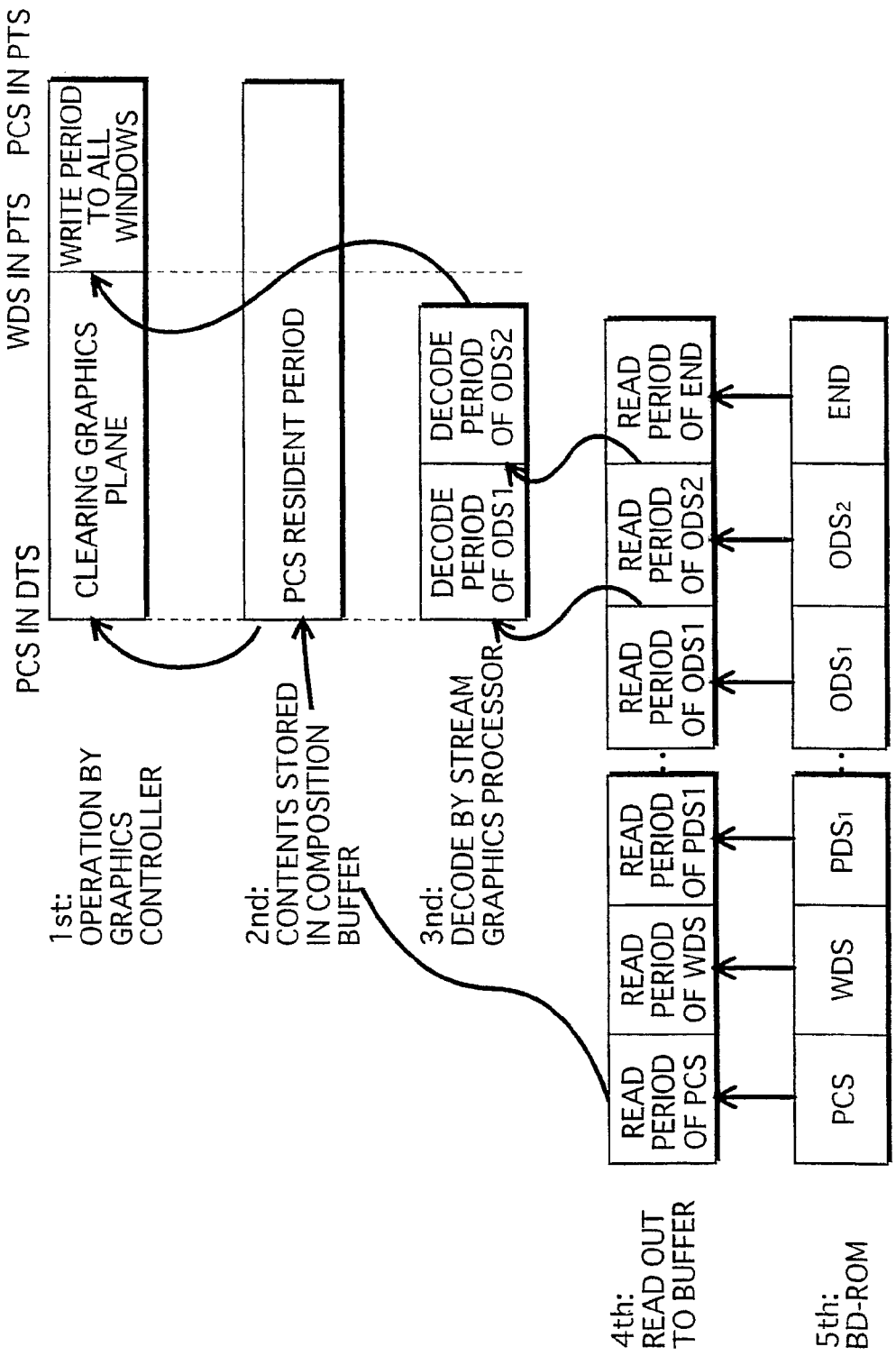
FIG. 29 illustrates a timing chart in a pipeline processing of a case in which decoding of the ODS ends before clearing of the Graphics Plane is completed.

In the Graphics Decoder 12, the Stream Graphics Processor 14 performs decoding continuously while the Graphics controller 17 performs clearing of the Graphics Plane 8. By the above pipeline processing, it is possible to perform a prompt display of the graphics. In FIG. 28, a case in which the clearing of the Graphics Plane ends before completing the decoding of the ODS is explained. FIG. 29 illustrates a timing chart in a pipeline processing of a case in which the decoding of the ODS ends before the clearing of the Graphics Plane is completed. In this case, it is not possible to write to the Graphics Plane at a time of completion of the decoding of the ODS. When the clearing of the Graphics Plane is completed, it becomes possible to write the graphics obtained by the decode to the Graphics Plane.

Figure 30:
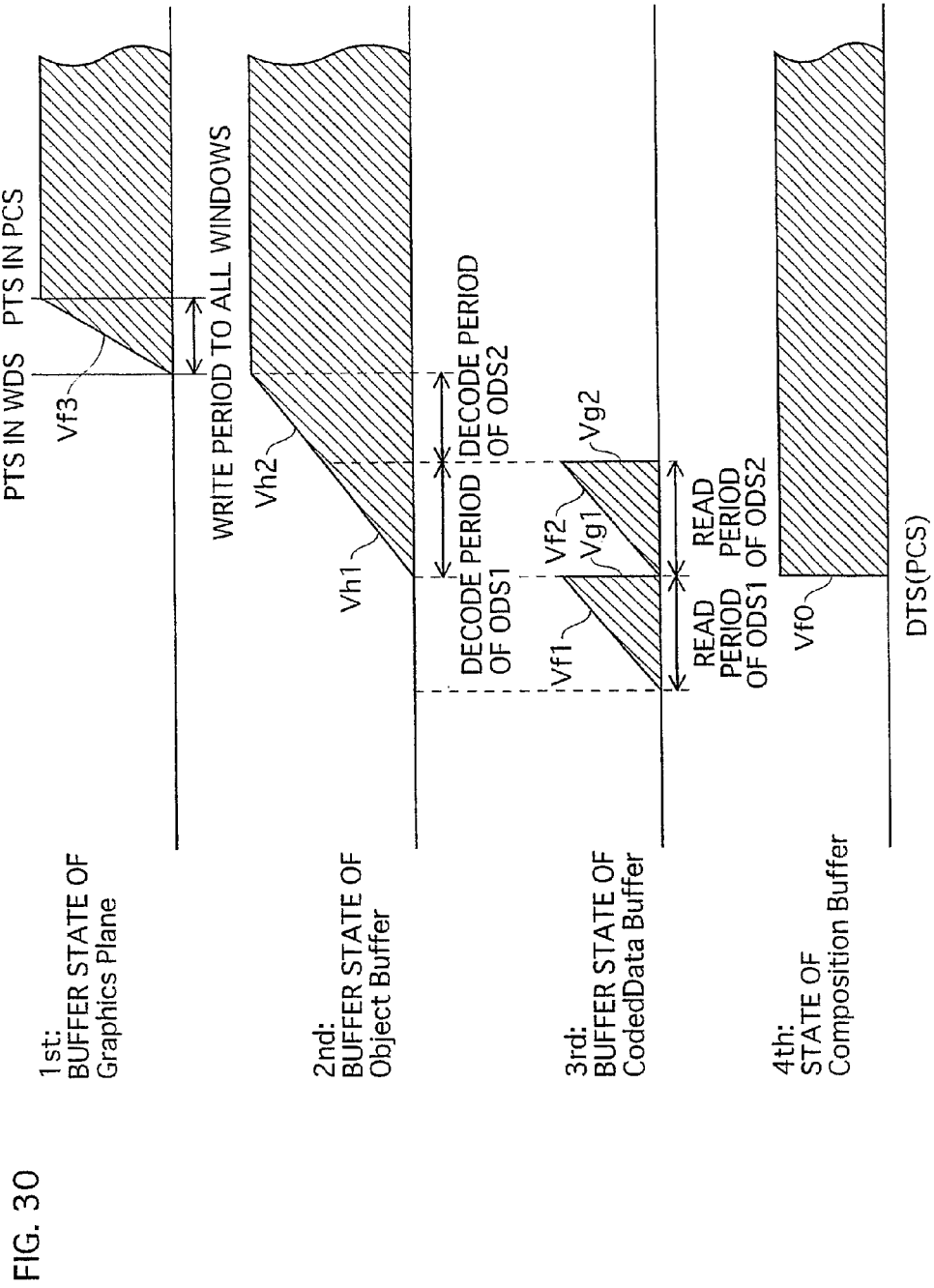
FIG. 30 is a timing chart showing chronological transition of the amount of accumulation at the Graphics Plane 8.

Next, a chronological transition in buffer occupancy is explained. FIG. 30 is a timing chart showing the chronological transitions of the following components shown in FIG. 26: the composition buffer 16, the object buffer 16, the coded data buffer 13, and the Graphics Plane 8.

The first to fourth rows illustrate the chronological transitions in occupancy of the Graphics Plane 8, the object buffer 15, the coded data buffer 13, and the composition buffer 16, respectively. Here, a chronological transition is described using line graph, in which the lateral axis represents timeline, and the longitudinal axis represents occupancy.

The fourth row of FIG. 30 shows the chronological transition in occupancy for the composition buffer 16. As the forth row shows, the chronological transition for the composition buffer 16 includes a part "vfo", which represents simple increase which is due to storage of PCS outputted from the coded data buffer 13.

The third row shows the chronological transition in occupancy for the coded data buffer 13. As the third row shows, the chronological transition for the coded data buffer 13 includes two simply increasing parts vf1 and vf2, and two simply decreasing parts vg1 and vg2. The gradients of the simply increasing parts vf1 and vf2 depend on the output rate Rx of the transport buffers 4a,b,c to the coded data buffer 13, and the gradients of the simply decreasing parts vg1 and vg2 represent decoding performed by the stream graphics processor 14, which is performed in an instant. In other words, decoding for ODS is performed instantly, and the stream graphics processor 14 retains the decompressed graphics obtained by the decoding. The write rate of the transmission path from the stream graphics processor 14 to the object buffer 15 is 128 Mbps. Therefore the occupancy of the object buffer 15 increases in accordance with this write rate.

The second row represents the chronological transition in occupancy for the object buffer 15. As the second row shows, the chronological transition for the object buffer 15 includes simply increasing parts vh1 and vh2, which is due to storage of ODS outputted from the stream graphics processor 14. The gradients of the simply increasing parts Vh1 and Vh2 depend on the transfer rate Rc from the stream graphics processor 14 to the object buffer 15.

The periods during which simply decreasing parts at the third row and the simply increasing parts at the second row occur correspond to "decode period". The start of such a decode period is indicated by the DTS of the ODS, and the end of the decode period is indicated by the PTS of the ODS. If the decompressed graphics is stored in the object buffer 15 until the time shown by the DTS of the ODS, that means the completion of decoding directed to the ODS. As long as the decompressed graphics is stored in the object buffer 15 until the time shown by the PTS of the ODS, the simply increasing parts and the simply decreasing parts, during this decode period, may take any form.

The first row represents the chronological transition in occupancy for the Graphics Plane 8. As the first row shows, the chronological transition for the Graphics Plane 8 includes a simply increasing part vf3, which is due to storage of already decoded ODS outputted from the Object Buffer 15. The gradient of the simply increasing part Vf3 depends on the transfer rate Rd from the Object Buffer 15 to the Graphics Plane 8. The end of the simply increasing part is shown by the PTS of ODS.

The graphs such as in FIG. 27 are illustrated using: DTS and PTS assigned to ODS; DTS and PTS assigned to ICS; size and transfer rate of each buffer illustrated in FIG. 27. Furthermore, by creating the graphs such as in this diagram, users can know how the state of each buffer changes, at the authoring stage.

Since the transition of the state of each buffer can be adjusted by updating DTS and PTS, it becomes possible to avoid decoding load, which would exceed the specification of the decoder, from being imposed on the reproduction apparatus, and to avoid buffer overflow incident to reproduction. According to this, the hardware/software implementation will become easy, in the developing phase of reproduction apparatuses.

Next, how the controlling unit 20 and the Graphics Decoder 12 are implemented is explained below. The controlling unit 20 is implemented by writing a program performing an operation shown in FIG. 30, and having a general CPU to execute the program. The operation performed by the controlling unit 20 is explained by referring to FIG. 30.

Figure 31:
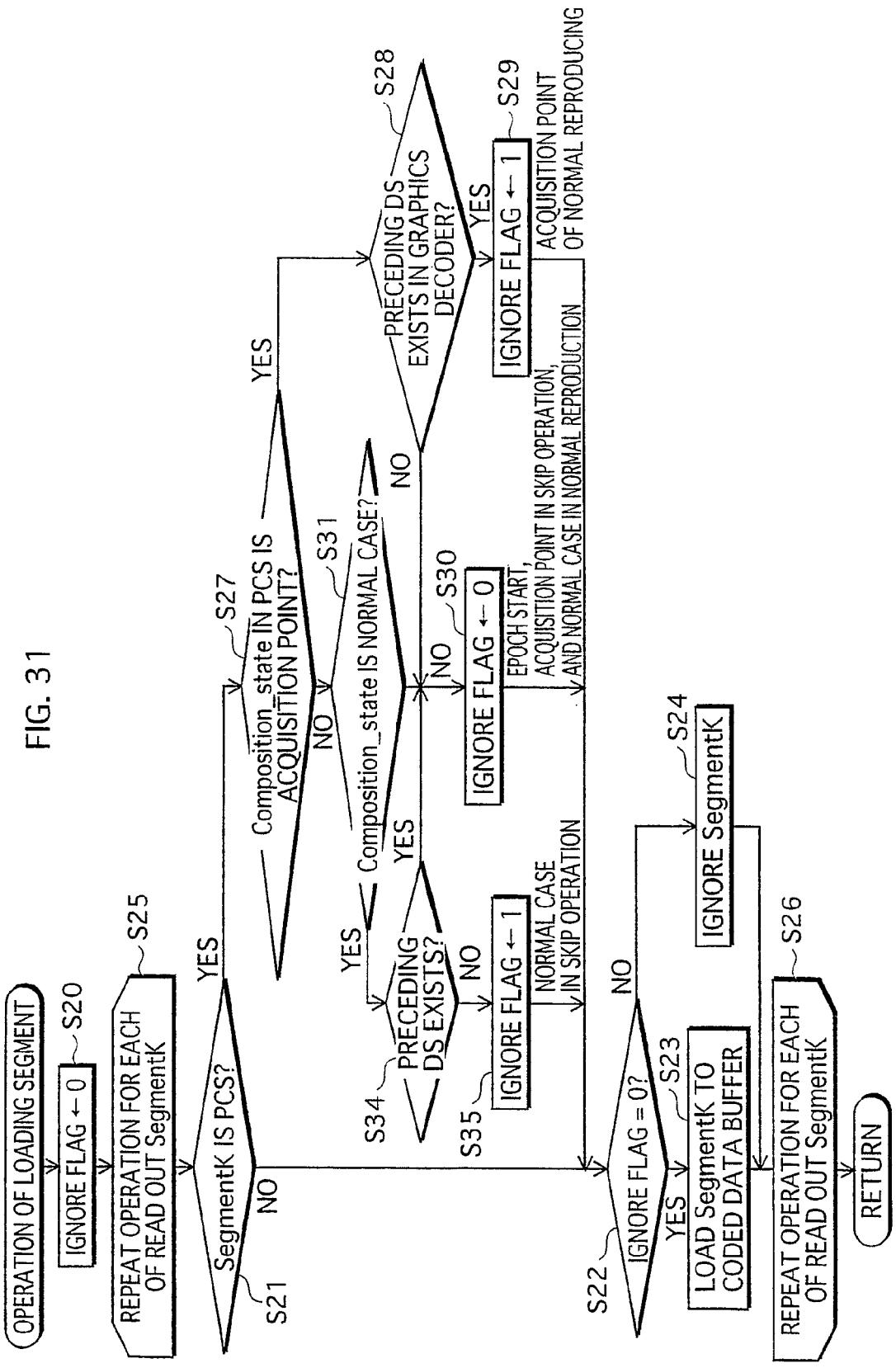
FIG. 31 is a flowchart illustrating a process of a loading operation of a functional segment.

FIG. 31 is a flowchart showing the process of loading operation of functional segment. In the flowchart, SegmentK is a variable indicating each of Segments (PCS, WDS, PDS, and ODS) that is read out in reproducing the AVClip. An ignore flag is a flag to determine if the SegmentK is ignored or loaded. The flowchart has a loop structure, in which first the ignore flag is initialized to 0 and then Steps S21-S24 and Steps S27-S31 are repeated for each SegmentK (Step S25 and Step S26).

Step S21 is to judge if the SegmentK is the PCS, and if the SegmentK is the PCS, judgments in Step S27 and Step S28 are performed.

Step S22 is to judge if the ignore flag is 0. If the ignore flag is 0, the operation moves to Step S23, and if the ignore flag is 1, the operation moves to Step S24. If the ignore flag is 0 (Yes in Step S22), the SegmentK is loaded to the Coded Data Buffer 13 in Step S23.

If the ignore flag is 1 (No in Step S22), the SegmentK is ignored in Step S24. By this, the rest of all functional segments that belong to the DS are ignored because Step S22 is No (Step S24).

As explained above, whether the SegmentK is ignored or loaded is determined by the ignore flag. Steps S27-S31, S34, and S35 are steps for setting the ignore flag.

In Step S27, it is judged if segment_type of the SegmentK is the Acquisition Point. If the SegmentK is the Acquisition Point, the operation moves to Step S28, and if the SegmentK is either the Epoch Start or Normal Case, then the operation moves to Step S31.

In Step S28, it is judged if a preceding DS exists in any of the buffers in the Graphics Decoder 12 (the coded data buffer 13, stream graphics processor 14, object buffer 15, and composition buffer 16). The judgment in Step S28 is made when the judgment in Step S27 is Yes. A case in which a preceding DS does not exist in the Graphics Decoder 12 indicates a case in which the skip operation is performed. In this case, the display starts from the DS that is the Acquisition Point, and therefore the operation moves to Step S30 (No in Step S28). In Step S30, the ignore flag is set to 0 and the operation moves to Step S22.

A case in which a preceding DS exists in the Graphics Decoder 12 indicates a case in which normal reproduction is performed. In this case, the operation moves to Step S29 (Yes in Step S28). In Step S29, the ignore flag is set to 1 and the operation moves to Step S22.

In Step S31, it is judged if composition_state of the PCS is the Normal Case. If the PCS is the Normal Case, the operation moves to Step S34, and if the PCS is the Epoch Start, then the ignore flag is set to 0 in Step S30.

In Step S34, like in Step S28, it is judged if a preceding DS exists in any of the buffers in the Graphics Decoder 12. If the preceding DS exists, the ignore flag is set to 0 (Step S30).

If the preceding DS does not exist, it is not possible to obtain sufficient functional segments to compose an interactive screen and the ignore flag is set to 1 (Step S35).

By setting the ignore flag in the above manner, the functional segments that constitute the Normal Case are ignored when the preceding DS does not exit in the Graphics Decoder 12.

Taking an example of a case in which the DS is multiplexed as shown in FIG. 31, a manner how the reading of the DS is performed is explained. In the example of FIG. 31, three DS are multiplexed with a moving picture. The composition_state of a DS1 is Epoch Start, the composition_state of a DS10 is Acquisition Point, and the composition_state of a DS20 is Normal Case.

Figure 32:
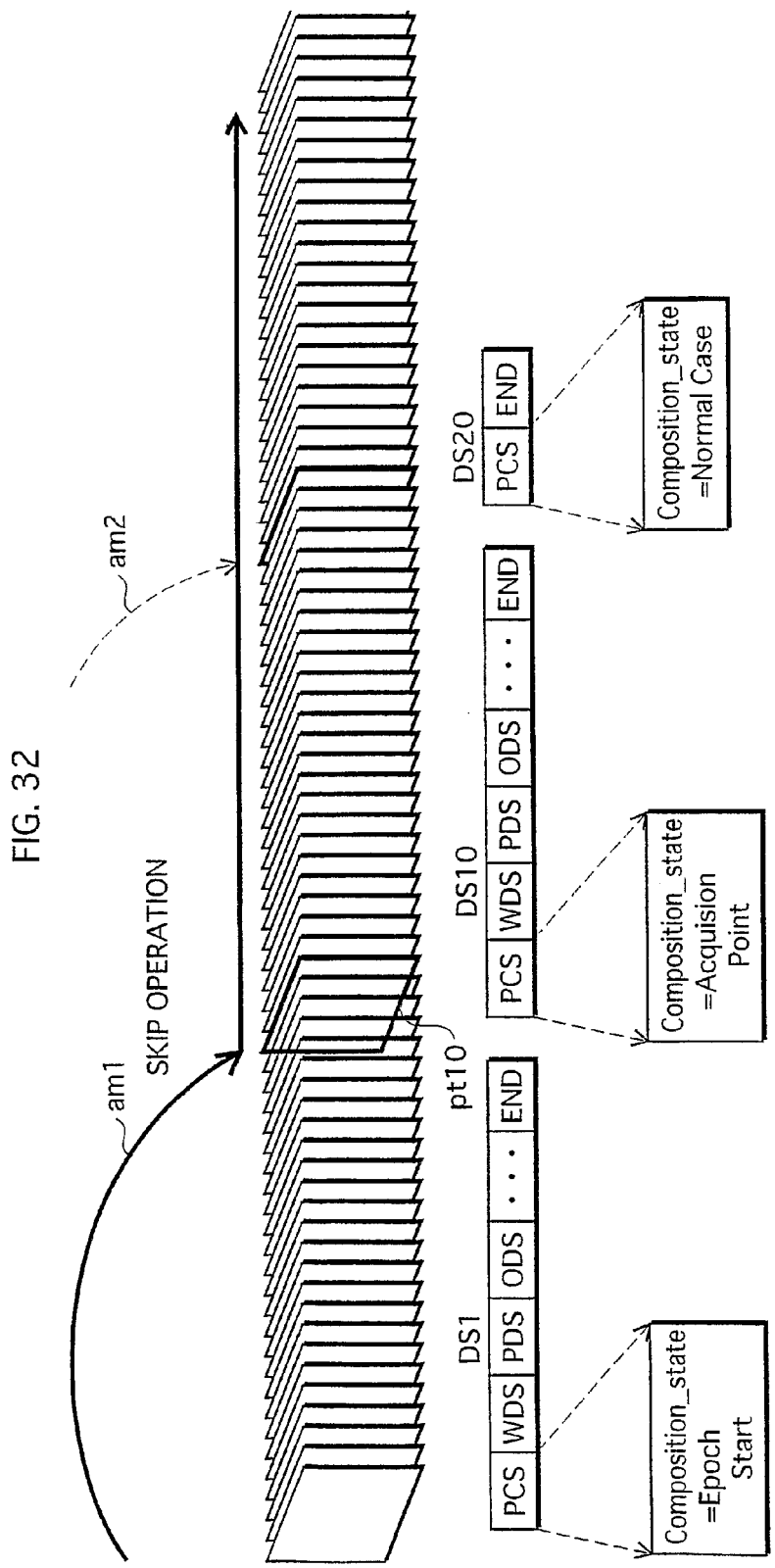
FIG. 32 shows an example of multiplexing.

Given that, in an AVClip in which the three DS and the moving picture are multiplexed, a skip operation to a picture data pt10 as shown by an arrow am1 is performed, the DS10 is the closest to a skipping target, and therefore the DS10 is the DS described in the flowchart in FIG. 30. Although the composition_state is judged to be the Acquisition Point in Step S27, the ignore flag is set to 0 because no preceding DS exists in the Coded Data Buffer 13, and the DS10 is loaded to the Coded Data Buffer 13 of the reproduction apparatus as shown by an arrow md1 in FIG. 32. On the other hand, in a case in which the skipping target is after the DS10 (an arrow am2 in FIG. 31), the DS20 is to be ignored because the DS20 is Normal Case Display Set and DS20 because a preceding DS does not exist in the Coded Data Buffer 13 (an arrow md2 in FIG. 32).

Figure 33:
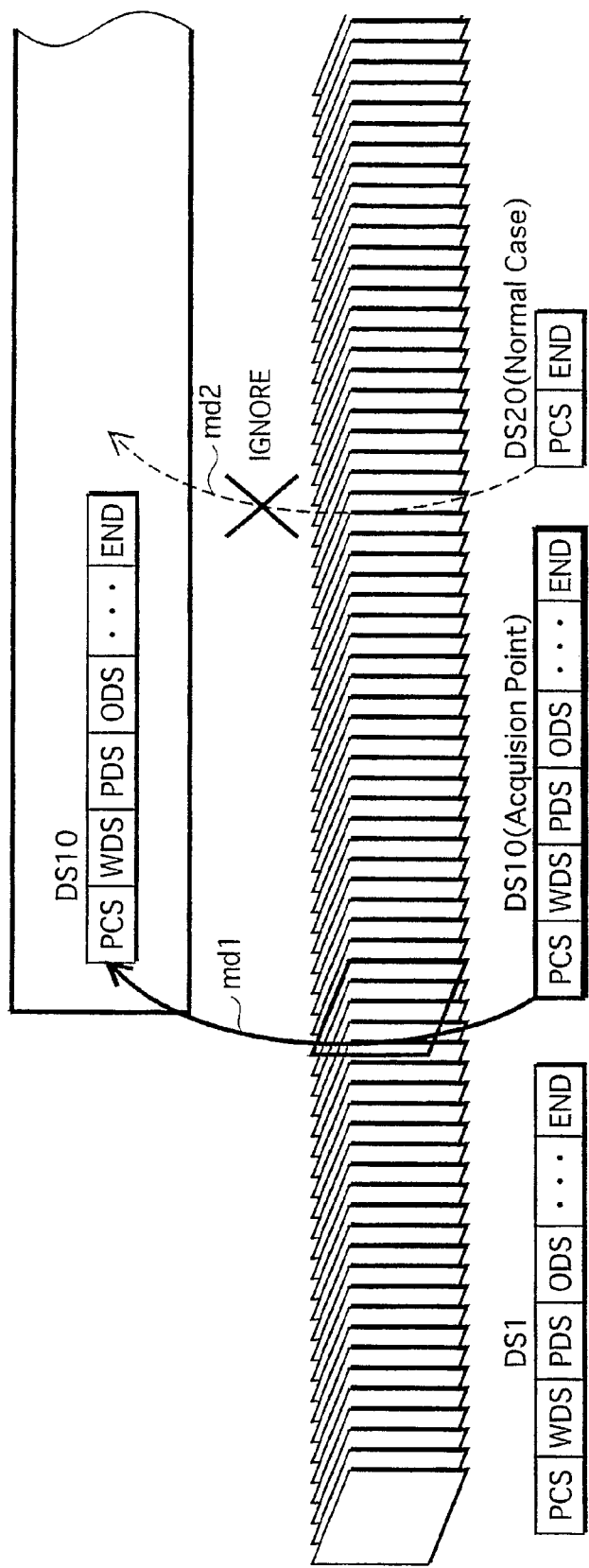
FIG. 33 illustrates a manner in which a DS10 is loaded to the Coded Data Buffer 13 of the reproduction apparatus.
Figure 34:
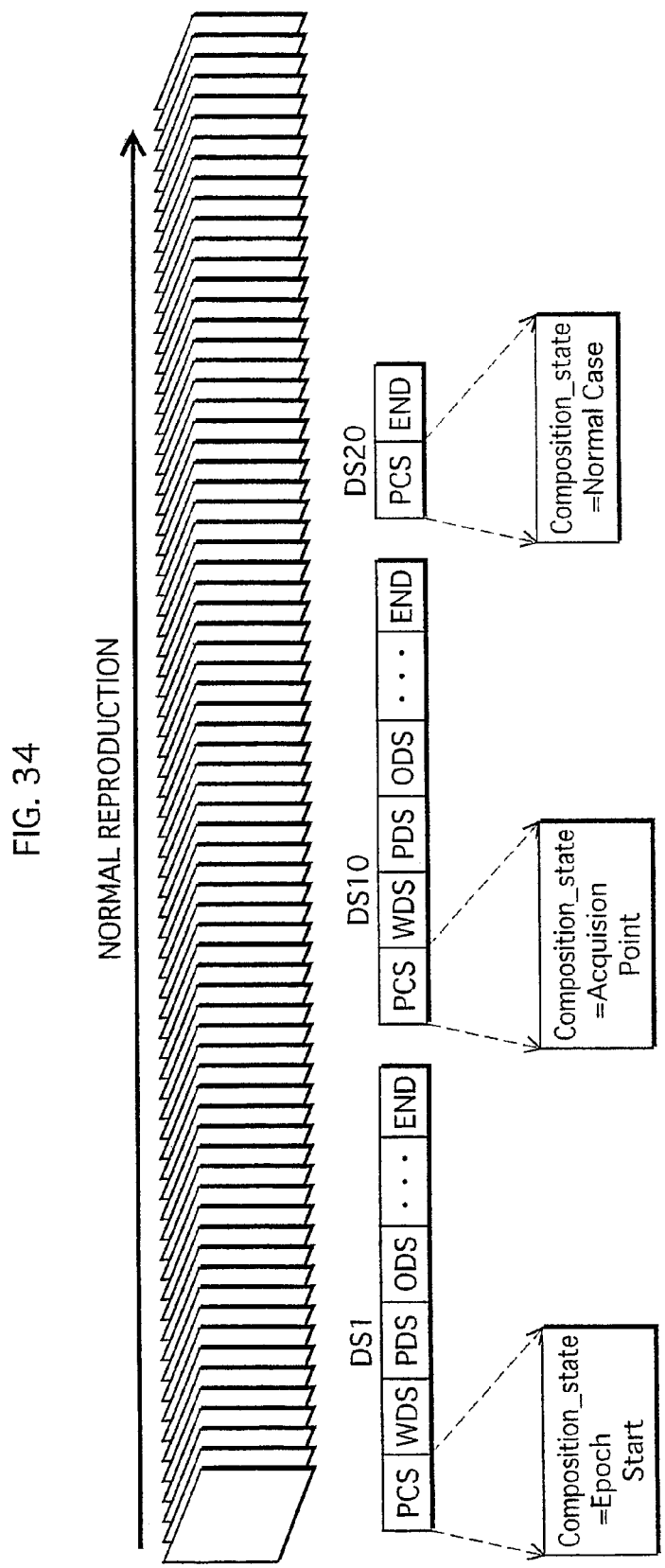
FIG. 34 illustrates a case where a normal reproduction is performed.

FIG. 33 illustrates loading of the DS1, DS10, and DS20 in a normal reproduction. The DS1 whose composition_state of the PCS is the Epoch Start is loaded to the Coded Data Buffer 13 as it is (Step S23). However, because the ignore flag of the DS10 whose composition_state of the PCS is the Acquisition Point is set to 1 (Step S29), the functional segments that constitute the DS10 are ignored and not loaded to the Coded Data Buffer 13 (an arrow rd2 in FIG. 34, and Step S24). Further, the DS20 is loaded to the Coded Data Buffer 13, because the composition_state of the PCS of the DS20 is the Normal Case (an arrow rd3 in FIG. 34).

Figure 35:
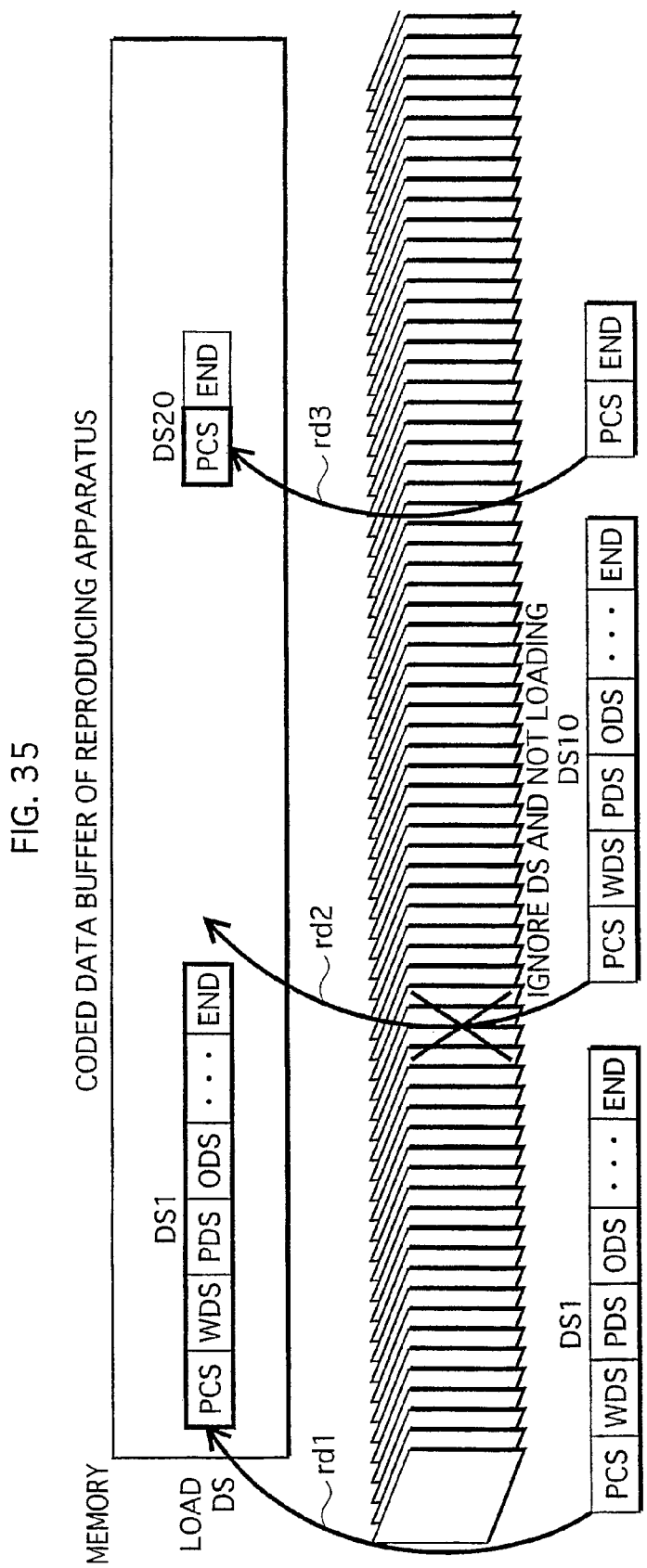
FIG. 35 illustrates loading of a DS1, the DS10, and a DS20 in a normal reproduction as performed in FIG. 34.
Figure 36:
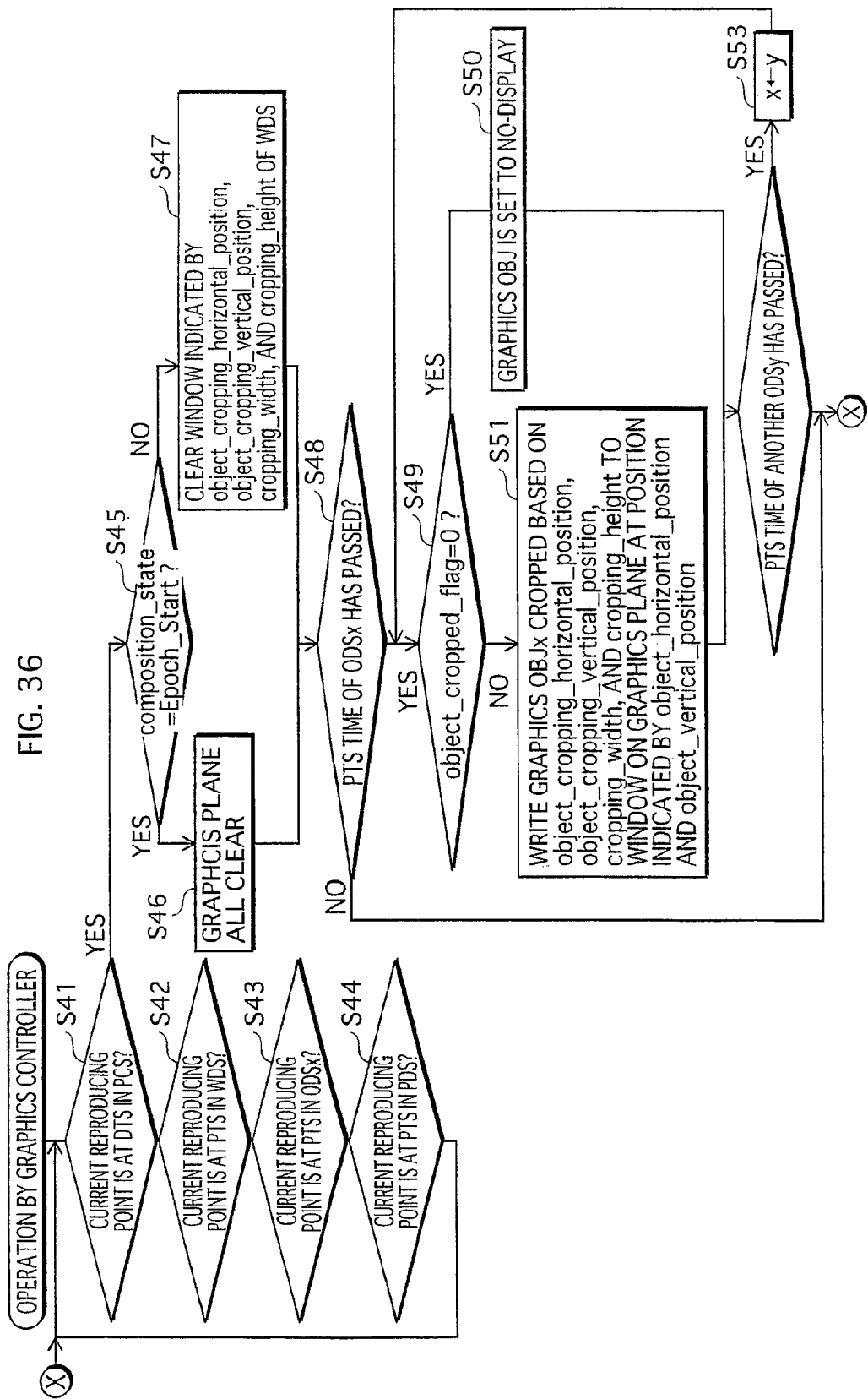
FIG. 36 is a flowchart showing a process performed by the Graphics controller 17.
Figure 37:
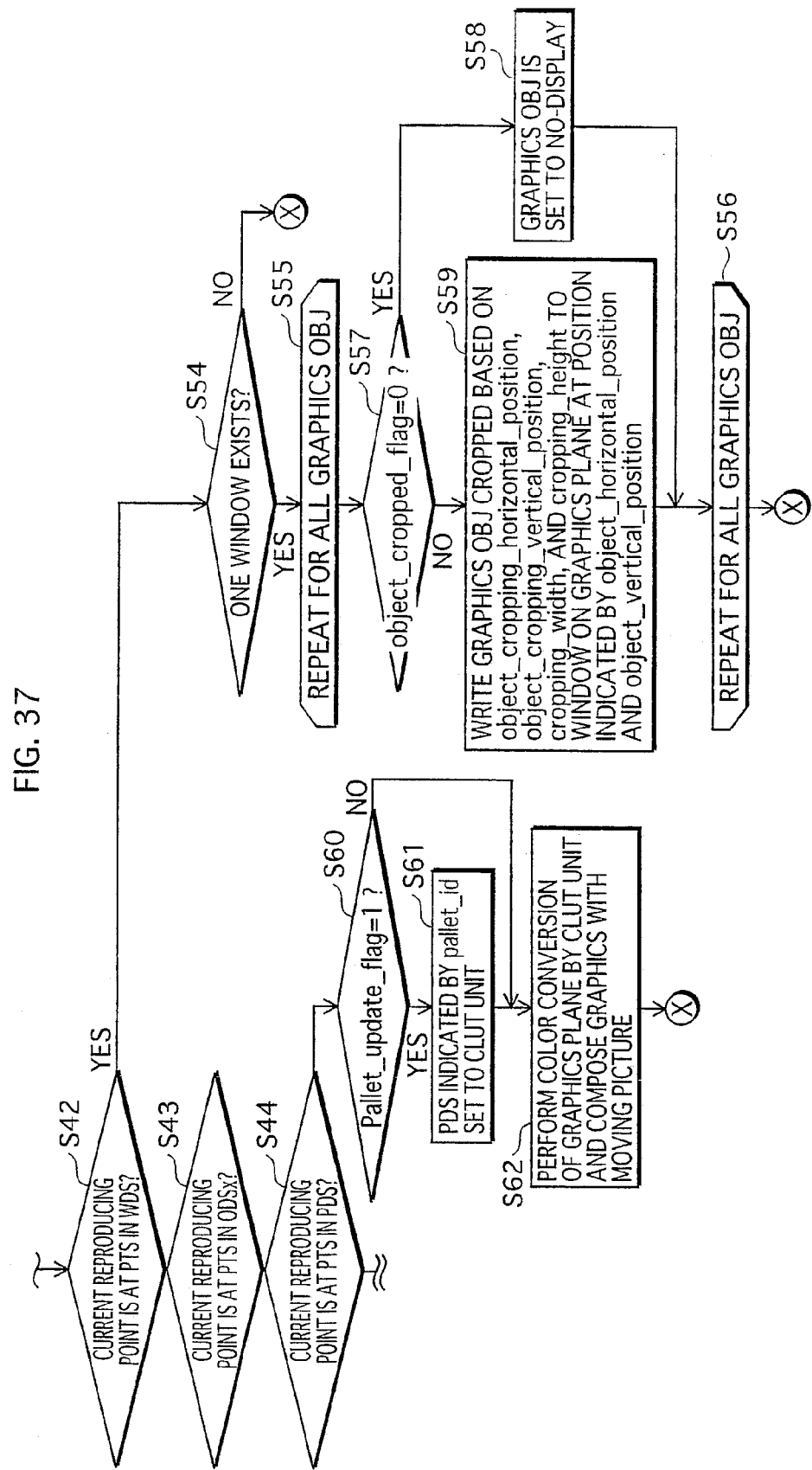
FIG. 37 is a flowchart showing a process performed by the Graphics Controller 17.

Next, operations by the Graphics controller 17 are explained. FIGS. 35-37 illustrate a flowchart showing the operations performed by the Graphics controller 17.

Steps S41-S44 are steps for a main routine of the flowchart and waits for any of events prescribed in Steps S41-S44 occurs.

Step S41 is to judge if a current reproducing time is a time indicated by the DTS of the PCS, and if the judging is Yes, then an operation in Steps S45-S53 is performed.

Step S45 is to judge if the composition_state of the OCS is the epoch_start, and if judged to be the epoch_start, the Graphics Plane 8 is all cleared in Step S46. If judged to be other than the epoch_start, the Window indicated by the window_horizontal_position, window_vertical_position, window_width, and window_height of the WDS is cleared.

Step S48 is a step performed after the clearing performed in Step S46 or in Step S47, and to judge if the time indicated by the PTS of any ODSx has passed. The decoding of any ODSx could be already completed by the time the clearing ends, because the clearing of an entire Graphics Plane 8 takes time. Therefore, in Steps S48, it is judged if the decoding of any ODSx is already completed by the time the clearing ends. If the judging is No, the operation returns to the main routine. If the time indicated by the PTS of any ODSx has already passed, an operation in Steps S49-S51 is performed. In Step S49, it is judged if object_crop_flag is 0, and if the flag indicates 0, then the Graphics Object is set to "no display" (Step S50).

If the flag is not 0 in Step S49, then an object cropped based on object_cropping_horizontal_position, object_cropping_vertical_position, cropping_width, and cropping_height is written to the Window in the Graphics Plane 8 at the position indicated by object_cropping_horizontal_position and object_cropping_vertical_position (Step S51). By the above operation, one or more Graphics Objects are rendered in the Window.

In Step 52, it is judged if the time corresponding to a PTS of another ODSy has passed. When writing the ODSx to the Graphics Plane 8, if the decoding of the ODSy has already been completed, then the ODSy becomes ODSx (Step S53), and the operation moves to Step S49. By this, the operation from Steps S49-S51 is also performed to another ODS.

Next, by referring to FIG. 36, Step S42 and Steps S54-S59 are explained below.

In Step 42, it is judged if the current reproducing point is at the PTS of the WDS. If the judging is that the current reproducing point is at the PTS of the WDS, then it is judged if the number of the Window is one or not in Step S54. If the judging is two, the operation returns to the main routine. If the judging is one, a loop processing of Steps S55-S59 is performed. In the loop processing, operations in Steps S55-S59 are performed to each of the two Graphics Object displayed in the Window. In Step S57, it is judged if object_crop_flag indicates 0. If it indicates 0, then the Graphics is not displayed (Step S58).

If it does not indicate 0, then a cropped object based on object_cropping_horizontal_position, object_cropping_vertical_position, cropping_width and cropping_height is written to the Window in the Graphics Plane 8 at the position indicated by object_cropping_horizontal_position and object_cropping_vertical_position (Step S59). By repeating the above operations, more than one Graphics Object is rendered in the Window.

In Step S44, it is judged if the current reproducing point is at the PTS of the PDS. If the judging is that the current reproducing point is at the PTS of the PDS, then it is judged if pallet_update_flag is one or not in Step S60. If the judging is one, the PDS indicated by pallet_id is set in the CLUT unit (Step S61). If the judging is 0, then Step S61 is skipped.

After that, the CLUT unit performs the color conversion of the Graphics Object on the Graphics Plane 8 to be combined with the moving picture (Step S62).

Next, by referring to FIG. 37, Step S43 and Steps S64-S66 are explained below.

In Step 43, it is judged if the current reproducing point is at the PTS of the ODS. If the judging is that the current reproducing point is at the PTS of the ODS, then it is judged if the number of the Window is two or not in Step S63. If the judging is one, the operation returns to the main routine. If the judging is two, operations in Steps S64-S66 are performed. In Step S64, it is judged if object_crop_flag indicates 0. If it indicates 0, then the Graphics is not displayed (Step S65).

If it doesn't indicate 0 then a cropped object based on object_cropping_horizontal_position, object_cropping_vertical_position, cropping_width, and cropping_height is written to the Window in the Graphics Plane 8 at the position indicated by object_cropping_horizontal_position and object_cropping_vertical_position (Step S66). By repeating the above operations, the Graphics Object is rendered in each Window.

The above explanations are about the DTS and PTS of the PCS, and the DTS and PTS of the ODS that belong to DSn. The DTS and PTS of the PDS, and the DTS and PTS of the END are not explained. First, the DTS and PTS of the PD that belongs to the DSn are explained.

As for the PDS that belongs to the DSn, it is sufficient if the PDS is available in the CLUT unit 9 by the PCS is loaded to the Composition Buffer 16 (DTS(DSn[PCS])) after decoding start point of a first ODS (DTS(DSn[ODS1])). Accordingly, a value of PTS of each PDS(PDS1-PDSlast) in the DSn is required to be set so as to satisfy the following relations.

$DTS(DSn[PCS]) \leq PTS(DSn[PDS1])$ $PTS(DSn[PDSj]) \leq PTS(DSn[PDSj1]) \leq PTS(DSn[PDSlast])$ $PTS(DSn[PDSlast]) \leq DTS(DSn[ODS1])$ Note that the DTS of the PDS is not referred to during the reproducing, the DTS of the ODS is set to the same value as the PTS of the PDS in order to satisfy the MPEG2 standard.

Figure 38:
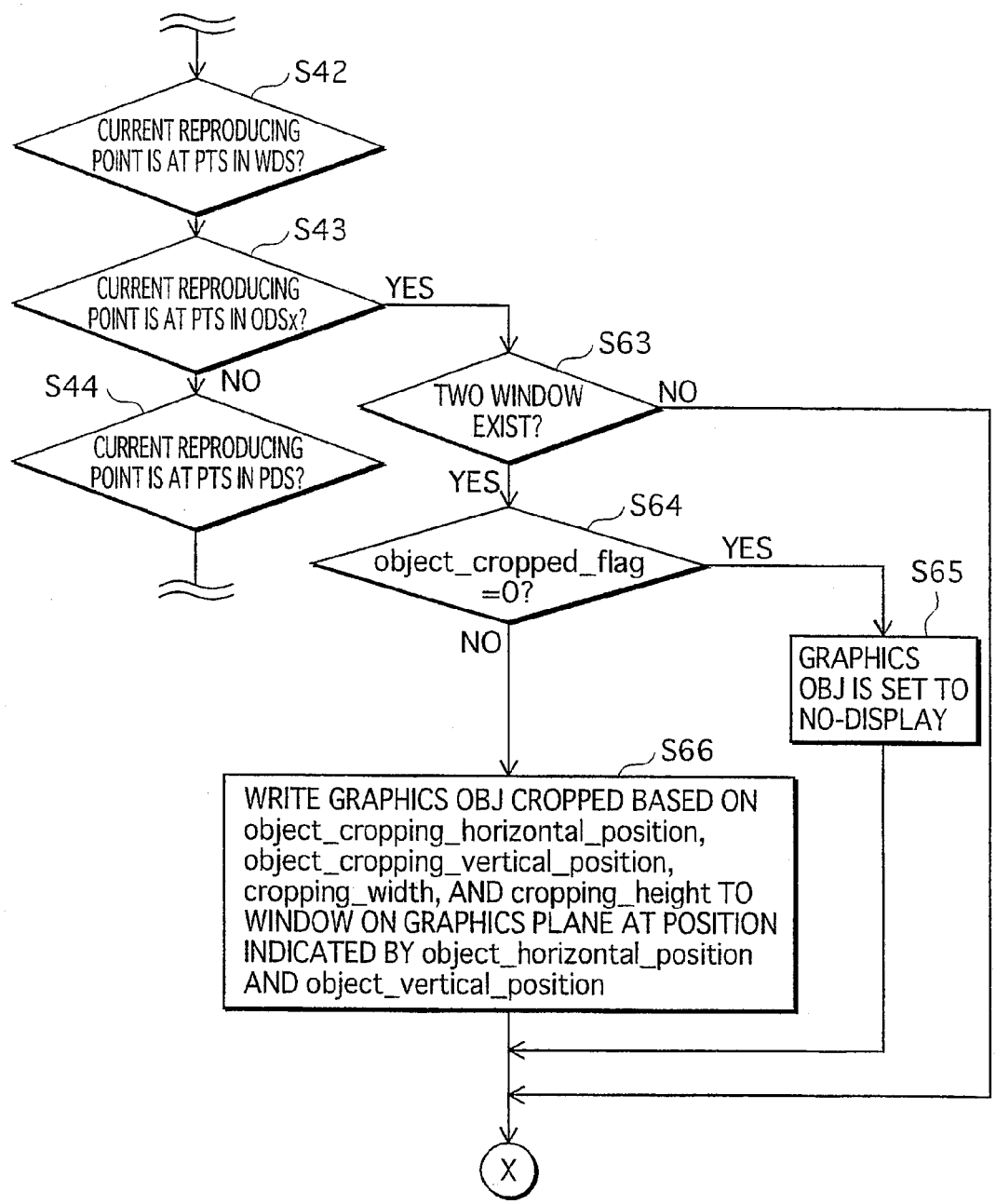
FIG. 38 a flowchart showing a process performed by the Graphics Controller 17.

Following is an explanation about roles of the DTS and PTS in the pipeline processing of the reproduction apparatus when the DTS and PDS are set so as to satisfy the above relations. FIG. 38 illustrates the pipeline of the reproduction apparatus based on the PTS of the PDS. FIG. 38 is based on FIG. 26. A first row in FIG. 38 indicates setting the ODS in the CLUT unit 9. Under the first row are the same as first to fifth rows in FIG. 26. The setting of PDS1-last in the CLUT unit 9 is performed simultaneously with the start of the ODS1 decoding (arrows up2, up3). (The setting of the PDS1-PDSlast to the CLUT unit 9 is performed after the transferring the PCS and WDS and before the decoding of the ODS1, and accordingly the setting of the PDS1-PDSlast to the CLUT unit 9 is set before a point indicated by the DTS of the ODS1 as shown by arrows up2 and up3.)

As described above, the setting of the PDS is performed in prior to the decoding of the ODS.

Next, a setting of the PTS of END of Display Set segment in the DSn is explained.

The END that belongs to the DSn indicates the end of the DSn, and accordingly it is necessary that the PTS of the END indicates the decode ending time of the ODS2. The decode ending time is indicated by the PTS(PTS(DSn[ODSlast])) of the ODS2(ODSlast), and therefore the PTS of the END is required to be set at a value that satisfies an equation below.

$PTS(DSn[END]) = PTS(DSn[ODSlast])$

In terms of a relation between the DSn and the PCS that belongs to the DSn+1, the PCS in the DSn is loaded to the Composition Buffer 16 before a loading time of the first ODS (ODS1), and therefore the PTS of the END should be after a loading time of the PCS in the DSn and before a loading time of the PCS that belongs to the DSn+1. Accordingly, the PTS of the END is required to satisfy a relation below.

$DTS(DSn[PCS]) \leq PTS(DSn[END]) \leq DTS(DSn+1[PCS])$

On the other hand, the loading time of the first ODS (ODS1) is before a loading time of a last PDS (PDSlast), and therefore the PTS of the END (PTS(DSn[END])) should be after a loading time of the PDS that belongs to the DSn (PTS(DSn[PDSlast])). Accordingly, the PTS of the END is required to satisfy a relation below.

$PTS(DSn[PDSlast]) \leq PTS(DSn[END])$

Figure 39:
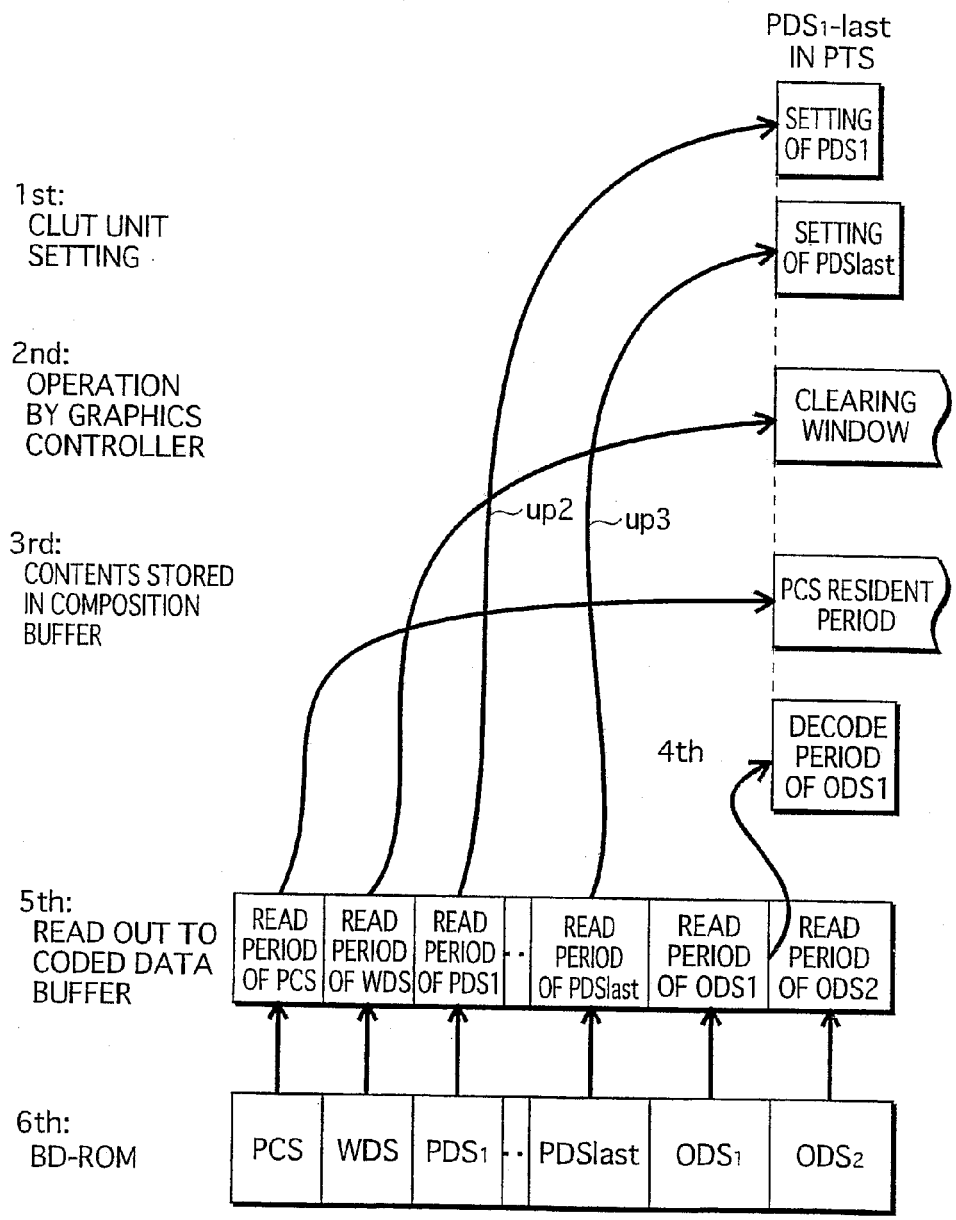
FIG. 39 illustrates a pipeline process of the reproduction apparatus based on the PTS of the PDS.
Figure 40:
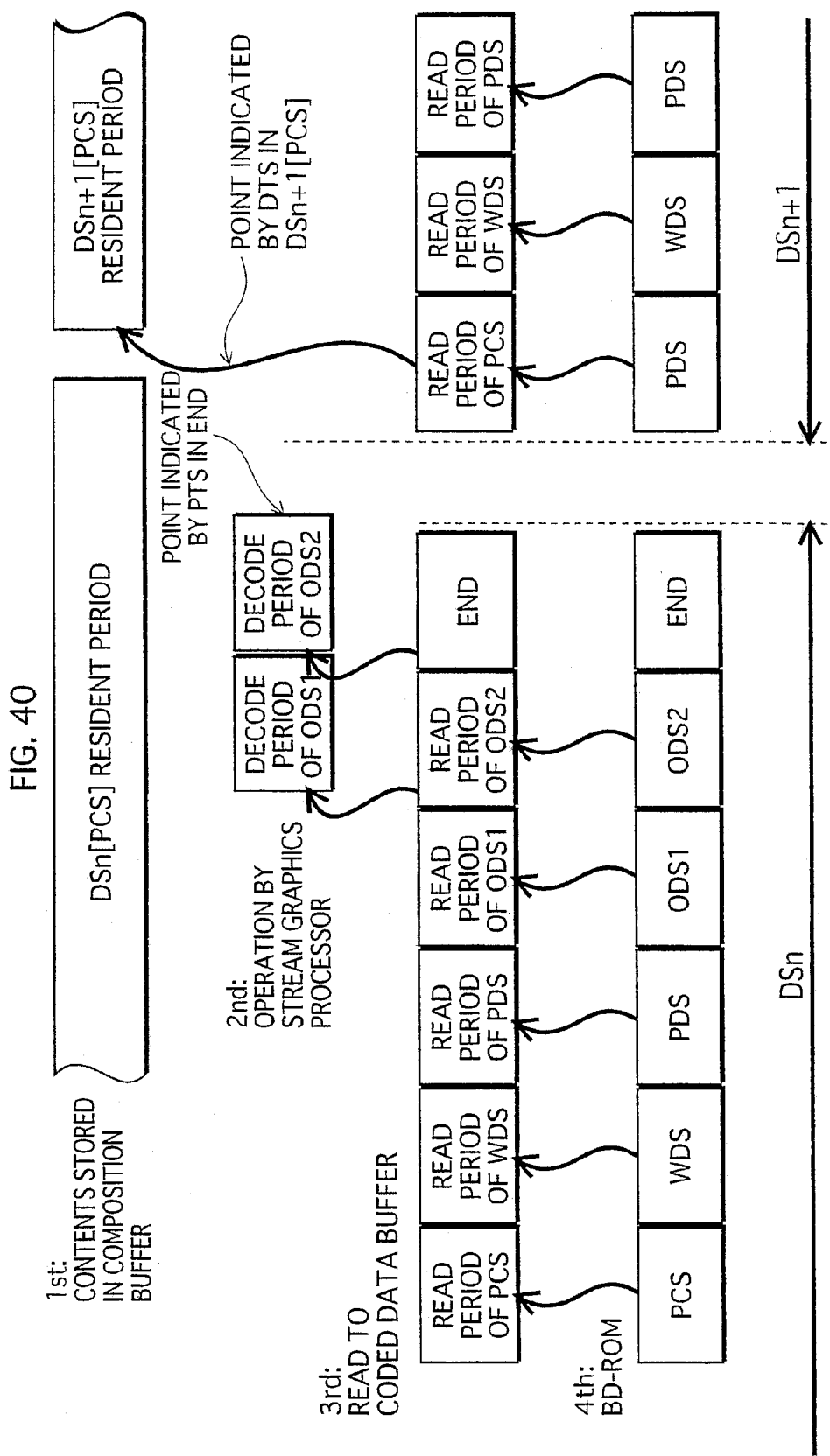
FIG. 40 is a diagram describes a significance of the END in the pipeline process of the reproduction apparatus.

Following is an explanation about significance of the PTS of the END in the pipeline processing of the reproduction apparatus. FIG. 39 is a diagram describes the significance of the END in the pipeline process of the reproduction apparatus. FIG. 39 is based on FIG. 28, and each row in FIG. 39 is substantially the same as FIG. 28 other than that a first row in FIG. 39 indicates the content of the Composition Buffer 16. Further, in FIG. 39, 2 Display Sets, DSn and DSn+1 are illustrated. The ODSlast in the DSn is the last ODSn of A-ODSs, and accordingly, the point indicated by the PTS of the END is before the DTS of the PCS in the DSn+1.

By the PTS of the END, it is possible to find when the loading of the ODS in the DSn is completed during reproduction.

Note that although the DTS of the END is not referred to during reproduction, the DTS of the END is set to the same value as the PTS of the END in order to satisfy the MPEG2 standard.

As described in the above, a part of the Graphics Plane is specified as the Window for displaying the Graphics according to the present embodiment, and therefore the reproduction apparatus does not have to render the Graphics for an entire Plane. The reproduction apparatus may render the Graphics for only a predetermined size of Window, 25% to 33% of the Graphics Plane, for example. Because the rendering of the Graphics other than the Graphics in the Window is not necessary, the load for software in the reproduction apparatus decreases.

Even in a worst case in which the updating of the Graphics is performed ¼ of the Graphics Plane, for example, it is possible to display the Graphics synchronously with the picture by the reproduction apparatus performing the write to the Graphics Plane at a predetermined transfer rate such as 256 Mbps, and by setting the size of the Window so as to ensure the sync display with the picture.

Thus, it is possible to realize a high resolution subtitle display for various reproduction apparatuses, because the sync display is easily ensured.

(Second Embodiment)

The First Embodiment explained above is for graphics dedicated for subtitle display. On the contrary, a Second Embodiment is on graphics for interactive display.

Among the embodiments of a recording medium according to the present invention, an example of use of the recording medium is explained as follows. Just as in the First Embodiment, the recording medium of the Second Embodiment can also be manufactured by an improvement in an application layer of a BD-ROM. FIG. 41 is a diagram schematically illustrating a structure of the AVClip of the second embodiment.

The AVClip (shown in the middle) is structured in a following manner. The video stream made of plural video frames (picture pj1, pj2, and pj3), and the audio stream made of plural audio frames (top row of the drawing) are respectively converted into a line of PES packets (second row of the drawing), and then into a line of TS packets (third row of the drawing). The interactive graphics stream (bottom row of the drawing) is converted into a line of PES packets (second to bottom row of the drawing), and then into a line of TS packets (third to bottom row of the drawing). The three lines of TS packets are multiplexed, and thus the AVClip is constituted.

Next, the interactive graphics stream is explained. The interactive graphics stream has an Interactive Composition Segment (ICS) instead of PCS, and does not have WDS. The interactive graphics stream is similar to the presentation graphics stream, in that it has functional segments named a Palette Definition Segment (PDS), an Object Definition Segment (ODS), and an END of Display Set Segment (END).

Figure 42A:
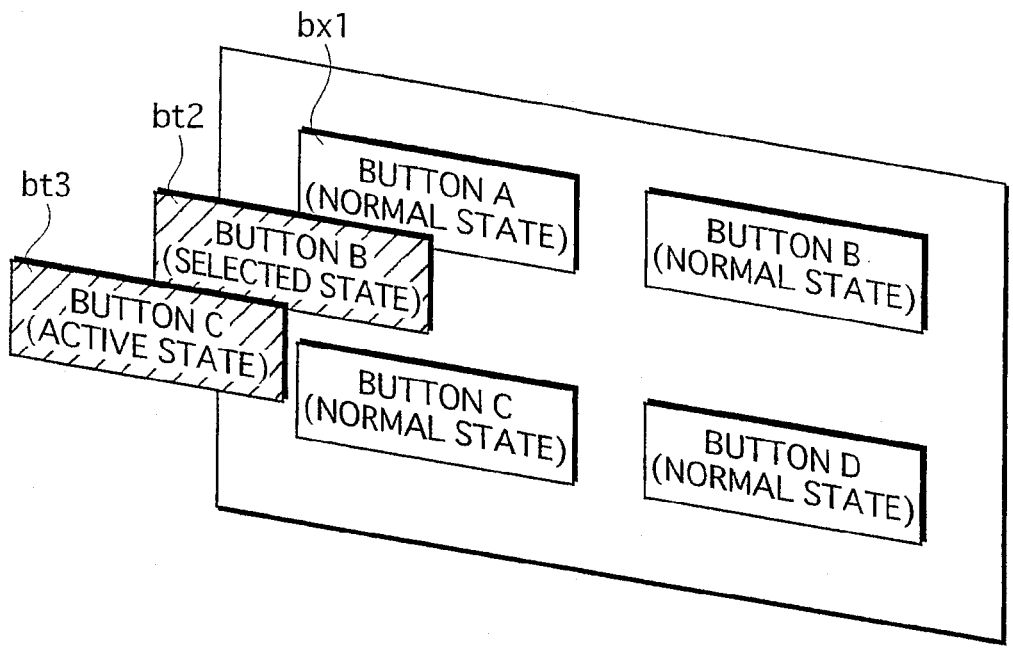
FIG. 42A and FIG. 42B are diagrams about an interactive screen according to the second embodiment.

Disposition of GUI parts on a screen generates an interactive screen that is defined by the functional segments. FIG. 42A is a diagram illustrating such an interactive screen realized by the interactive graphics stream. This interactive screen includes four GUI parts called buttons A-buttons D. Interactivity by means of interactive graphics stream means changing the state of these GUI parts (i.e. buttons) according to user operations. The state of the GUI parts (buttons) includes "normal state bt1", "selected state bt2", and "active state bt3", which are shown in FIG. 42A. The normal state is a state in which mere display is provided. As opposed to this, the selected state is a state in which a focus is given according to a user operation, but confirmation has not been received. The active state is a state in which confirmation is received. The button state can be changed by push directed to the keys of the remote controller 400, which is shown in the First Embodiment.

Figure 42B:
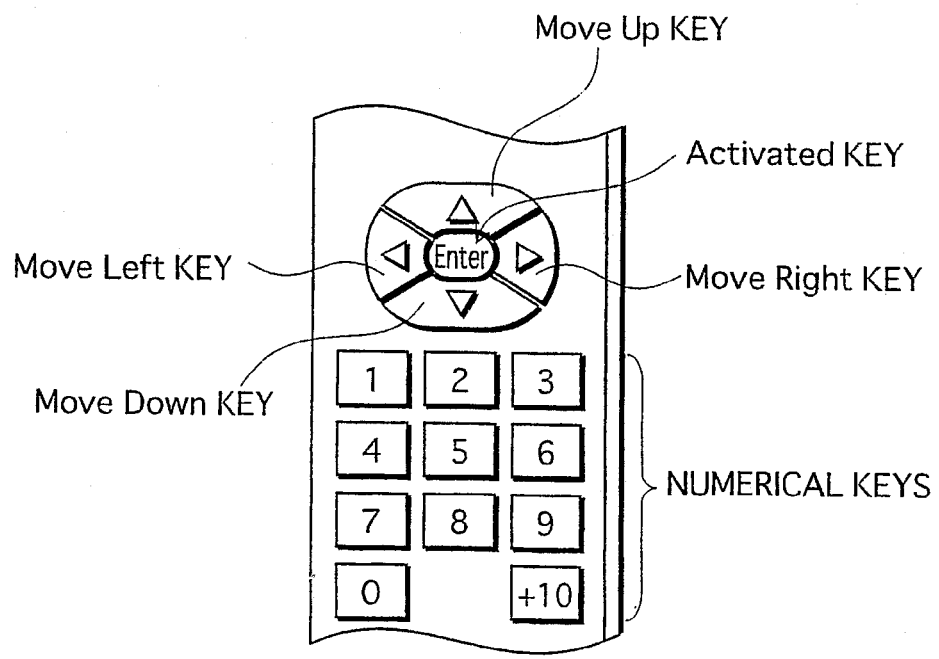

FIG. 42B is a diagram illustrating the keys of the remote controller 400, through which a user operation directed to the interactive screen is received. As shown in this drawing, the remote controller 400 is provided with MoveUp key, MoveDown key, MoveRight key, and MoveLeft key.

The MoveUp key is for, when a button in the interactive screen is in a selected state, setting a button above this selected button, to be in a selected state. The MoveDown key is for setting a button below this selected button to be in a selected state. The MoveRight key is for setting a key on the right of the selected key to be in a selected state, and the MoveLeft key is for setting a key on the left of the selected key to be in a selected state.

The Activated key is for setting the selected button to be in an active state (i.e. to activate. Numerical keys "0"-"9" are for setting a button to which a corresponding number is assigned, to be in a selected state. "+10" key is for receiving an operation to add 10 to the already inputted numerical values. It should be noted here that "0" key and "+10" key are both for receiving input of numerical value of no smaller than 10 digits. Therefore any one of them is enough for the remote controller 400.

Each state (i.e. normal state, selected state, and active state) is made of plural graphics in decompressed state. Each decompressed graphics, which is for representing each state of the buttons, is named "Graphics Object". The reason why one state of a button is represented by plural decompressed graphics is to take it into consideration to perform animation display for every state of each button.

Next, the improvements directed to the definition segments (ODS, PDS) in the present embodiment are explained. ODS and PDS have the same data structure as those of the First Embodiment. Only difference lies in the "object_ID" concerning ODS. ODS in the Second Embodiment constructs animation using plural Graphics Objects defined by plural ODSs. In constructing animation, an object_ID is added to a series of ODS, where the object_ID is a serial number.

Figure 43:
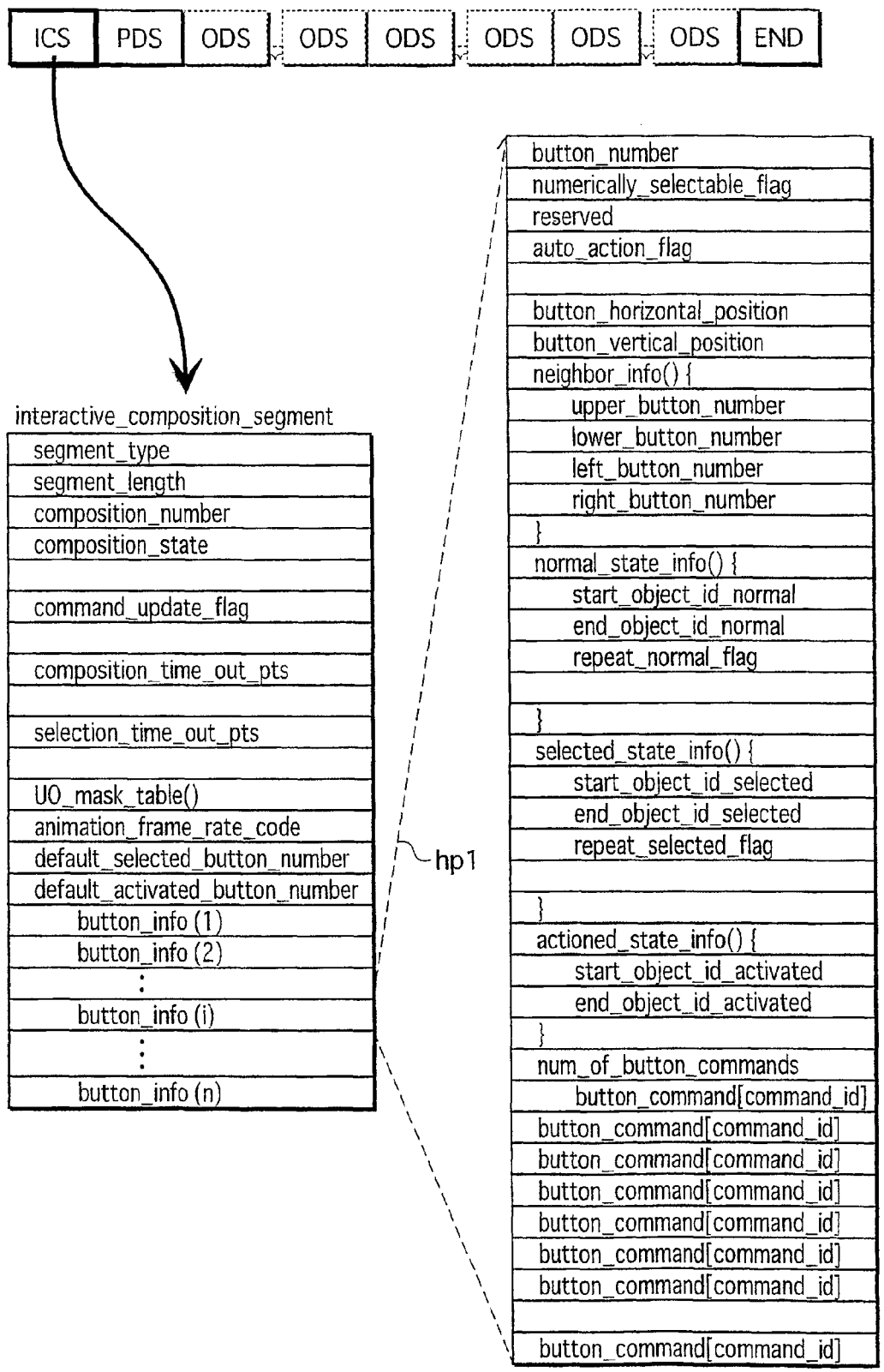
FIG. 43 illustrates a data structure of Interactive Composition Segment.

Next, ICS is explained. An Interactive Composition Segment is a functional segment constituting an interactive screen. The Interactive Composition Segment has the data structure shown in FIG. 43. As shown in this drawing, ICS is composed of: segment_type; segment_length; composition_number; composition_state;command_update_flag;composition_time_out_pts;selection_time_out_pts;UO_mask_table;animation_frame_rate_code;default_selected_button_number;default_activated_button_number; and button information sets (button info(1)(2)(3) . . . ).

"composition_number" represents numerical values from 0 to 15, which indicate performing of update.

"composition_state" represents the DS starting with the present ICS is Normal Case, Acquisition Point, or Epoch Start.

"command_update_flag" represents whether the button command within the present ICS has changed from the former ICS. For example, if the DS that a certain ICS belongs is Acquisition Point, this ICS will have the same content as an ICS which is just before this ICS, in principle. However, if "command_update_flag" is set to be on, a button command different from the ICS just before can be set as ICS. This flag is set to be valid when command is desired to be changed while applying Graphics Object.

"composition_time_out_pts" describes an end time of the interactive screen. At the end time, the interactive screen display is no longer valid, and so is not performed. It is desirable that composition_time_out_pts is described at a time accuracy of the reproduction timeline for the moving picture data.

"selection_time_out_pts" describes an end time of a valid button selection period. During the selection_time_out_pts, the button specified by default_activated_button_number gets activated. The period of selection_time_out_pts is equal to, or shorter than the period of composition_time_out_pts. Selection_time_out_pts is described at a time accuracy of the video frame.

"UO_mask_table" represents permission/prohibition of user operation for Display Set that corresponds to the ICS. If this mask field is set as prohibition, use operation directed to the reproduction apparatus will be invalid.

"animation_frame_rate_code" describes a frame rate to be applied to the animation-type button. An animation frame rate is obtained by dividing the video frame rate by a value in this field. If the value in this field is "00", only the ODS specified by start_object_id_xxx is displayed, and not animation, the ODS being among the ODSs defining Graphics Objects for the buttons.

"default_selected_button_number" indicates a button number that should be set in a selected state as a default, when an interactive screen display has started. If this field is "0", a button having the button number stored in the register of the reproduction apparatus will be automatically set to be in an active state. If this field is not "0", it means that this field indicates a valid value of button.

"default_activated_button_number" represents a button to be automatically set in an active state, when the user did not set any button to be in an active state prior to the time defined by selection_time_out_pts. If default_activated_button_number is "FF", the button currently in a selected state, at the time defined by selection_time_out_pts, will be automatically selected. If this default_activated_button_number is "00", the automatic selection will not be performed. If it is other than "00" and "FF", this field will be interpreted as indicating a valid button number.

Button information (button_info) defines each button composed at the interactive screen. A leader line in this drawing focuses the internal structure of button information i, which is about the ith button that the ICS controls. The following explains the information elements constituting the button information i.

"button_number" is a value uniquely identifying the button i, at the ICS.

"numerically_selectable_flag" indicates whether to permit the numerical value selection for the button i.

"auto_action_flag" indicates whether to automatically set the button i. If this auto_action_flag is set to be on (i.e. bit value of 1), the button i will be set in an active state, instead of in a selected state. Conversely, if the auto_action_flag is set to be off (i.e. bit value of 0), the button i will be set in a mere selected state, even if this button has been selected.

"object_horizontal_position" and "object_vertical_position" respectively indicate the horizontal position and the vertical position, of the upper-left pixel of the button i in the interactive screen.

"upper_button_number" indicates the number of a button to be set in a selected state instead of the button i, when the MoveUp key has been pushed at the time when the button i is in a selected state. If the number corresponding to the button i has been set in this field, the push directed to the MoveUp key will be ignored.

"lower_button_number", "left_button_number", and "right_button_number" indicate, when MoveDown key, MoveLeft key, and MoveRight key are respectively pushed during the button i being in a selected state, the number of a button to be in a selected state instead of the push of the button i. If the number corresponding to the button i has been set in this field, the push directed to these keys will be ignored.

"start_object_id_normal" is such a field that, when rendering the button i in a normal state by animation, the first number among the serial numbers that are assigned to the plurality of ODSs constituting the animation is described in this "start_object_id_normal".

"end_object_id_normal" is such a field that, when rendering the button i in a normal state by animation, the last number among the serial numbers (i.e. object_id) that are assigned to the plurality of ODSs constituting the animation is described in this end_object_id_normal. If the ID indicated in the end_object_id_normal is the same as the ID indicated in the start_object_id_normal, the still image corresponding to this ID in the Graphics Object will be the image for the button i.

"repeated_normal_flag" indicates whether to repeatedly continue the animation display of the button i that is in a normal state.

"start_object_id_selected" is such a field that, when rendering the button i in a selected state in animation, the first number among the serial numbers that are assigned to the plurality of ODSs constituting the animation is described in this "start_object_id_selected".

"end_object_id_selected" is such a field that, when rendering the button in a selected state by animation, the last number among the serial numbers that are assigned to the plurality of ODSs constituting the animation is described in this end_object_id_selected. If the ID indicated in the end_object_id_selected is the same as the ID indicated in the start_object_id_selected, the still image corresponding to this ID in the Graphics Object will be the image for the button i.

"repeat_selected_flag" indicates whether to repeatedly continue the animation display for the button i in the selected state. If start_object_id_selected and end_object_id_selected have the same value, this field will be set as 00.

"start_object_id_activated" is such a field that, when rendering the button i in the active state by animation, the first number among the serial numbers that are assigned to the plurality of ODSs constituting the animation is described in this start_object_id_activated.

"end_object_id_activated is such a field that, when rendering the button in the active state by animation, the last number among the serial numbers (i.e. object_id) that are assigned to the plurality of ODSs constituting the animation is described in this end_object_id_activated.

Next, the button command is explained.

A button command (button_command) is a command to be executed when the button i is set in active state.

Figure 44:
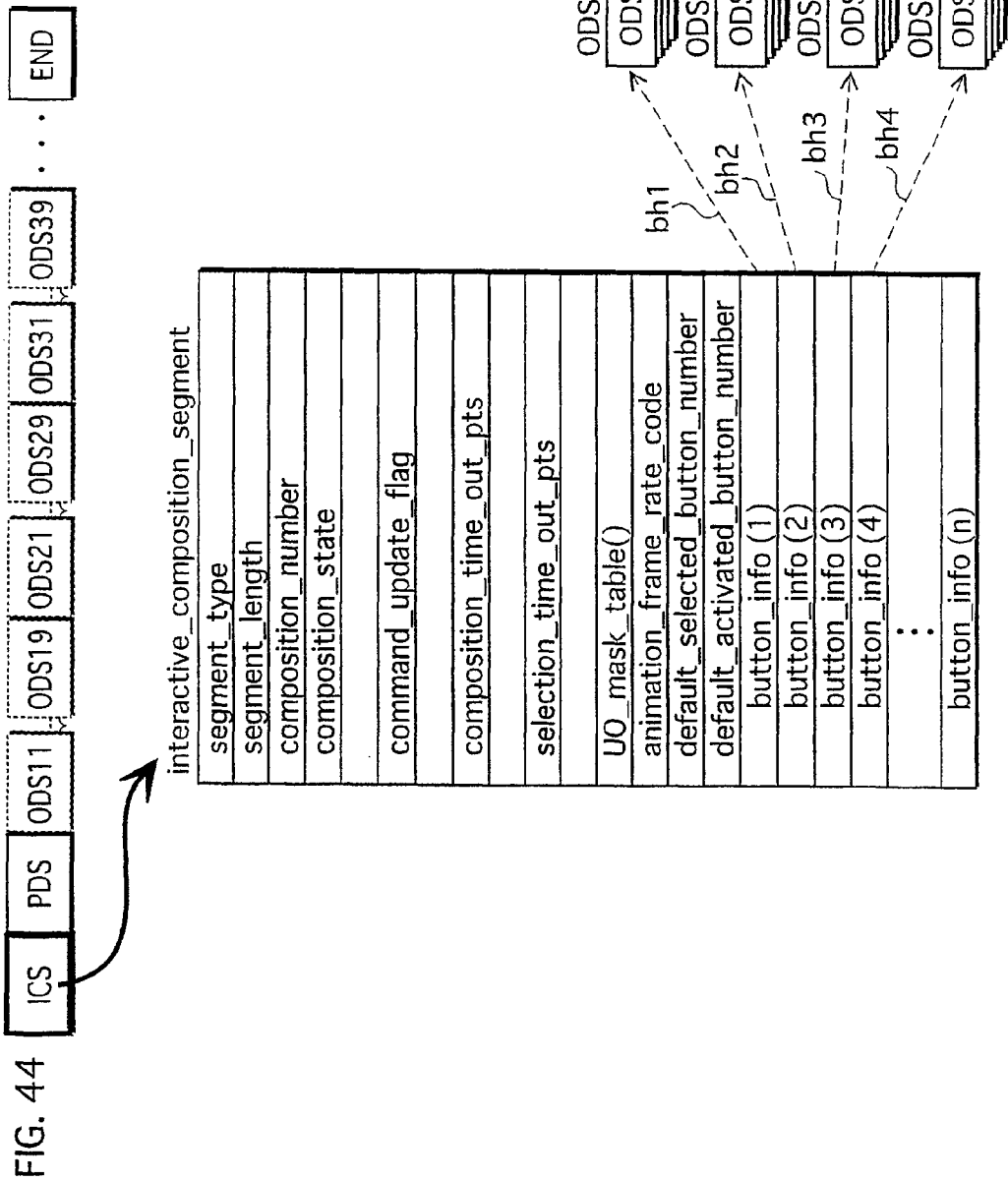
FIG. 44 shows a relationship between an ODS included in a DSn, and ICS.

As follows, an example of interactive control by means of ICS is explained. This example assumes ODS and ICS as illustrated in FIG. 44. FIG. 44 shows a relationship between the ODS included in the DSn and the ICS. This DSn is assumed to contain ODS11-19, 21-29, 31-39, and 41-49. Among these ODSs, ODS11-19 respectively illustrate states of the button A; ODS21-29 illustrate states of the button B; ODS31-39 states of button C; and ODS41-49 states of button D. (Please refer to the parenthesis "}"). Then it is assumed that the state controls for these button A-button D are described in the button_infos (1),(2),(3),(4), respectively.

The executing timing of control by means of ICS coincides with the display timing of arbitrary picture data pt1 in the moving picture of FIG. 45, this means that an interactive screen tm1 made up of the button A- the button D will be displayed by being composed (gs1) into this picture data pt1 (gs2). Since an interactive screen made of a plurality of buttons in accordance with the contents of the moving picture, it becomes possible to render very real images with use of buttons and by means of ICS.

Figure 46:
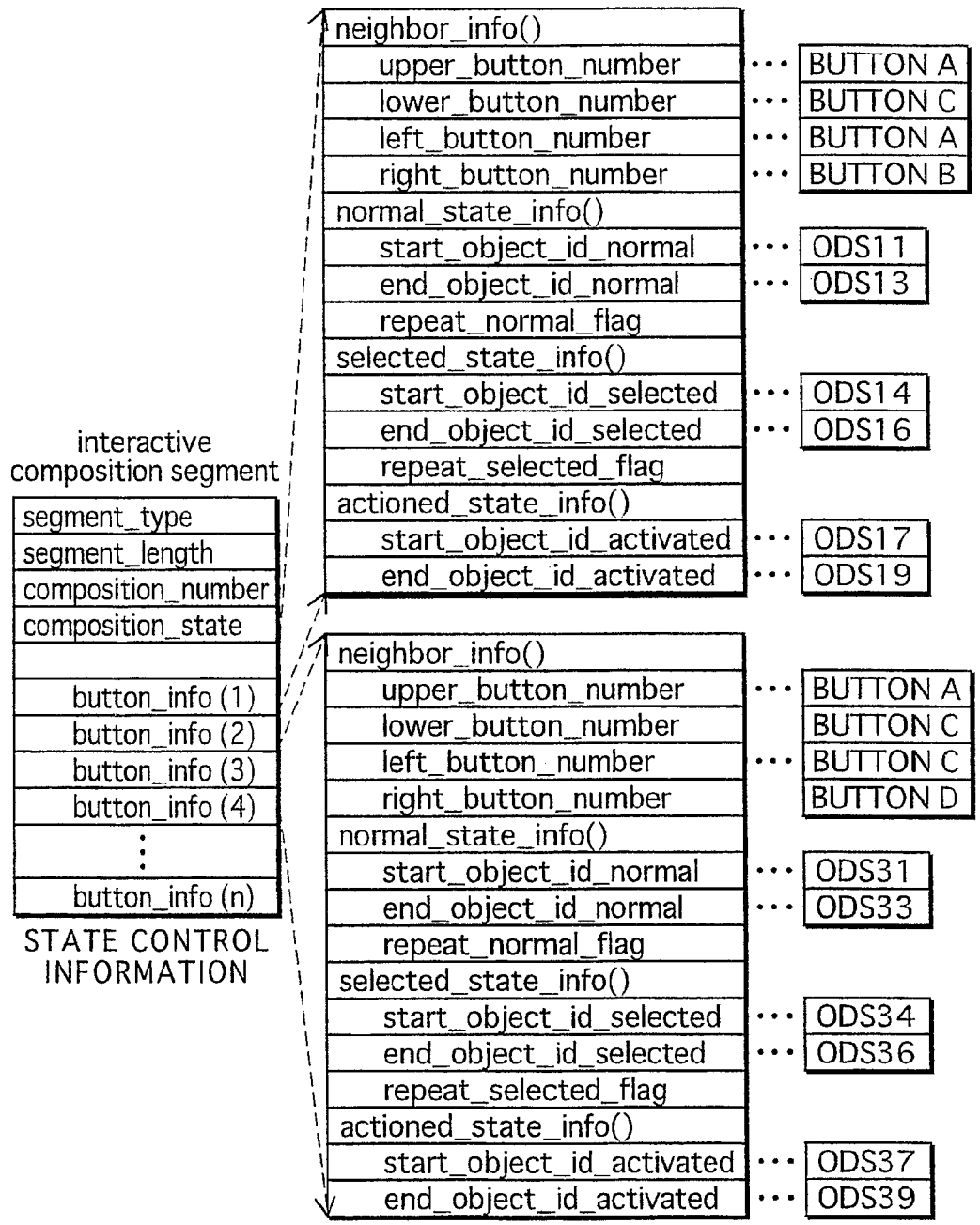
FIG. 46 shows an example of setting for button information in ICS.
Figure 47:
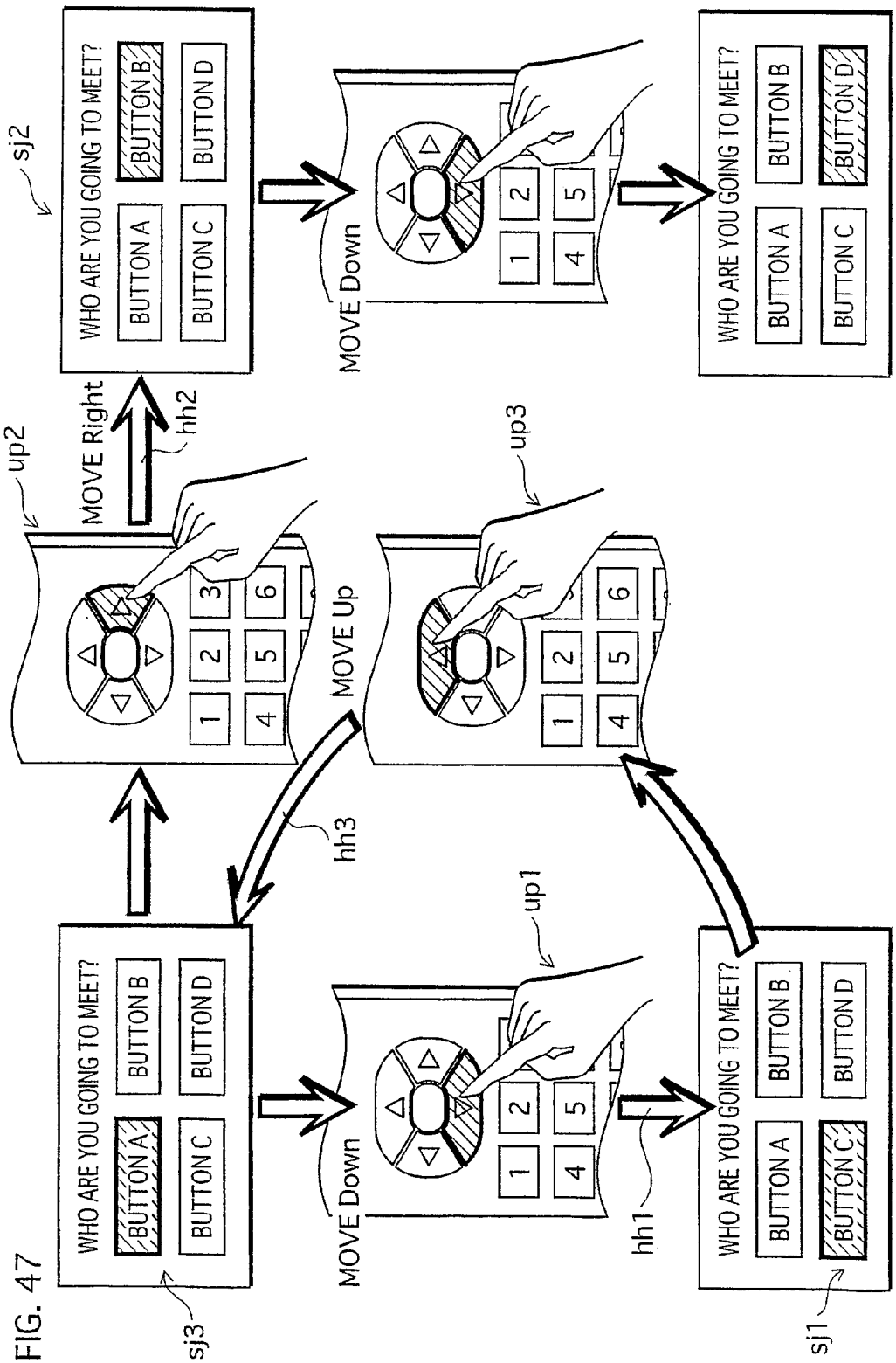
FIG. 47 illustrates a state transition of button A-button D.

FIG. 46 illustrates a description example of ICS, in a case where the state of the button A-the button D is changed as shown in FIG. 47. The arrows hh1 and hh2 in FIG. 47 symbolically represent the state change generated by neighbor_info( ) of button info(1). The neighbor_info( ) of button info(1) has lower_button_number to which the button C is set. Therefore if UO of MOVEDown key being pushed is generated while the button A is in a selected state (FIG. 47, up1), the button C will be in a selected state (FIG. 47, sj1). Since right_button_number in neighbor_info( ) of button info(1) is set as button B, if the UO of MOVERight key being pushed is generated while the button A is in a selected state (FIG. 47, up2), the button B will be in a selected state (FIG. 47, sj2).

The arrow hh3 in FIG. 47 shows control for state change of button info(3) due to neighbor_info( ). Since upper_button_number in neighbor_info of button info(3) is set as button A, if UO of MOVEUp key being pushed is generated while the button C is in a selected state, the button A will return to be in a selected state.

Next, the images for the button A-the button D are explained. Here, assumption is made that the ODS11, 21, 31, and 41 have images illustrated in FIG. 49, and the like. Since in ICS, normal_state_info( ) of button_info(1) has start_object_id_normal, end_object_id_normal that indicate ODS11-13, the normal state for the button A is represented as animation of ODS11-13. In addition, since the selected_state_info( ) of button_info(1) has start_object_id_selected, end_object_id_selected that indicate ODS14-16, the selected state of the button A is represented as ODS14-16. As a result of this button A being set to be in selected state by a user, the figure which is the image of the button A will change to that of ODS14-16, from that of ODS11-13. Here, if arrangement is made in which repeat_normal_flag, repeat_select_flag are set to 1, in the normal_state_info( ), selected_state_info( ) respectively, then the animation of ODS11-13 and the animation of ODS14-16 will be displayed repeatedly and continuously, as shown by "→(A)", "(A)→", "→(B)", and "(B)→" of the drawing.

If plural ODSs, which are able to render animation, are assigned to the button A-the button D, and corresponding controls are described in ICS, button state control can be realized more subtly and quickly (e.g. changing the expression of the character of the image as the user operation changes).

Next, the order of ODS in Display Set is explained. As aforementioned, ODS belonging to Display Set is indicated by ICS to represent one state of a button. The order of ODS in Display Set is determined, in accordance with the indication as to which state of a button it should represent.

More specifically, ODSs in Display Set are grouped under which state they represent, (1) as representing normal state, (2) as representing selected state, (3) as representing active state, and so on. Each of such groups, which represents one state of a button, is called "button-state group". Then, these button-state groups are arranged in the order such as "normal state→selected state→active state". Defining the order of ODS will accordingly define the order of the ODS in the Display Set.

Figure 50:
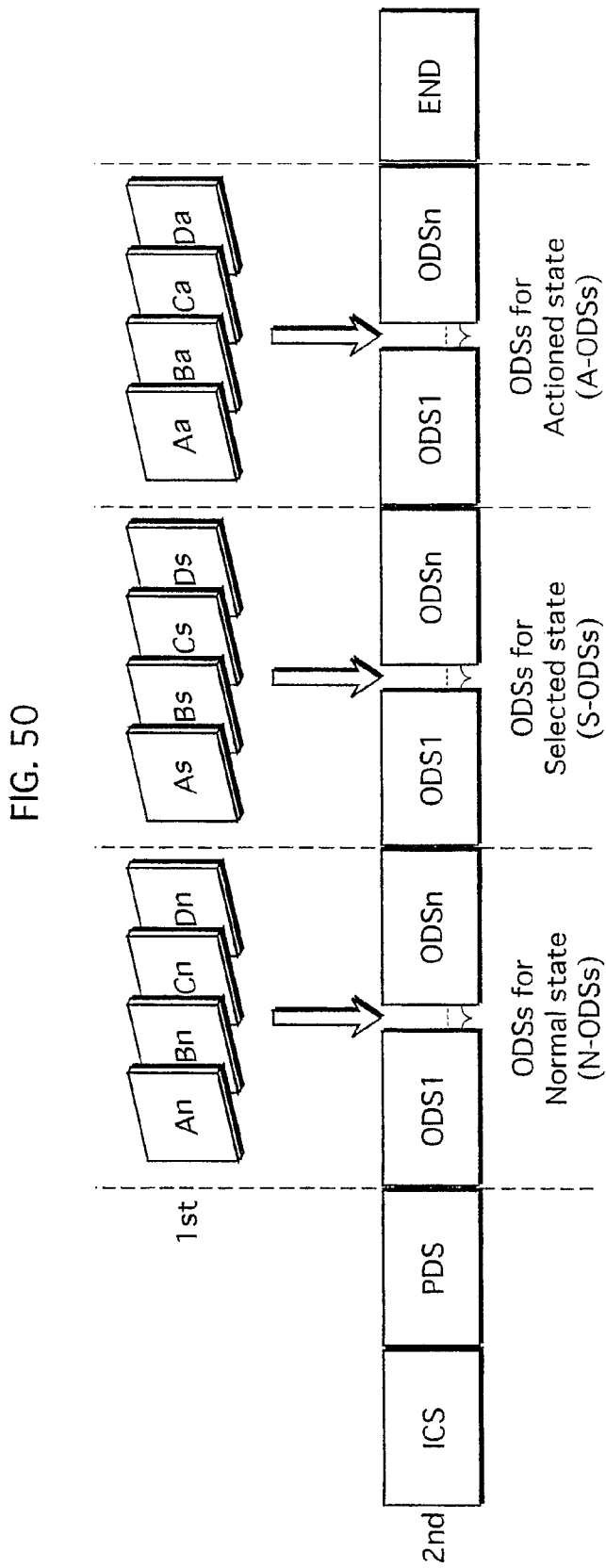
FIG. 50 illustrates the button-state groups and the order of ODS in Display Set.

FIG. 50 illustrates the order of ODS belonging to Display Set. In the second row of this diagram, three button-state groups of the Display Set are shown. This drawing shows three sets of ODS: an ODS set that renders normal state (ODS for Normal state); an ODS set that renders selected state (ODS for Selected state); and an ODS set that renders active state (ODS for Actioned state). These button-state groups are arranged in the order of "normal state→selected state→active state". The purpose of this order is to read the components that constitute the initial display of the interactive screen, ahead of reading of the other components that constitute the screen display after update.

The first row of FIG. 50 shows the Graphics Objects "An, Bn,Cn,Dn,As,Bs,Cs,Ds,Aa,Ba,Ca,Da". The subscript "n" assigned to An,Bn,Cn,Dn represents normal state of a corresponding button. In the same manner, the subscript "s" of As,Bs,Cs,Ds represents selected state of a corresponding button, and the subscript "a" represents active state of a corresponding button. The second row of FIG. 50 shows button-state groups to which the Graphics Objects of the first row belong. It should be noted, in this drawing, every set of ODS1-ODSn is assigned the same number, such as 1 and n. However, the sets are different from one another, and belong to N-ODSs, S-ODSs, and A-ODSs, respectively. This also applies to every similar drawing hereinafter.

Figure 51:
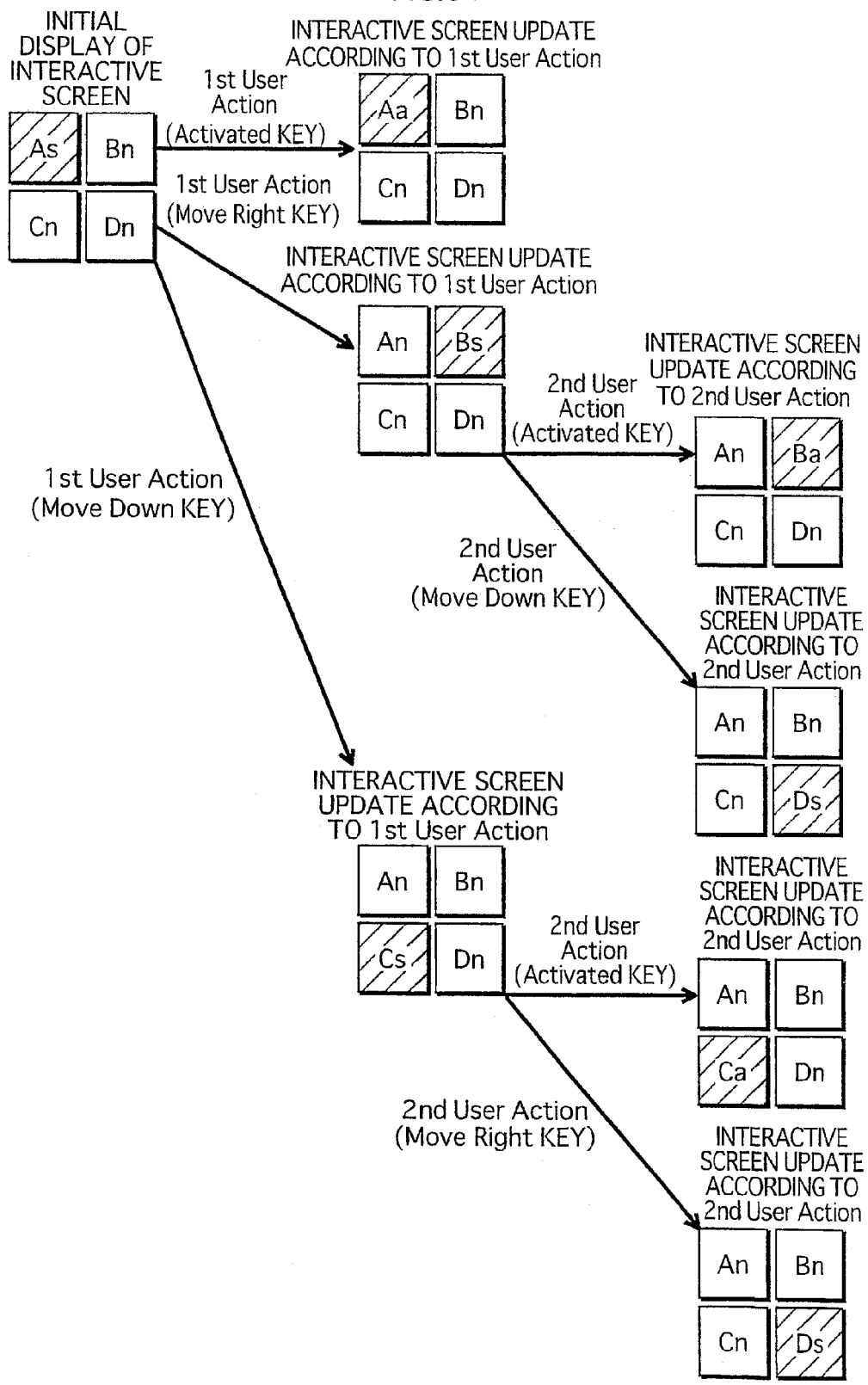
FIG. 51 illustrates a state transition of an interactive screen in which the button-state groups of FIG. 50 are disposed.

FIG. 51 illustrates state transition of an interactive screen in which the button-state groups of FIG. 50 are disposed.

The interactive screen of this drawing has plural states that are "initial display", "update display according to $1^{st}$ user action", and "update display according to $2^{nd}$ user action". The arrows in this drawing represent user actions that trigger the corresponding state change. According to this drawing, the four buttons A, B, C, and D have "normal state", "selected state", "active state", respectively. It can be understood that, so as to perform initial display, the Graphics Object for rendering three normal states and the Graphics Object for rendering one selected state are necessary.

Even in a case where the default selected button is not defined and which button to be set in selected state will change dynamically, initial display will be realized once the decoding for the Graphics Objects representing the normal state and the selected state, for each button, are complete. Taking this into consideration, the present embodiment disposes the button-state groups each corresponding to a different one of the states in the order of "normal state→selected state→active state", as shown in the second row of FIG. 50. Such disposition realizes initial display even when the reading and decoding of ODSs constituting the active state are incomplete, and helps shorten the period starting with reading start of Display Set and ending with completion of initial display.

Figure 48:
FIG. 48 illustrates images of ODS11, 21, 31, and 41, as one example.
Figure 49:
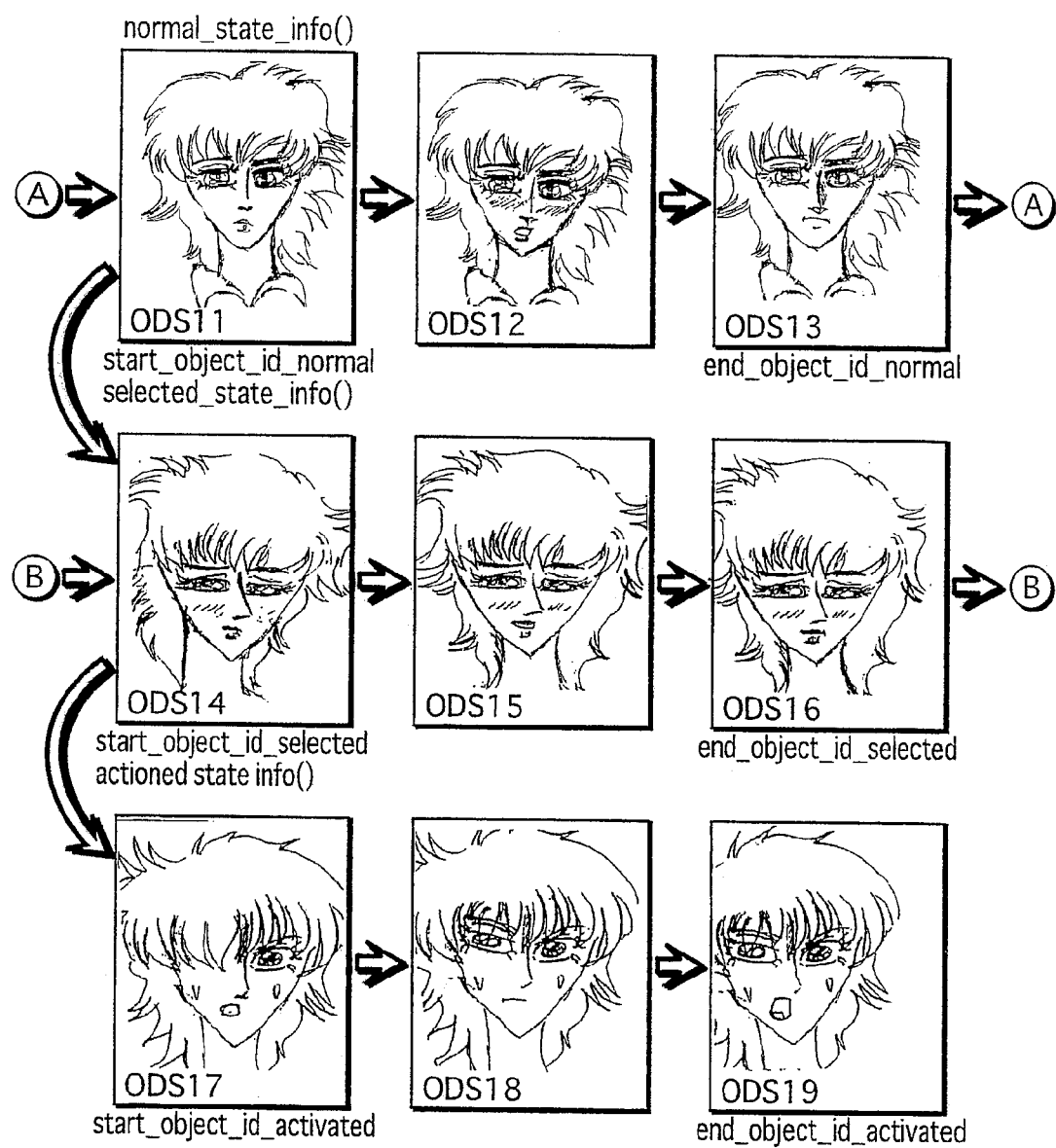
FIG. 49 illustrates images of ODS11-19 for the button A, as one example.
Figure 52:
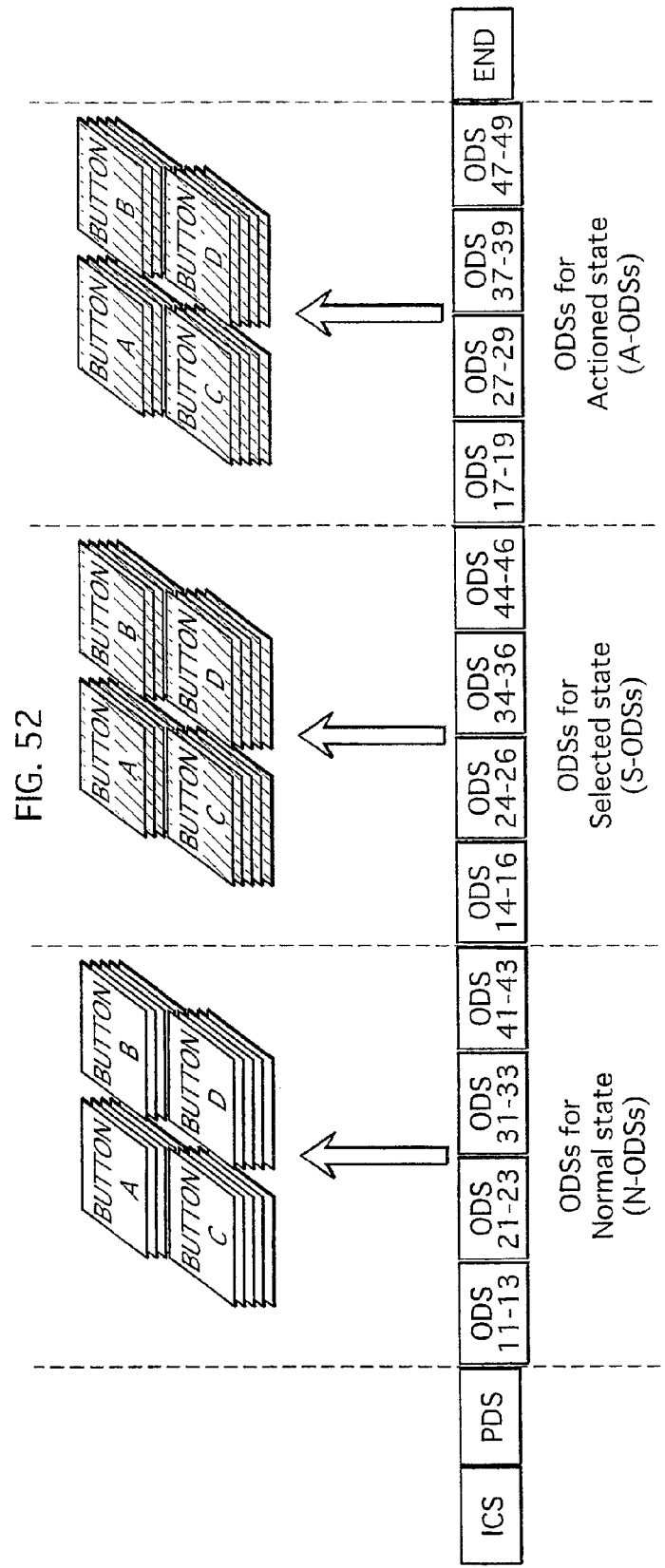
FIG. 52 illustrates the order of ODS in Display Set.

Next, the following explains in which order the ODSs illustrated in FIGS. 48 and 49 are disposed. FIG. 52 illustrates the order of ODS in Display Set. In this drawing, ODSs for Normal state are constituted by ODS11-13, ODS21-23, ODS31-33, and ODS41-43. The ODSs for Selected state are constituted by ODS14-16, ODS24-26, ODS34-36, and ODS44-46, and the ODSs for Actioned state are constituted by ODS17-19, ODS27-29, ODS37-39, and ODS47-49. ODS11-13 are for rendering the change in expression of the character that is shown in FIG. 49. The same thing applies to ODS21-23, ODS31-33, and ODS41-43. Therefore by disposing these ODSs in the top button-state group, it becomes possible to arrange the preparation of initial display even in the middle of reading out Display Set. According to this, the interactive screen that takes in animation can be performed without delay.

Next, the order of ODSs that are multiple-referred by a plurality of buttons is explained. Here, multiple-referring means that object_id of an ODS is indicated by two or more of normal_state_info, selected_state_info, and activated_state_info. By adopting such multiple-referring method, the selected state of a button can be rendered using the Graphics Object for rendering the normal state of a different button. This enables sharing of the image of the Graphics Object. Such sharing helps reduce the number of ODSs. In this case, a problem concerning the ODS used in multiple-referring is which button-state group this ODS belongs to.

More specifically, when the normal state of a button and the selected state of another button are rendered by one ODS, the thing to be considered is whether this ODS belongs to a button-state group corresponding to the normal state or to a button-state group corresponding to the selected state.

In this case, the ODS is disposed only once in the button-state group that corresponds to the state that appears earliest.

If a certain ODS is used in multiple-referring in both of the normal state and in the selected state, this ODS will be disposed in the button-state group corresponding to the normal state (N-ODSs), and not in the button-state group corresponding to the selected state (S-ODSs). In addition, if another ODS is used in multiple-referring in both of the selected state and in the active state, this ODS will be disposed in the button-state group corresponding to the selected state (S-ODSs), and not in the button-state group corresponding to the active state (A-ODSs). In sum, ODSs in such a multiple-referring method will be disposed only once within the button-state group corresponding to the earliest appearing state.

Next, the order of ODSs in S-ODSs is explained. In S-ODSs, which ODS comes first depends on whether the default selected button is determined statically, or it is dynamic. The default selected button which is statically determined has a valid value that is set (excluding 00) in default_selected_button_number in ICS, and this value specifies the button. When default_selected_button_number indicates a valid value, and that there is no ODS representing the default selected button in N-ODSs, the ODS representing the default selected button will be disposed first.

If default_selected_button_number indicates the value 00, the button set in the selected state as default will dynamically change according to the state of the reproduction apparatus side.

A case where default_selected_button_number should be set to indicate the value 0 is, for example, where AVClip to which Display Set has been multiplexed works as a joint point for a plurality of reproduction paths. If for example, the preceding plural playback paths are respectively first, second and third chapters, and the Display Set being the joint point is for displaying the buttons corresponding to the first, second, and third chapters, it is inadequate to decide, as default, the button to be in selected state in default_selected_button_number.

In such a case, it is ideal to change the button to be in selected state according to which one of the preceding plural reproduction paths is currently gone through, until reaching this Display Set (e.g. the second-chapter button when reaching from the first chapter, the third-chapter button when reaching from the second chapter, and the fourth-chapter button when reaching from the third button). In a case where the button to be in selected state will change, default_selected_button_number will be designed to be invalid, i.e. the value 0 is set thereto. Since the button to be in selected state will change, an arrangement of disposing a certain ODS at the beginning of the button-state group is not necessary.

Figure 53:
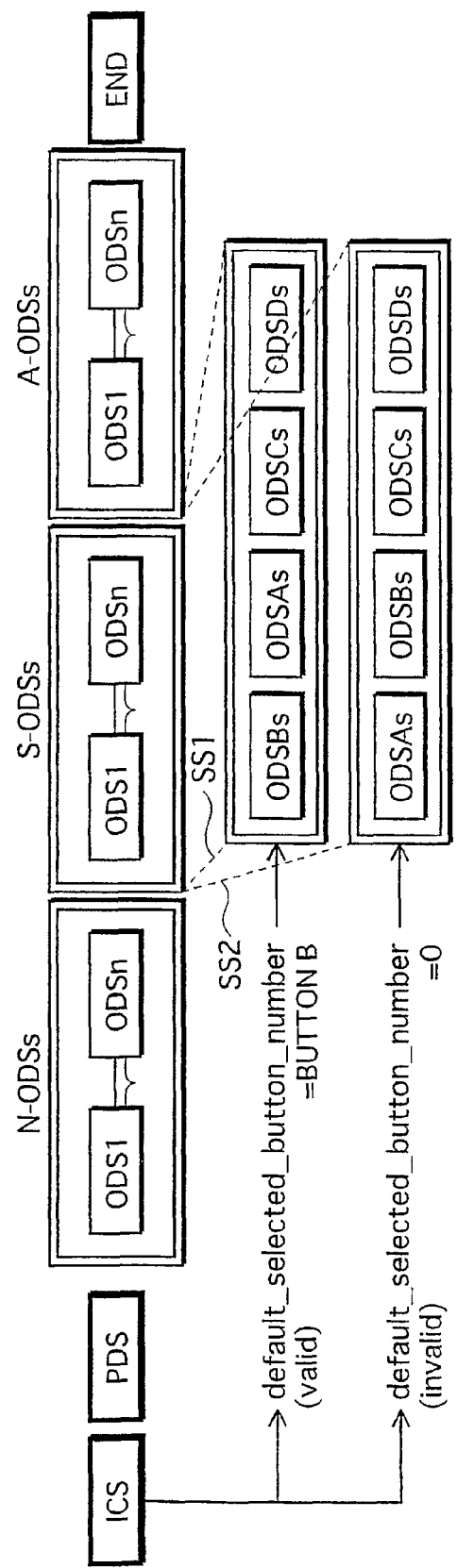
FIG. 53 shows difference in arrangement of ODS in S-ODSs, between a case of default_selected_button_number=0, and a case of default_selected_button_number=button B.

FIG. 53 shows difference in arrangement of ODS in S-ODSs between a case where default_selected_button_number is "=0", and a case where it is "=button B". In this drawing, the broken line ss1 shows the disposition of ODSs in S-ODSs, in a case where default_selected_button_number indicates the button B; and the broken line ss2 shows the disposition of ODSs in S-ODSs, in a case where default_selected_button_number indicates the value 0. As the notation of this drawing shows, when default_selected_button_number indicates the button B, the ODSBs indicating the button B's selected state is disposed first of S-ODSs, and the other buttons' ODSs are disposed thereafter. On the contrary, when default_selected_button_number indicates the value 0, the ODSAs indicating the button A's selected state is disposed first. As such, whether default_selected_button_number is valid or not causes the order of S-ODSs to change greatly.

Next, the following explains how Display Set having these ICS and ODS is disposed on the reproduction timeline for AVClip. DTS and PTS of ODS can be set based on the expressions shown in the first embodiment. On the contrary, DTS and PTS of ICS will be different from those shown in the first embodiment. The following explains the values for DTS and PTS of ICS.

When immediately after Epoch start, PTS in ICS will be set as an equal to or greater value than the value resulting from summing (1) PTS value of the ODS whose decode time is the last among the ODSs constituting the initial display of DSn, (2) time required to clear the Graphics Plane, and (3) write time for writing the Graphics Object obtained by ODS decoding to the Graphics Plane. On the other hand, when at Acquisition Point, it will be set to be equal to or greater than the value obtained by adding (3) the plane write period to (1) PTS value of ODS.

When default_selected_button_number is indicated in ICS, the initial display can be performed as long as i) ODS decoding for rendering the normal state of all the buttons and ii) ODS decoding for rendering the selected state of the default button. The ODSs for rendering the selected state of plural buttons at the initial display are called S-ODSs, and the ODS whose decoding time comes first among the ODSs (in this case, the ODS for rendering the default button) is called S-ODSsfirst. The PTS value of this S-ODSsfirst is set as the PTS value of the ODS whose decoding time comes last, and is used as a reference value of PTS in ICS.

When default_selected_button_number is not indicated in ICS, any button can be in selected state. Therefore preparation for the initial display will not be complete until preparation for rendering the normal state and the selected state for all the buttons. Among the S-ODSs for rendering the selected state of the plural buttons at the initial display, the one whose decoding time comes last is called S-ODSslast. The PTS value for this S-ODSslast is set as the PTS value of the ODS whose decoding time comes last, and is used as a reference value of PTS in ICS.

If the ending time for decoding the S-ODSsfirst is assumed to be PTS(DSn[S-ODSsfirst]), PTS(DSn[ICS]) will be a value resulting from adding, to PTS(DSn[S-ODSsfirst]), (2) the time required for clearing the Graphics Plane, and (3) write time for writing the Graphics Object obtained from ODS decoding to the Graphics Plane.

Assume here that, within the Graphics Plane, the width and the height of a rectangular area for rendering picture are respectively defined as "video-width" and "video-height", and that the rate of writing to the Graphics Plane is 128 Mbps. Then the time required for clearing the Graphics Plane is expressed as "8*video_width*video_height//128,000,000".

When this is expressed in time accuracy of 90 KHz, the clearing time (2) of the Graphics Plane will be 90,000*(8*video_width*video_height//128,000,000).

In addition, assume here that the total size of the Graphics Objects specified by all the button information included in ICS is ΣSIZE(DSn[ICS.BUTTON[i]]), and that the rate of writing to the Graphics Plane is 128 Mbps, then the time required for writing to the Graphics Plane is expressed as ΣSIZE(DSn[ICS.BUTTON[i]])//128.000,000. If this is expressed in time accuracy of 90 KHz, the clearing time (2) of the Graphics Plane is 90,000* (ΣSIZE(DSn[ICS.BUTTON[i]])//128.000,000).

Here, ΣSIZE(DSn[ICS.BUTTON[i]]) is the total size of the firstly-displayed Graphics Object, among the Graphics Objects representing all the buttons. This ΣSIZE(DSn[ICS.BUTTON[i]] will yield a different value, in a case where the default selected button has already determined, from in a case where the default selected button changes dynamically. When the default selected button has been statically determined, ΣSIZE(DSn[ICS.BUTTON[i]]) will be a total of 1) the firstly-displayed ODS among the plural ODSs for representing the selected state of the default selected button, and 2) the firstly-displayed ODS among the plural ODSs for representing the normal state of the buttons except the default selected button.

On the contrary, when the default selected button changes dynamically, it should assume the case where the write time is the longest, because it is hard to know which button will be the default selected button. In this case, it is considered that the Graphics Object to be firstly displayed is the Graphics Object having the largest size (Max(ODSn1.ODSs1) among 1) the Graphics Objects representing the first page in the normal state of an arbitrary button×(ODSn1), and 2) the Graphics Objects representing the first page in the selected state of the button×(ODSs1).

The result of summing this Max(ODSn1,ODSs1) of reach button will be ΣSIZE(DSn[ICS.BUTTON[i]]).

FIGS. 54A, 54B illustrate which values ΣSIZE(DSn[ICS.BUTTON[i]]) takes, in a case where N-ODSs includes plural ODSs constituting the buttons A-D, and where S-ODSs includes plural ODSs constituting the buttons A-D. Here, when default_selected_button_number indicates a valid value, ΣSIZE(DSn[ICS.BUTTON[i]]) will be the total size for the four ODSs shown by the frame in thick line. "As1" is the ODS firstly displayed among the plural ODSs representing the selected state of the button A. "Bn1", "Cn1", and "Dn1" represent the corresponding ODSs firstly displayed among the plural ODSs representing the normal states of the button B-the button D. When these sizes are expressed in size( ), ΣSIZE(DSn[ICS.BUTTON[i]]) will be:

size(As1)+size(Bn1)+size(Cn1)+size(Dn1).

On the other hand, when default_selected_button_number is "=0", ΣSIZE(DSn[ICS.BUTTON[i]]) will be:

Greater ODS of An1,As1+Greater ODS of Bn1,Bs1+ Greater ODS of Cn1,Cs1,+Greater ODS of Dn1, Ds1.

Therefore ΣSIZE(DSn[ICS.BUTTON[i]]) is expressed as follows.

ΣSIZE(DSn[ICS.BUTTON[i]])

=max(size($Cn1$))+max(size($Dn1$),size($Ds1$))

Using the above-stated expression, PTS(DSn[ICS]) immediately after the starting of Epoch Start is expressed as follows.

$PTS(DSn[ICS]) \geq PTS(DSn[S\text{-}ODSsfirst])$

+90,000*(8*video_width*video_height//128,000,000)

+90,000*(ΣSIZE(DSn[ICS.BUTTON[i]])//128,000,000)

Figure 55:
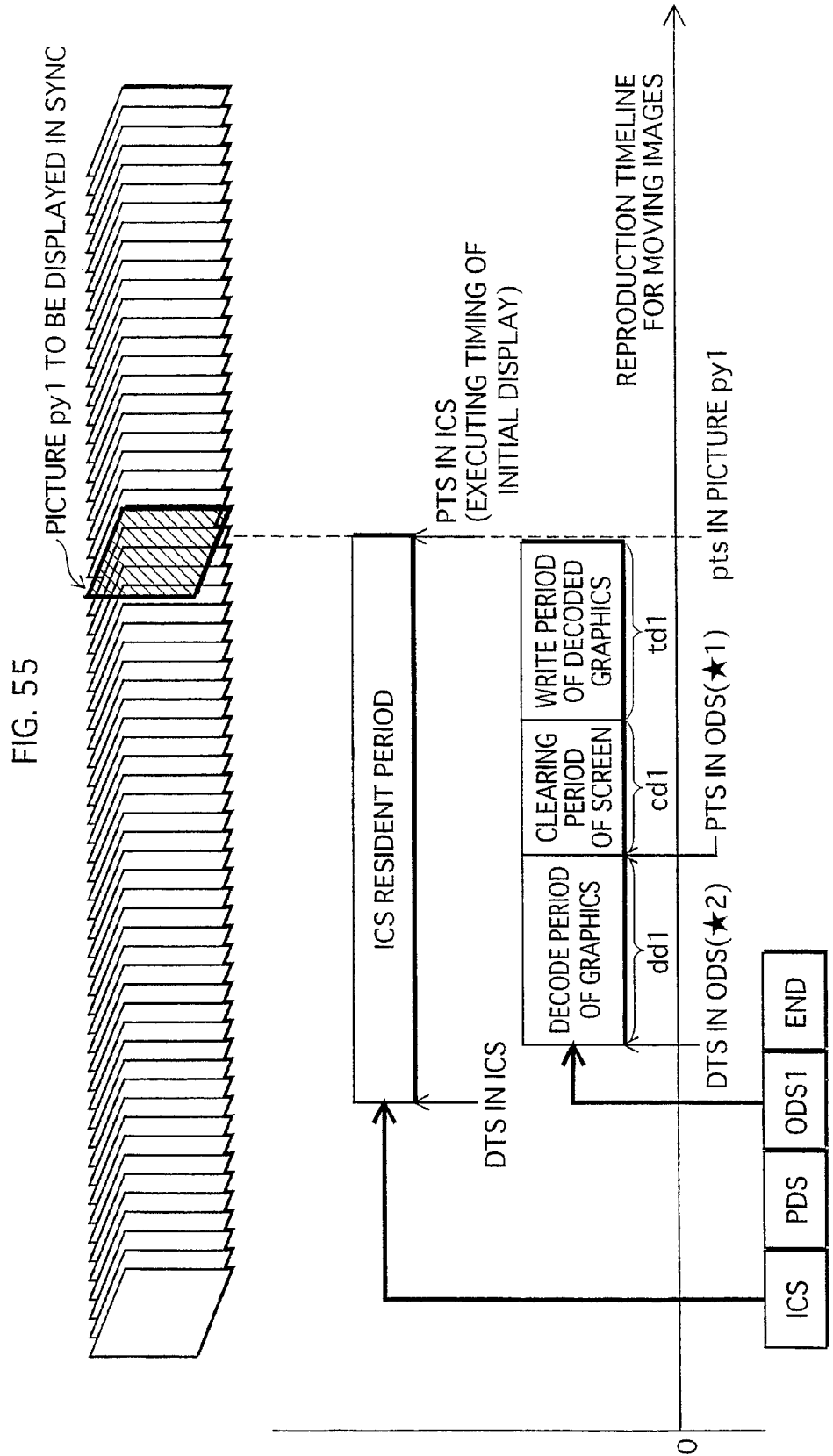
FIG. 55 shows a timing of synchronized display by means of ICS.

An example of realizing sync display, by setting PTS and DTS as above, is shown in FIG. 55. This drawing assumes a case where the button is displayed at the display timing of any picture data py1 in the moving picture. In such a case, the PTS value in ICS should be set so as to coincide with the display time-point of the corresponding picture data.

In addition, the PTS value in ODS.should be set at the time-point(1) of this drawing, because, by the time obtained by subtracting, from the PTS in ICS, the clearing period of the screen "cd1" and the transfer period of the Graphics Object "td1", decoding of the ODS whose decoding time comes last among the ODSs that constitute the initial display of DSn, should be complete. Furthermore, because decoding of ODS requires the period of dd1, the DTS value of ODS should be set prior to this PTS by the period of dd1.

FIG. 55 has only one ODS to be combined with a moving picture, which is a simplified example. In order to realize the initial display of the interactive screen to be combined with the moving picture among the plural ODSs, the PTS and DTS in ICS, and PTS, DTS in ODS should be set as shown in FIG. 56.

Figure 56:
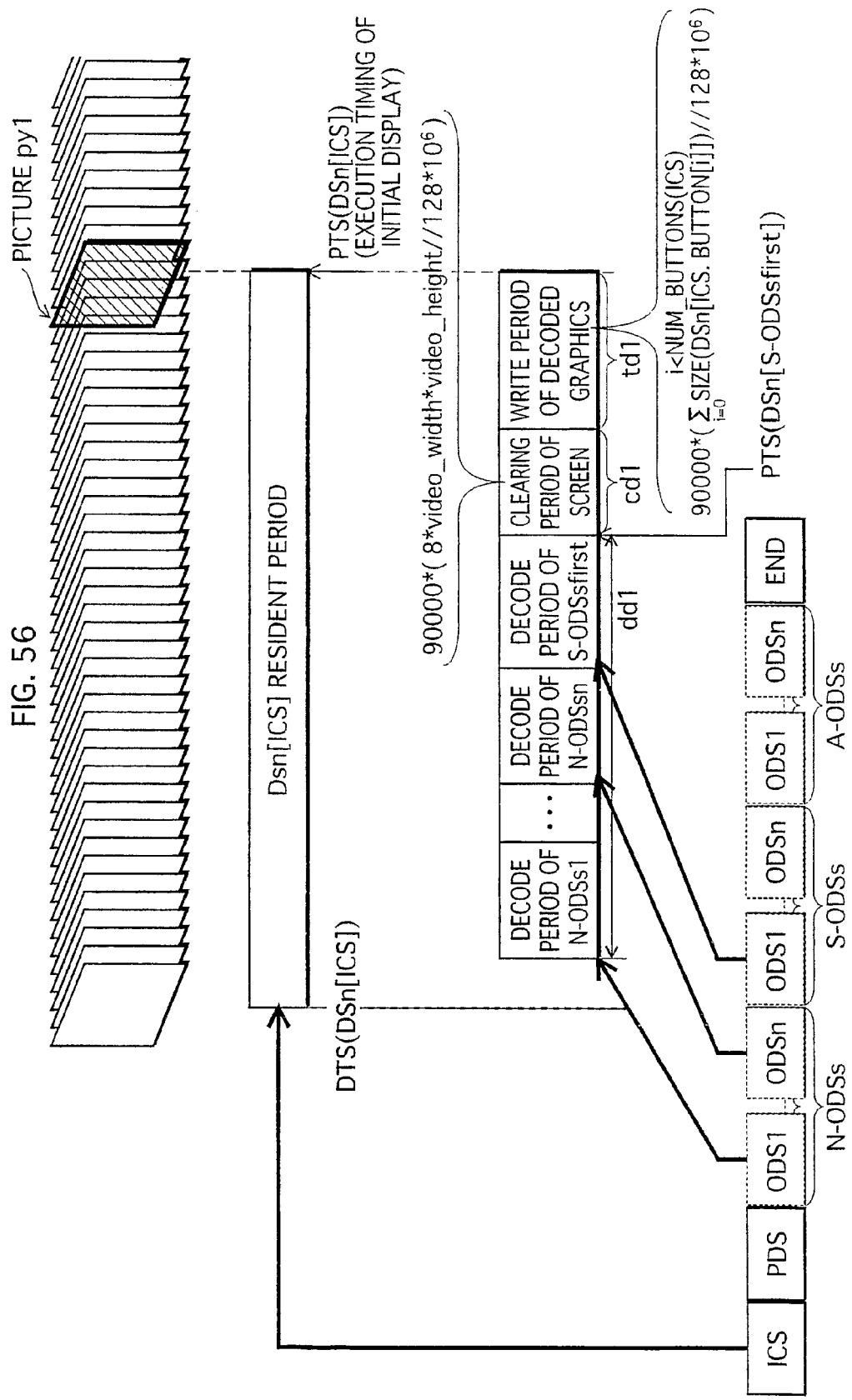
FIG. 56 shows how DTS and PTS are set in a case where an initial display of an interactive screen is constituted by plural ODSs, and where the default_selected_button is valid.

FIG. 56 shows how DTS and PTS are set in a case where the initial display of the interactive screen is constituted by plural ODSs, and where the default selected button is statically determined. If decoding for the S-ODSsfirst whose decoding is performed the last, among the ODSs for realizing the initial display, will end during the period dd1 of this drawing, PTS (DSn[S-ODSsfirst]) of this S-ODSsfirst should be set to indicate the time of the period dd1.

Furthermore, before initial display, screen clearing and transferring of already decoded Graphics Objects should be performed. Therefore PTS(DSn[ICS] of ICS should be set to be after the time obtained by adding, to the value of this PTS(DSn[S-ODSsfirst]), the period required for screen clearing (90,000*(8*video_width*video_height//128,000,000)) and the transfer period of the decoded Graphics Object (90,000*(ΣSIZE(DSn[ICS.BUTTON[i]])//128,000,000)).

Figure 57:
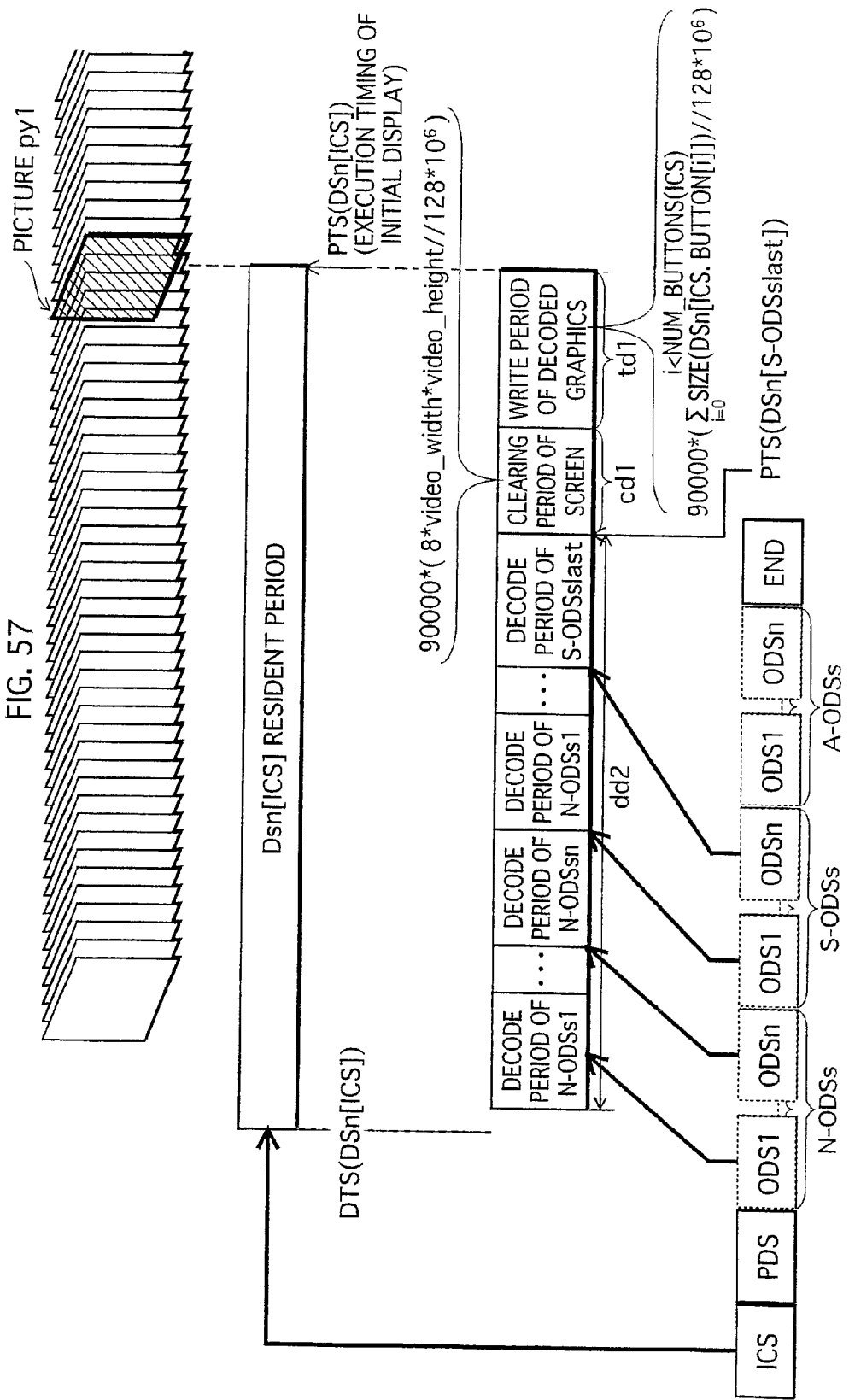
FIG. 57 shows how DTS and PTS are set in a case where an initial display of an interactive screen is constituted by plural ODSs, and where the default_selected_button is invalid.

FIG. 57 shows how DTS and PTS are set in a case where the initial display of the interactive screen is constituted by plural ODSs, and where the default selected button is not determined. If decoding for the S-ODSslast whose decoding is performed the last, among the ODSs for realizing the initial display, will end during the period dd2 of this drawing, PTS (DSn[S-ODSslast]) of this S-ODSslast should be set to indicate the time of the period dd2.

Furthermore, before initial display, screen clearing and transferring of already decoded Graphics Objects should be performed. Therefore PTS(DSn[ICS] of ICS should be set to be after the time obtained by adding, to the value of this PTS(DSn[S-ODSslast]), the period required for screen clearing (90,000*(8*video_width*video_height//128,000,000)) and the transfer period of the decoded Graphics Object (90,000*(ΣSIZE(DSn[ICS.BUTTON[i]])//128,000,000)).

It should be noted here that the sync control by means of PTS in ICS, stated above, includes not only control to display the button at a certain timing on the reproduction timeline, but also include the control to enable the display of Popup menu during a certain period on the reproduction timeline. The Popup menu is a menu displayed, as a popup, by a push directed to the menu key provided for the remote controller 400. The sync control by means of PTS in ICS also includes enabling this Popup display at the display timing of certain picture data in the AVClip. The ODSs constituting this Popup menu are decoded first and then written to the Graphics Plane, just as the ODSs constituting a button. Unless the writing to the Graphics Plane has been complete, it is impossible to answer the menu call by a user. In view of this, The time at which the Popup display becomes possible is written to PTS in ICS, at the sync display of the Popup menu.

Following the explanation on the recording medium of the present invention stated above, a reproduction apparatus according to the present invention is explained as follows. The internal structure of the reproduction apparatus according to the second embodiment is substantially the same as that of the first embodiment, except some improvements for the Object Buffer 15, and for the Graphics controller 17. Therefore the improvements for the Object Buffer 15, and for the Graphics controller 17 are detailed as follows.

Figure 58:
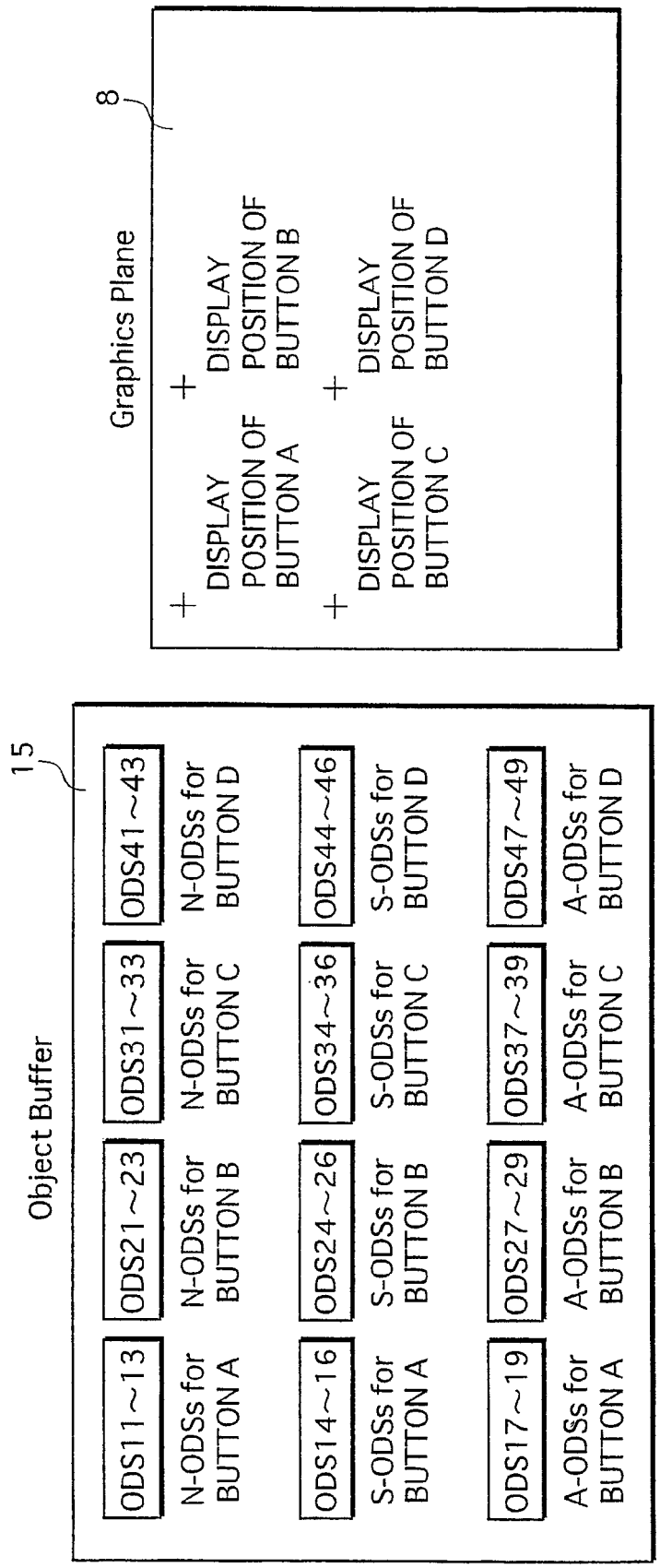
FIG. 58 illustrates the content of an Object Buffer 15 in comparison with a Graphics Plane 8.

Graphics objects that are obtained by the decoding performed by the Stream Graphics processor 14 and that are for constituting an interactive screen are disposed in the Object Buffer 15 according to the second embodiment. FIG. 58 illustrates the content of the Object Buffer 15 in comparison with the Graphics Plane 8. The content of the Object Buffer 15 assumes a case in which the ODS shown in FIG. 48 and FIG. 49 are written to the Object Buffer 15. The examples of FIG. 48 and FIG. 49 realizes the four-button animation by 36 ODS(ODS11-ODS49), where the ODS representing all the frames of this animation are stored in this Object Buffer 15, and the display position of each of the ODSs stored in this Object Buffer 15 is defined in the Graphics Plane 8. This display position is defined by Button_horizontal_position and Button_vertical_position of the corresponding button information. Animation is realized by writing the plural ODSs stored in the Object Buffer 15 to a corresponding display position of the Graphics Plane 8, by transferring one frame at a time.

Figure 59:
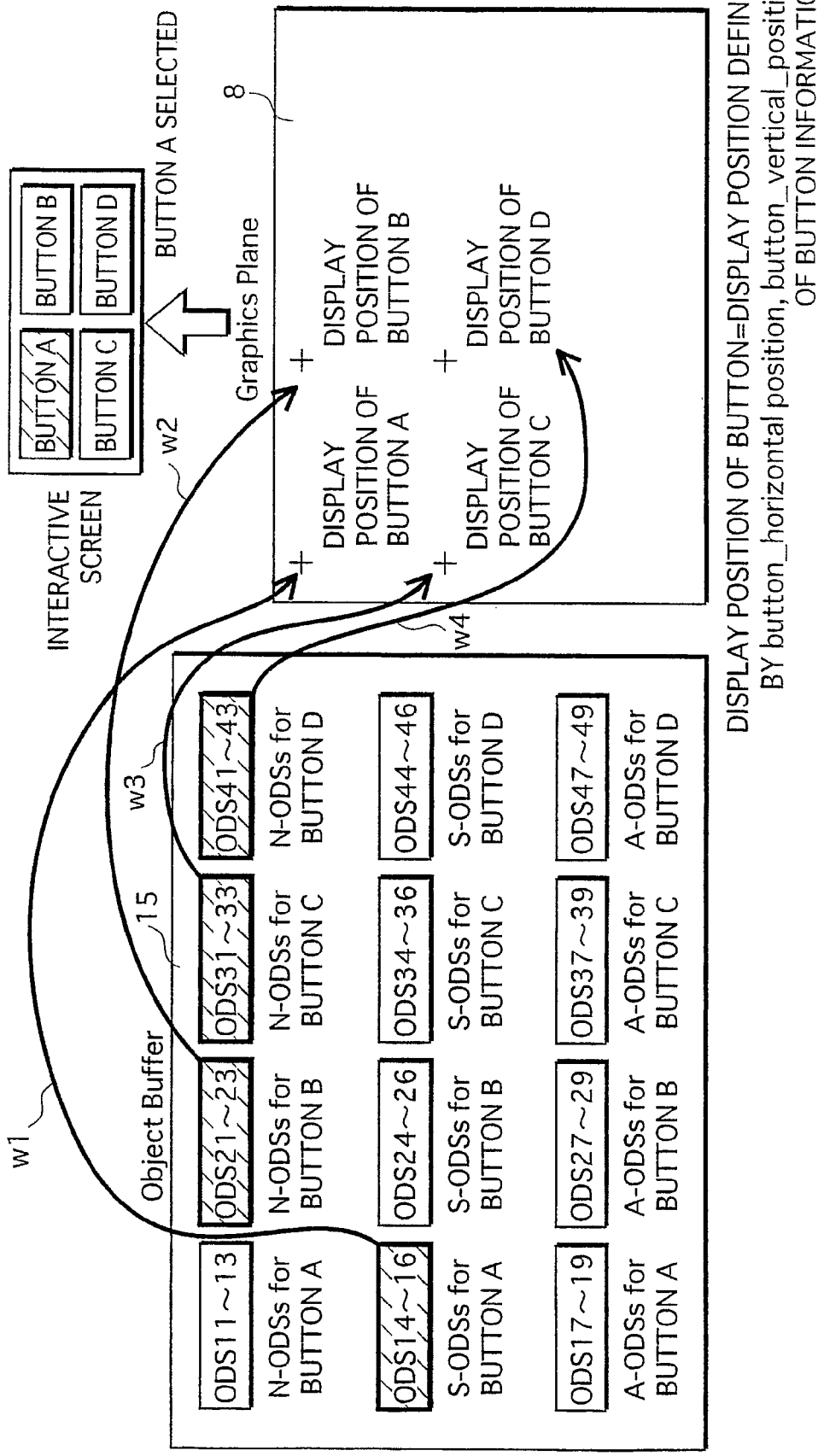
FIG. 59 illustrates an operation performed by the Graphics controller 17 at the initial display time.

The Graphics controller 17 of the second embodiment interprets the ICS disposed unit the Composition buffer 16, and executes control based on the ICS. The execution timing of this control is based on the value of PTS assigned to the ICS. The important task of this Graphics controller 17 is a writing operation at the initial display time of the interactive screen, and at the update time. The following describes, with reference to FIG. 59, the writing operation at the initial display time of the interactive screen and at the update time. FIG. 59 illustrates the operation performed by the Graphics controller at the initial display time. As this diagram shows, the Graphics controller 17 performs control so that the ODSs belonging to S-ODSs of the button A are written to the display position defined by Button_horizontal_position and Button_vertical_position of the button information at the button A; and similarly, the ODSs belonging to the N-ODSs of the buttons B, C, D are written to the respective display positions defined by the corresponding Button_horizontal_position and Button_vertical_position of the button information of the buttons B, C, and D. Note here that the arrows w1, w2, w3, and w4 symbolically show the aforementioned writing. By performing the writing, the initial display shown in FIG. 51 will be performed. What should be noted here is that not all the ODSs are necessary for realizing the initial display of the interactive screen, and as long as the Object Buffer 15 contains the ODSs belonging to S-ODSs of the default selected button and the ODSs belonging to N-ODSs of the other buttons, it is enough for completing the initial display of the interactive screen. Therefore when the ODSs belonging to S-ODSs of the default selected button and the ODSs belonging to N-ODSs of the other buttons have been decoded, it can be said to be ready for the Graphics controller 17 to start performing writing for the initial display of the interactive screen.

Figure 60:
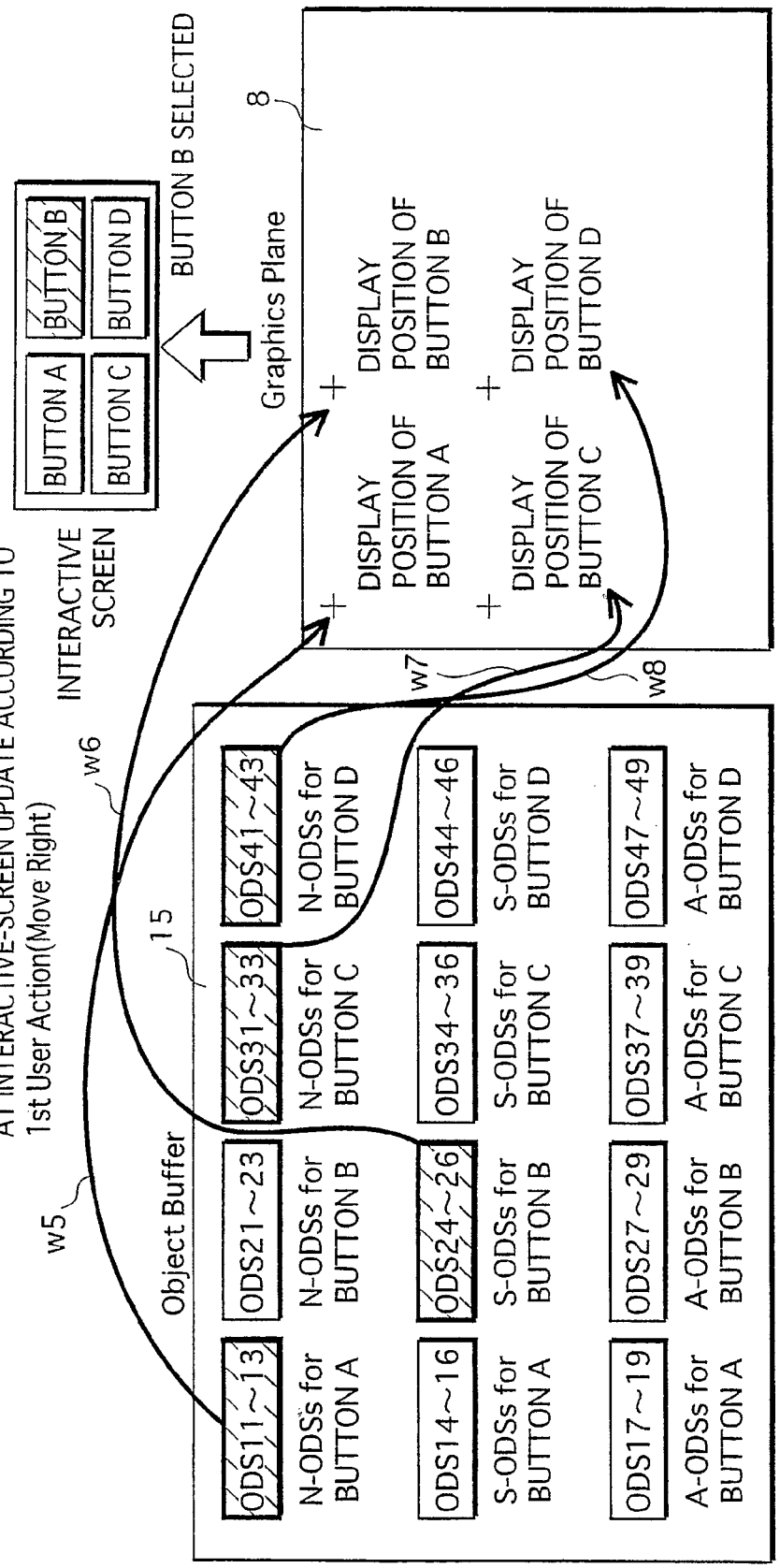
FIG. 60 illustrates an operation performed by the Graphics controller 17 when the interactive screen update is performed according to 1stUserAction(MoveRight).

FIG. 60 illustrates the operation performed by the Graphics controller 17 when the interactive-screen update is performed according to 1stUserAction(MoveRight). As this drawing shows, the Graphics controller 17 performs control so that the ODS belonging to S-ODSs of the button B is written to the display position defined by Button_horizontal_position and Button_vertical_position of the button information at the button B; and similarly, the ODSs belonging to the N-ODSs of the button A are written to the display position defined by Button_horizontal_position and Button_vertical_position of the button information of the button A. Note here that the arrows w5, w6, w7, and w8 symbolically show the aforementioned writing. By performing the writing, the state change shown in FIG. 51 will be realized. The buttons C and D are in the normal state, just as in the initial display time, but the writing to the Graphics Plane 8 is being continually performed therefor, so as to continue the animation.

Figure 61:
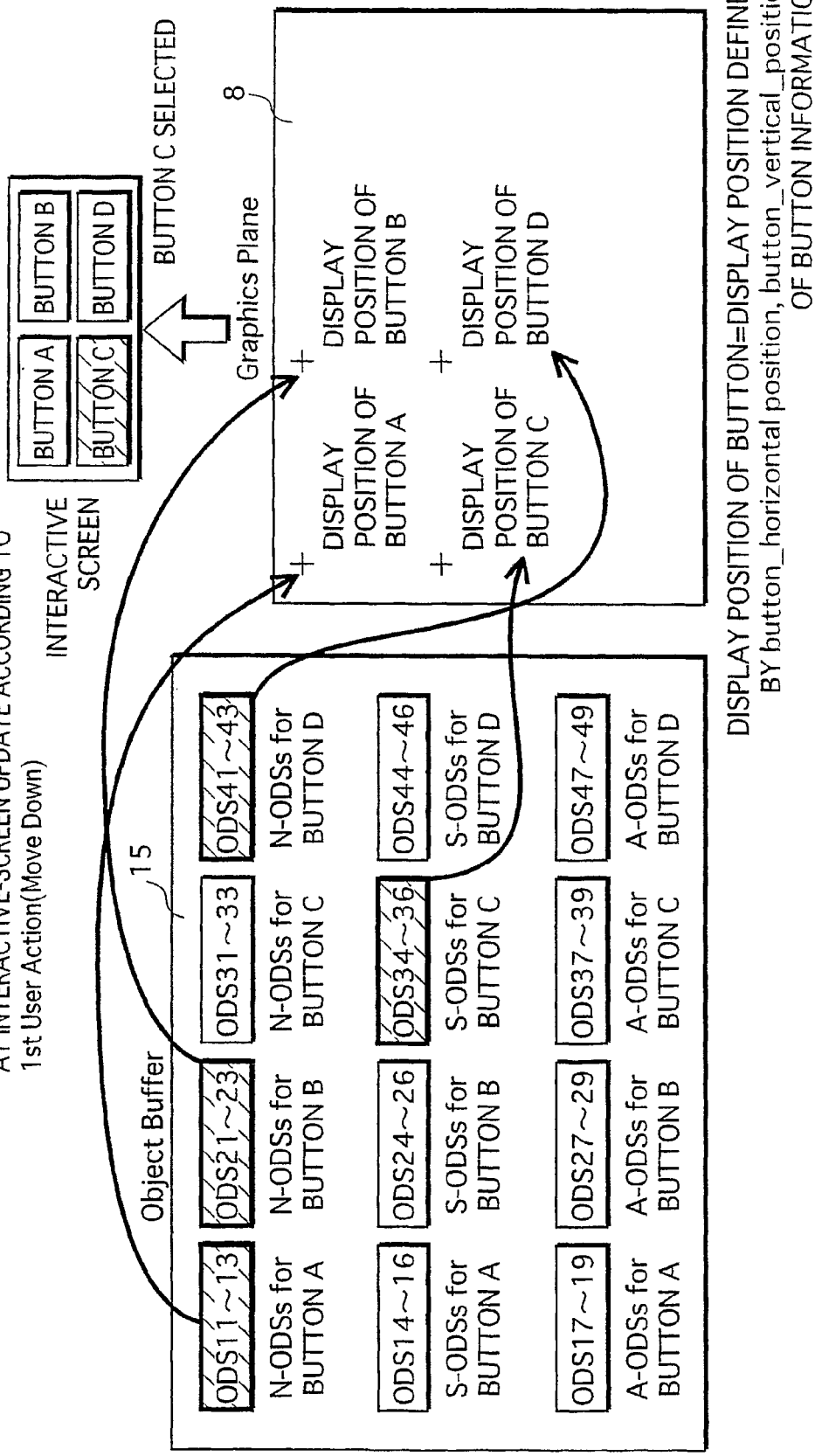
FIG. 61 illustrates an operation performed by the Graphics controller 17 when the interactive screen update is performed according to the 1stUserAction(MoveDown).
Figure 62:
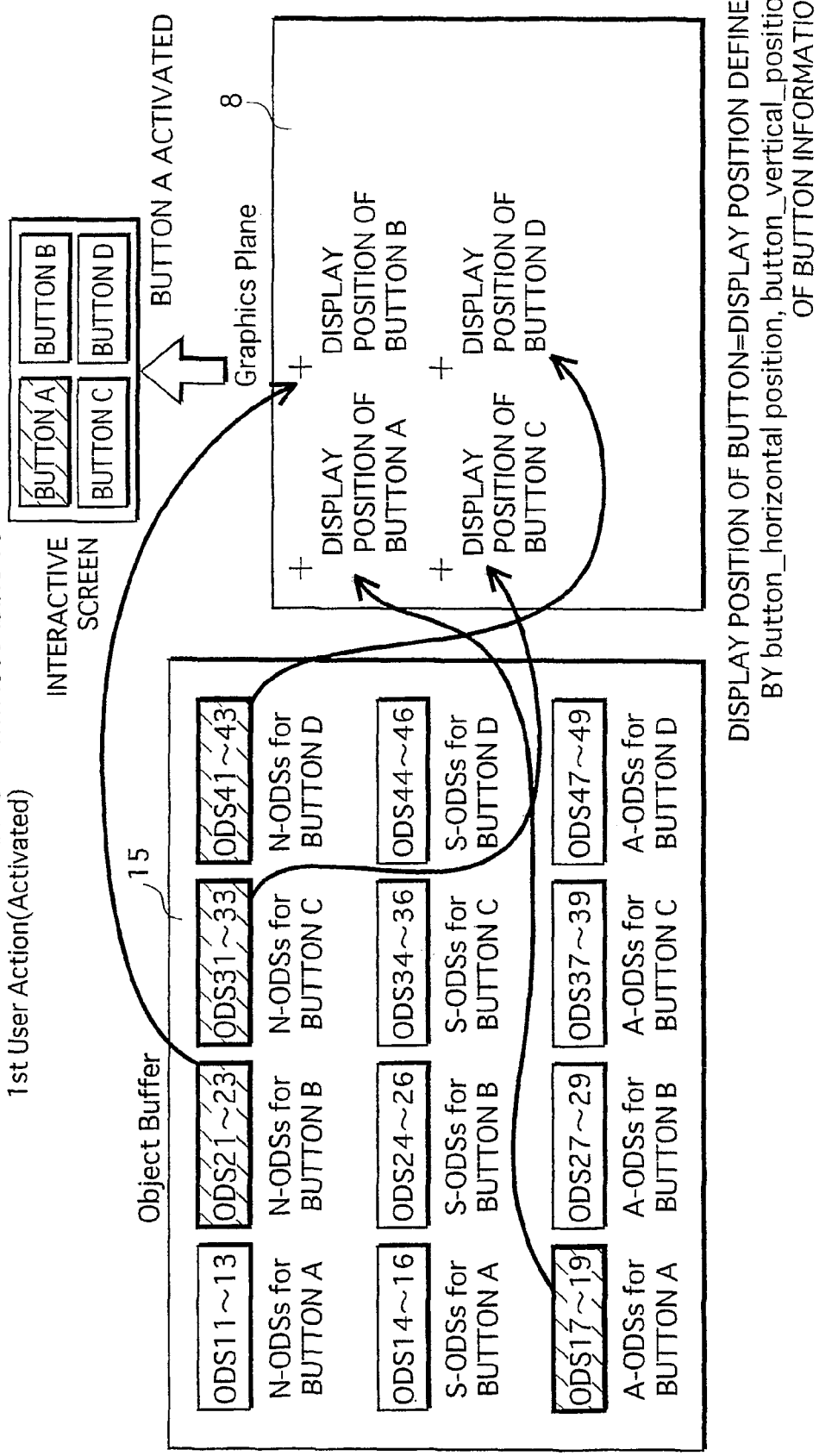
FIG. 62 illustrates an operation performed by the Graphics controller 17 when the interactive screen update is performed according to the 1stUserAction(Activated).

In the similar manner as above, FIGS. 61 and 62 illustrate the operations performed by the Graphics controller 17, at the interactive screen update when the 1stUserAction is "Move-Down" and "Activated". At the interactive screen update time, The S-ODSs and the A-ODSs of the buttons other than the default selected button, and so it is desired that all the ODSs have been stored in the Object Buffer 15.

In the reproduction apparatus, constructed as in the above, each component performs decoding operations in pipeline processing method, Just as in the first embodiment.

Figure 63:
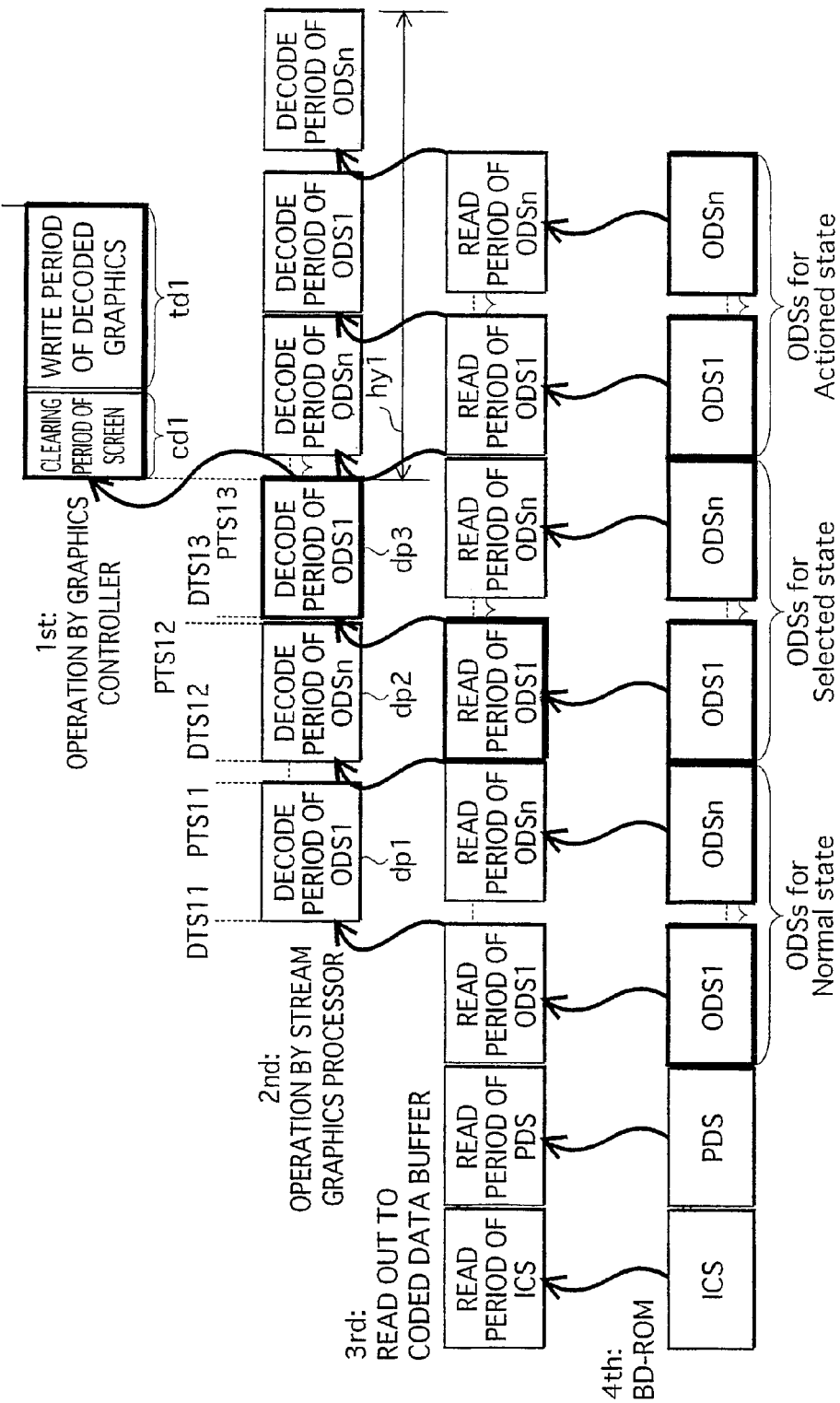
FIG. 63 is a timing chart illustrating a pipeline processing performed by the reproduction apparatus.

FIG. 63 is a timing chart illustrating a pipeline processing performed by the reproduction apparatus. The fourth row shows the Display Set of BD-ROM, and the third row shows reading periods of ICS, PDS, ODS to the Coded Data buffer 13. The second row shows decode periods of ODSs, where the decoding is performed by the Stream Graphics processor 14. The first row shows operation periods of the Graphics controller 17. The decoding start time for the ODSs are shown by DTS11, DTS12, and DTS13, respectively. The storing, to the Coded Data buffer 13, of the first ODS(N-ODSs[ODS1]) among those belonging to N-ODSs will be complete by the DTS11. The storing, to the Coded Data buffer 13, of the last ODS(N=ODSs[ODSn]) among those belonging to the N-ODSs, will be complete by the DTS12. As such, each ODS will have been read to the Coded Data buffer 13 by the time shown by its own DTS.

On the other hand, the decode end time of each ODS is shown by PTS11, PTS12, and PTS13 of the drawing. The decoding of N-ODSs(ODS1) performed by the Stream Graphics processor 14 will be complete by PTS11; and the decoding of N-ODSs(ODSn) will be complete by PTS12. As such, by the time shown by the DTS of each ODS, the ODS has been read to the Coded Data buffer 13, and each read ODS to the Coded Data buffer 13 will be decoded and written to the Object Buffer 15 by the time shown by the PTS shown by the corresponding PTS. The Stream Graphics processor 14 performs these series of operation, in pipeline processing method.

When the default selected button is determined statically, all the Graphics Objects necessary for the initial display of the interactive screen will be ready on the Object Buffer 15 when the decoding is complete for 1) the button-state group corresponding to the normal state, and 2) the first ODS of the button-state group corresponding to the selected state. In this drawing, at the time shown by PTS13, all the Graphics Objects necessary for the initial display of the interactive screen get ready.

In this drawing, the period cd1 in the first row is the period necessary for clearing the Graphics Plane 8. In addition, the period td1 is the period necessary for writing, to the Graphics Plane 8, the Graphics Objects constituting the first page of the interactive screen, which are among the Graphics Objects obtained on the Object Buffer 15. The exact storing place of the Graphics Objects in the Graphics Plane 8 is the place shown by button_horizontal_position and button_vertical_position. In other words, cd1 (screen clearing period) td1 (writing period of the Graphics Object having been decoded) are added to PTS13 of ODS, decompressed graphics constituting the interactive screen will be obtained on the Graphics Plane 8 in the obtained period. Then, by 1) making the CULT unit 9 perform a color conversion of decompressed graphics, and 2) making the adding unit 10 combine the decompressed picture stored in the video plane 6, the composition image will be obtained.

As opposed to the case where the initial display is performed after decoding all the ODSs included in the Display Set, it becomes possible, in the above-stated case, to perform an initial display regardless of whether decoding of a button-state group corresponding to the selected state has been complete, or whether decoding of a button-state group corresponding to the active state has been complete. Therefore the initial display will be performed earlier in this case by the period hy1 in the drawing.

It should be noted, in this drawing, every set of ODS1-ODSn is assigned the same number, such as 1 and n. However, the sets are different from one another, and belong to N-ODSs, S-ODSs, and A-ODSs, respectively. This also applies to every similar drawing hereinafter.

In the graphics decoder 12, even while the Graphics controller 17 continues executing clearing of the Graphics Plane 8 or writing to the Graphics Plane 8, the Stream Graphics processor 14 continues performing decoding (decode period of ODSn, decode period of ODS1, and decode period n of ODSn, in the second row). Therefore, it becomes possible to finish decoding of the other ODSs than those being treated by the Graphics controller 17, earlier than conventionally, since the other ODSs will be decoded simultaneously with the decoding of ODSs being treated by the Graphics controller 17. Since it becomes possible to have preparation for updating the interactive screen early by completing the decoding of the other ODSs, the interactive screen update, which will use the other ODSs, will be accordingly finish earlier than conventionally. The aforementioned pipeline processing enables both the initial display of the interactive screen and the updating thereof, to be performed without delay.

Figure 64:
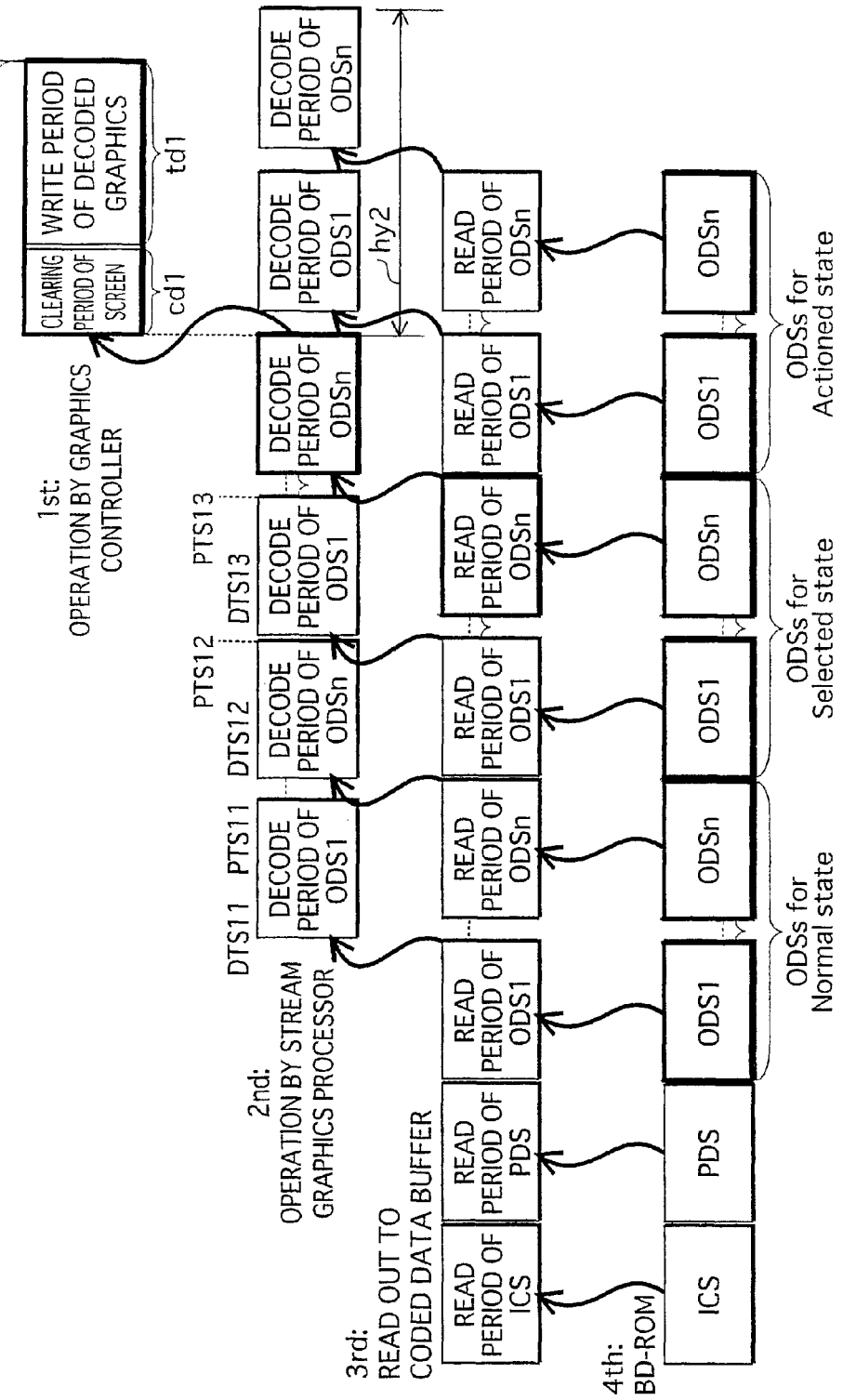
FIG. 64 is a timing chart illustrating a pipeline processing by the reproduction apparatus in a case where the default selected button changes dynamically.

FIG. 63 assumes the case where the default selected button has been statically determined. On the contrary, FIG. 64 is a timing chart illustrating a pipeline processing by the reproduction apparatus in a case where the default selected button changes dynamically. When the default selected button changes dynamically, the Graphics Objects necessary for the initial display will be ready, when all the ODSs belonging to the button-state group have been decoded and the Graphics Objects are obtained in the Graphics Plane. As opposed to the case where the initial display is performed after decoding all the ODSs included in the button-state group corresponding to the active state, the above-stated case enables the initial display to be performed regardless of whether decoding of the button-state group corresponding to the active state has been complete. Therefore, the initial display will be performed earlier in this case by the period hy2 in the drawing.

Figure 65:
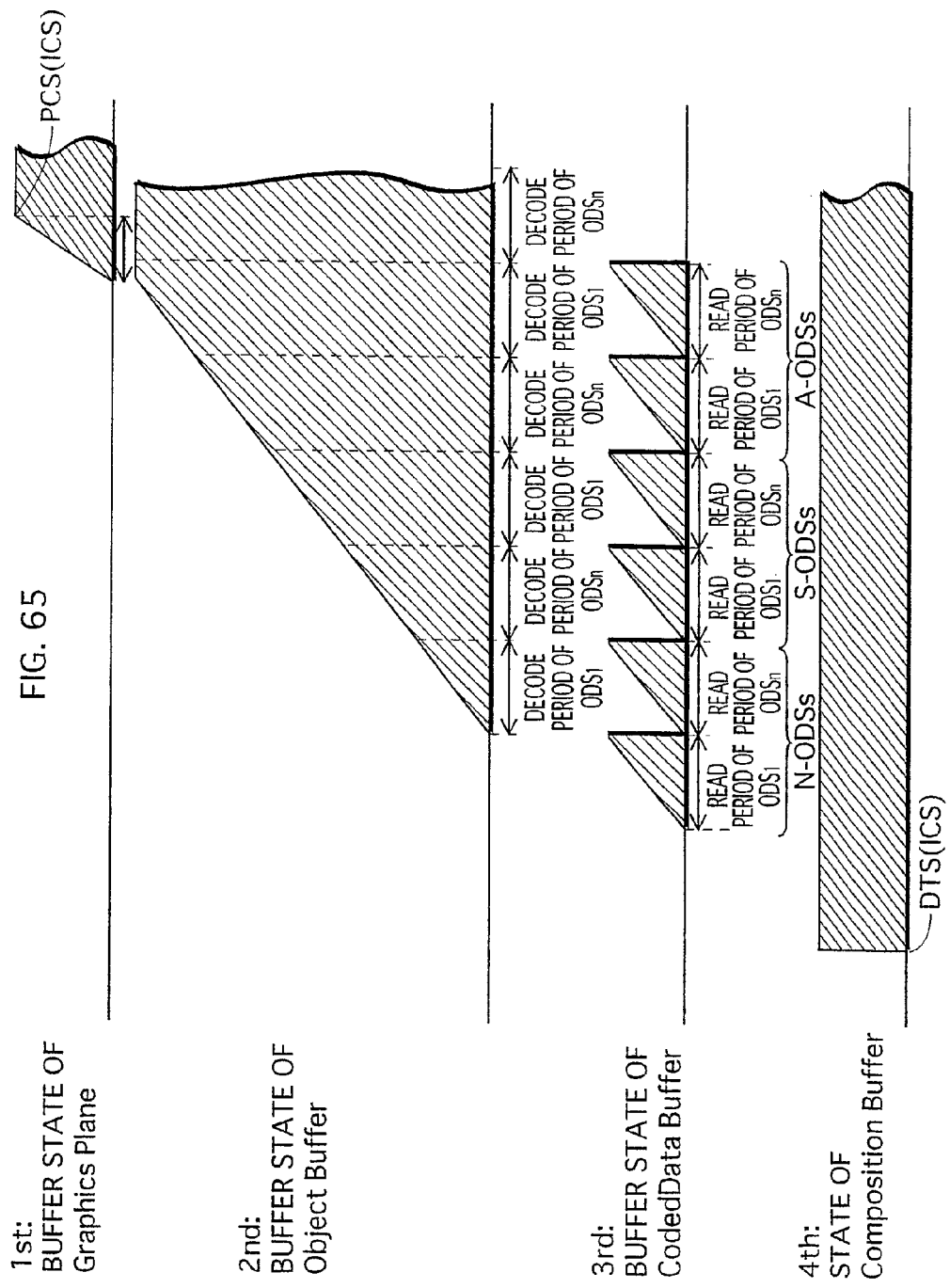
FIG. 65 is a timing chart illustrating chronological transitions in occupancy of the Graphics Plane 8, the Object Buffer 15, the Coded Data buffer 13, and the Composition buffer 16.

FIG. 65 is a timing chart illustrating chronological transitions in occupancy of the Graphics Plane 8, the Object Buffer 15, the Coded Data buffer 13, and the Composition buffer 16.

The notations of occupancy used in this drawing conform to those used in FIG. 30. Since the ODSs constituting N-ODSs, S-ODSs, A-ODSs are to be decoded in the second embodiment, the number of simply increasing parts and of simply decreasing parts is more than in FIG. 30. Except for this difference, FIG. 65 is the same as FIG. 30. Just as in the first embodiment, the graphs for example in FIG. 65 are illustrated using: DTS and PTS assigned to ODS; DTS and PTS assigned to ICS; size and transfer rate of each buffer illustrated in FIG. 27. Furthermore, by creating such graphs, users can know how the state of each buffer changes, at the authoring stage. Since the transition of the state of each buffer can be adjusted by updating DTS and PTS, it becomes possible, also in this embodiment, to avoid generation of decoding load which would exceed the specification of the decoder at the side of the reproduction apparatus, and to avoid buffer overflow incident to reproduction. According to this, the hardware/software implementation will become easy, in the developing phase of reproduction apparatuses.

Next, software improvement necessary for realizing the reproduction apparatus of the second embodiment is explained.

Figure 66:
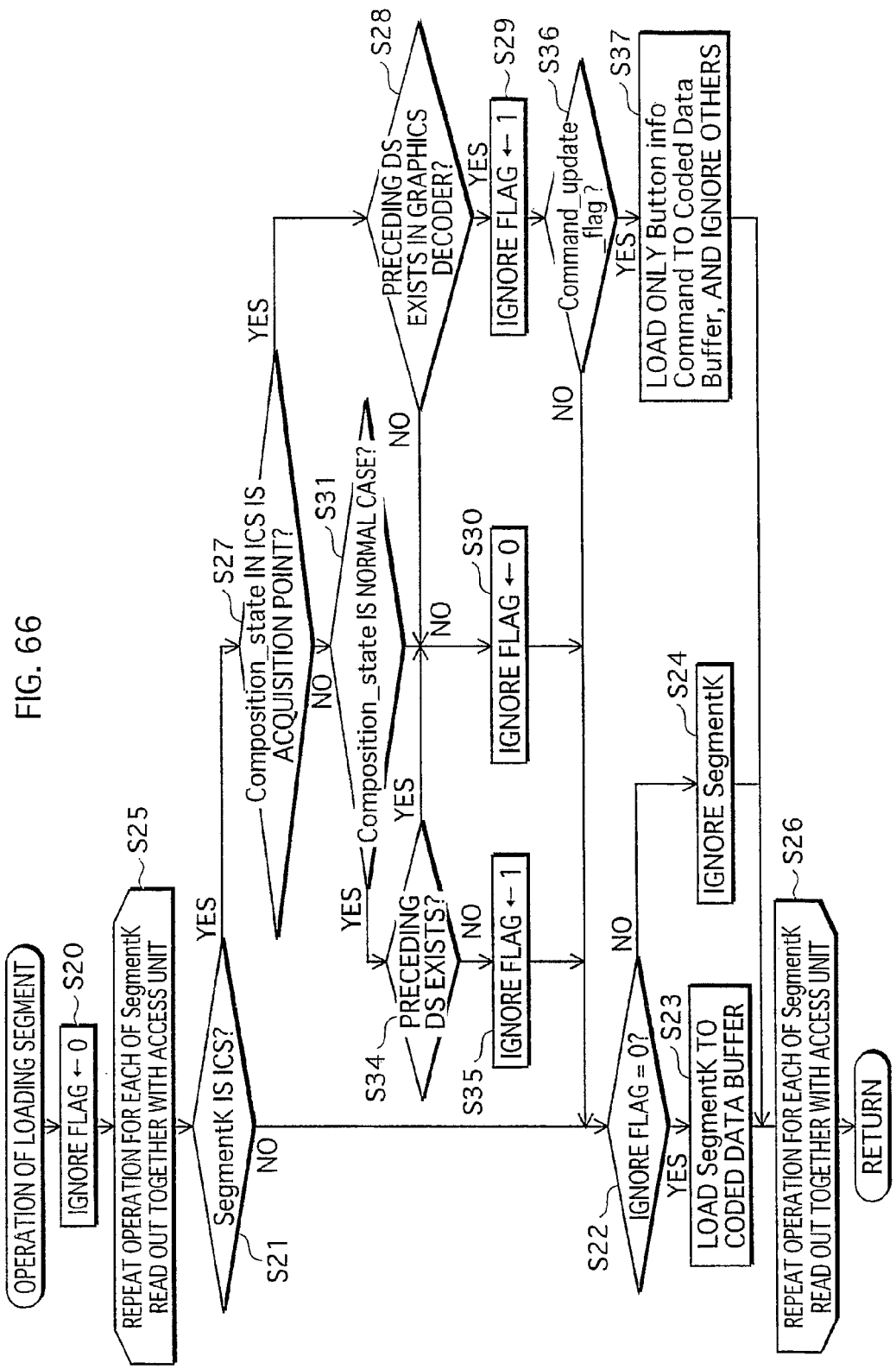
FIG. 66 is a flowchart showing a process of loading operation of Segment.

FIG. 66 is a flowchart showing the process of loading operation of functional segment. This drawing is dawn based on the flowchart of FIG. 31. The difference is that, after Step S29, Steps S36 and S67 are added to FIG. 66.

Step S36 is to judge whether command_update_flag is 1. If it is 1 (Step S36:Yes), only button command in the button information is loaded to the Coded Data buffer 13, and the others are ignored (Step S37). If it is 0, the control is moved to Step S22, thereby ignoring the ICS representing Acquisition Point (Step S24).

Figure 67:
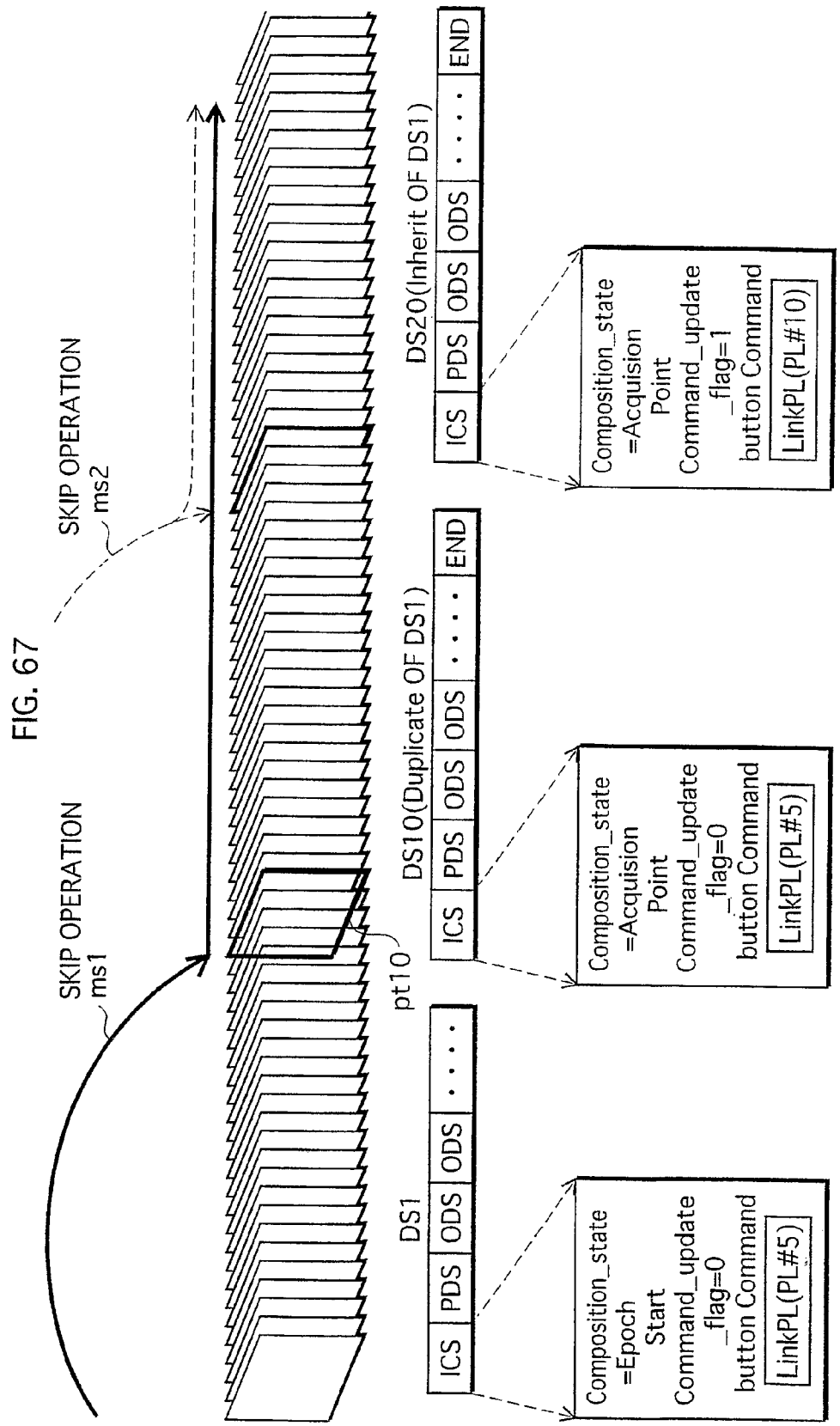
FIG. 67 shows an example of multiplexing.

Next, assuming the case where multiplexing is performed as in FIG. 67, the following explains how DS is read out. The example of FIG. 67 multiplexes three DS with a moving picture. Among the three DS, the first DS1 has Epoch_Start as Composition_state, includes a button command called Link-PL(PL#5), and whose Command_update_flag is set as 0.

DS10 is "Duplicate" of DS1, and has Acquisition Point as Composition_state, includes a button command called Link-PL(PL#5), and whose Command_update_flag is set as 0.

DS20 is "Inherit" of DS1, and has Acquisition Point as Composition_state. The difference from DS1 is the button command (LinkPL(PL#10)), and so as to representing this, its Command_update_flag is set as 1.

Figure 68:
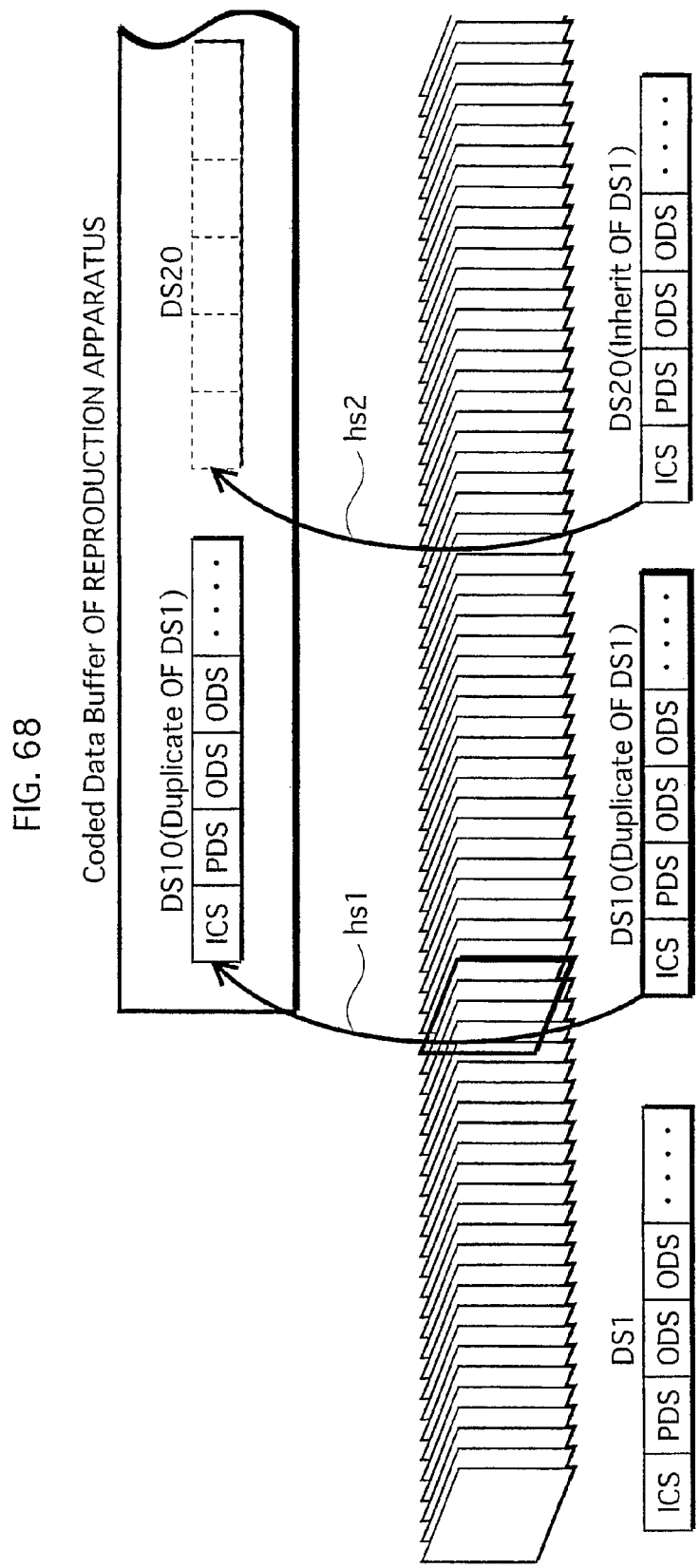
FIG. 68 illustrates a manner in which a DS10 is loaded to the Coded Data Buffer 13 of the reproduction apparatus.

Assume here that these three DS and the moving picture are multiplexed in an AVClip, and a skip operation to a picture data pt10 of ms1 is performed. In this case, the DS10 which is closest to a skipping target is the target of FIG. 66. At Step S27, composition_state will be judged to be Acquisition Point, but no preceding DS exist in the graphics decoder 12. Therefore the ignore flag is set as 0, and this DS10 is loaded to the Coded Data buffer 13 of the reproduction apparatus (hs1 of FIG. 68). On the other hand, when the target of a skip operation falls after the position at which Display Set exists (ms2), Display Set 20 (hs2 of FIG. 68) will be read to the Coded Data buffer 13.

Figure 69:
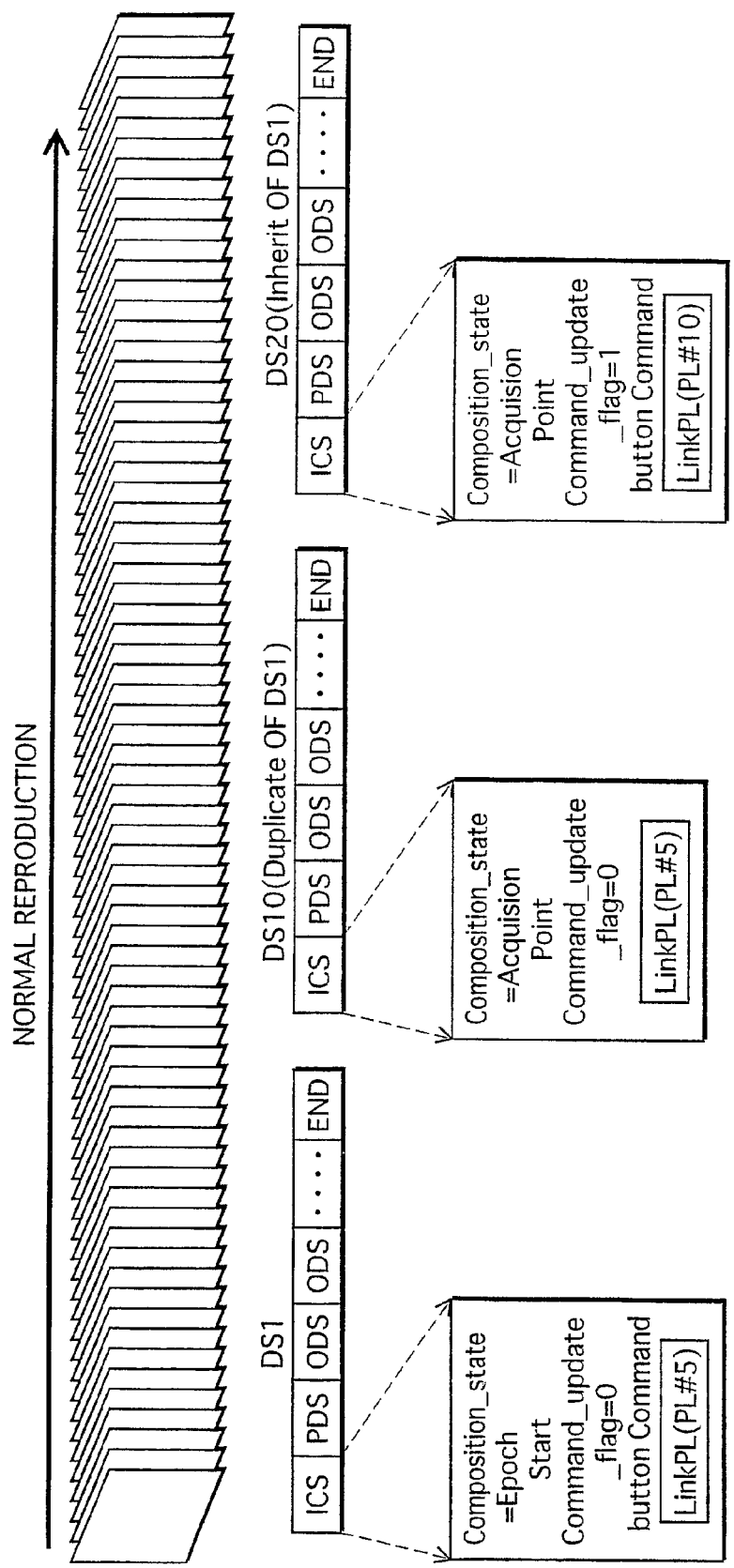
FIG. 69 illustrates a case where a normal reproduction is performed.
Figure 70:
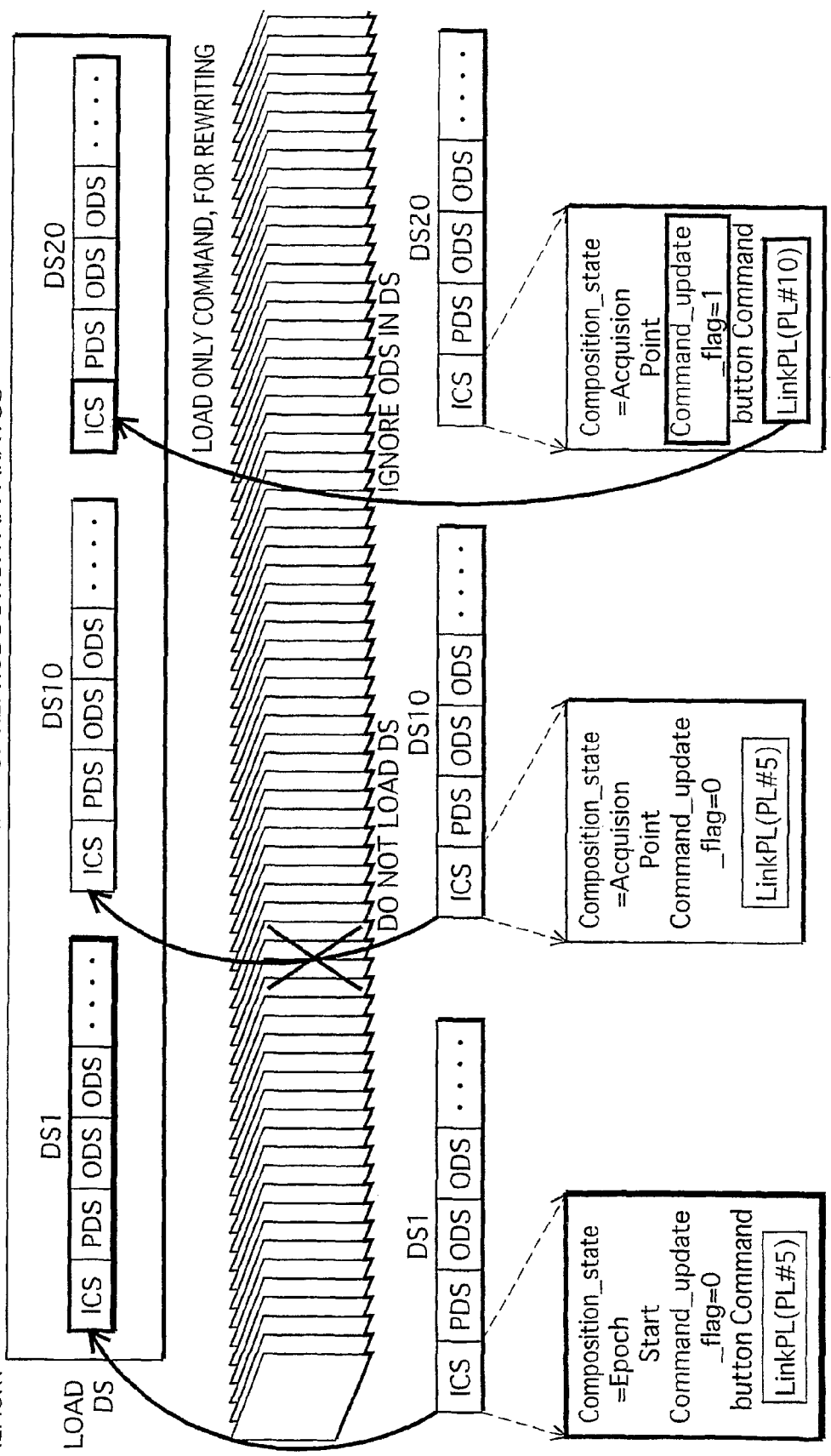
FIG. 70 illustrates loading of a DS1, the DS10, and a DS20 in a normal reproduction as performed in FIG. 69.

FIG. 70 shows loading of DS1, DS10, and DS20, in a normal reproduction as performed in FIG. 69. Among the three DS, DS1 whose Composition_state of ICS is Epoch Start is loaded to the Coded Data buffer 13, as it is (Step S23). However, DS10, whose Composition_state of ICS is Acquisition Point, has the ignore flag of 1 (Step S29). Therefore the functional segments constituting DS10 will not be loaded to the Coded Data buffer 13, and will be ignored instead (Step S24). Furthermore, as for DS20, it is true that its Composition_state of ICS is Acquisition Point, but its Command_update_flag is set as 1. Therefore Step S36 yields "Yes", and so only button command thereof is loaded, and only the button command of ICS of DS on the Coded Data buffer 13 is replaced with the button command of DS20 (Step S37). However, the ignore flag still represents 1, and so the others different from this button command will not be loaded, and ignored instead.

Figure 71:
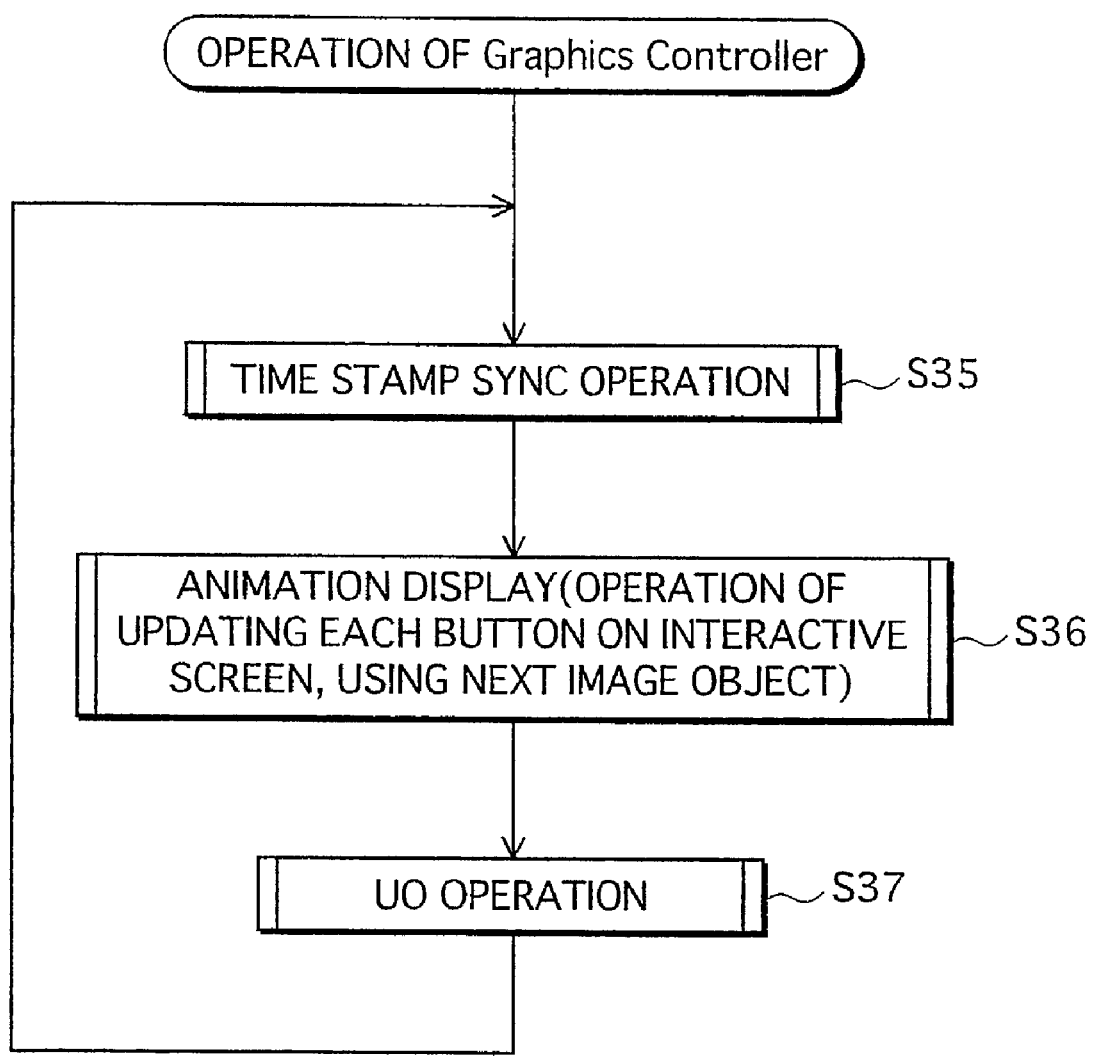
FIG. 71 is a flowchart illustrating a main routine of the processing performed by the Graphics controller 17.

When reaching DS20, the display content stays the same, however the button command has changed from LinkPL(#5) of DS, to LinkPL(#19). Such replacement of button command enables control of changing the contents of a button command. Next, the processing performed by the Graphics controller is explained. FIG. 71 is a flowchart illustrating the main routine of the processing performed by the Graphics controller 17. In this flowchart, the following three operations are repeatedly executed: time stamp sync operation (Step S35), animation display operation (Step S36), and UP operation (Step S37).

Figure 72:
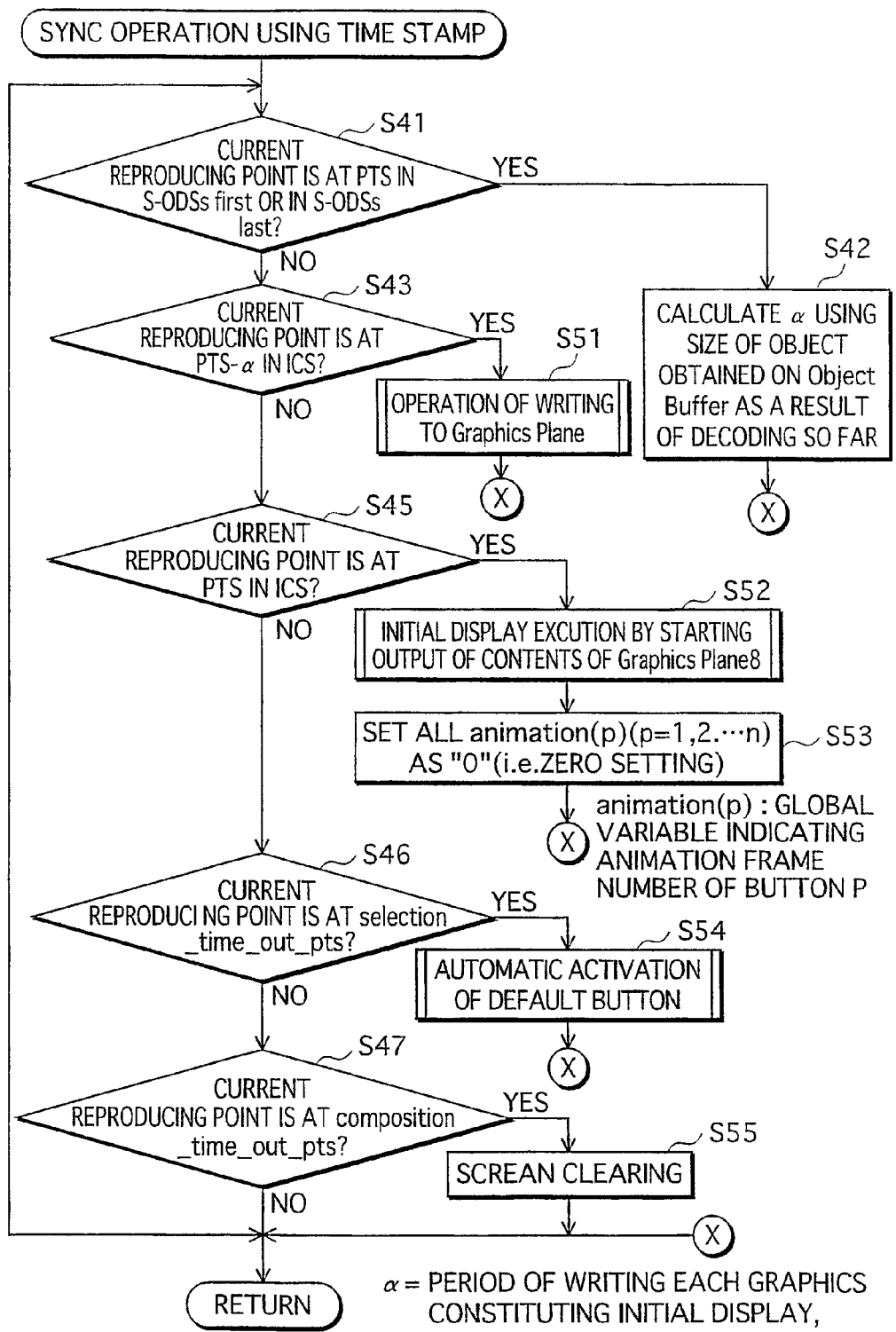
FIG. 72 is a flowchart illustrating a processing for realizing sync control that uses time stamp.

Here, the processing performed by the Graphics controller 17 is explained. The processing performed by the Graphics controller 17 is greatly changed from what are shown in FIGS. 36-38, to what are shown in FIGS. 71-78. FIG. 71 is a flowchart illustrating the main routine of the processing performed by the Graphics controller 17. FIG. 72 is a flowchart illustrating the processing for realizing sync control that uses time stamp. In this flowchart, judgment is performed as to any of the conditions of Steps S41, S43-S47 holds. If any of the conditions holds, a corresponding operation is performed, and then goes back to the main routine. The stated processing is a subroutine.

Step S41 is to judge whether the current reproducing point is one of the time represented by the PTS of the S-ODSsfirst, and the time represented by the PTS of the S-ODSslast. If the current reproducing point is judged to be one of the stated times, the period α thereof is calculated. The period α is obtained by summation of (2) period required for clearing a GraphicsPlane, and (1) period required for writing the Graphics Object obtained by ODS decoding, to the Graphics Plane.

At Step S42, the Graphics controller 17 refers to Composition_state in ICS, and a) if Composition_state is Epoch Start, sets α to be "plane clearing period (2)+plane writing period (3)"; b) if Composition_state is Acquisition Point, sets a to be the plane writing period (3). Calculation of the plane writing period (3) is performed as follows: if default_selected_button_number is a valid value, the calculating method of FIG. 54A is used; and if default_selected_button_number is 0, the calculating method of FIG. 54B is used. When α is calculated, the control will return to a loop processing.

Step S43 is to judge whether the current reproducing point is the time represented by PTS-α in ICS. If the judgment results in affirmative, a writing operation to the Graphics Plane 8 is performed (Step S51), and the control returns to the main routine.

Step S45 is to judge whether the current reproducing point is PTS in ICS. If the judgment results in affirmative, then the outputting of the contents of the Graphics Plane 8 is instructed. The destination of the contents is the CLUT unit 9. The CLUT unit 9 performs color conversion to the contents. Then the interactive screen will be combined with the contents of the video plane 9. As a result, the initial display is performed (Step S52). Then, the variable "animation(p)(p=1, 2, 3 . . . n) is set to be 0 (Step S53), and the control returns to the main routine. Here, the variable animation(p) is a global variable that indicates which number of frame in the frame sequence is currently displayed, used in executing the animation display of the button(p) (a global variable is a variable that is valid throughout a plurality of flowcharts). Therefore at Step S53, button (p) of all the buttons will be set to be 0.

Step S46 and Step S47 are to judge whether the current reproducing point has reached the time information described in ICS.

Step S46 is to judge whether the current reproducing time is the time represented by selection_TimeOut_PTS, and if the judgment results in affirmative, an operation for activating the button represented by default_activated_button_number is performed, and the control returns to the main routine (Step S54).

Step S47 is to judge whether the current reproducing point is Composition_TimeOut_PTS, and if the judgment results in the affirmative, the screen is cleared, then the control returns to the main routine (Step S55). In the sync operation stated above, each of the operations at Step S51 and Step S54 are performed as a subroutine. Following this, the subroutine at Step S51 is explained with reference to FIG. 73.

Figure 73:
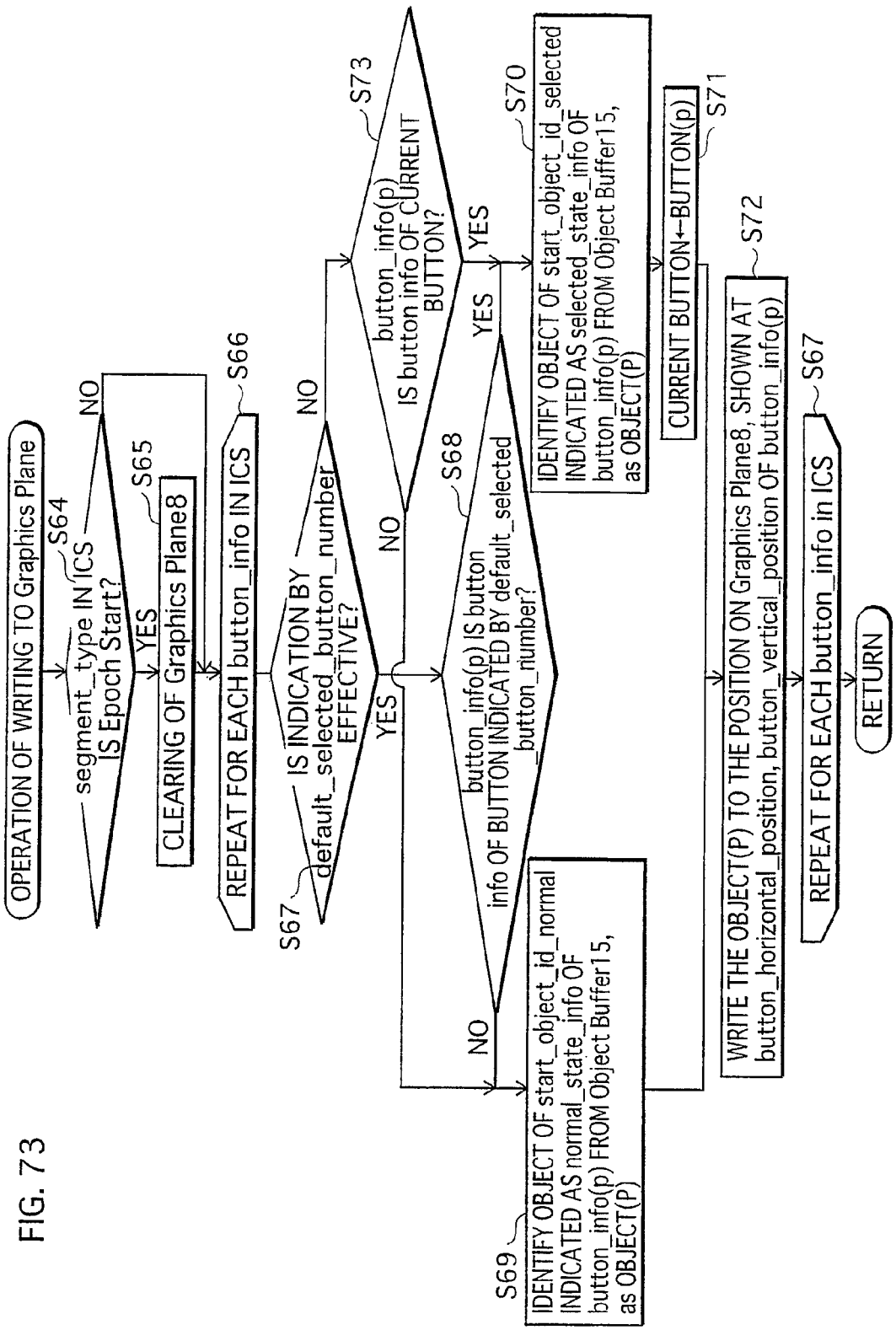
FIG. 73 is a flowchart showing a process of an operation to write to the Graphics Plane 8.

FIG. 73 is a flowchart illustrating the operation of writing the initial display of the menu, to the Graphics Plane 8. Step S64 is to judge whether Composition_state in ICS is Epoch Start, and if the judgment is in the affirmative, the Graphics Plane is cleared at Step S65, and the operations of Steps S66-S73 are performed. The period required for clearing the Graphics Plane 8 is the period cd1 in FIG. 56 and FIG. 57. If the judgment of Step S64 is in the negative, Step S65 is skipped, and the operations of Steps S66-S73 are performed.

Steps S66-S73 form a loop processing, which is to be repeated for each piece of button information of ICS (Step S66, S67). Button information that should go through this loop processing is called button information (p).

Step S67 is to judge whether the indication by default_selected_button_number is valid or not. Step S68 is to judge whether the button_info(p) is button information corresponding to the default selected button indicated by default_selected_button_number.

If the judgment in Step S68 is in the negative, the Graphics Object of start_object_id_normal, indicated by normal_state_info of button_info(p) is found from the Object Buffer 15, and is identified as Graphics Object(p) (Step S69).

If the judgment in Step S68 is in the affirmative, the Graphics Object of start_object_id selected, indicated by selected_state_info of button_info(p) is found from the Object Buffer 15, and is identified as Graphics Object(p) (Step S70), then the button (p) is set as the current button (Step S71). The current button is a button that has been set to be in selected state in the interactive screen currently displayed. The reproduction apparatus stores the identifier of this current button, as PSR(10).

Once the Graphics Object (p) has been identified as a result of Step S69 and Step S70, the Graphics Object (p) is written to the position on the Graphics Plane 8, which is indicated by button_horizontal_position and button_vertical_position of button_info (p) (Step S72). By repeating the above-described operations for each piece of button information, the first Graphics Object, which is among the plural graphic objects each showing the state of a corresponding button, is to be written to the Graphics Plane 8. The period required to perform the operation, which is directed to the Graphics Object that is necessary for at least the initial display of the Object Buffer 15, is shown by the period td1 of FIG. 56 and FIG. 57.

When default_selected_button_number is "=0", and that the default selected button changes dynamically, Step S67 will be No, and whether the button_info(p) corresponds to the current button is judged. If the judgment of Step S67 results in the affirmative, the control goes to Step S70; and if the judgment results in negative, the control is moved to Step S69.

Figure 74:
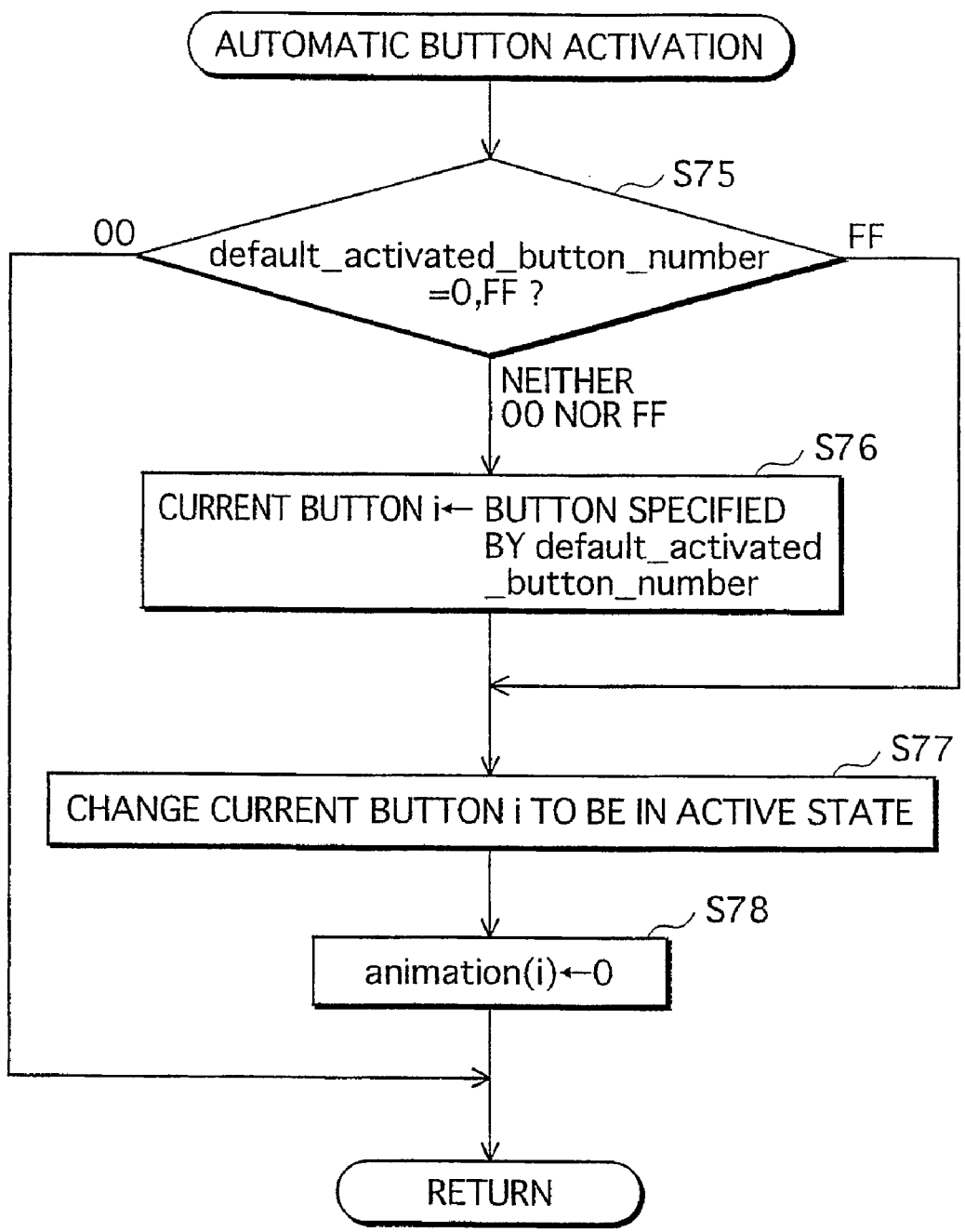
FIG. 74 is a flowchart illustrating an automatic activation processing for the default selected button.

Next, the subroutine processing at Step S54 is explained, with reference to FIG. 74.

FIG. 74 is a flowchart illustrating the automatic activation processing for the default selected button. First, whether default_activated_button_number is 0 or FF is judged (Step S75). If the judgment of Step S75 results in "00", no processing is performed and the control returns to the main routine; and if the judgment of Step S75 results in "FF", the current button i is changed into active state (Step S77), the variable animation (i) is set as 0, and the control returns to the main routine (Step S78).

If the judgment of Step S75 results in neither "00" nor "FF", the button specified as default_activated_button_number is set as the current button (Step S76), the current button i is changed into active state (Step S77), the variable animation (i) corresponding to the current button i is set as 0, and the control returns to the main routine (Step S78).

The above-stated processing enables the button in selected state, to be changed into active state after a predetermined time.

Figure 75:
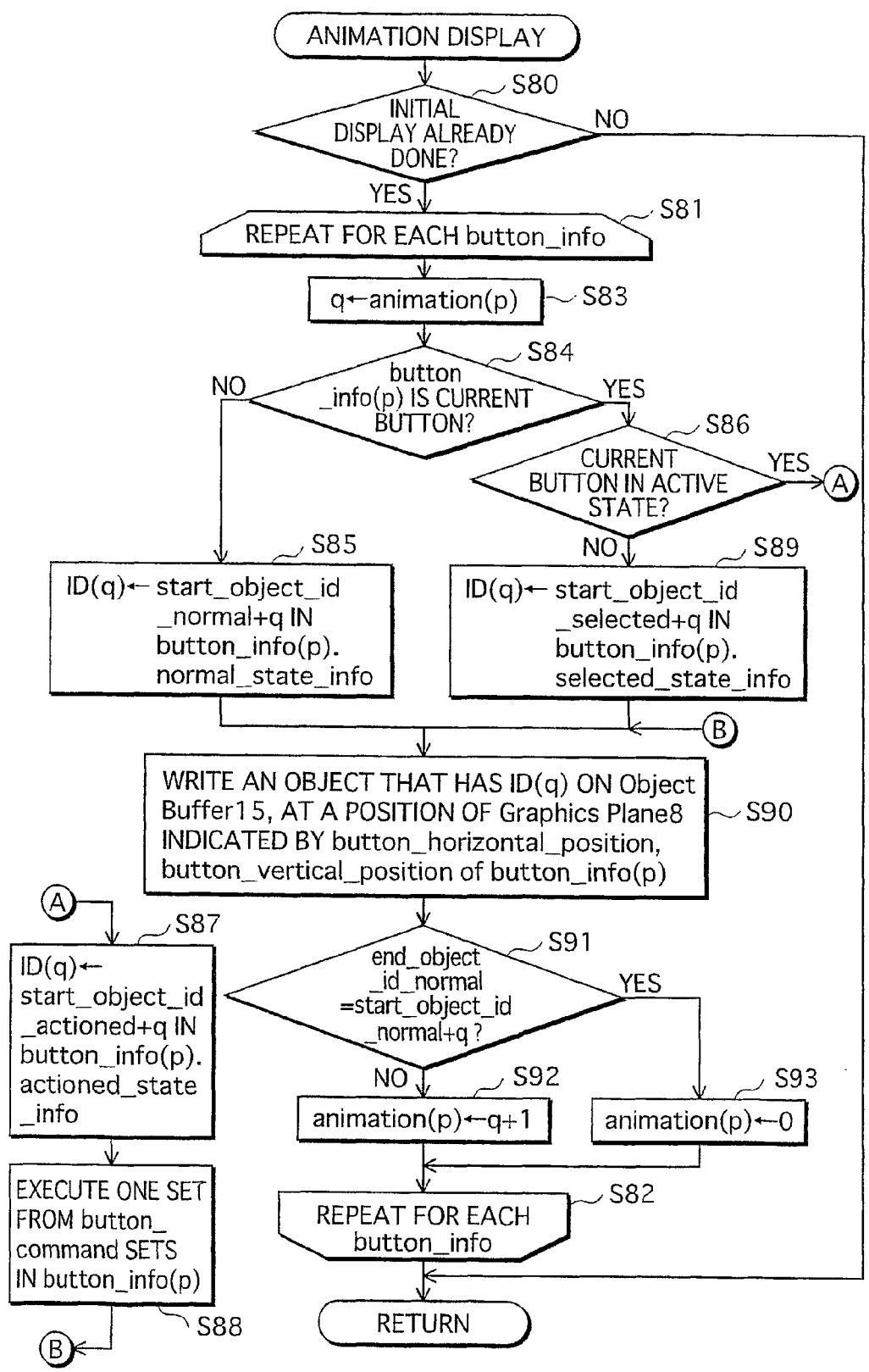
FIG. 75 is a flowchart showing an animation display process.

Next, the animation by means of the menu (Step S36) is explained. FIG. 75 is a flowchart showing the animation display processing.

Here, the initial display is realized by writing a Graphics Object to the Graphics Plane 8, the Graphics Object having been specified by 1) start_object_id_normal of normal_state_info and 2) start_object_id_selected of selected_state_info, for each button_info. Here, "animation" is a processing to update the Graphics Plane with an arbitrary frame of each button (i.e. Graphics Object of qth frame), every time a cycle of the loop processing of Step S35-Step S37 is completed. This update is performed by returning the main routine, by writing the Graphics Objects indicated by normal_state_info and selected_state_info of button_info, one by one to the Graphics Plane 8. Here, the variable q is used in identifying each Graphics Object indicated by normal_state_info and selected_state_info of button_info, for each piece of button information.

The processing for realizing this animation display is detailed with reference to FIG. 75. This flowchart assumes a case where repeat_normal_flag and repeat_selected_flag, of CIS, are set to indicate "repetition necessary", to simplify explanation.

Step S80 is to judge whether the initial display has finished. If the judgment of Step S80 results in the negative, the control returns without performing any processing; if the judgment of Step S80 results in the affirmative, Step S81-Step S93 are performed. Step S81-Step S93 constitute a loop processing of repeating the operations of Step S83-Step S93, for each button_info in ICS (Step S81, Step S82).

Step S83 is to set the variable animation(p) corresponding button_info(p), to the variable q. By performing this step, the variable q will indicate the current number of frames, which corresponds to the button_info(p).

Step S84 is to judge whether button_info(p) corresponds to the button currently in selected state (hereinafter "current button").

If the button_info(p) is judged other than the current button, judgment of Step S86 is performed.

Step S86 is to judge whether the current button is in active state, and if judging affirmatively, an identifier resulting from adding the variable q to start_object_id_actioned in button_info(p).actioned_state_info is set to be ID(q). Then, one button command among those included in button_info(p) is executed (Step S88).

If the current button is judged not be in active state, an identifier resulting from adding the variable q to start_object_id_selected in button_info(p).selected_state_info is set to be ID(q). (Step S89).

Once ID(q) is determined as a result of the above operations, the Graphics Object (p), having the ID(q) and existing in the Object Buffer 15, is written to the position on the Graphics Plane 8 indicated by button_horizontal_position and button_vertical_position of button_info(p) (Step S90).

By the above-explained loop processing, among the plural Graphics Objects that constitute the selected state (or the active state) of the current button, and the normal state of the other buttons, the Graphics Object corresponding to qth page is written to the Graphics Plane 8.

Step S91 is to judge whether start_object_id_normal+q has reached end_object_id_normal. If the judgment of Step S91 results in the negative, the value resulting from incrementing the variable q by 1 is set as the variable "animation(p)" (Step S92). If the judgment of Step S91 results in the affirmative, the variable "animation (p)" is initialized to have the value 0 (Step S93). The above-stated operations are repeated to all the button_info in ICS (Step S81, Step S82). When all the button_info have undergone the above operations, the control will return to the main routine.

During the above-explained Step S80-Step S93, each time the main routine (Step S35-Step S37) is performed one time, the image of each button of the interactive screen will be updated to a new Graphics Object. This means that, when the above-mentioned main routine (Step S35-Step S37) is performed several times, a so-called animation is realized. In the animation, the Graphics controller 17 adjust time so that the display interval for one frame of Graphics Object will be the value indicated by animation_frame_rate_code.

It should be noted here that, at Step S88, the button commands included in button_info(p) are executed one by one. However, it is also possible to execute the button commands collectively, after the series of Graphics Objects corresponding to the active state has been displayed. Next, the process of UO operation, which is to be performed at Step S37 of the main routine, is explained with reference to FIG. 76.

Figure 76:
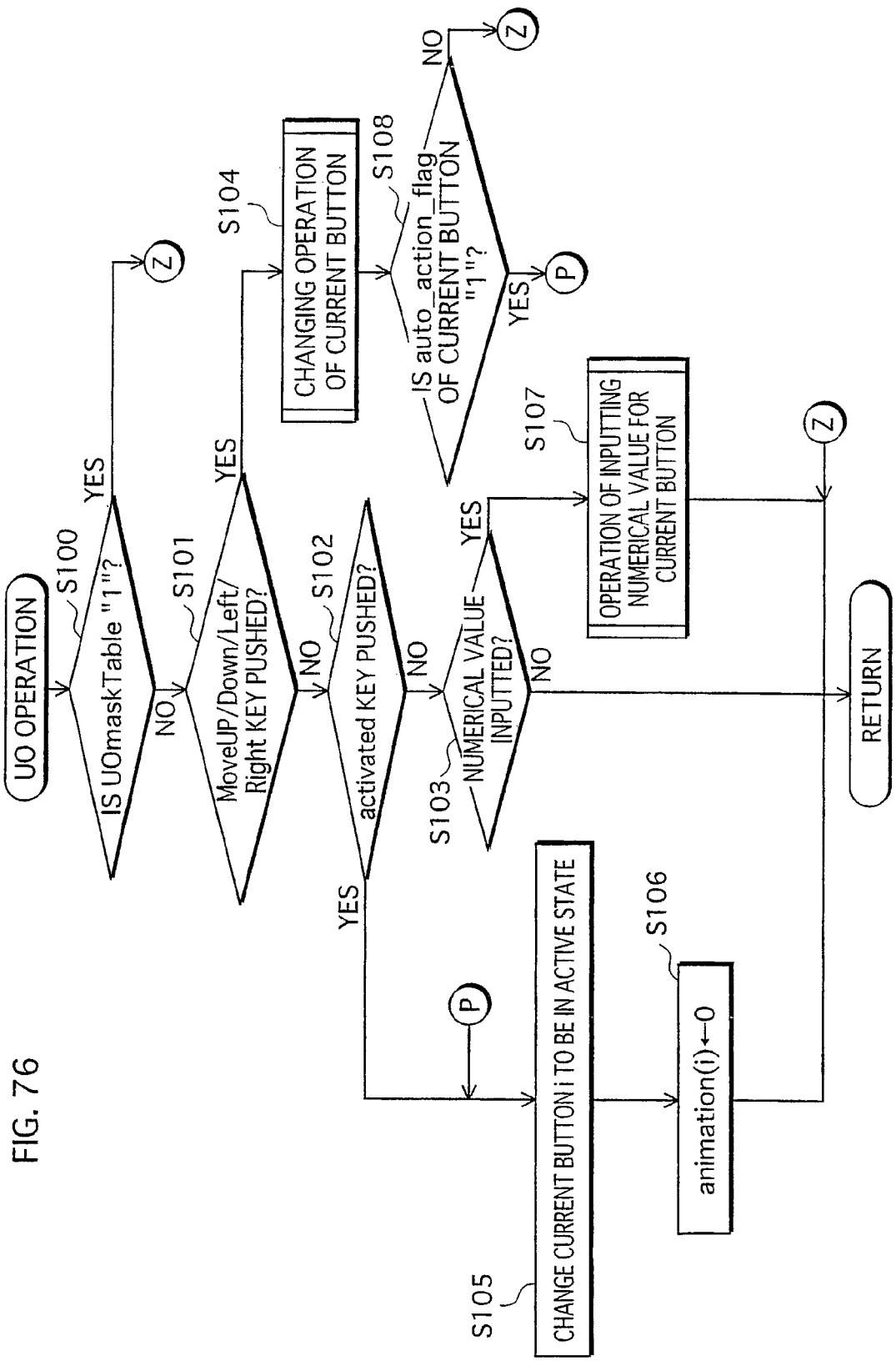
FIG. 76 is a flowchart illustrating a process of UO operation.

FIG. 76 is a flowchart showing the process of UO operation. In this flowchart, it is judged whether any of the conditions of Step S100-Step S103 holds. If any of the conditions holds, a corresponding processing is performed, and then goes back to the main routine. Step S100 is to judge whether UomaskTable is set as "1", and if the judgment is in the affirmative, the control will return to the main routine, without performing any processing.

Step S101 is to judge whether MoveUP/Down/Left/Right key has been pushed. If the judgment is in the affirmative, the current button is changed (Step S104), and it is then judged whether auto_action_flag of the current button is 01 (Step S108). If the judgment of Step S108 is in the negative, the control returns to the main routine. If the judgment of Step S108 is in the affirmative, the control is moved to Step S105.

Step S102 is to judge whether the activated key has been pushed. If the judgment is in the affirmative, the current button i is changed to an active state (step S105). Then, the variable "animation(i)" is set to be 0 (Step S106).

Figure 77:
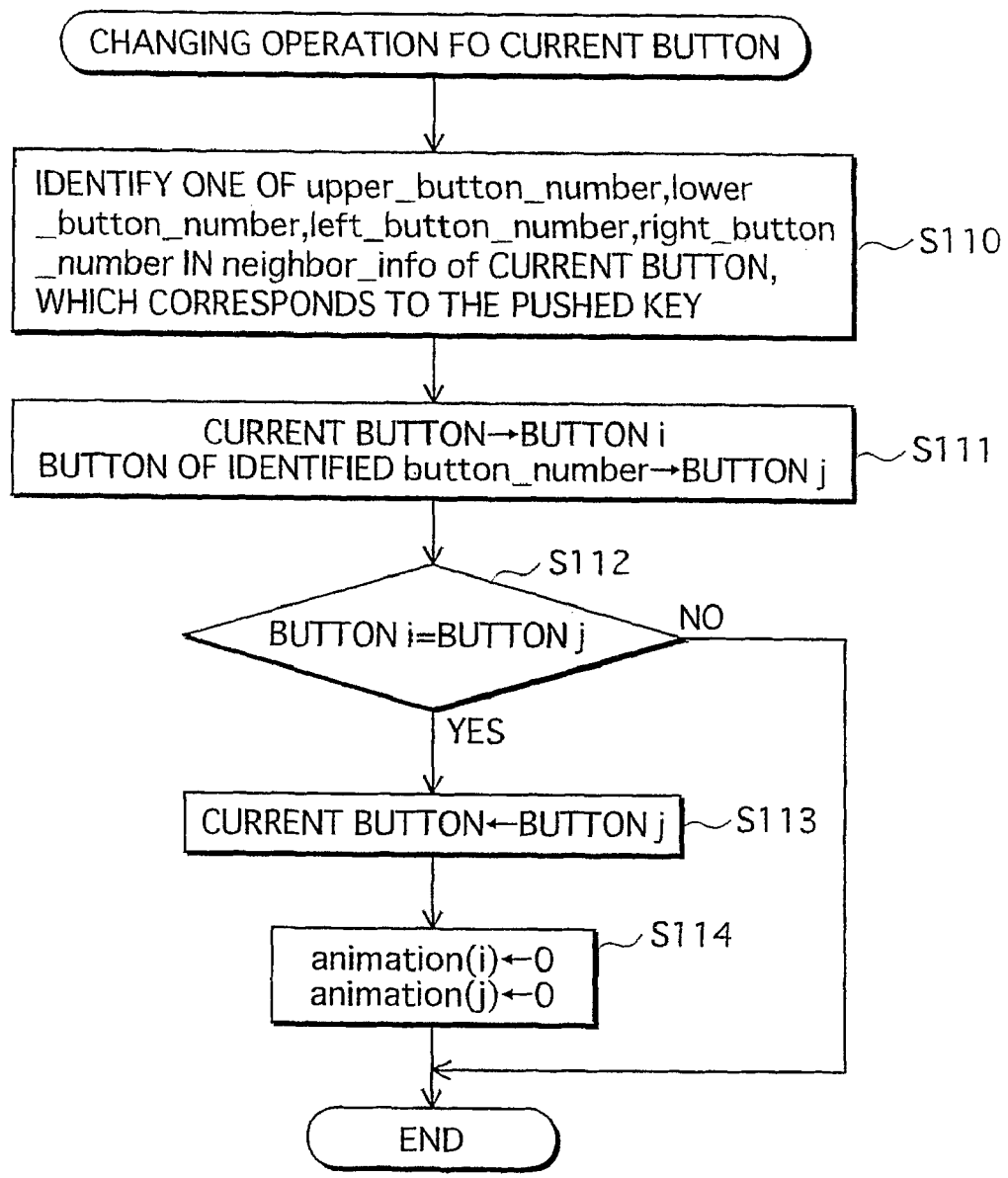
FIG. 77 is a flowchart illustrating a process of current button changing operation.
Figure 78:
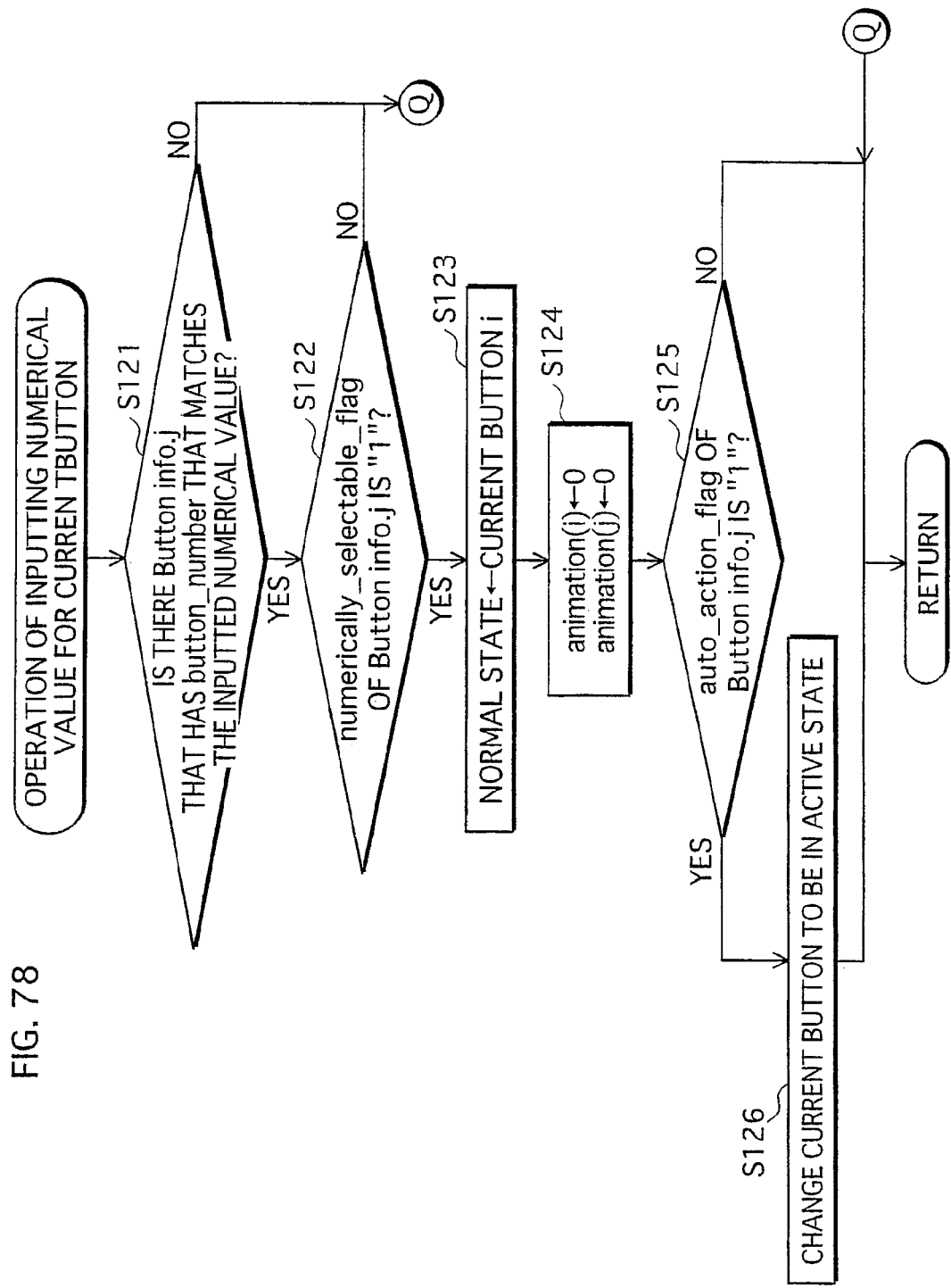
FIG. 78 is a flowchart illustrating a process of numerical value inputting operation.

Step S103 is to judge whether it is a case of numerical value inputting. If the judgment is in the affirmative, a corresponding numerical inputting operation is performed (Step S107), and the control returns to the main routine. Among the processes in FIG. 76, each of Step S104 and Step S107 is a subroutine. The processes of these subroutines are shown in FIG. 77 and FIG. 78. The following is an explanation on these flowcharts.

FIG. 77 is a flowchart showing the process of current button changing operation. First, among upper_button_number, lower_button_number, Left_button_number, and right_button_number, which belong to neighbor_info of the current button, the one corresponding to the pushed key is identified (Step S110).

Then the current button is set as "button i", and the button to be the new current button is set as "button j" (Step S111). Step S112 is to judge whether the button j set in Step S1 corresponds to the button i. If they correspond to each other, the control will return to the main routine without performing any processing. If they do not correspond to each other, the button j is set as the current button (Step S113), the variable "animation(i)" and the variable "animation(j) are set to be 0, and the control returns to the main routine (Step S114).

FIG. 78 is a flowchart showing the process of numerical value inputting operation.

Judgment is performed as to whether there is Button info.j that has button_number matching the inputted numerical value (Step S121). Then judgment is performed as to whether numerically_selectable_flag, of Button info.j, is 1 (Step S122). If Step S121 and Step S122 are "Yes", the current button is changed to a normal state, and the button j is set as the current button (Step S123), and the variable "animation (i)" and the variable "animation(j) are set to be 0 (Step S124). After these operations, judgment is performed as to whether auto_action_flag, of Button info.j, is 1 (Step S125). If the judgment is in the negative, the control returns to the main routine.

If the judgment is in the affirmative, the current button is changed to an active state at Step S126, and the control returns to the main routine.

If any one of Steps S121-S122 is No, the control will return to the main routine.

The Graphics controller 17 performs the above processes, for performing sync display. Here, please note that if performing an interactive screen display triggered by a user operation using Popup display or the like, the Stream Graphics processor 14 and the Graphics controller 17 perform the following operations, which are the same operations performed for performing sync display. By performing the following operations, the Graphics Object is obtained in the Graphics Plane 8. After the Graphics Object is obtained as mentioned above, it is waited until the current reproducing point passes the time indicated by the PTS assigned to ICS. Then, after the mentioned time, if the UO controller 18 receives UO indicating a menu call, it will be outputted to the CLUT unit 9, and instructs the CULT unit 9 to perform the Graphics Object stored in the Graphics Plane 8. If such outputting is performed in synchronization with the UO, a Popup display in accordance with the push of the menu call will be realized.

The above explanation sets forth the setting of PTS in ICS; and DTS in ODS and PTS, which belong to DSn. However, it does not mention DTS in ICS; DTS and PTS in PDS; DTS and PTS in END. In view of this, the following explains the time stamps relating to these. Since WDS does not exist in the second embodiment, ICS should be loaded to the Composition buffer 16, prior to 1) the decoding start time of the first PDS (PDS1) of DSn (i.e. DTS(DSn[ODS1])), and 2) the time at which the first PDS(PDS1) in DSn becomes available (i.e. PTS(DSn[PDS1])). In other words, it should be set the value that satisfies the following expression:

$$DTS(DSn[ICS]) \leq DTS(DSn[ODS1])$$

$$DTS(DSn[ICS]) \leq PTS(DSn[PDS1])$$

Next, the setting of DTS and PTS, for each PDS belonging to DSn, is explained.

The time at which each PDS belonging to DSn becomes valid in the CLUT unit 9, is from 1) the time at which ICS is loaded to the Composition buffer 16 to 2) the decoding start time for the first ODS (DTS(DSn[ODS1]). In view of this, the PTS value of each PDS belonging to the DSn (i.e. PDs1-PDSlast) should be set to the value that satisfies the following relations:

$$DTS(DSn[ICS]) \leq PTS(DSn[PDS1])$$

$$PTS(DSn[PDSj]) \leq PTS(DSn[PSj+1]) \leq PTS(DSn[PDSlast])$$

$$PTS(DSn[PDSlast]) \leq DTS(DSn[ODS1])$$

Next, the setting of PTS of "END of Display SetSegment" belonging to DSn is explained. The END that belong to DSn shows the ending of the DSn. Therefore it should be the decoding end time of the last ODS(ODSlast) of the DSn. This decoding end time is indicated by PTS(PTS(DSn[ODSlast])), and so PTS of End should be set as the value indicated by the following expression:

$$PTS(DSn[END])=PTS(DSn[ODSlast])$$

In view of the relation with ICS belonging to DSn and DSn+1, ICS in DSn is loaded to the Composition buffer 16 prior to the loading time of the first ODS (i.e. ODS1). Therefore PTS in END should be after 1) the loading time of ICS belonging to DSn (i.e. DTS(DSn[ICS])), and before 2) the loading time of ICS belonging to DSn+1 (i.e. DTS(DSn+1[ICS])). Accordingly, the PTS in END should satisfy the following relation:

$$DTS(DSn[ICS]) \leq PTS(DSn[END]) \leq DTS(DSn+1[ICS])$$

On the other hand, the loading time of the first ODS (i.e. ODS1) PTS in END (i.e. PTS(DSn[END])) should be after the loading time of PDS belonging to DSn. Accordingly, PTS in END should satisfy the following relation:

$$PTS(Dsn[PDSlast]) \leq PTS(DSn[END])$$

Since the ICS, PDS, ODS to which DTS and PTS are set, are incorporated in AVClip in advance, it is convenient to describe an interactive control for making the reproduction apparatus execute a certain operation at the time when a frame of a certain moving picture appears in the screen. In other words, the above arrangement is convenient to describe an interactive control that is synchronized closely with the moving picture contents. In addition, the ICS, PDS, and ODS are multiplexed onto the AVClip itself. Therefore in a case where the sections to which a user would like to perform reproduction control are numerous, such as some hundreds, it is not necessary to store all the IDS, PDS, and ODS, which correspond to all of the sections, in the memory. Because the ICS, PDS, and ODS are to be read from a BD-ROM, the following arrangement is sufficient. That is, ICS, PDS, and ODS, which correspond to the moving picture section to be played back at the moment, stay resident in the memory. After playback for this moving picture section is finished, the corresponding ICS, PDS, and ODS are deleted from the memory, and instead, ICS, PDS, ODS corresponding to the succeeding moving picture section are stored in the memory. Since ICS PDS, and ODS are to be multiplexed onto AVClip, even if the number of ICS, PDS, and ODS becomes some hundreds, the occupancy of the memory can be restrained to a minimum required level.

As explained above, the present embodiment has 360 pages of ODS so as to realize animation. Therefore when the button material is grouped under three states, the ODS will be grouped by 120 pages (i.e. into three button-state groups). The button-state groups are arranged so that a group corresponding to earlier appearing state is placed more to the beginning, compared to a group corresponding to later appearing state. Because of this, at reproduction, a button-state group corresponding to earlier appearing state is loaded to the reproduction apparatus accordingly earlier, compared to a button-state group corresponding to later appearing state. According to this, even if decoding of all the 360 pages of ODS has not been complete, at least the initial display is ready for being performed if only about ⅓-⅔ of the total ODS is complete. Since the initial display operation can be commenced at the completion of about ⅓-⅔ of the total ODS, even if there are numerous ODS to be read and decoded, the initial display will not be delayed. Therefore, an interactive screen is executed swiftly, even if the screen contains animation to entertain users.

(Third Embodiment)

Figure 79:
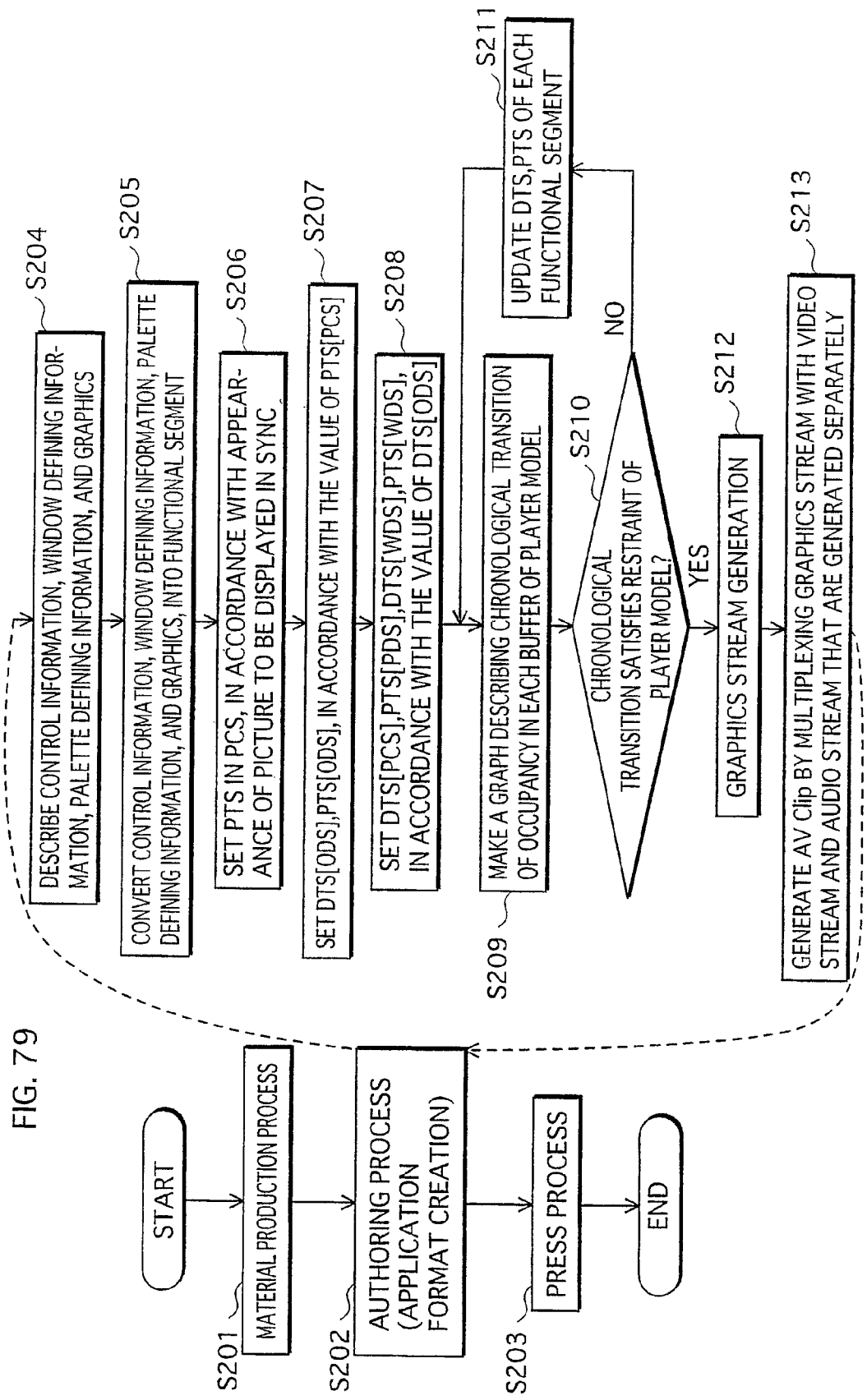
FIG. 79 illustrates a method of manufacturing a BD-ROM that records the PCS explained in the first embodiment.

The present embodiment relates to a manufacturing method of a BD-ROM. FIG. 79 illustrates a method of manufacturing the PCS explained in the first embodiment.

The manufacturing method of a BD-ROM includes: a material producing step S201 of photographing an image picture, and of recording corresponding audio, for example; an authoring step S202 of generating an application format; and a press step S203 of completing the BD-ROM by performing pressing/lamination.

Among these steps, the authoring step directed to BD-ROM includes the following step S204-Step S210.

At Step S204, control information, window define information, palette define information, and graphics are described. At Step S205, the control information, the window define information, the palette define information, and the graphics are respectively converted into a functional segment. At Step S206, PTS in PCS is set, according to when the picture to be displayed in sync appears. At Step S207, DTS [ODS] and PTS[ODS] are set, according to the value of PTS[PCS]. At Step S208, DTS[PCS], PTS[PDS], DTS [WDS], and PTS[WDS] are set, according to the value of DTS[ODS], and at step S209, the chronological change, in occupancy, of each buffer of the planer model is expressed as a graph. At Step S210, it is judged whether the chronological change expressed in graph satisfies the restriction imposed at the player model.

If the judgment of Step S210 results in the affirmative, a graphics stream is created at Step S212, and an AVClip is obtained by multiplexing the graphics stream with a video stream and an audio stream, which have been created separately from the graphics stream. Then the AVClip is made to be in conformity with the format of the BD-ROM, thereby completing an application format.

The above explanation is for the manufacturing method of the recording medium according to the first embodiment. A manufacturing method of the recording medium according to the second embodiment is shown in FIG. 80. In FIG. 80, Step S304-Step S308 replace Step S204-Step S208 of FIG. 79.

As follows, Step S304-Step S308 are explained. At Step S304, control information, palette define information, and graphics are described. At Step S305, the control information, the palette define information, and the graphics are respectively converted into a functional segment. At Step S306, PTS in ICS is set, according to when the picture to be displayed in sync appears. Then at Step S307, DTS[ODS] and PTS[ODS] are set, according to the value of PTS[ICS]. At Step S308, DTS[ICS] and PTS[PDS] are set, according to the value of DTS[ODS].

(Note)

Needless to say, the above explanation does not show all the embodiments and use form of the present invention. The present invention is also realized by an embodiment to which any of the following modifications (A), (B), (C), (D), . . . etc. is added. Please note that the inventions in the claims of the present invention are broadened or generalized descriptions of either the above-described embodiments, or the modified embodiments based on the following modifications. The extent of the broadening and generalization reflects the state of the art at the time of filing.

(A) In all the embodiments, the recording medium according to the present invention is assumed to be a BD-ROM. However, the characteristics of the recording medium of the present invention lies on the graphics stream stored in the recording medium, and this characteristics does not rely on the physical nature of a BD-ROM. In other words, any recording medium that is operable to record a graphics stream may be used in realizing the present invention. The examples include: an optical disk such as DVD-ROM, DVD-RAM, DVD-RW, DVD-R, DVD+RW, DVD+R, CD-R, CD-RW; and an optical magnetic disk such as PD and MD. The examples further include a semiconductor memory card such as a compact flash card, a smart media, memory stick, multimedia card, and a PCM-CIA card. Still further, the examples include: a magnetic recording disk such as a flexible disk, SuperDisk, Clik!; and a removable hard disk drive such as ORB, Jaz, SparQ, SyJet, EZFley, and micro drive. The examples also include a hard disk incorporated in an apparatus.

(B) In the all the embodiments, the reproduction apparatus decodes the AVClip stored in the BD-ROM, before outputting it to a television. However, a structure is also possible in which the reproduction apparatus is a mere BD-ROM drive, and the other components are included in the television. In this case, the reproduction apparatus and the television may be connected to each other via an IEEE1394, to constitute a home network. The reproduction apparatus of the embodiments is for use with the television connected thereto. However, the reproduction apparatus may be integral with a display. Furthermore, in the reproduction apparatus of each of the embodiments, only the system LSI (integrated circuit), which is the essence of the processing, may be considered the invention. The reproduction apparatus and the integrated circuit are both the inventions described in the present specification, and so the act of manufacturing a reproduction apparatus having any of the stated form and manner, based on the internal structure of the reproduction apparatus of the first embodiment is also an embodiment of the present invention. Any act of transfer whether incurring charge or not (sales if incurring charge, and gifts if not incurring charge), rent, and import constitute an embodiment of the present invention. In addition, any act of performing these transfer and rent, through the exhibition at the shops, catalogue solicitation, and pamphlet distribution, also constitutes an embodiment of the present invention.

(C) The information processing shown in each flowchart is concretely realized using hardware resources. Therefore any programs whose processes are shown in the flowcharts may respectively constitute an independent invention. All the embodiments relating to the programs assume that a program is in the form incorporated in the corresponding reproduction apparatus. However, The program itself, shown in the first embodiment, may be an independent embodiment from the corresponding reproduction apparatus. The embodiment of a program itself includes: (1) act of manufacturing the program; (2) act of transfer the program whether incurring charge or not; (3) act of renting; (4) act of importing; (5) act of providing to the public through an interactive electronic communication circuit; and (6) offering the transfer to general users, through exhibition at shops, catalogue solicitation, pamphlet distribution, and so on.

(D) If the time concept existing in each step, which is executed chronologically in every flowchart, is considered an indispensable factor for specifying the present invention, then each process in the flowchart is interpreted to disclose a use pattern of the reproduction method. If the processes of the above-explained flowcharts are executed by chronologically executing each step therein, so as to be effective for and instrumental in achieving the object of the present invention, that will correspond to the embodiment of the recording method of the present invention.

(E) When being recorded to the BD-ROM, it is desirable that each TS packet constituting an AVClip is assigned an extra header. The extra header is called "TP_extra_header", includes "Arrival_Time_Stamp" and "copy_permission_indicator", and has 4-byte length. TP_extra_header-assigned TS packets (EX-assigned TS packet) are divided into groups each including 32 TS packets, and are written into three sectors. The total size of the groups each composed of 32 EX assigned TS packets is 6144 bytes (=32*192), which is equal to the total size of the three sectors (6144 bytes (=2048*3). 32 EX-assigned TS packets stored in one sector is referred to as "Aligned Unit".

When used in the home network connected through the IEEE1394, the reproduction apparatus performs Aligned Unit transmission by the following transmission processing. That is, the sender apparatus removes TS_extra_header from each of the 32 EX-assigned TS packets in an Aligned Unit, encodes the TS packets's main bodies, and outputs them. In outputting the TS packets, isochronous packets are inserted in many places between the TS packets. The exact insertion places are based on the time shown by Arrival_Time_Stamp of TS_extra_header. In response to outputting of the TS packets, the reproduction apparatus outputs DTCP_Descriptor. DTCP_Descriptor signifies the copy permit/prohibit setting of TP_extra_header. Therefore, if DTCP_Descriptor is described to signify "prohibit copy", the TS packets will not be recorded on another apparatus, at the time when they are used in the home network connected through the IEEE1394.

(F) The digital stream in each of the embodiments is an AVClip in the BD-ROM standard. However, it may alternatively be a VOB (Video Object) in the DVD-Video standard or in the DVD-Video Recording standard. A VOB is a program stream conforming to the ISO_IEC13818-1 standard, and is obtained by multiplexing a video stream and an audio stream. The video stream in an AVClip may alternatively be in MPEG4 method or in WMV method. Furthermore, an audio stream may alternatively be in Dolby=AC3 method, MP3 method, MPEG-AAC method, or dts method.

(G) The movie works in the embodiments may be obtained by encoding analogue image signals, or stream data made up of transport streams broadcasted through a digital broadcast. Furthermore, a content may be obtained by encoding analogue/digital movie signals recorded on videotape, or may be a digital work distributed from a distribution server.

(H) The Graphics Object, shown in the first and second embodiments is raster data that has been encoded in run-length encoding method. The reason why the run-length encoding method is used as compressing/encoding method of Graphics Objects is that the run-length encoding method is the most suitable for compressing/decompressing subtitles.

Subtitles are characteristic in that the continual length of one pixel value in horizontal direction is comparatively long. Therefore, if using the run-length encoding compression, a high compression rate is obtained. In addition, the load incident to decompression is not much, and so is suitable for creating software for decoding processing. In the present invention, compression/decompression method used for the subtitles is used for the Graphics Object, so that one apparatus structure for performing decoding is shared between the subtitles and the Graphics Objects. However, adopting of run-length encoding method for Graphics Objects is not an indispensable feature of the present invention, and Graphics Objects may alternatively be PNG data. In addition, raster data may be vector data, or transparent images.

(I) Display effects of PCS may be given to graphics of subtitles selected according to the language setting at the apparatus side. By this, the display effect used to be realized by characters represented by the moving picture main body in current DVDs is able to be realized using the subtitle graphics displayed according to the language setting at the apparatus side. This is practically very valuable.

(J) Display effects of PCS may be given to graphics of subtitles selected by the apparatus side according to the display setting. Specifically, graphics for various display modes such as wide vision, pan scan, and letter box have been recorded on a BD-ROM, and the apparatus selects one of them according to the setting of the television to which the apparatus is connected to, and displays the selected type of graphics. In this case, a display effect will be given to the subtitle graphics displayed in the above way. Therefore the subtitle graphics will look better. By this, the display effect used to be realized by the characters represented by the moving picture main body in the current DVDs is able to be realized using the subtitle graphics displays according to the display setting at the apparatus side. This is practically very valuable.

(K) In the first embodiment, the write rate Rc to the Graphics Plane is defined so that the window size is 25% of the entire size, so that Graphics Plane clearing and re-rendering are possible within one video frame. However alternatively, if assuming that the vertical retrace time is 25% of 1/29.93, then the Rc will be 1 Gbps. By setting RC as such, the graphics display will be facilitated. This is practically very valuable.

In addition to writing at the vertical retrace time, writing synchronized with the write scan may be simultaneously performed. By this, even if the write rate is Rc=256 Mbps, display will be facilitated.

(L) In each of the embodiments, the reproduction apparatus is equipped with a Graphics Plane. However, instead of this Graphics Plane, a line buffer that can store decompressed pixels for one line may be mounted to the reproduction apparatus. Since the conversion into an image signal can be performed for each horizontal row (i.e. line), if such a line buffer is provided, the reproduction apparatus is able to perform the conversion into an image signal.

(M) Subtitles being graphics are explained above, as character sequences for representing words uttered in the movie works. However, the subtitles may contain a combination of figure, character, and color, as constituting a trademark. Further, the subtitles may contain all sorts of national marks, official marks adopted by nations for supervision and authorization, marks of international organizations, marks representing places of origin of specific commodities, and the like.

(N) The first embodiment assumes that subtitles are displayed at the upper/lower parts of the screen, and so the windows are defined at the upper/lower parts of the Graphics Plane, accordingly. However, it is also possible to define the windows at the right/left parts of the Graphics Plane. This is useful in displaying Japanese subtitles in longitudinal direction.

(O) AVClip in each of the embodiments constitutes a movie work. However, AVClip may be for realizing "karaoke" (accompaniment of prerecorded tape). In this case, in the course of a song, PCS may realize a display effect that changes the color of subtitles, for example.

(P) In a case where plural reproduction paths joint to one another, and that the default selected button changes depending on which reproduction path is to be taken, the following arrangement is preferable. That is, reproduction control in the dynamic scenario is described so that at the time when each reproduction path is passed, the eigenvalue for the reproduction path is set at the register of the reproduction apparatus, and that the reproduction processes are described so that buttons will be set in a selected state according to the values set in the register. By this arrangement, the button to be in a selected state can be changed according to which reproduction path is to be passed.

Industrial Applicability

A recording medium and a reproduction apparatus, of the present invention, realize a subtitle display having display effect and an interactive display containing animation, and so help provide the market with movie works of high added values, which helps invigorate the movie market and the consumer goods market. Accordingly, the recording medium and the reproduction apparatus, of the present invention, are very useful in the movie industry and the consumer goods industry.

The invention claimed is:

1. A reproduction apparatus for reproducing a digital stream that is obtained by multiplexing a video stream and a graphics stream, the reproduction apparatus comprising:
   a video decoder obtaining a moving picture by decoding the video stream; and
   a graphics decoder combining graphics data with the moving picture and displaying the graphics data combined with the moving picture,
   wherein the graphics stream is a packet sequence including a plurality of packets,
   wherein the plurality of packets include a data packet storing the graphics data and a control packet storing control information,
   wherein the data packet includes a first decode time stamp and a first presentation time stamp,
   wherein the control packet includes a second decode time stamp and a second presentation time stamp,
   wherein the graphics decoder comprises:
      a processor starting decoding of the graphics data when a current reproduction point reaches a point shown by the first decode time stamp, and ending the decoding of the graphics data when the current reproduction point reaches a point shown by the first presentation time stamp;
      a controller combining the graphics data in a decoded state with the moving picture, according to the second presentation time stamp, and displaying the graphics data combined with the moving picture;
      a coded data buffer storing the graphics data in a compressed state; and
      an object buffer storing the graphics data in a decompressed state resulting from the decoding by the processor,
   wherein the reproduction apparatus further comprises a graphics plane storing part of the graphics data in the decompressed state stored in the object buffer, the part of the graphics data being used for display,
   wherein, when the graphics data is constituted of two sets of graphics data,
   a value of the second presentation time stamp is equal to or greater than a value obtained by adding a predetermined value to a value of the second decode time stamp,
   the predetermined value is a total of a period X and a period Y,
   the period X is a longer one of: a total (a) of a period required for clearing a screen and a period required for writing the former of the two sets of graphics data in the decoded state, to the screen; and a total period (b) required for decoding the two sets of graphics data,
   the period Y is a period required for writing, to the screen, the latter of the two sets of graphics data in the decoded state, and
   wherein the controller judges whether type information included in the control information indicates a memory management start, and if judging affirmatively, starts memory management by clearing the coded data buffer, the object buffer, and the graphics plane when the current reproduction point of the video stream reaches the value of the second decode time stamp, reads the control information from the control packet and, when the current reproduction point reaches the value of the second presentation time stamp, displays content of the graphics plane.

2. A recording medium reproduction system including: a recording medium; and a reproduction apparatus for reproducing data on the recording medium,
   wherein the recording medium has stored thereon a digital stream, the digital stream is obtained by multiplexing a graphics stream and a video stream, the graphics stream being a packet sequence including a plurality of packets,
   wherein the plurality of packets, which constitute the graphics stream, include a data packet storing the graphics data and a control packet storing control information,
   wherein the data packet includes a first decode time stamp and a first presentation time stamp,
   wherein the control packet includes a second decode time stamp and a second presentation time stamp,
   wherein a value of the first decode time stamp indicates a timing for decoding the graphics data,
   wherein the control information includes type information,
   wherein a value of the second presentation time stamp indicates a timing for combining the graphics data in a decoded state with the moving picture and displaying the graphics data combined with the moving picture,
   wherein a value of the second decode time stamp indicates (i) a time for a memory management start in a reproduction time axis of the digital stream and (ii) a timing for reading the control information into the memory,
   wherein, when the graphics data is constituted of two sets of graphics data,
   the value of the second presentation time stamp is equal to or greater than a value obtained by adding a predetermined value to the value of the second decode time stamp,
   the predetermined value is a total of a period X and a period Y,
   the period X is a longer one of: a total (a) of a period required for clearing a screen and a period required for writing the former of the two sets of graphics data in the decoded state, to the screen; and a total period (b) required for decoding the two sets of graphics data, the period Y is a period required for writing, to the screen, the latter of the two sets of graphics data in the decoded state, wherein the reproduction apparatus comprises:
   a video decoder obtaining a moving picture by decoding the video stream; and
   a graphics decoder combining the graphics data with the moving picture and displaying the graphics data combined with the moving picture, the graphics decoder comprises:
   a processor starting decoding of the graphics data when a current reproduction point reaches a point shown by the first decode time stamp, and ending the decoding of the graphics data when the current reproduction point reaches a point shown by the first presentation time stamp;
   a controller combining the graphics data in the decoded state with the moving picture, according to the second presentation time stamp, and displaying the graphics data combined with the moving picture;
   a coded data buffer storing the graphics data in a compressed state; and
   an object buffer storing the graphics data in a decompressed state resulting from the decoding by the processor, wherein the reproduction apparatus further comprises a graphics plane storing part of the graphics data in the decompressed state stored in the object buffer, the part of the graphics data being used for display, and wherein the controller judges whether the type information included in the control information indicates the memory management start, and if judging affirmatively, starts memory management by clearing the coded data buffer, the object buffer, and the graphics plane when the current reproduction point of the video stream reaches the value of the second decode time stamp, reads the control information from the control packet and, when the current reproduction point reaches the value of the second presentation time stamp, displays content of the graphics plane.

3. A non-transitory recording medium having stored thereon a graphics stream being a packet sequence including a plurality of packets, wherein the plurality of packets, which constitute the graphics stream, include a data packet storing graphics data and a control packet storing control information, wherein the data packet includes a first decode time stamp and a first presentation time stamp, wherein the control packet includes a second decode time stamp and a second presentation time stamp, wherein a value of the first decode time stamp indicates a timing for decoding the graphics data, wherein the control information includes type information, wherein a value of the second presentation time stamp indicates a timing for combining the graphics data in a decoded state with a moving picture and displaying the graphics data combined with the moving picture, p1 wherein a value of the second decode time stamp indicates (i) a time for a memory management start in a reproduction time axis of a digital stream and (ii) a timing for reading the control information into a memory, and p1 wherein, when the graphics data is constituted of two sets of graphics data, p1 the value of the second presentation time stamp is equal to or greater than a value obtained by adding a predetermined value to the value of the second decode time stamp, p1 the predetermined value is a total of a period X and a period Y, p1 the period X is a longer one of: a total (a) of a period required for clearing a screen and a period required for writing the former of the two sets of graphics data in the decoded state, to the screen; and a total period (b) required for decoding the two sets of graphics data, and the period Y is a period required for writing, to the screen, the latter of the two sets of graphics data in the decoded state.

* * * * *

UNITED STATES PATENT AND TRADEMARK OFFICE
CERTIFICATE OF CORRECTION

PATENT NO. : 8,369,690 B2
APPLICATION NO. : 12/437477
DATED : February 5, 2013
INVENTOR(S) : McCrossan et al.

Page 1 of 2

It is certified that error appears in the above-identified patent and that said Letters Patent is hereby corrected as shown below:

On the Title page, Item (60):
Under Related U.S. Application Data, the priority claim to Provisional Application No. 60/485,207 filed on July 3, 2003 should be added.

In the Claims
Claim 3, Col. 58, line 16: "with'a" should read -- with a --.

Claim 3, Col. 58, lines 22-31:

The phrase "p1" is shown where new paragraphs within the claim should be. This section of the claim currently reads as:

...(i) a time for a memory management start in a reproduction time axis of a digital stream and (ii) a timing for reading the control information into a memory, and p1 wherein a value of the second decode time stamp indicates (i) a time for a memory management start in a reproduction time axis of a digital stream and (ii) a timing for reading the control information into a memory, and p1 wherein, when the graphics data is constituted of two sets of graphics data, p1 the value of the second presentation time stamp is equal to or greater than a value obtained by adding a predetermined value to the value of the second decode time stamp, p1 the predetermined value is a total of a period X and a period Y, p1 the period X is a longer one of: a total (a) of a period required for clearing a screen and a period required for writing the former of the two sets of graphics data in the decoded state, to the screen; and...

This portion of the claim should be formatted as follows, omitting the "p1":

... (i) a time for a memory management start in a reproduction time axis of a digital stream and (ii) a timing for reading the control information into a memory, and wherein a value of the second decode time stamp indicates (i) a time for a memory Signed and Sealed this
Thirtieth Day of July, 2013

Teresa Stanek Rea
*Acting Director of the United States Patent and Trademark Office* management start in a reproduction time axis of a digital stream and (ii) a timing for reading the control information into a memory, and wherein, when the graphics data is constituted of two sets of graphics data, the value of the second presentation time stamp is equal to or greater than a value obtained by adding a predetermined value to the value of the second decode time stamp, the predetermined value is a total of a period X and a period Y, the period X is a longer one of: a total (a) of a period required for clearing a screen and a period required for writing the former of the two sets of graphics data in the decoded state, to the screen; and ...